United States Patent
Linyaev et al.

(10) Patent No.: US 9,669,492 B2
(45) Date of Patent: Jun. 6, 2017

(54) HIGH POWER LASER OFFSHORE DECOMMISSIONING TOOL, SYSTEM AND METHODS OF USE

(71) Applicants: Eugene J. Linyaev, Magnolia, TX (US); Scott A. Marshall, Houston, TX (US); Daryl L. Grubb, Houston, TX (US); Ronald A. De Witt, Katy, TX (US); Paul D. Deutch, Houston, TX (US); Brian O. Faircloth, Evergreen, CO (US); Jason D. Fraze, Littleton, CO (US); Mark S. Zediker, Castle Rock, CO (US)

(72) Inventors: Eugene J. Linyaev, Magnolia, TX (US); Scott A. Marshall, Houston, TX (US); Daryl L. Grubb, Houston, TX (US); Ronald A. De Witt, Katy, TX (US); Paul D. Deutch, Houston, TX (US); Brian O. Faircloth, Evergreen, CO (US); Jason D. Fraze, Littleton, CO (US); Mark S. Zediker, Castle Rock, CO (US)

(73) Assignee: Foro Energy, Inc., Houston, TX (US)

(*) Notice: Subject to any disclaimer, the term of this patent is extended or adjusted under 35 U.S.C. 154(b) by 940 days.

(21) Appl. No.: 13/966,969

(22) Filed: Aug. 14, 2013

(65) Prior Publication Data
US 2013/0319984 A1    Dec. 5, 2013

Related U.S. Application Data

(63) Continuation-in-part of application No. 13/565,345, filed on Aug. 2, 2012, now Pat. No. 9,089,928, and a
(Continued)

(51) Int. Cl.
*B23K 26/00* (2014.01)
*B23K 26/38* (2014.01)
*B23K 26/10* (2006.01)

(52) U.S. Cl.
CPC ............ *B23K 26/38* (2013.01); *B23K 26/106* (2013.01)

(58) Field of Classification Search
CPC .............................. B23K 26/38; B23K 26/106
(Continued)

(56) References Cited

U.S. PATENT DOCUMENTS

| 914,636 A | 3/1909 | Case |
| 2,548,463 A | 4/1951 | Blood |

(Continued)

FOREIGN PATENT DOCUMENTS

| EP | 0 295 045 A2 | 12/1988 |
| EP | 0 515 983 A1 | 12/1992 |

(Continued)

OTHER PUBLICATIONS

International Search Report and Written Opinion of the International Searching Authority, PCT/US2014/029067, mailed Sep. 29, 2014.

(Continued)

*Primary Examiner* — Phuong Nguyen
(74) *Attorney, Agent, or Firm* — Glen P. Belvis; Steptoe & Johnson LLP.

(57) ABSTRACT

There is provided high power laser systems, high power laser tools, and methods of using these tools and systems for cutting, sectioning and removing structures objects, and materials, and in particular, for doing so in difficult to access locations and environments, such as offshore, underwater, or in hazardous environments, such as nuclear and chemical facilities. Thus, there is also provided high power laser
(Continued)

systems, high power laser tools, and methods of using these systems and tools for removing structures, objects, and materials located offshore, under bodies of water and under the seafloor.

25 Claims, 41 Drawing Sheets

Related U.S. Application Data continuation-in-part of application No. 13/222,931, filed on Aug. 31, 2011, and a continuation of application No. 13/211,729, filed on Aug. 17, 2011, now abandoned, and a continuation of application No. 13/347,445, filed on Jan. 10, 2012, now Pat. No. 9,080,425, and a continuation of application No. 13/210,581, filed on Aug. 16, 2011, now Pat. No. 8,662,160, and a continuation of application No. 13/403,741, filed on Feb. 23, 2012, now abandoned, and a continuation of application No. 12/543,986, filed on Aug. 19, 2009, now Pat. No. 8,826,973, and a continuation-in-part of application No. 12/544,136, filed on Aug. 19, 2009, now Pat. No. 8,511,401, and a continuation-in-part of application No. 12/840,978, filed on Jul. 21, 2010, now Pat. No. 8,571,368, and a continuation-in-part of application No. 12/706,576, filed on Feb. 16, 2010, now Pat. No. 9,347,271, and a continuation-in-part of application No. 13/366,882, filed on Feb. 6, 2012, now Pat. No. 9,138,786.

(60) Provisional application No. 61/514,391, filed on Aug. 2, 2011, provisional application No. 61/605,422, filed on Mar. 1, 2012, provisional application No. 61/605,429, filed on Mar. 1, 2012, provisional application No. 61/605,434, filed on Mar. 1, 2012, provisional application No. 61/378,910, filed on Aug. 31, 2010, provisional application No. 61/374,594, filed on Aug. 17, 2010, provisional application No. 61/431,827, filed on Jan. 11, 2011, provisional application No. 61/431,830, filed on Feb. 7, 2011, provisional application No. 61/446,312, filed on Feb. 24, 2011, provisional application No. 61/090,384, filed on Aug. 20, 2008, provisional application No. 61/102,730, filed on Oct. 3, 2008, provisional application No. 61/106,472, filed on Oct. 17, 2008, provisional application No. 61/153,271, filed on Feb. 17, 2009, provisional application No. 61/090,384, filed on Aug. 20, 2008, provisional application No. 61/102,730, filed on Oct. 3, 2008, provisional application No. 61/106,472, filed on Oct. 17, 2008, provisional application No. 61/153,271, filed on Feb. 17, 2009, provisional application No. 61/295,562, filed on Jan. 15, 2010, provisional application No. 61/439,970, filed on Feb. 7, 2011.

(58) Field of Classification Search
USPC .............. 219/121.7, 121.72, 121.75, 121.78, 219/121.63, 121.64, 121.67, 121.6, 219/121.84
See application file for complete search history.

(56) References Cited

U.S. PATENT DOCUMENTS

| | | |
|---|---|---|
| 2,742,555 A | 4/1956 | Murray |
| 3,122,212 A | 2/1964 | Karlovitz |
| 3,151,690 A | 10/1964 | Grable |
| 3,383,491 A | 5/1968 | Muncheryan |
| 3,461,964 A | 8/1969 | Venghiattis |
| RE26,666 E | 9/1969 | Henderson |
| 3,493,060 A | 2/1970 | Van Dyk |
| 3,497,020 A | 2/1970 | Kammerer, Jr. |
| 3,503,804 A | 3/1970 | Schneider et al. |
| 3,539,221 A | 11/1970 | Gladstone |
| 3,544,165 A | 12/1970 | Snedden |
| 3,556,600 A | 1/1971 | Shoupp et al. |
| 3,574,357 A | 4/1971 | Alexandru et al. |
| 3,586,413 A | 6/1971 | Adams |
| 3,652,447 A | 3/1972 | Yant |
| 3,679,863 A | 7/1972 | Houldcroft et al. |
| 3,693,718 A | 9/1972 | Stout |
| 3,699,649 A | 10/1972 | McWilliams |
| 3,786,878 A | 1/1974 | Chapman |
| 3,802,203 A | 4/1974 | Ichise et al. |
| 3,820,605 A | 6/1974 | Barber et al. |
| 3,821,510 A | 6/1974 | Muncheryan |
| 3,823,788 A | 7/1974 | Garrison et al. |
| 3,843,865 A | 10/1974 | Nath |
| 3,871,485 A | 3/1975 | Keenan, Jr. |
| 3,882,945 A | 5/1975 | Keenan, Jr. |
| 3,938,599 A | 2/1976 | Horn |
| 3,960,448 A | 6/1976 | Schmidt et al. |
| 3,977,478 A * | 8/1976 | Shuck ............... E21B 7/15 166/308.1 |
| 3,992,095 A | 11/1976 | Jacoby et al. |
| 3,998,281 A | 12/1976 | Salisbury et al. |
| 4,019,331 A | 4/1977 | Rom et al. |
| 4,025,091 A | 5/1977 | Zeile, Jr. |
| 4,026,356 A | 5/1977 | Shuck |
| 4,046,191 A | 9/1977 | Neath |
| 4,047,580 A | 9/1977 | Yahiro et al. |
| 4,057,118 A | 11/1977 | Ford |
| 4,061,190 A | 12/1977 | Bloomfield |
| 4,066,138 A | 1/1978 | Salisbury et al. |
| 4,090,572 A | 5/1978 | Welch |
| 4,102,418 A | 7/1978 | Kammerer, Jr. |
| 4,113,036 A | 9/1978 | Stout |
| 4,125,757 A | 11/1978 | Ross |
| 4,151,393 A | 4/1979 | Fenneman et al. |
| 4,162,400 A | 7/1979 | Pitts, Jr. |
| 4,189,705 A | 2/1980 | Pitts, Jr. |
| 4,194,536 A | 3/1980 | Stine et al. |
| 4,199,034 A | 4/1980 | Salisbury et al. |
| 4,227,582 A | 10/1980 | Price |
| 4,228,856 A | 10/1980 | Reale |
| 4,243,298 A | 1/1981 | Kao et al. |
| 4,249,925 A | 2/1981 | Kawashima et al. |
| 4,252,015 A | 2/1981 | Harbon et al. |
| 4,256,146 A | 3/1981 | Genini et al. |
| 4,266,609 A | 5/1981 | Rom et al. |
| 4,280,535 A | 7/1981 | Willis |
| 4,281,891 A | 8/1981 | Shinohara et al. |
| 4,282,940 A | 8/1981 | Salisbury et al. |
| 4,324,972 A | 4/1982 | Furrer et al. |
| 4,332,401 A | 6/1982 | Stephenson et al. |
| 4,336,415 A | 6/1982 | Walling |
| 4,340,245 A | 7/1982 | Stalder |
| 4,367,917 A | 1/1983 | Gray |
| 4,370,886 A | 2/1983 | Smith, Jr. et al. |
| 4,374,530 A | 2/1983 | Walling |
| 4,375,164 A | 3/1983 | Dodge et al. |
| 4,389,645 A | 6/1983 | Wharton |
| 4,401,477 A | 8/1983 | Clauer et al. |
| 4,415,184 A | 11/1983 | Stephenson et al. |
| 4,417,603 A | 11/1983 | Argy |
| 4,423,980 A | 1/1984 | Warnock |
| 4,436,177 A | 3/1984 | Elliston |
| 4,444,420 A | 4/1984 | McStravick et al. |
| 4,453,570 A | 6/1984 | Hutchison |
| 4,459,731 A | 7/1984 | Hutchison |
| 4,477,106 A | 10/1984 | Hutchison |
| 4,504,112 A | 3/1985 | Gould et al. |
| 4,522,464 A | 6/1985 | Thompson et al. |
| 4,531,552 A | 7/1985 | Kim |
| 4,533,814 A | 8/1985 | Ward |

(56) References Cited

U.S. PATENT DOCUMENTS

| | | |
|---|---|---|
| 4,565,351 A | 1/1986 | Conti et al. |
| 4,662,437 A | 5/1987 | Renfro |
| 4,683,944 A | 8/1987 | Curlett |
| 4,689,467 A | 8/1987 | Inoue |
| 4,690,212 A | 9/1987 | Termohlen |
| 4,694,865 A | 9/1987 | Tauschmann |
| 4,725,116 A | 2/1988 | Spencer et al. |
| 4,741,405 A | 5/1988 | Moeny et al. |
| 4,744,420 A | 5/1988 | Patterson et al. |
| 4,770,493 A | 9/1988 | Ara et al. |
| 4,774,393 A | 9/1988 | Tarumoto |
| 4,793,383 A | 12/1988 | Gyory et al. |
| 4,799,544 A | 1/1989 | Curlett |
| 4,830,113 A | 5/1989 | Geyer |
| 4,836,305 A | 6/1989 | Curlett |
| 4,860,654 A | 8/1989 | Chawla et al. |
| 4,860,655 A | 8/1989 | Chawla |
| 4,872,520 A | 10/1989 | Nelson |
| 4,924,870 A | 5/1990 | Wlodarczyk et al. |
| 4,952,771 A | 8/1990 | Wrobel |
| 4,989,236 A | 1/1991 | Myllymäki |
| 4,997,250 A | 3/1991 | Ortiz, Jr. |
| 5,003,144 A | 3/1991 | Lindroth et al. |
| 5,004,166 A | 4/1991 | Sellar |
| 5,033,545 A | 7/1991 | Sudol |
| 5,049,738 A | 9/1991 | Gergely et al. |
| 5,084,617 A | 1/1992 | Gergely |
| 5,086,842 A | 2/1992 | Cholet |
| 5,093,880 A | 3/1992 | Matsuda et al. |
| 5,107,936 A | 4/1992 | Foppe |
| 5,121,872 A | 6/1992 | Legget |
| 5,125,061 A | 6/1992 | Marlier et al. |
| 5,125,063 A | 6/1992 | Panuska et al. |
| 5,128,882 A | 7/1992 | Cooper et al. |
| 5,140,664 A | 8/1992 | Bosisio et al. |
| 5,163,321 A | 11/1992 | Perales |
| 5,168,940 A | 12/1992 | Foppe |
| 5,172,112 A | 12/1992 | Jennings |
| 5,176,328 A | 1/1993 | Alexander |
| 5,182,785 A | 1/1993 | Savegh et al. |
| 5,212,755 A | 5/1993 | Holmberg |
| 5,226,107 A | 7/1993 | Stern et al. |
| 5,269,377 A | 12/1993 | Martin |
| 5,285,045 A | 2/1994 | Ito et al. |
| 5,285,204 A | 2/1994 | Sas-Jaworsky |
| 5,308,951 A | 5/1994 | Mori |
| 5,348,097 A | 9/1994 | Giannesini et al. |
| 5,351,533 A | 10/1994 | Macadam et al. |
| 5,353,875 A | 10/1994 | Schultz et al. |
| 5,355,967 A | 10/1994 | Mueller et al. |
| 5,356,081 A | 10/1994 | Sellar |
| 5,396,805 A | 3/1995 | Surjaatmadja |
| 5,397,372 A | 3/1995 | Partus et al. |
| 5,411,081 A | 5/1995 | Moore et al. |
| 5,411,085 A | 5/1995 | Moore et al. |
| 5,411,105 A | 5/1995 | Gray |
| 5,413,045 A | 5/1995 | Miszewski |
| 5,413,170 A | 5/1995 | Moore |
| 5,418,350 A | 5/1995 | Freneaux et al. |
| 5,419,188 A | 5/1995 | Rademaker et al. |
| 5,423,383 A | 6/1995 | Pringle |
| 5,425,420 A | 6/1995 | Pringle |
| 5,434,944 A | 7/1995 | Kerry et al. |
| 5,435,351 A | 7/1995 | Head |
| 5,435,395 A | 7/1995 | Connell |
| 5,454,347 A | 10/1995 | Shibata et al. |
| 5,463,711 A | 10/1995 | Chu |
| 5,465,793 A | 11/1995 | Pringle |
| 5,469,878 A | 11/1995 | Pringle |
| 5,479,860 A | 1/1996 | Ellis |
| 5,483,988 A | 1/1996 | Pringle |
| 5,488,992 A | 2/1996 | Pringle |
| 5,500,768 A | 3/1996 | Doggett et al. |
| 5,503,014 A | 4/1996 | Griffith |
| 5,503,370 A | 4/1996 | Newman et al. |
| 5,505,259 A | 4/1996 | Wittrisch et al. |
| 5,515,926 A | 5/1996 | Boychuk |
| 5,526,887 A | 6/1996 | Vestavik |
| 5,561,516 A | 10/1996 | Noble et al. |
| 5,566,764 A | 10/1996 | Elliston |
| 5,573,225 A | 11/1996 | Boyle et al. |
| 5,574,815 A | 11/1996 | Kneeland |
| 5,577,560 A | 11/1996 | Coronado et al. |
| 5,586,609 A | 12/1996 | Schuh |
| 5,589,090 A | 12/1996 | Song |
| 5,599,004 A | 2/1997 | Newman et al. |
| 5,615,052 A | 3/1997 | Doggett |
| 5,638,904 A | 6/1997 | Misselbrook et al. |
| 5,655,745 A | 8/1997 | Morrill |
| 5,670,069 A | 9/1997 | Nakai et al. |
| 5,692,087 A | 11/1997 | Partus et al. |
| 5,694,408 A | 12/1997 | Bott et al. |
| 5,707,939 A | 1/1998 | Patel |
| 5,735,502 A | 4/1998 | Levett et al. |
| 5,757,484 A | 5/1998 | Miles et al. |
| 5,759,859 A | 6/1998 | Sausa |
| 5,771,984 A | 6/1998 | Potter et al. |
| 5,773,791 A | 6/1998 | Kuykendal |
| 5,793,915 A | 8/1998 | Joyce |
| 5,794,703 A | 8/1998 | Newman et al. |
| 5,813,465 A | 9/1998 | Terrell et al. |
| 5,828,003 A | 10/1998 | Thomeer et al. |
| 5,832,006 A | 11/1998 | Rice et al. |
| 5,833,003 A | 11/1998 | Longbottom et al. |
| 5,847,825 A | 12/1998 | Alexander |
| 5,862,273 A | 1/1999 | Pelletier |
| 5,862,862 A | 1/1999 | Terrell |
| 5,864,113 A | 1/1999 | Cossi |
| 5,896,482 A | 4/1999 | Blee et al. |
| 5,896,938 A | 4/1999 | Moeny et al. |
| 5,902,499 A | 5/1999 | Richerzhagen |
| 5,909,306 A | 6/1999 | Goldberg et al. |
| 5,913,337 A | 6/1999 | Williams et al. |
| 5,924,489 A | 7/1999 | Hatcher |
| 5,929,986 A | 7/1999 | Slater et al. |
| 5,933,945 A | 8/1999 | Thomeer et al. |
| 5,938,954 A | 8/1999 | Onuma et al. |
| 5,973,783 A | 10/1999 | Goldner et al. |
| 5,986,236 A | 11/1999 | Gainand et al. |
| 5,986,756 A | 11/1999 | Slater et al. |
| RE36,525 E | 1/2000 | Pringle |
| 6,015,015 A | 1/2000 | Luft et al. |
| 6,038,363 A | 3/2000 | Slater et al. |
| 6,059,037 A | 5/2000 | Longbottom et al. |
| 6,060,662 A | 5/2000 | Rafie et al. |
| 6,065,540 A | 5/2000 | Thomeer et al. |
| RE36,723 E | 6/2000 | Moore et al. |
| 6,076,602 A | 6/2000 | Gano et al. |
| 6,084,203 A | 7/2000 | Bonigen |
| 6,092,601 A | 7/2000 | Gano et al. |
| 6,104,022 A | 8/2000 | Young et al. |
| RE36,880 E | 9/2000 | Pringle |
| 6,116,344 A | 9/2000 | Longbottom et al. |
| 6,135,206 A | 10/2000 | Gano et al. |
| 6,147,754 A | 11/2000 | Theriault et al. |
| 6,157,893 A | 12/2000 | Berger et al. |
| 6,163,012 A * | 12/2000 | Kimura ............... B23K 26/106 |
| | | 219/121.63 |
| 6,166,546 A | 12/2000 | Scheihing et al. |
| 6,180,913 B1 | 1/2001 | Kolmeder et al. |
| 6,191,385 B1 | 2/2001 | Oloughlin et al. |
| 6,215,734 B1 | 4/2001 | Moeny et al. |
| 6,227,300 B1 | 5/2001 | Cunningham et al. |
| 6,250,391 B1 | 6/2001 | Proudfoot |
| 6,265,653 B1 | 7/2001 | Haigh et al. |
| 6,273,193 B1 | 8/2001 | Hermann et al. |
| 6,275,645 B1 | 8/2001 | Vereecken et al. |
| 6,281,489 B1 | 8/2001 | Tubel et al. |
| 6,301,423 B1 | 10/2001 | Olson |
| 6,309,195 B1 | 10/2001 | Bottos et al. |
| 6,321,839 B1 | 11/2001 | Vereecken et al. |
| 6,352,114 B1 | 3/2002 | Toalson et al. |
| 6,354,370 B1 | 3/2002 | Miller et al. |
| 6,355,928 B1 | 3/2002 | Skinner et al. |

(56) References Cited

U.S. PATENT DOCUMENTS

| | | |
|---|---|---|
| 6,356,683 B1 | 3/2002 | Hu et al. |
| 6,361,299 B1 | 3/2002 | Quigley et al. |
| 6,367,566 B1 | 4/2002 | Hill |
| 6,377,591 B1 | 4/2002 | Hollister et al. |
| 6,384,738 B1 | 5/2002 | Carstensen et al. |
| 6,386,300 B1 | 5/2002 | Curlett et al. |
| 6,401,825 B1 | 6/2002 | Woodrow |
| 6,424,784 B1 | 7/2002 | Olson |
| 6,426,479 B1 | 7/2002 | Bischof |
| 6,437,326 B1 | 8/2002 | Yamate et al. |
| 6,439,313 B1 | 8/2002 | Thomeer et al. |
| 6,450,257 B1 | 9/2002 | Douglas |
| 6,463,198 B1 | 10/2002 | Coleman et al. |
| 6,494,259 B2 | 12/2002 | Surjaatmadja |
| 6,497,290 B1 | 12/2002 | Misselbrook et al. |
| 6,536,743 B2 | 3/2003 | Selcer et al. |
| 6,555,784 B2 | 4/2003 | Lehisa et al. |
| 6,557,249 B1 | 5/2003 | Pruett et al. |
| 6,561,289 B2 | 5/2003 | Portman et al. |
| 6,564,046 B1 | 5/2003 | Chateau |
| 6,591,046 B2 | 7/2003 | Stottlemyer |
| 6,615,922 B2 | 9/2003 | Deul et al. |
| 6,626,249 B2 | 9/2003 | Rosa |
| 6,634,388 B1 | 10/2003 | Taylor et al. |
| 6,644,848 B1 | 11/2003 | Clayton et al. |
| 6,661,815 B1 | 12/2003 | Kozlovsky et al. |
| 6,710,720 B2 | 3/2004 | Carstensen et al. |
| 6,712,150 B1 | 3/2004 | Misselbrook et al. |
| 6,725,924 B2 | 4/2004 | Davidson et al. |
| 6,737,605 B1 | 5/2004 | Kern |
| 6,747,743 B2 | 6/2004 | Skinner et al. |
| 6,755,262 B2 | 6/2004 | Parker |
| 6,808,023 B2 | 10/2004 | Smith et al. |
| 6,832,654 B2 | 12/2004 | Ravensbergen et al. |
| 6,837,313 B2 | 1/2005 | Hosie et al. |
| 6,847,034 B2 | 1/2005 | Shah et al. |
| 6,851,488 B2 | 2/2005 | Batarseh |
| 6,854,534 B2 | 2/2005 | Livingstone |
| 6,867,858 B2 | 3/2005 | Owen et al. |
| 6,870,128 B2 | 3/2005 | Kobayashi et al. |
| 6,874,361 B1 | 4/2005 | Meltz et al. |
| 6,880,646 B2 | 4/2005 | Batarseh |
| 6,885,784 B2 | 4/2005 | Bohnert |
| 6,888,097 B2 | 5/2005 | Batarseh |
| 6,888,127 B2 | 5/2005 | Jones et al. |
| 6,912,898 B2 | 7/2005 | Jones et al. |
| 6,913,079 B2 | 7/2005 | Tubel |
| 6,920,395 B2 | 7/2005 | Brown |
| 6,920,946 B2 | 7/2005 | Oglesby |
| 6,923,273 B2 | 8/2005 | Terry et al. |
| 6,944,380 B1 | 9/2005 | Hideo et al. |
| 6,957,576 B2 | 10/2005 | Skinner et al. |
| 6,967,322 B2 | 11/2005 | Jones et al. |
| 6,977,367 B2 | 12/2005 | Tubel et al. |
| 6,978,832 B2 | 12/2005 | Gardner et al. |
| 6,981,561 B2 | 1/2006 | Krueger et al. |
| 6,994,162 B2 | 2/2006 | Robison |
| 7,040,746 B2 | 5/2006 | McCain et al. |
| 7,055,604 B2 | 6/2006 | Jee et al. |
| 7,055,629 B2 | 6/2006 | Oglesby |
| 7,066,283 B2 | 6/2006 | Livingstone |
| 7,072,044 B2 | 7/2006 | Kringlebotn et al. |
| 7,072,588 B2 | 7/2006 | Skinner |
| 7,086,484 B2 | 8/2006 | Smith, Jr. |
| 7,087,865 B2 | 8/2006 | Lerner |
| 7,088,437 B2 | 8/2006 | Blomster et al. |
| 7,099,533 B1 | 8/2006 | Chenard |
| 7,126,332 B2 | 10/2006 | Blanz et al. |
| 7,134,488 B2 | 11/2006 | Tudor et al. |
| 7,134,514 B2 | 11/2006 | Riel et al. |
| 7,140,435 B2 | 11/2006 | Defretin et al. |
| 7,147,064 B2 | 12/2006 | Batarseh et al. |
| 7,152,700 B2 | 12/2006 | Church et al. |
| 7,163,875 B2 | 1/2007 | Richerzhagen |
| 7,172,026 B2 | 2/2007 | Misselbrook |
| 7,172,038 B2 | 2/2007 | Terry et al. |
| 7,174,067 B2 | 2/2007 | Murshid et al. |
| 7,188,687 B2 | 3/2007 | Rudd et al. |
| 7,195,731 B2 | 3/2007 | Jones |
| 7,196,786 B2 | 3/2007 | DiFoggio |
| 7,199,869 B2 | 4/2007 | MacDougall |
| 7,201,222 B2 | 4/2007 | Kanady et al. |
| 7,210,343 B2 | 5/2007 | Shammai et al. |
| 7,212,283 B2 | 5/2007 | Hother et al. |
| 7,223,935 B2 | 5/2007 | Wessner |
| 7,249,633 B2 | 7/2007 | Ravensbergen et al. |
| 7,259,353 B2 | 8/2007 | Guo |
| 7,264,057 B2 | 9/2007 | Rytlewski et al. |
| 7,270,195 B2 | 9/2007 | MacGregor et al. |
| 7,273,108 B2 | 9/2007 | Misselbrook |
| 7,310,466 B2 | 12/2007 | Fink et al. |
| 7,334,637 B2 | 2/2008 | Smith, Jr. |
| 7,337,660 B2 | 3/2008 | Ibrahim et al. |
| 7,343,983 B2 | 3/2008 | Livingstone |
| 7,358,457 B2 | 4/2008 | Peng et al. |
| 7,362,422 B2 | 4/2008 | DiFoggio et al. |
| 7,365,285 B2 | 4/2008 | Toida |
| 7,372,230 B2 | 5/2008 | McKay |
| 7,394,064 B2 | 7/2008 | Marsh |
| 7,395,696 B2 | 7/2008 | Bissonnette et al. |
| 7,395,866 B2 | 7/2008 | Milberger et al. |
| 7,416,032 B2 | 8/2008 | Moeny et al. |
| 7,416,258 B2 | 8/2008 | Reed et al. |
| 7,424,190 B2 | 9/2008 | Dowd et al. |
| 7,471,831 B2 | 12/2008 | Bearman et al. |
| 7,487,834 B2 | 2/2009 | Reed et al. |
| 7,490,664 B2 | 2/2009 | Skinner et al. |
| 7,494,272 B2 | 2/2009 | Thomas et al. |
| 7,503,404 B2 | 3/2009 | McDaniel et al. |
| 7,515,782 B2 | 4/2009 | Zhang et al. |
| 7,516,802 B2 | 4/2009 | Smith, Jr. |
| 7,518,722 B2 | 4/2009 | Julian et al. |
| 7,527,108 B2 | 5/2009 | Moeny |
| 7,530,406 B2 | 5/2009 | Moeny et al. |
| 7,535,628 B2 | 5/2009 | Tsuchiya et al. |
| 7,559,378 B2 | 7/2009 | Moeny |
| 7,563,695 B2 | 7/2009 | Gu et al. |
| 7,587,111 B2 | 9/2009 | de Montmorillon et al. |
| 7,600,564 B2 | 10/2009 | Shampine et al. |
| 7,603,011 B2 | 10/2009 | Varkey et al. |
| 7,617,873 B2 | 11/2009 | Lovell et al. |
| 7,624,743 B2 | 12/2009 | Sarkar et al. |
| 7,628,227 B2 | 12/2009 | Marsh |
| 7,646,794 B2 | 1/2010 | Sakurai et al. |
| 7,646,953 B2 | 1/2010 | Dowd et al. |
| 7,647,948 B2 | 1/2010 | Quigley et al. |
| 7,671,983 B2 | 3/2010 | Shammai et al. |
| 7,715,664 B1 | 5/2010 | Shou et al. |
| 7,720,323 B2 | 5/2010 | Yamate et al. |
| 7,769,260 B2 | 8/2010 | Hansen et al. |
| 7,802,384 B2 | 9/2010 | Kobayashi et al. |
| 7,834,777 B2 | 11/2010 | Gold |
| 7,843,633 B2 | 11/2010 | Nakamae et al. |
| 7,848,368 B2 | 12/2010 | Gapontsev et al. |
| 7,862,556 B2 | 1/2011 | Mu et al. |
| 7,866,035 B2 | 1/2011 | Cummings et al. |
| 7,878,703 B2 | 2/2011 | Roberts |
| 7,900,699 B2 | 3/2011 | Ramos et al. |
| 7,938,175 B2 | 5/2011 | Skinner et al. |
| 8,011,454 B2 | 9/2011 | Castillo |
| 8,025,371 B1 | 9/2011 | Dean, Jr. |
| 8,062,986 B2 | 11/2011 | Khrapko et al. |
| 8,074,332 B2 | 12/2011 | Keatch et al. |
| 8,082,996 B2 | 12/2011 | Kocis et al. |
| 8,091,638 B2 | 1/2012 | Dusterhoft et al. |
| 8,109,345 B2 | 2/2012 | Jeffryes |
| 8,110,775 B2 | 2/2012 | Lo et al. |
| 8,175,433 B2 | 5/2012 | Caldwell et al. |
| 8,217,302 B2 | 7/2012 | Alpay et al. |
| 8,272,455 B2 | 9/2012 | Guimerans et al. |
| 8,307,900 B2 | 11/2012 | Lynde et al. |
| 8,322,441 B2 | 12/2012 | Fenton |
| 8,383,982 B2 | 2/2013 | Bruland et al. |
| 8,385,705 B2 | 2/2013 | Overton et al. |

(56) References Cited

U.S. PATENT DOCUMENTS

| | | |
|---|---|---|
| 8,424,617 B2 | 4/2013 | Faircloth et al. |
| 8,459,376 B2 | 6/2013 | Williams |
| 8,464,794 B2 | 6/2013 | Schultz et al. |
| 8,511,401 B2 | 8/2013 | Zediker et al. |
| 8,520,470 B2 | 8/2013 | Mathai et al. |
| 8,522,869 B2 | 9/2013 | Noya et al. |
| 8,528,643 B2 | 9/2013 | Schultz et al. |
| 8,534,357 B2 | 9/2013 | Schultz et al. |
| 8,540,026 B2 | 9/2013 | Schultz et al. |
| 8,579,047 B2 | 11/2013 | Houston |
| 8,627,901 B1 | 1/2014 | Underwood et al. |
| 8,636,085 B2 | 1/2014 | Rinzler et al. |
| 8,701,794 B2 | 4/2014 | Zediker et al. |
| 2002/0007945 A1 | 1/2002 | Neuroth et al. |
| 2002/0028287 A1 | 3/2002 | Kawada et al. |
| 2002/0039465 A1 | 4/2002 | Skinner |
| 2002/0185474 A1 | 12/2002 | Dunsky et al. |
| 2002/0189806 A1 | 12/2002 | Davidson et al. |
| 2003/0000741 A1 | 1/2003 | Rosa |
| 2003/0053783 A1 | 3/2003 | Shirasaki |
| 2003/0056990 A1 | 3/2003 | Oglesby |
| 2003/0074896 A1 | 4/2003 | Linster et al. |
| 2003/0085040 A1 | 5/2003 | Hemphill et al. |
| 2003/0094281 A1 | 5/2003 | Tubel |
| 2003/0132029 A1 | 7/2003 | Parker |
| 2003/0145991 A1 | 8/2003 | Olsen |
| 2003/0155156 A1 | 8/2003 | Livingstone |
| 2003/0159283 A1 | 8/2003 | White |
| 2003/0160164 A1 | 8/2003 | Jones et al. |
| 2003/0226826 A1 | 12/2003 | Kobayashi et al. |
| 2004/0006429 A1 | 1/2004 | Brown |
| 2004/0016295 A1 | 1/2004 | Skinner et al. |
| 2004/0020643 A1 | 2/2004 | Thomeer et al. |
| 2004/0026382 A1 | 2/2004 | Richerzhagen |
| 2004/0033017 A1 | 2/2004 | Kringlebotn et al. |
| 2004/0074979 A1 | 4/2004 | McGuire |
| 2004/0093950 A1 | 5/2004 | Bohnert |
| 2004/0096614 A1 | 5/2004 | Quigley et al. |
| 2004/0112642 A1 | 6/2004 | Krueger et al. |
| 2004/0119471 A1 | 6/2004 | Blanz et al. |
| 2004/0129418 A1 | 7/2004 | Jee et al. |
| 2004/0195003 A1 | 10/2004 | Batarseh |
| 2004/0200341 A1 | 10/2004 | Walters et al. |
| 2004/0206505 A1 | 10/2004 | Batarseh |
| 2004/0207731 A1 | 10/2004 | Bearman et al. |
| 2004/0211894 A1 | 10/2004 | Hother et al. |
| 2004/0218176 A1 | 11/2004 | Shammal et al. |
| 2004/0244970 A1 | 12/2004 | Smith, Jr. |
| 2004/0252748 A1 | 12/2004 | Gleitman |
| 2004/0256103 A1 | 12/2004 | Batarseh |
| 2004/0262272 A1 | 12/2004 | Jung |
| 2005/0000953 A1 | 1/2005 | Perozek et al. |
| 2005/0007583 A1 | 1/2005 | DiFoggio |
| 2005/0012244 A1 | 1/2005 | Jones |
| 2005/0016730 A1 | 1/2005 | Mcmechan et al. |
| 2005/0024716 A1 | 2/2005 | Nilsson et al. |
| 2005/0024743 A1 | 2/2005 | Camy-Peyret |
| 2005/0034857 A1 | 2/2005 | Defretin et al. |
| 2005/0061778 A1 | 3/2005 | Arakawa et al. |
| 2005/0094129 A1 | 5/2005 | MacDougall |
| 2005/0099618 A1 | 5/2005 | DiFoggio et al. |
| 2005/0115741 A1 | 6/2005 | Terry et al. |
| 2005/0121094 A1 | 6/2005 | Quigley et al. |
| 2005/0121235 A1 | 6/2005 | Larsen et al. |
| 2005/0189146 A1 | 9/2005 | Oglesby |
| 2005/0201652 A1 | 9/2005 | Ellwood, Jr. |
| 2005/0224228 A1 | 10/2005 | Livingstone |
| 2005/0230107 A1 | 10/2005 | McDaniel et al. |
| 2005/0252286 A1 | 11/2005 | Ibrahim et al. |
| 2005/0263281 A1 | 12/2005 | Lovell et al. |
| 2005/0263497 A1 | 12/2005 | Lehane et al. |
| 2005/0268704 A1 | 12/2005 | Bissonnette et al. |
| 2005/0269132 A1 | 12/2005 | Batarseh et al. |
| 2005/0272512 A1 | 12/2005 | Bissonnette et al. |
| 2005/0272513 A1 | 12/2005 | Bissonnette et al. |
| 2005/0272514 A1 | 12/2005 | Bissonnette et al. |
| 2005/0282645 A1 | 12/2005 | Bissonnette et al. |
| 2006/0005579 A1 | 1/2006 | Jacobsen et al. |
| 2006/0038997 A1 | 2/2006 | Julian et al. |
| 2006/0049345 A1 | 3/2006 | Rao et al. |
| 2006/0065815 A1 | 3/2006 | Jurca |
| 2006/0070770 A1 | 4/2006 | Marsh |
| 2006/0102343 A1 | 5/2006 | Skinner et al. |
| 2006/0102607 A1 | 5/2006 | Adams et al. |
| 2006/0118303 A1 | 6/2006 | Schultz et al. |
| 2006/0137875 A1 | 6/2006 | Dusterhoft et al. |
| 2006/0169677 A1 | 8/2006 | Deshi |
| 2006/0173148 A1 | 8/2006 | Sasaki et al. |
| 2006/0185843 A1 | 8/2006 | Smith, Jr. |
| 2006/0191684 A1 | 8/2006 | Smith, Jr. |
| 2006/0204188 A1 | 9/2006 | Clarkson et al. |
| 2006/0207799 A1 | 9/2006 | Yu |
| 2006/0231257 A1 | 10/2006 | Reed et al. |
| 2006/0237233 A1 | 10/2006 | Reed et al. |
| 2006/0257150 A1 | 11/2006 | Tsuchiya et al. |
| 2006/0260832 A1 | 11/2006 | McKay |
| 2006/0266522 A1 | 11/2006 | Eoff et al. |
| 2006/0283592 A1 | 12/2006 | Sierra et al. |
| 2006/0289724 A1 | 12/2006 | Skinner et al. |
| 2007/0000877 A1 | 1/2007 | Durr et al. |
| 2007/0034409 A1 | 2/2007 | Dale et al. |
| 2007/0045289 A1 | 3/2007 | Kott et al. |
| 2007/0045544 A1 | 3/2007 | Favro et al. |
| 2007/0068705 A1 | 3/2007 | Hosie et al. |
| 2007/0081157 A1 | 4/2007 | Csutak et al. |
| 2007/0125163 A1 | 6/2007 | Dria et al. |
| 2007/0193990 A1 | 8/2007 | Richerzhagen et al. |
| 2007/0217736 A1 | 9/2007 | Zhang et al. |
| 2007/0227741 A1 | 10/2007 | Lovell et al. |
| 2007/0242265 A1 | 10/2007 | Vessereau et al. |
| 2007/0247701 A1 | 10/2007 | Akasaka et al. |
| 2007/0267220 A1 | 11/2007 | Magiawala et al. |
| 2007/0278195 A1 | 12/2007 | Richerzhagen et al. |
| 2007/0280615 A1 | 12/2007 | de Montmorillon et al. |
| 2008/0023202 A1 | 1/2008 | Keatch et al. |
| 2008/0053702 A1 | 3/2008 | Smith, Jr. |
| 2008/0067159 A1 | 3/2008 | Zhang et al. |
| 2008/0073077 A1 | 3/2008 | Tunc et al. |
| 2008/0093125 A1 | 4/2008 | Potter et al. |
| 2008/0112760 A1 | 5/2008 | Curlett |
| 2008/0124816 A1 | 5/2008 | Bruland et al. |
| 2008/0128123 A1 | 6/2008 | Gold |
| 2008/0138022 A1 | 6/2008 | Tassone |
| 2008/0165356 A1 | 7/2008 | DiFoggio et al. |
| 2008/0166132 A1 | 7/2008 | Lynde et al. |
| 2008/0180787 A1 | 7/2008 | DiGiovanni et al. |
| 2008/0245568 A1 | 10/2008 | Jeffryes |
| 2008/0253410 A1 | 10/2008 | Sakurai et al. |
| 2008/0264690 A1 | 10/2008 | Khan et al. |
| 2008/0273852 A1 | 11/2008 | Parker et al. |
| 2008/0314591 A1 | 12/2008 | Hales et al. |
| 2008/0314883 A1 | 12/2008 | Juodkazis et al. |
| 2009/0020333 A1 | 1/2009 | Marsh |
| 2009/0029842 A1 | 1/2009 | Khrapko et al. |
| 2009/0031870 A1 | 2/2009 | O'Connor |
| 2009/0033176 A1 | 2/2009 | Huang et al. |
| 2009/0045176 A1 | 2/2009 | Wawers et al. |
| 2009/0045177 A1 | 2/2009 | Koseki et al. |
| 2009/0049345 A1 | 2/2009 | Mock et al. |
| 2009/0050371 A1 | 2/2009 | Moeny |
| 2009/0078467 A1 | 3/2009 | Castillo |
| 2009/0084765 A1 | 4/2009 | Muratsubaki et al. |
| 2009/0105955 A1 | 4/2009 | Castillo et al. |
| 2009/0126235 A1 | 5/2009 | Kobayashi et al. |
| 2009/0133871 A1 | 5/2009 | Skinner et al. |
| 2009/0133929 A1 | 5/2009 | Rodland |
| 2009/0139768 A1 | 6/2009 | Castillo |
| 2009/0166042 A1 | 7/2009 | Skinner |
| 2009/0190887 A1 | 7/2009 | Freeland et al. |
| 2009/0194292 A1 | 8/2009 | Oglesby |
| 2009/0194329 A1 | 8/2009 | Guimerans et al. |
| 2009/0205675 A1 | 8/2009 | Sarkar et al. |
| 2009/0225793 A1 | 9/2009 | Marciante et al. |
| 2009/0260834 A1 | 10/2009 | Henson et al. |

(56) References Cited

U.S. PATENT DOCUMENTS

| | | |
|---|---|---|
| 2009/0266552 A1 | 10/2009 | Barra et al. |
| 2009/0266562 A1 | 10/2009 | Greenaway |
| 2009/0272424 A1 | 11/2009 | Ortabasi |
| 2009/0272547 A1 | 11/2009 | Dale et al. |
| 2009/0279835 A1 | 11/2009 | de Montmorillon et al. |
| 2009/0294050 A1 | 12/2009 | Traggis et al. |
| 2009/0294421 A1 | 12/2009 | Hu et al. |
| 2009/0294423 A1 | 12/2009 | Hu et al. |
| 2009/0308852 A1 | 12/2009 | Alpay et al. |
| 2009/0324183 A1 | 12/2009 | Bringuier et al. |
| 2010/0000790 A1 | 1/2010 | Moeny |
| 2010/0001179 A1 | 1/2010 | Kobayashi et al. |
| 2010/0008631 A1 | 1/2010 | Herbst |
| 2010/0013663 A1 | 1/2010 | Cavender et al. |
| 2010/0018703 A1 | 1/2010 | Lovell et al. |
| 2010/0025032 A1 | 2/2010 | Smith et al. |
| 2010/0032207 A1 | 2/2010 | Potter et al. |
| 2010/0044102 A1 | 2/2010 | Rinzler et al. |
| 2010/0044103 A1 | 2/2010 | Moxley et al. |
| 2010/0044104 A1 | 2/2010 | Zediker et al. |
| 2010/0044105 A1 | 2/2010 | Faircloth et al. |
| 2010/0044106 A1 | 2/2010 | Zediker et al. |
| 2010/0044353 A1 | 2/2010 | Olsen |
| 2010/0071794 A1 | 3/2010 | Homan |
| 2010/0078414 A1 | 4/2010 | Perry et al. |
| 2010/0084132 A1 | 4/2010 | Noya et al. |
| 2010/0089571 A1 | 4/2010 | Revellat et al. |
| 2010/0089574 A1 | 4/2010 | Wideman et al. |
| 2010/0089576 A1 | 4/2010 | Wideman et al. |
| 2010/0089577 A1 | 4/2010 | Wideman et al. |
| 2010/0114190 A1 | 5/2010 | Bendett et al. |
| 2010/0155059 A1 | 6/2010 | Ullah |
| 2010/0158457 A1 | 6/2010 | Drozd et al. |
| 2010/0158459 A1 | 6/2010 | Homa |
| 2010/0163539 A1 | 7/2010 | Fukushima et al. |
| 2010/0170672 A1 | 7/2010 | Schwoebel et al. |
| 2010/0170680 A1 | 7/2010 | McGregor et al. |
| 2010/0187010 A1 | 7/2010 | Abbasi et al. |
| 2010/0197116 A1 | 8/2010 | Shah et al. |
| 2010/0212769 A1 | 8/2010 | Quigley et al. |
| 2010/0215326 A1 | 8/2010 | Zediker et al. |
| 2010/0218993 A1 | 9/2010 | Wideman et al. |
| 2010/0224408 A1 | 9/2010 | Kocis et al. |
| 2010/0226135 A1 | 9/2010 | Chen |
| 2010/0236785 A1 | 9/2010 | Collis et al. |
| 2010/0290781 A1 | 11/2010 | Overton et al. |
| 2010/0301027 A1 | 12/2010 | Sercel |
| 2010/0326659 A1 | 12/2010 | Schultz et al. |
| 2010/0326665 A1 | 12/2010 | Redlinger et al. |
| 2011/0030367 A1 | 2/2011 | Dadd |
| 2011/0030957 A1 | 2/2011 | Constantz et al. |
| 2011/0035154 A1 | 2/2011 | Kendall et al. |
| 2011/0048743 A1 | 3/2011 | Stafford et al. |
| 2011/0061869 A1 | 3/2011 | Abass et al. |
| 2011/0079437 A1 | 4/2011 | Hopkins et al. |
| 2011/0085149 A1 | 4/2011 | Nathan |
| 2011/0100635 A1 | 5/2011 | Williams |
| 2011/0122644 A1 | 5/2011 | Okuno |
| 2011/0127028 A1 | 6/2011 | Strickland |
| 2011/0135247 A1 | 6/2011 | Achara et al. |
| 2011/0139450 A1 | 6/2011 | Vasques et al. |
| 2011/0147013 A1 | 6/2011 | Kilgore |
| 2011/0162854 A1 | 7/2011 | Bailey et al. |
| 2011/0168443 A1 | 7/2011 | Smolka |
| 2011/0170563 A1 | 7/2011 | Heebner et al. |
| 2011/0174537 A1 | 7/2011 | Potter et al. |
| 2011/0186298 A1 | 8/2011 | Clark et al. |
| 2011/0198075 A1 | 8/2011 | Okada et al. |
| 2011/0205652 A1 | 8/2011 | Abbasi et al. |
| 2011/0220409 A1 | 9/2011 | Foppe |
| 2011/0240314 A1 | 10/2011 | Greenaway |
| 2011/0266062 A1 | 11/2011 | Shuman, V et al. |
| 2011/0278070 A1 | 11/2011 | Hopkins et al. |
| 2011/0290563 A1 | 12/2011 | Kocis et al. |
| 2011/0303460 A1 | 12/2011 | Von Rohr et al. |
| 2012/0000646 A1 | 1/2012 | Liotta et al. |
| 2012/0012392 A1 | 1/2012 | Kumar |
| 2012/0012393 A1 | 1/2012 | Kumar |
| 2012/0020631 A1 | 1/2012 | Rinzler et al. |
| 2012/0048550 A1 | 3/2012 | Dusterhoft et al. |
| 2012/0048568 A1 | 3/2012 | Li et al. |
| 2012/0061091 A1 | 3/2012 | Radi |
| 2012/0067643 A1 | 3/2012 | Dewitt et al. |
| 2012/0068086 A1 | 3/2012 | Dewitt et al. |
| 2012/0068523 A1 | 3/2012 | Bowles |
| 2012/0074110 A1 | 3/2012 | Zediker et al. |
| 2012/0103693 A1 | 5/2012 | Jeffryes |
| 2012/0111578 A1 | 5/2012 | Tverlid |
| 2012/0118568 A1 | 5/2012 | Kleefisch et al. |
| 2012/0118578 A1 | 5/2012 | Skinner |
| 2012/0155813 A1 | 6/2012 | Quigley et al. |
| 2012/0189258 A1 | 7/2012 | Overton et al. |
| 2012/0217015 A1 | 8/2012 | Zediker et al. |
| 2012/0217017 A1 | 8/2012 | Zediker et al. |
| 2012/0217018 A1 | 8/2012 | Zediker et al. |
| 2012/0217019 A1 | 8/2012 | Zediker et al. |
| 2012/0234542 A1 | 9/2012 | McFall |
| 2012/0239013 A1 | 9/2012 | Islam |
| 2012/0248078 A1 | 10/2012 | Zediker et al. |
| 2012/0255774 A1 | 10/2012 | Grubb et al. |
| 2012/0255933 A1 | 10/2012 | McKay et al. |
| 2012/0261188 A1 | 10/2012 | Zediker et al. |
| 2012/0266803 A1 | 10/2012 | Zediker et al. |
| 2012/0267168 A1 | 10/2012 | Grubb et al. |
| 2012/0273269 A1 | 11/2012 | Rinzler et al. |
| 2012/0273470 A1 | 11/2012 | Zediker et al. |
| 2012/0275159 A1 | 11/2012 | Fraze et al. |
| 2013/0011102 A1 | 1/2013 | Rinzler et al. |
| 2013/0175090 A1 | 7/2013 | Zediker |
| 2013/0192893 A1 | 8/2013 | Zediker |
| 2013/0192894 A1 | 8/2013 | Zediker |
| 2013/0220626 A1 | 8/2013 | Zediker |
| 2013/0228372 A1 | 9/2013 | Linyaev et al. |
| 2013/0228557 A1 | 9/2013 | Zediker |
| 2013/0266031 A1 | 10/2013 | Norton |
| 2013/0319984 A1 | 12/2013 | Linyaev et al. |
| 2014/0000902 A1 | 1/2014 | Wolfe |
| 2014/0060802 A1 | 3/2014 | Zediker |
| 2014/0060930 A1 | 3/2014 | Zediker |
| 2014/0069896 A1 | 3/2014 | Deutch |
| 2014/0090846 A1 | 4/2014 | Deutch et al. |
| 2014/0190949 A1 | 7/2014 | Zediker et al. |
| 2014/0231085 A1 | 8/2014 | Zediker |
| 2014/0231398 A1 | 8/2014 | Land |
| 2014/0248025 A1 | 9/2014 | Rinzler |
| 2014/0345872 A1 | 11/2014 | Zediker |

FOREIGN PATENT DOCUMENTS

| | | |
|---|---|---|
| EP | 0515983 A1 | 12/1992 |
| EP | 0 565 287 A1 | 10/1993 |
| EP | 0 950 170 B1 | 9/2002 |
| FR | 2 716 924 | 9/1995 |
| FR | 2 716 924 A1 | 9/1995 |
| GB | 1 284 454 | 8/1972 |
| GB | 2420358 B | 5/2006 |
| JP | 09072738 A | 3/1997 |
| JP | 09-242453 A | 9/1997 |
| JP | 2000-334590 A | 12/2000 |
| JP | 2004-108132 A | 4/2004 |
| JP | 2006-307481 A | 11/2006 |
| JP | 2007-120048 A | 5/2007 |
| WO | WO 95/32834 A1 | 12/1995 |
| WO | WO 97/49893 A1 | 12/1997 |
| WO | WO 98/50673 A1 | 11/1998 |
| WO | WO 98/56534 A1 | 12/1998 |
| WO | WO 02/057805 A2 | 7/2002 |
| WO | WO 03/027433 A1 | 4/2003 |
| WO | WO 03/060286 A1 | 7/2003 |
| WO | WO 2004/009958 A1 | 1/2004 |
| WO | WO 2004/094786 A1 | 11/2004 |
| WO | WO 2005/001232 A2 | 1/2005 |
| WO | WO 2005/001239 A1 | 1/2005 |
| WO | WO 2006/008155 A1 | 1/2006 |

(56) References Cited

FOREIGN PATENT DOCUMENTS

| | | |
|---|---|---|
| WO | WO 2006/041565 A1 | 4/2006 |
| WO | WO 2006/054079 A1 | 5/2006 |
| WO | WO 2007/002064 A1 | 1/2007 |
| WO | WO 2007/112387 A2 | 10/2007 |
| WO | WO 2007/136485 A2 | 11/2007 |
| WO | WO 2008/016852 A1 | 2/2008 |
| WO | WO 2008/070509 A2 | 6/2008 |
| WO | WO 2008/085675 A1 | 7/2008 |
| WO | WO 2009029067 A1 | 3/2009 |
| WO | WO 2009/042774 A2 | 4/2009 |
| WO | WO 2009/042781 A2 | 4/2009 |
| WO | WO 2009/042785 A2 | 4/2009 |
| WO | WO 2009/131584 A1 | 10/2009 |
| WO | WO 2010/036318 A1 | 4/2010 |
| WO | WO 2010/060177 A1 | 6/2010 |
| WO | WO 2010/087944 A1 | 8/2010 |
| WO | WO 2011/008544 A2 | 1/2011 |
| WO | WO 2011/032083 A1 | 3/2011 |
| WO | WO 2011/041390 A2 | 4/2011 |
| WO | WO 2011/075247 A2 | 6/2011 |
| WO | WO 2011/106078 A2 | 9/2011 |
| WO | WO 2012/003146 A2 | 1/2012 |
| WO | WO 2012/012006 A1 | 1/2012 |
| WO | WO 2012/027699 A1 | 3/2012 |
| WO | WO 2012/064356 A1 | 5/2012 |
| WO | WO 2012/116189 A2 | 8/2012 |

OTHER PUBLICATIONS

International Search Report and the Written Opinion of the International Searching Authority, or the Declaration from PCT/US14/29375, mailed on Nov. 25, 2014.
U.S. Appl. No. 13/565,345, filed Aug. 2, 2012, Zediker et al.
U.S. Appl. No. 13/768,149, filed Jan. 15, 2013, Zediker et al.
U.S. Appl. No. 13/777,650, filed Feb. 26, 2013, Zediker et al.
U.S. Appl. No. 13/782,869, filed Mar. 1, 2013, Schroit et al.
U.S. Appl. No. 13/782,942, filed Mar. 1, 2013, Norton et al.
U.S. Appl. No. 13/800,559, filed Mar. 13, 2013, Zediker et al.
U.S. Appl. No. 13/800,820, filed Mar. 13, 2013, Zediker et al.
U.S. Appl. No. 13/800,879, filed Mar. 13, 2013, Zediker et al.
U.S. Appl. No. 13/800,933, filed Mar. 13, 2013, Zediker et al.
U.S. Appl. No. 13/849,831, filed Mar. 25, 2013, Zediker et al.
U.S. Appl. No. 13/852,719, filed Mar. 28, 2013, Faircloth et al.
Utility U.S. Appl. No. 13/768,149, filed Feb. 15, 2013, 27 pages.
Utility U.S. Appl. No. 13/777,650, filed Feb. 26, 2013, 73 pages.
Utility U.S. Appl. No. 13/782,869, filed Mar. 1, 2013, 80 pages.
Utility U.S. Appl. No. 13/782,942, filed Mar. 1, 2013, 81 pages.
Utility U.S. Appl. No. 13/800,559, filed Mar. 13, 2013, 73 pages.
Utility U.S. Appl. No. 13/800,820, filed Mar. 13, 2013, 73 pages.
Utility U.S. Appl. No. 13/800,879, filed Mar. 13, 2013, 73 pages.
Utility U.S. Appl. No. 13/800,933, filed Mar. 13, 2013, 73 pages.
Utility U.S. Appl. No. 13/849,831, filed Mar. 25, 2013, 83 pages.
Utility U.S. Appl. No. 13/852,719, filed Mar. 28, 2013, 85 pages.
Abdulagatova, Z. et al., "Effect of Temperature and Pressure on the Thermal Conductivity of Sandstone", *International Journal of Rock Mechanics & Mining Sciences*, vol. 46, 2009, pp. 1055-1071.
Abousleiman, Y. et al., "Poroelastic Solution of an Inclined Borehole in a Transversely Isotropic Medium", *Rock Mechanics*, Daemen & Schultz (eds), 1995, pp. 313-318.
Ackay, H. et al., Paper titled "Orthonormal Basis Functions for Continuous-Time Systems and Lp Convergence", date unknown but prior to Aug. 19, 2009, pp. 1-12.
Acosta, A. et al., paper from X Brazilian MRS meeting titled "Drilling Granite With Laser Light", X Encontro da SBPMat Granado-RS, Sep. 2011, 4 pages including pp. 56 and 59.
Ahmadi, M. et al., "The Effect of Interaction Time and Saturation of Rock on Specific Energy in ND:YAG Laser Perforating", *Optics and Laser Technology*, vol. 43, 2011, pp. 226-231.
Akhatov, I. et al., "Collapse and Rebound of a Laser-Induced Cavitation Bubble", *Physics of Fluids*, vol. 13, No. 10, Oct. 2001, pp. 2805-2819.

Albertson, M. L. et al., "Diffusion of Submerged Jets", a paper for the *American Society of Civil Engineers*, Nov. 5, 1852, pp. 1571-1596.
Al-Harthi, A. A. et al., "The Porosity and Engineering Properties of Vesicular Basalt in Saudi Arabia", *Engineering Geology*, vol. 54, 1999, pp. 313-320.
Anand, U. et al., "Prevention of Nozzle Wear in Abrasive Water Suspension Jets (AWSJ) Using Porous Lubricated Nozzles", *Transactions of the ASME*, vol. 125, Jan. 2003, pp. 168-181.
Andersson, J. C. et al., "The Aspo Pillar Stability Experiment: Part II—Rock Mass Response to Coupled Excavation-Induced and Thermal-Induced Stresses", *International Journal of Rock Mechanics & Mining Sciences*, vol. 46, 2009, pp. 879-895.
Anovitz, L. M. et al., "A New Approach to Quantification of Metamorphism Using Ultra-Small and Small Angle Neutron Scattering", *Geochimica et Cosmochimica Acta*, vol. 73, 2009, pp. 7303-7324.
Antonucci, V. et al., "Numerical and Experimental Study of a Concentrated Indentation Force on Polymer Matrix Composites", an excerpt from the *Proceedings of the COMSOL Conference*, 2009, 4 pages.
Author unknown, "Standard Test Method for Thermal Conductivity of Solids by Means of the Guarded-Comparative-Longitudinal Heat Flow Technique, Standard under the fixed Designation E1225-09, ", published by ASTM International, 2009, pp. 1-9.
Atkinson, B. K., "Introduction to Fracture Mechanics and Its Geophysical Applications", *Fracture Mechanics of Rock*, 1987, pp. 1-26.
Aubertin, M. et al., "A Multiaxial Stress Criterion for Short- and Long-Term Strength of Isotropic Rock Media", *International Journal of Rock Mechanics & Mining Sciences*, vol. 37, 2000, pp. 1169-1193.
Avar, B. B. et al., "Porosity Dependence of the Elastic Modulus of Lithophysae-rich Tuff: Numerical and Experimental Investigations", *International Journal of Rock Mechanics & Mining Sciences*, vol. 40, 2003, pp. 919-928.
Backers, T. et al., "Tensile Fracture Propagation and Acoustic Emission Activity in Sandstone: The Effect of Loading Rate", *International Journal of Rock Mechanics & Mining Sciences*, vol. 42, 2005, pp. 1094-1101.
Baek, S. Y. et al., "Simulation of the Coupled Thermal/Optical Effects for Liquid Immersion Micro-/Nanolithography", source unknown, believed to be publically available prior to 2012,13 pages.
Bagatur, T. et al., "Air-entrainment Characteristics in a Plunging Water Jet System Using Rectangular Nozzles with Rounded Ends", *Water SA*, vol. 29, No. 1, Jan. 2003, pp. 35-38.
Baird, J. A. et al., "Analyzing the Dynamic Behavior of Downhole Equipment During Drilling", US government Sandia Report, SAND-84-0758C, DE84 008840, believed to be publically available prior to Jul. 2010, 7 pages.
Batarseh, S. I. et al, "Innovation in Wellbore Perforation Using High-Power Laser", *International Petroleum Technology Conference*, IPTC No. 10981, Nov. 2005, 7 pages.
Batarseh, S. et al., "Well Perforation Using High-Power Lasers", a paper prepared for presentation at the SPE (Society of Petroleum Engineers) Annual Technical Conference and Exhibition, SPE No. 84418, Oct. 2003, 10 pages.
Baykasoglu, A. et al., "Prediction of Compressive and Tensile Strength of Limestone via Genetic Programming", *Expert Systems with Applications*, vol. 35, 2008, pp. 111-123.
Belushi, F. et al., "Demonstration of the Power of Inter-Disciplinary Integration to Beat Field Development Challenges in Complex Brown Field-South Oman", *Society of Petroleum Engineers*, a paper prepared for presentation at the Abu Dhabi International Petroleum Exhibition & Conference, SPE No. 137154, Nov. 2010, 18 pages.
Belyaev, V. V., "Spall Damage Modelling and Dynamic Fracture Specificities of Ceramics", *Journal of Materials Processing Technology*, vol. 32, 1992, pp. 135-144.
Benavente, D. et al., "The Combined Influence of Mineralogical, Hygric and Thermal Properties on the Durability of Porous Building Stones", *Eur. J. Mineral*, vol. 20, Aug. 2008, pp. 673-685.

(56) References Cited

OTHER PUBLICATIONS

Bieniawski, Z. T., "Mechanism of Brittle Fracture of Rock: Part I—Theory of the Fracture Process", *Int. J. Rock Mech. Min. Sci.*, vol. 4, 1967, pp. 395-406.

Bilotsky, Y. et al., "Modelling Multilayers Systems with Time-Depended Heaviside and New Transition Functions", excerpt from the Proceedings of the 2006 Nordic COMSOL Conference, 2006, 4 pages.

Birkholzer, J. T. et al., "The Impact of Fracture—Matrix Interaction on Thermal—Hydrological Conditions in Heated Fractured Rock", an origial research paper published online http://vzy.scijournals.org/cgi/content/full/5/2/657, May 26, 2006, 27 pages.

Blackwell, D. D. et al., "Geothermal Resources in Sedimentary Basins", a presentation for the Geothermal Energy Generation in Oil and Gas Settings, Mar. 13, 2006, 28 pages.

Blair, S. C. et al., "Analysis of Compressive Fracture in Rock Using Statistical Techniques: Part I. A Non-linear Rule-based Model", *Int. J. Rock Mech. Min. Sci.*, vol. 35 No. 7, 1998, pp. 837-848.

Blomqvist, M. et al., "All-in-Quartz Optics for Low Focal Shifts", *SPIE Photonics West Conference in San Francisco*, Jan. 2011, 12 pages.

Boechat, A. A. P. et al., "Bend Loss in Large Core Multimode Optical Fiber Beam Delivery Systems", *Applied Optics.*, vol. 30 No. 3, Jan. 20, 1991, pp. 321-327.

Bolme, C. A., "Ultrafast Dynamic Ellipsometry of Laser Driven Shock Waves", a dissertation for the degree of Doctor of Philosophy in Physical Chemistry at Massachusetts Institute of Technology, Sep. 2008, pp. 1-229.

Brown, G., "Development, Testing and Track Record of Fiber-Optic, Wet-Mate, Connectors", *IEEE*, 2003, pp. 83-88.

Brujan, E. A. et al., "Dynamics of Laser-Induced Cavitation Bubbles Near an Elastic Boundar", *J. Fluid Mech.*, vol. 433, 2001, pp. 251-281.

Burdine, N. T., "Rock Failure Under Dynamic Loading Conditions", Society of Petroleum Engineers Journal, Mar. 1963, pp. 1-8.

Bybee, K., "Modeling Laser-Spallation Rock Drilling", *JPT*, an SPE available at www.spe.org/jpt, Feb. 2006, 2 pp. 62-63.

Bybee, Karen, highlight of "Drilling a Hole in Granite Submerged in Water by Use of CO2 Laser", an SPE available at www.spe.org/jpt, *JPT*, Feb. 2010, pp. 48, 50 and 51.

Cai, W. et al., "Strength of Glass from Hertzian Line Contact", *Optomechanics 2011: Innovations and Solutions*, 2011, 5 pages.

Capetta, I. S. et al., "Fatigue Damage Evaluation on Mechanical Components Under Multiaxial Loadings", European Comsol Conference, University of Ferrara, Oct. 16, 2009, 25 pages.

Carstens, J. P. et al., "Rock Cutting by Laser", a paper of *Society of Petroleum Engineers of AIME*, 1971, 11 pages.

Caruso, C. et al., "Dynamic Crack Propagation in Fiber Reinforced Composites", Excerpt from the Proceedings of the COMSOL Conference, 2009, 5 pages.

Chastain, T. et al., "Deepwater Drilling Riser System", *SPE Drilling Engineering*, Aug. 1986, pp. 325-328.

Chen, H. Y. et al., "Characterization of the Austin Chalk Producing Trend", SPE, a paper prepared for presentation at the 61st Annual Technical Conference and Exhibition of the Society of Petroleum Engineers, SPE No. 15533, Oct. 1986, pp. 1-12.

Chen, K., paper titled "Analysis of Oil Film Interferometry Implementation in Non-Ideal Conditions", source unknown, Jan. 7, 2010, pp. 1-18.

Chraplyvy, A. R., "Limitations on Lightwave Communications Imposed by Optical-Fiber Nonlinearities", *Journal of Lightwave Technology*, vol. 8 No. 10, Oct. 1990, pp. 1548-1557.

Churcher, P. L. et al., "Rock Properties of Berea Sandstone, Baker Dolomite, and Indiana Limestone", a paper prepared for presentation at the SPE International Symposium on Oilfield Chemistry), *SPE*, SPE No. 21044, Feb. 1991, pp. 431-446 and 3 additional pages.

Cimetiere, A. et al., "A Damage Model for Concrete Beams in Compression", *Mechanics Research Communications*, vol. 34, 2007, pp. 91-96.

Close, F. et al., "Successful Drilling of Basalt in a West of Shetland Deepwater Discovery", a paper prepared for presentation at Offshore Europe 2005 by SPE (Society of Petroleum Engineers) Program Committee, SPE No. 96575, Sep. 2005, pp. 1-10.

Cohen, J. H., "High-Power Slim-Hole Drilling System", a paper presented at the conference entitled Natural Gas RD&D Contractor's Review Meeting, Office of Scientific and Technical Information, Apr. 1995, 10 pages.

Cone, C., "Case History of the University Block 9 (Wolfcamp) Field—Gas-Water Injection Secondary Recovery Project", *Journal of Petroleum Technology*, Dec. 1970, pp. 1485-1491.

Contreras, E. et al., "Effects of Temperature and Stress on the Compressibilities, Thermal Expansivities, and Porosities of Cerro Prieto and Berea Sandstones to 9000 PSI and 208 degrees Celsius", Proceedings Eighth Workshop Geothermal Reservoir Engineering, Leland Stanford Junior University, Dec. 1982, pp. 197-203.

Cooper, R., "Coiled Tubing Deployed ESPs Utilizing Internally Installed Power Cable—A Project Update", a paper prepared by SPE (Society of Petroleum Engineers) Program Committee for presentation at the 2nd North American Coiled Tubing Roundtable, SPE 38406, Apr. 1997, pp. 1-6.

Coray, P. S. et al., "Measurements on 5:1 Scale Abrasive Water Jet Cutting Head Models", source unknown, available prior to 2012, 15 pages.

Cruden, D. M., "The Static Fatigue of Brittle Rock Under Uniaxial Compression", *Int. J. Rock Mech. Min. Sci. & Geomech. Abstr.*, vol. 11, 1974, pp. 67-73.

Da Silva, B. M. G., "Modeling of Crack Initiation, Propagation and Coalescence in Rocks", a thesis for the degree of Master of Science in Civil and Environmental Engineering at the Massachusetts Institute of Technology, Sep. 2009, pp. 1-356.

Dahl, F. et al., "Development of a New Direct Test Method for Estimating Cutter Life, Based on the Sievers' J Miniature Drill Test", *Tunnelling and Underground Space Technology*, vol. 22, 2007, pp. 106-116.

De Castro Lima, J. J. et al., "Linear Thermal Expansion of Granitic Rocks: Influence of Apparent Porosity, Grain Size and Quartz Content", *Bull Eng Geol Env.*, vol. 63, 2004, pp. 215-220.

Degallaix, J. et al., "Simulation of Bulk-Absorption Thermal Lensing in Transmissive Optics of Gravitational Waves Detector", *Appl. Phys.*, B77, 2003, pp. 409-414.

Dey, T. N. et al., "Some Mechanisms of Microcrack Growth and Interaction in Compressive Rock Failure", *Int. J. Rock Mech. Min. Sci. & Geomech. Abstr.*, vol. 18, 1981, pp. 199-209.

Dimotakis, P. E. et al., "Flow Structure and Optical Beam Propagation in High-Reynolds-Number Gas-Phase Shear Layers and Jets", *J. Fluid Mech.*, vol. 433, 2001, pp. 105-134.

Dole, L. et al., "Cost-Effective Cementitious Material Compatible with Yucca Mountain Repository Geochemistry", a paper prepared by Oak Ridge National Laboratory for the US Department of Energy, No. ORNL/TM-2004/296, Dec. 2004, 128 pages.

Dumans, C. F. F. et al., "PDC Bit Selection Method Through the Analysis of Past Bit Performances", a paper prepared for presentation at the *SPE* (Society of Petroleum Engineers—Latin American Petroleum Engineering Conference), Oct. 1990, pp. 1-6.

Dutton, S. P. et al., "Evolution of Porosity and Permeability in the Lower Cretaceous Travis Peak Formation, East Texas", *The American Association of Petroleum Geologists Bulletin*, vol. 76, No. 2, Feb. 1992, pp. 252-269.

Dyskin, A. V. et al., "Asymptotic Analysis of Crack Interaction with Free Boundary", *International Journal of Solids and Structure*, vol. 37, 2000, pp. 857-886.

Eckel, J. R. et al., "Nozzle Design and its Effect on Drilling Rate and Pump Operation", a paper presented at the spring meeting of the Southwestern District, Division of Production, Beaumont, Texas, Mar. 1951, pp. 28-46.

Ehrenberg, S. N. et al., "Porosity-Permeability Relationship in Interlayered Limestone-Dolostone Reservoir", *The American Association of Petroleum Geologists Bulletin*, vol. 90, No. 1, Jan. 2006, pp. 91-114.

Ersoy, A., "Wear Characteristics of PDC Pin and Hybrid Core Bits in Rock Drilling", *Wear*, vol. 188, 1995, pp. 150-165.

(56) References Cited

OTHER PUBLICATIONS

Falcao, J. L. et al., "PDC Bit Selection Through Cost Prediction Estimates Using Crossplots and Sonic Log Data", *SPE*, a paper prepared for presentation at the 1993 SPE/IADC Drilling Conference, Feb. 1993, pp. 525-535.

Falconer, I. G. et al., "Separating Bit and Lithology Effects from Drilling Mechanics Data", *SPE*, a paper prepared for presentation at the 1988 IADC/SPE Drilling Conference, Feb./Mar. 1988, pp. 123-136.

Farra, G., "Experimental Observations of Rock Failure Due to Laser Radiation", a thesis for the degree of Master of Science at Massachusetts Institute of Technology, Jan. 1969, 128 pages.

Farrow, R. L. et al., "Peak-Power Limits on Fiber Amplifiers Imposed by Self-Focusing", *Optics Letters*, vol. 31, No. 23, Dec. 1, 2006, pp. 3423-3425.

Fertl, W. H. et al., "Spectral Gamma-Ray Logging in the Texas Austin Chalk Trend", *SPE of AIME*, a paper for Journal of Petroleum Technology, Mar. 1980, pp. 481-488.

Field, F. A., "A Simple Crack-Extension Criterion for Time-Dependent Spallation", *J. Mech. Phys. Solids*, vol. 19, 1971, pp. 61-70.

Finger, J. T. et al., "PDC Bit Research at Sandia National Laboratories", Sandia Report No. SAND89-0079-UC-253, a report prepared for US Department of Energy, Jun. 1989, 88 pages.

Freeman, T. T. et al., "THM Modeling for Reservoir Geomechanical Applications", presented at the COMSOL Conference, Oct. 2008, 22 pages.

Friant, J. E. et al., "Disc Cutter Technology Applied to Drill Bits", a paper prepared by Excavation Engineering Associates, Inc. for the US Department of Energy's Natural Gas Conference, Mar. 1997, pp. 1-16.

Fuerschbach, P. W. et al., "Understanding Metal Vaporization from Laser Welding", Sandia Report No. SAND-2003-3490, a report prepared for DOE, Sep. 2003, pp. 1-70.

Gahan, B. C. et al., "Analysis of Efficient High-Power Fiber Lasers for Well Perforation", *SPE*, No. 90661, a paper prepared for presentation at the SPE Annual Technical Conference and Exhibition, Sep. 2004, 9 pages.

Gahan, B. C. et al., "Effect of Downhole Pressure Conditions on High-Power Laser Perforation", *SPE*, No. 97093, a paper prepared for the 2005 SPE (Society of Petroleum Engineers) Annual Technical Conference and Exhibition, Oct. 12, 2005, 7 pages.

Gahan, B. C., et al., "Laser Drilling—Drilling with the Power of Light: High Energy Laser Perforation and Completion Techniques", Annual Technical Progress Report by the *Gas Technology Institute*, to the Department of Energy, Nov. 2006, 94 pages.

Gahan, B. C. et al., "Laser Drilling: Drilling with the Power of Light, Phase 1: Feasibility Study", a Topical Report by the *Gas Technology Institute*, for the US Government under Cooperative Agreement No. DE-FC26-00NT40917, Sep. 30, 2001, 107 pages.

Gale, J. F. W. et al., "Natural Fractures in the Barnett Shale and Their Importance for Hydraulic Fracture Treatments", The American Association of Petroleum Geologists, *AAPG Bulletin*, vol. 91, No. 4, Apr. 2007, pp. 603-622.

Gardner, R. D. et al., "Fluorescent Dye Penetrants Applied to Rock Fractures", *Int. J. Rock Mech. Min. Sci.*, vol. 5, 1968, pp. 155-158 with 2 additional pages.

Gelman, A., "Multi-level (hierarchical) modeling: what it can and can't do", source unknown, Jun. 1, 2005, pp. 1-6.

Gerbaud, L. et al., "PDC Bits: All Comes From the Cutter/Rock Interaction", SPE, No. IADC/SPE 98988, a paper presented at the IADC/SPE Drilling Conference, Feb. 2006, pp. 1-9.

Gonthier, F. "High-power All-Fiber® components: The missing link for high power fiber lasers", source unknown, believed to be publically available prior to Jul. 2010, 11 pages.

Graves, R. M. et al., "Comparison of Specific Energy Between Drilling With High Power Lasers and Other Drilling Methods", *SPE*, No. SPE 77627, a paper presented at the SPE (Society of Petroleum Engineers) Annual Technical Conference and Exhibiton, Sep. 2002, pp. 1-8.

Graves, R. M. et al., "Spectral signatures and optic coeffecients of surface and reservoir rocks at COIL, CO2 and Nd:YAG laser wavelenghts", source unknown, believed to be publically available prior to Jul. 2010, 13 pages.

Graves, R. M. et al., "StarWars Laser Technology Applied to Drilling and Completing Gas Wells", *SPE*, No. 49259, a paper prepared for presentation at the 1998 SPE Annual Technical Conference and Exhibition, 1998, pp. 761-770.

Green, D. J. et al., "Crack Arrest and Multiple Crackling in Glass Through the Use of Designed Residual Stress Profiles", *Science*, vol. 283, No. 1295, 1999, pp. 1295-1297.

Grigoryan, V., "Inhomogeneous Boundary Value Problems", a lecture for Math 124B, Jan. 26, 2010, pp. 1-5.

Grigoryan, V., "Separathion of variables: Neumann Condition", a lecture for Math 124A, Dec. 1, 2009, pp. 1-3.

Gunn, D. A. et al., "Laboratory Measurement and Correction of Thermal Properties for Application to the Rock Mass", *Geotechnical and Geological Engineering*, vol. 23, 2005, pp. 773-791.

Guo, B. et al., "Chebyshev Rational Spectral and Pseudospectral Methods on a Semi-infinite Interval", *Int. J. Numer. Meth. Engng*, vol. 53, 2002, pp. 65-84.

Gurarie, V. N., "Stress Resistance Parameters of Brittle Solids Under Laser/Plasma Pulse Heating", *Materials Science and Engineering*, vol. A288, 2000, pp. 168-172.

Hagan, P. C., "The Cuttability of Rock Using a High Pressure Water Jet", University of New South Wales, Sydney, Australia, obtained form the Internet on Sep. 7, 2010, at: http://www.mining.unsw.edu.au/Publications/publications_staff/Paper_Hagan_WASM.htm, 16 pages.

Hall, K. et al., "Rock Albedo and Monitoring of Thermal Conditions in Respect of Weathering: Some Expected and Some Unexpected Results", *Earth Surface Processes and Landforms*, vol. 30, 2005, pp. 801-811.

Hammer, D. X. et al., "Shielding Properties of Laser-Induced Breakdown in Water for Pulse Durations from 5 ns to 125 fs", *Applied Optics*, vol. 36, No. 22, Aug. 1, 1997, pp. 5630-5640.

Hancock, M. J., "The 1-D Heat Equation: 18.303 Linear Partial Differential Equations", source unknown, 2004, pp. 1-41.

Hareland, G., et al., "A Drilling Rate Model for Roller Cone Bits and Its Application", *SPE*, No. 129592, a paper prepared for presentation at the CPS/SPE International Oil and Gas Conference and Exhibition, Jun. 2010, pp. 1-7.

Hareland, G. et al., "Drag—Bit Model Including Wear", *SPE*, No. 26957, a paper prepared for presentation at the Latin American/Caribbean Petroleum Engineering Conference, Apr. 1994, pp. 657-667.

Harrison, C. W. III et al., "Reservoir Characterization of the Frontier Tight Gas Sand, Green River Basin, Wyoming", *SPE*, No. 21879, a paper prepared for presentation at the Rocky Mountain Regional Meeting and Low-Permeability Reservoirs Symposium, Apr. 1991, pp. 717-725.

Hashida, T. et al., "Numerical Simulation with Experimental Verification of the Fracture Behavior in Granite Under Confining Pressures based on the Tension-Softening Model", *International Journal of Fracture*, vol. 59, 1993, pp. 227-244.

Hasting, M. A. et al., "Evaluation of the Environmental Impacts of Induced Seismicity at the Naknek Geothermal Energy Project, Naknek, Alaska", a final report prepared for ASRC Energy Services Alaska Inc., May 2010, pp. 1-33.

Head, P. et al., "Electric Coiled Tubing Drilling (E-CTD) Project Update", *SPE*, No. 68441, a paper prepared for presentation at the SPE/CoTA Coiled Tubing Roundtable, Mar. 2001, pp. 1-9.

Hood, M., "Waterjet-Assisted Rock Cutting Systems—The Present State of the Art", *International Journal of Mining Engineering*, vol. 3, 1985, pp. 91-111.

Howard, A. D. et al., "VOLAN Interpretation and Application in the Bone Spring Formation (Leonard Series) in Southeastern New Mexico", *SPE*, No. 13397, a paper presented at the 1984 SPE Production Technology Symposium, Nov. 1984, 10 pages.

Howells, G., "Super-Water [R] Jetting Applications from 1974 to 1999", paper presented st the Proceedings of the $10^{th}$ American Waterjet Confeence in Houston, Texas, 1999, 25 pages.

(56) References Cited

OTHER PUBLICATIONS

Hu, H. et al., "Simultaneous Velocity and Concentration Measurements of a Turbulent Jet Mixing Flow", *Ann. N.Y. Acad. Sci.*, vol. 972, 2002, pp. 254-259.
Huang, C. et al., "A Dynamic Damage Growth Model for Uniaxial Compressive Response of Rock Aggregates", *Mechanics of Materials*, vol. 34, 2002, pp. 267-277.
Huang, H. et al., "Intrinsic Length Scales in Tool-Rock Interaction", *International Journal of Geomechanics*, Jan./Feb. 2008, pp. 39-44.
Huenges, E. et al., "The Stimulation of a Sedimentary Geothermal Reservoir in the North German Basin: Case Study Grob Schonebeck", *Proceedings, Twenty-Ninth Workshop on Geothermal Reservoir Engineering*, Stanford University, Stanford, California, Jan. 26-28, 2004, 4 pages.
Hutchinson, J. W., "Mixed Mode Cracking in Layered Materials", *Advances in Applied Mechanics*, vol. 29, 1992, pp. 63-191.
Imbt, W. C. et al., "Porosity in Limestone and Dolomite Petroleum Reservoirs", paper presented at the Mid Continent District, Division of Production, Oklahoma City, Oklahoma, Jun. 1946, pp. 364-372.
Jackson, M. K. et al., "Nozzle Design for Coherent Water Jet Production", source unknown, believed to be published prior to 2012, pp. 53-89.
Jadoun, R. S., "Study on Rock-Drilling Using PDC Bits for the Prediction of Torque and Rate of Penetration", *Int. J. Manufacturing Technology and Management*, vol. 17, No. 4, 2009, pp. 408-418.
Jain, R. K. et al., "Development of Underwater Laser Cutting Technique for Steel and Zircaloy for Nuclear Applications", *Journal of Physics for Indian Academy of Sciences*, vol. 75 No. 6, Dec. 2010, pp. 1253-1258.
Jen, C. K. et al., "Leaky Modes in Weakly Guiding Fiber Acoustic Waveguides", *IEEE Transactions on Ultrasonic Ferroelectrics and Frequency Control*, vol. UFFC-33 No. 6, Nov. 1986, pp. 634-643.
Judzis, A. et al., "Investigation of Smaller Footprint Drilling System; Ultra-High Rotary Speed Diamond Drilling Has Potential for Reduced Energy Requirements", IADC/SPE No. 99020, believed to be publically available prior to Jul. 2010, 33 pages.
Jurewicz, B. R., "Rock Excavation with Laser Assistance", *Int. J. Rock Mech. Min. Sci. & Geomech. Abstr.*, vol. 13, 1976, pp. 207-219.
Karakas, M., "Semianalytical Productivity Models for Perforated Completions", *SPE*, No. 18247, a paper for SPE (Society of Petroleum Engineers) Production Engineering, Feb. 1991, pp. 73-82.
Karasawa, H. et al., "Development of PDC Bits for Downhole Motors", *Proceedings 17th NZ Geothermal Workshop*, 1995, pp. 145-150.
Kemeny, J. M., "A Model for Non-linear Rock Deformation Under Compression Due to Sub-critical Crack Growth", *Int. J. Rock Mech. Min. Sci. & Geomech. Abstr.*, vol. 28 No. 6, 1991, pp. 459-467.
Khandelwal, M., "Prediction of Thermal Conductivity of Rocks by Soft Computing", *Int. J. Earth Sci. (Geol. Rundsch)*, May 11, 2010, 7 pages.
Kim, C. B. et al., "Measurement of the Refractive Index of Liquids at 1.3 and 1.5 Micron Using a Fibre Optic Fresnel Ratio Meter", *Meas. Sci. Technol.*, vol. 5, 2004, pp. 1683-1686.
Kiwata, T. et al., "Flow Visualization and Characteristics of a Coaxial Jet with a Tabbed Annular Nozzle", *JSME International Journal Series B*, vol. 49, No. 4, 2006, pp. 906-913.
Kobayashi, T. et al., "Drilling a 2-inch in Diameter Hole in Granites Submerged in Water by CO2 Lasers", *SPE*, No. 119914, a paper prepared for presentation at the SPE/IADC Drilling Conference and Exhibition, Mar. 2009, 6 pages.
Kobyakov, A. et al., "Design Concept for Optical Fibers with Enhanced SBS Threshold", *Optics Express*, vol. 13, No. 14, Jul. 11, 2005, pp. 5338-5346.
Kolari, K., "Damage Mechanics Model for Brittle Failure of Transversely Isotropic Solids (Finite Element Implementation)", *VTT Publications* 628, 2007, 210 pages.
Kollé, J. J., "A Comparison of Water Jet, Abrasive Jet and Rotary Diamond Drilling in Hard Rock", *Tempress Technologies Inc.*, 1999, pp. 1-8.
Kolle, J. J., "HydroPulse Drilling", a Final Report for US Department of Energy under Cooperative Development Agreement No. DE-FC26-FT34367, Apr. 2004, 28 pages.
Kovalev, V. I. et al., "Observation of Hole Burning in Spectrum in SBS in Optical Fibres Under CW Monochromatic Laser Excitation", *IEEE*, Jun. 3, 2010, pp. 56-57.
Koyamada, Y. et al., "Simulating and Designing Brillouin Gain Spectrum in Single-Mode Fibers", *Journal of Lightwave Technology*, vol. 22, No. 2, Feb. 2004, pp. 631-639.
Krajcinovic, D. et al., "A Micromechanical Damage Model for Concrete", *Engineering Fracture Mechanics*, vol. 25, No. 5/6, 1986, pp. 585-596.
Kranz, R. L., "Microcracks in Rocks: A Review", *Tectonophysics*, vol. 100, 1983, pp. 449-480.
Agrawal, Govind P., "Nonlinear Fiber Optics", Chap. 9, Fourth Edition, Academic Press copyright 2007, pp. 334-337.
Damzen, M. J. et al., "Stimulated Brillion Scattering", Chapter 8—SBS in Optical Fibres, OP Publishing Ltd, Published by Institute of Physics, London, England, 2003, pp. 137-153.
Eichler, H.J. et al., "Stimulated Brillouin Scattering in Multimode Fibers for Optical Phase Conjugation", *Optics Communications*, vol. 208, 2002, pp. 427-431.
Kubacki, Emily et al., "Optics for Fiber Laser Applications", *CVI Laser, LLC*, Technical Reference Document #20050415, 2005, 5 pgs.
Lally, Evan M., "A Narrow-Linewidth Laser at 1550 nm Using the Pound-Drever-Hall Stabilization Technique", Thesis, submitted to Virginia Polytechnic Institute and State University, Blacksburg, Virginia, 2006, 92 pgs.
McElhenny, John E. et al., "Unique Characteristic Features of Stimulated Brillouin Scattering in Small-Core Photonic Crystal Fibers", *J. Opt. Soc. Am. B*, vol. 25, No. 4, 2008, pp. 582-593.
Mocofanescu, A. et al., "SBS threshold for single mode and multimode GRIN fibers in an all fiber configuration", *Optics Express*, vol. 13, No. 6, 2005, pp. 2019-2024.
Shannon, G. J. et al., "High power laser welding in hyperbaric gas and water environments", *Journal of Laser Applications*, vol. 9, 1997, pp. 129-136.
International Search Report and Written Opinion for PCT App. No. PCT/US10/24368, dated Nov. 2, 2010, 16 pgs.
U.S. Appl. No. 12/706,576, filed Feb. 16, 2010, 28 pgs.
U.S. Appl. No. 12/840,978, filed Jul. 21, 2009, 61 pgs.
Agrawal Dinesh et al., Report on "Development of Advanced Drill Components for BHA Using Mircowave Technology Incorporating Carbide Diamond Composites and Functionally Graded Materials", Microwave Processing and Engineering Center, Material Research Institute, The Pennsylvania State University, 2003, 10 pgs.
Agrawal Dinesh et al., Report on "Graded Steele—Tungsten Cardide/Cobalt-Diamond Systems Using Microwave Heating", Material Research Institute, Penn State University, *Proceedings of the 2002 International Conference on Functionally Graded Materials*, 2002, pp. 50-58.
Agrawal Dinesh et al., "Microstructural by TEM of WC/Co composites Prepared by Conventional and Microwave Processes", Materials Research Lab, The Pennsylvania State University, 15th *International Plansee Seminar*, vol. 2, 2001, pp. 677-684.
Ai, H.A. et al., "Simulation of dynamic response of granite: A numerical approach of shock-induced damage beneath impact craters", *International Journal of Impact Engineering*, vol. 33, 2006, pp. 1-10.
Anton, Richard J. et al., "Dynamic Vickers indentation of brittle materials", *Wear*, vol. 239, 2000, pp. 27-35.
Ashby, M. F. et al., "The Failure of Brittle Solids Containing Small Cracks Under Compressive Stress States", *Acta Metall.*, vol. 34, No. 3, 1986, pp. 497-510.
Aydin, A. et al., "The Schmidt hammer in rock material characterization", *Engineering Geology*, vol. 81, 2005, pp. 1-14.
Baflon, Jean-Paul et al., "On the Relationship Between the Parameters of Paris' Law for Fatigue Crack Growth in Aluminium Alloys", *Scripta Metallurgica*, vol. 11, No. 12, 1977, pp. 1101-1106.

(56) References Cited

OTHER PUBLICATIONS

Bailo, El Tahir et al., "Spectral signatures and optic coefficients of surface and reservoir shales and limestones at COIL, $CO_2$ and Nd:YAG laser wavelengths", *Petroleum Engineering Department, Colorado School of Mines*, 2004, 13 pgs.

Baird, J. A. "GEODYN: A Geological Formation/Drillstring Dynamics Computer Program", *Society of Petroleum Engineers of AIME*, 1964, 9 pgs.

Baird, Jerold et al., Phase 1 Theoretical Description, A Geological Formation Drill String Dynamic Interaction Finite Element Program (GEODYN), *Sandia National Laboratories*, Report No. Sand-84-7101, 1984, 196 pgs.

Batarseh, S. et al. "Well Perforation Using High-Power Lasers", *Society of Petroleum Engineers*, SPE 84418, 2003, pp. 1-10.

BDM Corporation, Geothermal Completion Technology Life-Cycle Cost Model (GEOCOM), *Sandia National Laboratories*, for the U.S. Dept. of Energy, vols. 1 and 2, 1982, 222 pgs.

Beste, U. et al., "Micro-scratch evaluation of rock types—a means to comprehend rock drill wear", *Tribology International*, vol. 37, 2004, pp. 203-210.

Blackwell, B. F., "Temperature Profile in Semi-infinite Body With Exponential Source and Convective Boundary Condition", *Journal of Heat Transfer, Transactions of the ASME*, vol. 112, 1990, pp. 567-571.

Britz, Dieter, "Digital Simulation in Electrochemistry", *Lect. Notes Phys.*, vol. 666, 2005, pp. 103-117.

Browning, J. A. et al., "Recent Advances in Flame Jet Working of Minerals", *7th Symposium on Rock Mechanics*, Pennsylvania State Univ., 1965, pp. 281-313.

Cardenas, R., "Protected Polycrystalline Diamond Compact Bits for Hard Rock Drilling", Report No. DOE-99049-1381, *U.S. Department of Energy*, 2000, pp. 1-79.

Carstens, Jeffrey et al., "Heat-Assisted Tunnel Boring Machines", *Federal Railroad Administration and Urban Mass Transportation Administration*, U.S. Dept. of Transportation, Report No. FRA-RT-71-63, 1970, 340 pgs.

Clegg, John et al., "Improved Optimisation of Bit Selection Using Mathematically Modelled Bit-Performance Indices", *IADC/SPE International* 102287, 2006, pp. 1-10.

Close, F. et al., "Successful Drilling of Basalt in a West of Shetland Deepwater Discovery", *SPE International* 96575, Society of Petroleum Engineers, 2006, pp. 1-10.

Cobern, Martin E., "Downhole Vibration Monitoring & Control System Quarterly Technical Report #1", *APS Technology, Inc.*, Quarterly Technical Report #1, DVMCS, 2003, pp. 1-15.

Cogotsi, G. A. et al., "Use of Nondestructive Testing Methods in Evaluation of Thermal Damage for Ceramics Under Conditions of Nonstationary Thermal Effects", *Institute of Strength Problems, Academy of Sciences of the Ukrainian SSR*, 1985, pp. 52-56.

Cook, Troy, "Chapter 23, Calculation of Estimated Ultimate Recovery (EUR) for Wells in Continuous-Type Oil and Gas Accumulations", *U.S. Geological Survey Digital Data Series DDS-69-D*, Denver, Colorado: Version 1, 2005, pp. 1-9.

Dahl, Filip et al., "Development of a new direct test method for estimating cutter life, based on the Sievers J miniature drill test", *Tunnelling and Underground Space Technology*, vol. 22, 2007, pp. 106-116.

Das, A. C. et al., "Acousto-ultrasonic study of thermal shock damage in castable refractory", *Journal of Materials Science Letters*, vol. 10, 1991, pp. 173-175.

De Guire, Mark R., "Thermal Expansion Coefficient (start)", *EMSE 201—Introduction to Materials Science & Engineering*, 2003, pp. 15.1-15.15.

Dinçer, Ismail et al., "Correlation between Schmidt hardness, uniaxial compressive strength and Young's modulus for andesites, basalts and tuffs", *Bull Eng Geol Env*, vol. 63, 2004, pp. 141-148.

Dunn, James C., "Geothermal Technology Development at Sandia", *Geothermal Research Division, Sandia National Laboratories*, 1987, pp. 1-6.

Eighmy, T. T. et al., "Microfracture Surface Charaterizations: Implications for in Situ Remedial Methods in Fractured Rock", *Bedrock Bioremediation Center, Final Report, National Risk Management Research Laboratory, Office of Research and Development, U. S. Environmental Protection Agency*, EPA/600/R-05/121, 2006, pp. 1-99.

Elsayed, M.A. et al., "Measurement and analysis of Chatter in a Compliant Model of a Drillstring Equipped With a PDC Bit", *Mechanical Engineering Dept., University of Southwestern Louisiana and Sandia National Laboratories*, 2000, pp. 1-10.

Ferro, D. et al., "Vickers and Knoop hardness of electron beam deposited ZrC and HfC thin films on titanium", *Surface & Coatings Technology*, vol. 200, 2006, pp. 4701-4707.

Figueroa, H. et al., "Rock removal using high power lasers for petroleum exploitation purposes", *Gas Technology Institute, Colorado School of Mines, Halliburton Energy Services, Argonne National Laboratory*, 2002, pp. 1-13.

Finger, John T. et al., "PDC Bit Research at Sandia National Laboratories", Sandia Report, *Geothermal Research Division 6252, Sandia National Laboratories*, SAND89-0079-UC-253, 1989, pp. 1-88.

Gahan, Brian C. et al. "Analysis of Efficient High-Power Fiber Lasers for Well Perforation", *Society of Petroleum Engineers*, SPE 90661, 2004, pp. 1-9.

Gahan, Brian C. et al. "Efficient of Downhole Pressure Conditions on High-Power Laser Perforation", *Society of Petroleum Engineers*, SPE 97093, 2005, pp. 1-7.

Gahan, B. C. et al., "Laser Drilling: Determination of Energy Required to Remove Rock", *Society of Petroleum Engineers International*, SPE 71466, 2001, pp. 1-11.

Gahan, Brian C. et al., "Laser Drilling: Drilling with the Power of Light, Phase 1: Feasibility Study", *Topical Report*, Cooperative Agreement No. DE-FC26-00NT40917, 2000-2001, pp. 1-148.

Glowka, David A., "Design Considerations for a Hard-Rock PDC Drill Bit", *Geothermal Technology Development Division 6241, Sandia National Laboratories*, SAND-85-0666C, DE85 008313, 1985, pp. 1-23.

Glowka, David A., "Development of a Method for Predicting the Performance and Wear of PDC Drill Bits", *Sandia National Laboratories*, SAND86-1745-UC-66c, 1987, pp. 1-206.

Glowka, David A. et al., "Program Plan for the Development of Advanced Synthetic-Diamond Drill Bits for Hard-Rock Drilling", *Sandia National Laboratories*, SAND 93-1953, 1993, pp. 1-50.

Glowka, David A. et al., "Progress in the Advanced Synthetic-Diamond Drill Bit Program", *Sandia National Laboratories*, SAND95-2617C, 1994, pp. 1-9.

Glowka, David A., "The Use of Single—Cutter Data in the Analysis of PDC Bit Designs", *61st Annual Technical Conference and Exhibition of Society of Petroleum Engineers*, 1986, pp. 1-37.

Graves, Ramona M. et al., "Application of High Power Laser Technology to Laser/Rock Destruction: Where Have We Been? Where Are We Now?", *SW AAPG Convention*, 2002, pp. 213-224.

Graves, Ramona M. et al., "Laser Parameters That Effect Laser-Rock Interaction: Determining the Benefits of Applying Star Wars Laser Technology for Drilling and Completing Oil and Natural Gas Wells", Topical Report, *Petroleum Engineering Department, Colorado School of Mines*, 2001, pp. 1-157.

Habib, P. et al., "The Influence of Residual Stresses on Rock Hardness", *Rock Mechanics*, vol. 6, 1974, pp. 15-24.

Hall, Kevin, "The role of thermal stress fatigue in the breakdown of rock in cold regions", *Geomorphology*, vol. 31, 1999, pp. 47-63.

Han, Wei, "Computational and experimental investigations of laser drilling and welding for microelectronic packaging", *Dorchester Polytechnic Institute*, A Dissertation submitted in May 2004, 242 pgs.

Hareland, G. et al., "Cutting Efficiency of a Single PDC Cutter on Hard Rock", *Journal of Canadian Petroleum Technology*, vol. 48, No. 6, 2009, pp. 1-6.

Healy, Thomas E., "Fatigue Crack Growth in Lithium Hydride", *Lawrence Livermore National Laboratory*, 1993, pp. 1-32.

Hettema, M. H. H. et al., "The Influence of Steam Pressure on Thermal Spalling of Sedimentary Rock: Theory and Experiments", *Int. J. Rock Mech. Min. Sci.*, vol. 35, No. 1, 1998, pp. 3-15.

(56) References Cited

OTHER PUBLICATIONS

Hibbs, Louis E. et al., "Wear Machanisms for Polycrystalline-Diamond Compacts as Utilized fro Drilling in Geothermal Environments", *Sandia National Laboratories*, for the United States Government, Report No. SAND-82-7213, 1983, 287 pgs.

Hoek, E., "Fracture of Anisotropic Rock", *Journal of the South African Institute of Mining and Metallurgy*, vol. 64, No. 10, 1964, pp. 501-523.

Hoover, Ed R. et al., "Failure Mechanisms of Polycrystalline-Diamond Compact Drill Bits in Geothermal Environments", Sandia Report, *Sandia National Laboratories*, SAND81-1404, 1981, pp. 1-35.

Huff, C. F. et al., "Recent Developments in Polycrystalline Diamond-Drill-Bit Design", *Drilling Technology Division—4741, Sandia National Laboratories*, 1980, pp. 1-29.

Jimeno, Carlos Lopez et al., Drilling and Blasting of Rocks, *a. a. Balkema Publishers*, 1995, 30 pgs.

Kahraman, S. et al., "Dominant rock properties affecting the penetration rate of percussive drills", *International Journal of Rock Mechanics and Mining Sciences*, 2003, vol. 40, pp. 711-723.

Kelsey, James R., "Drilling Technology/GDO", *Sandia National Laboratories*, SAND-85-1866c, DE85 017231, 1985, pp. 1-7.

Kerr, Callin Joe, "PDC Drill Bit Design and Field Application Evolution", *Journal of Petroleum Technology*, 1988, pp. 327-332.

Ketata, C. et al., "Knowledge Selection for Laser Drilling in the Oil and Gas Industry", *Computer Society*, 2005, pp. 1-6.

Khan, Ovais U. et al., "Laser heating of sheet metal and thermal stress development", *Journal of Materials Processing Technology*, vol. 155-156, 2004, pp. 2045-2050.

Kim, K. R. et al., "$CO_2$ laser-plume interaction in materials processing", *Journal of Applied Physics*, vol. 89, No. 1, 2001, pp. 681-688.

Klotz, K. et al., "Coatings with intrinsic stress profile: Refined creep analysis of (Ti,Al)N and cracking due to cyclic laser heating", *Thin Solid Films*, vol. 496, 2006, pp. 469-474.

Kobayashi, Toshio et al., "Drilling a 2-inch in Diameter Hole in Granites Submerged in Water by $CO_2$ Lasers", *SPE International, IADC 119914 Drilling Conference and Exhibition*, 2009, pp. 1-11.

Kujawski, Daniel, "A fatigue crack driving force parameter with load ratio effects", *International Journal of Fatigue*, vol. 23, 2001, pp. S239-S246.

Labuz, J. F. et al., "Microrack-dependent fracture of damaged rock", *International Journal of Fracture*, vol. 51, 1991, pp. 231-240.

Lacy, Lewis L., "Dynamic Rock Mechanics Testing for Optimized Fracture Designs", *Society of Petroleum Engineers International, Annual Technical Conference and Exhibition*, 1997, pp. 23-36.

Lau, John H., "Thermal Fatigue Life Prediction of Flip Chip Solder Joints by Fracture Mechanics Method", *Engineering Fracture Mechanics*, vol. 45, No. 5, 1993, pp. 643-654.

Leong, K. H. et al., "Lasers and Beam Delivery for Rock Drilling", *Argonne National Laboratory*, ANL/TD/TM03-01, 2003, pp. 1-35.

Leung, M. et al., "Theoretical study of heat transfer with moving phase-change interface in thawing of frozen food", *Journal of Physics D: Applied Physics*, vol. 38, 2005, pp. 477-482.

Lima, R. S. et al., "Elastic Modulus Measurements via Laser-Ultrasonic and Knoop Indentation Techniques in Thermally Sprayed Coatings", *Journal of Thermal Spray Technology*, vol. 14(1), 2005, pp. 52-60.

Lin, Y. T., "The Impact of Bit Performance on Geothermal-Well Cost", *Sandia National Laboratories*, SAND-81-1470C, 1981, pp. 1-6.

Lomov, I. N. et al., "Explosion in the Granite Field: Hardening and Softening Behavior in Rocks", *U.S. Department of Energy, Lawrence Livermore National Laboratory*, 2001, pp. 1-7.

Long, S. G. et al., "Thermal fatigue of particle reinforced metal-matrix composite induced by laser heating and mechanical load", *Composites Science and Technology*, vol. 65, 2005, pp. 1391-1400.

Lyons, K. David et al., "NETL Extreme Drilling Laboratory Studies High Pressure High Temperature Drilling Phenomena", *U.S. Department of Energy, National Energy Technology Laboratory*, 2007, pp. 1-6.

Marshall, David B. et al., "Indentation of Brittle Materials", *Microindentation Techniques in Materials Science and Engineering, ASTM STP 889; American Society for Testing and Materials*, 1986, pp. 26-46.

Maurer, William C., "Advanced Drilling Techniques", published by Petroleum Publishing Co., copyright 1980, 26 pgs.

Maurer, William C., "Novel Drilling Techniques", published by Pergamon Press, UK, copyright 1968, pp. 1-64.

Mazerov, Katie, "Bigger coil sizes, hybrid rigs, rotary steerable advances push coiled tubing drilling to next level", *Drilling Contractor*, 2008, pp. 54-60.

Medvedev, I. F. et al., "Optimum Force Characteristics of Rotary-Percussive Machines for Drilling Blast Holes", Moscow, Translated from *Fiziko-Tekhnicheskie Problemy Razrabotki Poleznykh Iskopaemykh*, No. 1, 1967, pp. 77-80.

Mensa-Wilmot, Graham et al., "Advanced Cutting Structure Improves PDC Bit Performance in Hard and Abrasive Drilling Environments", *Society of Petroleum Engineers International*, 2003, pp. 1-13.

Messaoud, Louafi, "Influence of Fluids on the Essential Parameters of Rotary Percussive Drilling", *Laboratoire d'Environnement (Tébessa)*, vol. 14, 2009, pp. 1-8.

Moradian, Z. A. et al., "Predicting the Uniaxial Compressive Strength and Static Young's Modulus of Intact Sedimentary Rocks Using the Ultrasonic Test", *International Journal of Geomechanics*, vol. 9, No. 1, 2009, pp. 14-19.

Muto, Shigeki et al., "Laser cutting for thick concrete by multi-pass technique", *Chinese Optics Letters*, vol. 5 Supplement, 2007, pp. S39-S41.

Naqavi, I. Z. et al., "Laser heating of multilayer assembly and stress levels: elasto-plastic consideration", *Heat and Mass Transfer*, vol. 40, 2003, pp. 25-32.

Nara, Y. et al., "Sub-critical crack growth in anisotropic rock", *International Journal of Rock Mechanics and Mining Sciences*, vol. 43, 2006, pp. 437-453.

Nemat-Nasser, S. et al., "Compression-Induced Nonplanar Crack Extension With Application to Splitting, Exfoliation, and Rockburst", *Journal of Geophysical Research*, vol. 87, No. B8, 1982, pp. 6805-6821.

O'Hare, Jim et al., "Design Index: A Systematic Method of PDC Drill-Bit Selection", *Society of Petroleum Engineers International, IADC/SPE Drilling Conference*, 2000, pp. 1-15.

Okon, P. et al., "Laser Welding of Aluminium Alloy 5083", *21st International Congress on Applications of Lasers and Electro-Optics*, 2002, pp. 1-9.

Ortega, Alfonso et al., "Frictional Heating and Convective Cooling of Polycrystalline Diamond Drag Tools During Rock Cutting", Report No. SAND 82-0675c, *Sandia National Laboratories*, 1982, 23 pgs.

Ortega, Alfonso et al., "Studies of the Frictional Heating of Polycrystalline Diamond Compact Drag Tools During Rock Cutting", *Sandia National Laboratories*, SAND-80-2677, 1982, pp. 1-151.

Ortiz, Blas et al., Improved Bit Stability Reduces Downhole Harmonics (Vibrations), *International Association of Drilling Contractors/Society of Petroleum Engineers Inc.*, 1996, pp. 379-389.

Palashchenko, Yuri A., "Pure Rolling of Bit Cones Doubles Performance", *I & Gas Journal*, vol. 106, 2008, 8 pgs.

Pardoen, T. et al., "An extended model for void growth and Coalescence", *Journal of the Mechanics and Physics of Solids*, vol. 48, 2000, pp. 2467-2512.

Park, Un-Chul et al., "Thermal Analysis of Laser Drilling Processes", *IEEE Journal of Quantum Electronics*, 1972, vol. QK-8, No. 2, 1972, pp. 112-119.

Parker, Richard A. et al., "Laser Drilling Effects of Beam Application Methods on Improving Rock Removal", *Society of Petroleum Engineers*, SPE 84353, 2003, pp. 1-7.

(56) References Cited

OTHER PUBLICATIONS

Pavlina, E. J. et al., "Correlation of Yield Strength and Tensile Strength with Hardness for Steels", *Journals of Materials Engineering and Performance*, vol. 17, No. 6, 2008, pp. 888-893.
Ping, CAO et al., "Testing study of subcritical crack growth rate and fracture toughness in different rocks", *Transactions of Nonferrous Metals Society of China*, vol. 16, 2006, pp. 709-714.
Plinninger, Ralf J. et al., "Predicting Tool Wear in Drill and Blast", *Tunnels & Tunneling International Magazine*, 2002, pp. 1-5.
Plinninger, Dr. Ralf J. et al., "Wear Prediction in Hardrock Excavation Using the CERCHAR Abrasiveness Index (CAI)", *EUROCK 2004 & 53rd Geomechanics Colloquium. Schubert* (ed.), VGE, 2004, pp. 1-6.
Polsky, Yarom et al., "Enhanced Geothermal Systems (EGS) Well Construction Technology Evaluation Report", *Sandia National Laboratories*, Sandia Report, SAND2008-7866, 2008, pp. 1-108.
Pooniwala, Shahvir, "Lasers: The Next Bit", *Society of Petroleum Engineers*, No. SPE 104223, 2006, 10 pgs.
Potyondy, D. O. et al., "A Bonded-particle model for rock", *International Journal of Rock Mechanics and Mining Sciences*, vol. 41, 2004, pp. 1329-1364.
Qixian, Luo et al., "Using compression wave ultrasonic transducers to measure the velocity of surface waves and hence determine dynamic modulus of elasticity for concrete", *Construction and Building Materials*, vol. 10, No. 4, 1996, pp. 237-242.
Radkte, Robert, "New High Strength and faster Drilling TSP Diamond Cutters", Report by *Technology International, Inc.*, DOE Award No. DE-FC26-97FT34368, 2006, 97 pgs.
Rauenzahn, R. M., "Analysis of Rock Mechanics and Gas Dynamics of Flame-Jet Thermal Spallation Drilling", *Massachusetts Institute of Technology*, submitted in partial fulfillment of doctorate degree, 1986 583 pgs.
Rauenzahn, R. M. et al., "Rock Failure Mechanisms of Flame-Jet Thermal Spallation Drilling—Theory and Experimental Testing", *Int. J. Rock Merch. Min. Sci. & Geomech. Abstr.*, vol. 26, No. 5, 1989, pp. 381-399.
Raymond, David W., "PDC Bit Testing at Sandia Reveals Influence of Chatter in Hard-Rock Drilling", *Geothermal Resources Council Monthly Bulletin*, SAND99-2655J, 1999, 7 pgs.
Rossmanith, H. P. et al., "Wave Propagation, Damage Evolution, and Dynamic Fracture Extension. Part I. Percussion Drilling", *Materials Science*, vol. 32, No. 3, 1996, pp. 350-358.
Sachpazis, C. I, M. Sc., Ph. D., "Correlating Schmidt Hardness With Compressive Strength and Young's Modulus of Carbonate Rocks", *International Association of Engineering Geology*, Bulletin, No. 42, 1990, pp. 75-83.
Sano, Osam et al., "Acoustic Emission During Slow Crack Growth", *Department Mining and Mineral Engineering, NII-Electronic Library Service*, 1980, pp. 381-388.
Schormair, Nik et al., "The influence of anisotropy on hard rock drilling and cutting", *The Geological Society of London, IAEG*, Paper No. 491, 2006, pp. 1-11.
Shuja, S. Z. et al., "Laser heating of semi-infinite solid with consecutive pulses: Influence of materaial properties on temperature field", *Optics & Laser Technology*, vol. 40, 2008, pp. 472-480.
Smith, E., "Crack Propagation at a Constant Crack Tip Stress Intensity Factor", *Int. Journal of Fracture*, vol. 16, 1980, pp. R215-R218.
Solomon, A. D. et al., "Moving Boundary Problems in Phase Change Models Current Research Questions", *Engineering Physics and Mathematics Division*, ACM Signum Newsletter, vol. 20, Issue 2, 1985, pp. 8-12.
Sousa, Luis M. O. et al., "Influence of microfractures and porosity on the physico-mechanical properties and weathering of ornamental granites", *Engineering Geology*, vol. 77, 2005, pp. 153-168.
Stone, Charles M. et al., "Qualification of a Computer Program for Drill String Dynamics", *Sandia National Laboratories*, SAND-85-0633C, 1985, pp. 1-20.
Takarli, Mokhfi et al., "Damage in granite under heating/cooling cycles and water freeze-thaw condition", *International Journal of Rock Mechanics and Mining Sciences*, vol. 45, 2008, pp. 1164-1175.
Tanaka, K. et al., "The Generalized Relationship Between the Parameters C and $m$ of Paris' Law for Fatigue Crack Growth", *Scripta Metallurgica*, vol. 15, No. 3, 1981, pp. 259-264.
Tang, C. A. et al., "Coupled analysis of flow, stress and damage (FSD) in rock failure", *International Journal of Rock Mechanics and Mining Sciences*, vol. 39, 2002, pp. 477-489.
Thorsteinsson, Hildigunnur et al., "The Impacts of Drilling and Reservoir Technology Advances on EGS Exploitation", *Proceedings, Thirty-Third Workshop on Geothermal Reservoir Engineering, Institute for Sustainable Energy, Environment, and Economy (ISEEE)*, 2008, pp. 1-14.
U.S. Dept of Energy, "Chapter 6—Drilling Technology and Costs", from Report for the Future of Geothermal Energy, 2005, 53 pgs.
Varnado, S. G. et al., "The Design and Use of Polycrystalline Diamond Compact Drag Bits in the Geothermal Environment", *Society of Petroleum Engineers of AIME*, SPE 8378, 1979, pp. 1-11.
Wen-gui, Cao et al., "Damage constituitive model for strain-softening rock based on normal distribution and its parameter determination", *J. Cent. South Univ. Technol.*, vol. 14, No. 5, 2007, pp. 719-724.
Wiercigroch, M., "Dynamics of ultrasonic percussive drilling of hard rocks", *Journal of Sound and Vibration*, vol. 280, 2005, pp. 739-757.
Williams, R. E. et al., "Experiments in Thermal Spallation of Various Rocks", *Transactions of the ASME*, vol. 118, 1996, pp. 2-8.
Willis, David A. et al., "Heat transfer and phase change during picosecond laser ablation of nickel", *International Journal of Heat and Mass Transfer*, vol. 45, 2002, pp. 3911-3918.
Wong, Teng-fong et al., "Microcrack statistics, Weibull distribution and micromechanical modeling of compressive failure in rock", *Mechanics of Materials*, vol. 38, 2006, pp. 664-681.
Wood, Tom, "Dual Purpose COTD™ Rigs Establish New Operational Records", *Treme Coil Drilling Corp., Drilling Technology Without Borders*, 2009, pp. 1-18.
Xia, K. et al., "Effects of microstructures on dynamic compression of Barre granite", *International Journal of Rock Mechanics and Mining Sciences*, vol. 45, 2008. pp. 879-887, available at: www.sciencedirect.com.
Xu, Zhiyue et al., "Laser Spallation of Rocks for Oil Well Drilling", *Proceedings of the 23rd International Congress on Applications of Lasers and Electro-Optics*, 2004, pp. 1-6.
Xu, Z et al. "Modeling of Laser Spallation Drilling of Rocks fro gas- and Oilwell Drilling", *Society of Petroleum Engineers*, SPE 95746, 2005, pp. 1-6.
Xu, Z. et al., "Specific Energy for Laser Removal of Rocks", *Proceedings of the 20th International Congress on Applications of Lasers & Electro-Optics*, 2001, pp. 1-8.
Xu, Z. et al., "Specific energy for pulsed laser rock drilling", *Journal of Laser Applications*, vol. 15, No. 1, 2003, pp. 25-30.
Yamshchikov, V. S. et al., "An Evaluation of the Microcrack Density of Rocks by Ultrasonic Velocimetric Method", *Moscow Mining Institute. (Translated from Fiziko-Tekhnicheskie Problemy Razrabotki Poleznykh Iskopaemykh)*, 1985, pp. 363-366.
Yilbas, B. S. et al., "Laser short pulse heating: Influence of pulse intensity on temperature and stress fields", *Applied Surface Science*, vol. 252, 2006, pp. 8428-8437.
Yilbas, B. S. et al., "Laser treatment of aluminum surface: Analysis of thermal stress field in the irradiated región", *Journal of Materials Processing Technology*, vol. 209, 2009, pp. 77-88.
Yilbas, B. S. et al., "Nano-second laser pulse heating and assisting gas jet considerations", *International Journal of Machine Tools & Manufacture*, vol. 40, 2000, pp. 1023-1038.
Yilbas, B. S. et al., "Repetitive laser pulse heating with a convective boundary condition at the surface", *Journal of Physics D: Applied Physics*, vol. 34, 2001, pp. 222-231.
Yun, Yingwei et al., "Thermal Stress Distribution in Thick Wall Cylinder Under Thermal Shock", *Journal of Pressure Vessel Technology, Transactions of the ASME*, 2009, vol. 131, pp. 1-6.

(56) References Cited

OTHER PUBLICATIONS

Zeuch, D.H. et al., "Rock Breakage Mechanism Wirt a PDC Cutter", *Society of Petroleum Engineers*, 60$^{th}$ Annual Technical Conference, Las Vegas, Sep. 22-25, 1985, 11 pgs.
Zhai, Yue et al., "Dynamic failure analysis on granite under uniaxial impact compressive load", *Front. Archit. Civ. Eng. China*, vol. 2, No. 3, 2008, pp. 253-260.
Zhou, X.P., "Microcrack Interaction Brittle Rock Subjected to Uniaxial Tensile Loads", *Theoretical and Applied Fracture Mechanics*, vol. 47, 2007, pp. 68-76.
Zhou, Zehua et al., "A New Thermal-Shock-Resistance Model for Ceramics: Establishment and validation", *Materials Science and Engineering*, A 405, 2005, pp. 272-276.
Zhu, Dongming et al., "Influence of High Cycle Thermal Loads on Thermal Fatigue Behavior of Thick Thermal Barrier Coatings", *National Aeronautics and Space Administration, Army Research Laboratory*, Technical Report ARL-TR-1341, NASA TP-3676, 1997, pp. 1-50.
Zhu, Dongming et al., "Investigation of thermal fatigue behavior of thermal barrier coating systems", *Surface and Coatings Technology*, vol. 94-95, 1997, pp. 94-101.
Zhu, Dongming et al., "Investigation of Thermal High Cycle and Low Cycle Fatigue Mechanisms of Thick Thermal Barrier Coatings", *National Aeronautics and Space Administration, Lewis Research Center*, NASA/TM-1998-206633, 1998, pp. 1-31.
Zhu, Dongming et al., "Thermophysical and Thermomechanical Properties of Thermal Barrier Coating Systems", *National Aeronautics and Space Administration, Glenn Research Center*, NASA/TM-2000-210237, 2000, pp. 1-22.
International Search Report for PCT Application No. PCT/US09/54295, dated Apr. 26, 2010, 16 pgs.
A Built-for-Purpose Coiled Tubing Rig, by Schulumberger Wells,No. DE-PS26-03NT15474, 2006, 1 pg.
Diamond-Cutter Drill Bits, by Geothermal Energy Program, Office of Geothermal and Wind Technologies, 2000, 2 pgs.
Extreme Coil Drilling, by Extreme Drilling Corporation, 2009, 10 pgs.
IADC Dull Grading System for Fixed Cutter Bits, by Hughes Christensen, 1996, 14 pgs.
Percussion Drilling Manual, by Smith Tools, 2002, 67 pgs.
Simple Drilling Methods, WEDC Loughborough University, United Kingdom, 1995, 4 pgs.
International Search Report for related applicat5ion case No. PCT/US2012/049338, dated Jan. 22, 2013, 14 pgs.
U.S. Appl. No. 13/486,795, filed Jun. 1, 2012, Rinzler et al.
International Search Report for PCT Application No. PCT/US2011/044548, dated Jan. 24, 2012, 17 pgs.
International Search Report for PCT Application No. PCT/US2011/047902, dated Jan. 17, 2012, 9 pgs.
International Search Report for PCT Application No. PCT/US2011/050044, dated Feb. 1, 2012, 26 pgs.
International Search Report for PCT Application No. PCT/US2012/026277, dated May 30, 2012, 11 pgs.
International Search Report for PCT Application No. PCT/US2012/026265, dated May 30, 2012, 14 pgs.
International Search Report for PCT Application No. PCT/US2012/026280, dated May 30, 2012, 12 pgs.
International Search Report for PCT Application No. PCT/US2012/026471, dated May 30, 2012, 13 pgs.
International Search Report for PCT Application No. PCT/US2012/026525, dated May 31, 2012, 8 pgs.
International Search Report for PCT Application No. PCT/US2012/026526, dated May 31, 2012, 10 pgs.
International Search Report for PCT Application No. PCT/US2012/026494, dated May 31, 2012, 12 pgs.
International Search Report for PCT Application No. PCT/US2012/026337, dated Jun. 7, 2012, 21 pgs.
International Search Report for PCT Application No. PCT/US2012/020789, dated Jun. 29, 2012, 9 pgs.
International Search Report for PCT Application No. PCT/US2012/040490, dated Oct. 22, 2012, 14 pgs.
Labuz, J. F. et al., "Experiments with Rock: Remarks on Strength and Stability Issues", *International Journal of Rock Mechanics & Mining Science*, vol. 44, 2007, pp. 525-537.
Labuz, J. F. et al., "Size Effects in Fracture of Rock", *Rock Mechanics for Industry*, Amadei, Kranz, Scott & Smeallie (eds), 1999, pp. 1137-1143.
Langeveld, C. J., "PDC Bit Dynamics", a paper prepared for presentation at the 1992 IADC/SPE Drilling Conference, Feb. 1992, pp. 227-241.
Lee, S. H. et al., "Themo-Poroelastic Analysis of Injection-Induced Rock Deformation and Damage Evolution", *Proceedings Thirty-Fifth Workshop on Geothermal Reservoir Engineering*, Feb. 2010, 9 pages.
Lee, Y. W. et al., "High-Power Yb3+ Doped Phosphate Fiber Amplifier", *IEEE Journal of Selected Topics in Quantum Electronics*, vol. 15, No. 1, Jan./Feb. 2009, pp. 93-102.
Legarth, B. et al., "Hydraulic Fracturing in a Sedimentary Geothermal Reservoir: Results and Implications", *International Journal of Rock Mechanics & Mining Sciences*, vol. 42 , 2005, pp. 1028-1041.
Lehnhoff, T. F. et al., "The Influence of Temperature Dependent Properties on Thermal Rock Fragmentation", *Int. J. Rock Mech. Min. Sci. & Geomech. Abstr.*, vol. 12, 1975, pp. 255-260.
Leong, K. H., "Modeling Laser Beam-Rock Interaction", a report prepared for US Department of Energy (http://www.doe.gov/bridge), while publication date is unknown, it is believed to be prior to Jul. 21, 2010, 8 pages including pp. 1-6.
Li, Q. et al., "Experimental Research on Crack Propagation and Failure in Rock-type Materials under Compression", *EJGE*, vol. 13, Bund. D, 2008, p. 1-13.
Li, X. B. et al., "Experimental Investigation in the Breakage of Hard Rock by the PDC Cutters with Combined Action Modes", *Tunnelling and Underground Space Technology*, vol. 16, 2001, pp. 107-114.
Liddle, D. et al., "Cross Sector Decommissioning Workshop", presentation, Mar. 23, 2011, 14 pages.
Lindholm, U. S. et al., "The Dynamic Strength and Fracture Properties of Dresser Basalt", *Int. J. Rock Mech. Min. Sci. & Geomech. Abstr.*, vol. 11, 1974, pp. 181-191.
Loland, K. E., "Continuous Damage Model for Load-Response Estimation of Concrete", *Cement and Concrete Research*, vol. 10, 1980, pp. 395-402.
Lorenzana, H. E. et al., "Metastability of Molecular Phases of Nitrogen: Implications to the Phase Diagram", a manuscript submitted to the European Hight Pressure Research Group 39 Conference, *Advances on High Pressure*, Sep. 21, 2001, 18 pages.
Lubarda, V. A. et al., "Damage Model for Brittle Elastic Solids with Unequal Tensile and Compressive Strengths", *Engineering Fracture Mechanics*, vol. 29, No. 5, 1994, pp. 681-692.
Lucia, F. J. et al., "Characterization of Diagenetically Altered Carbonate Reservoirs, South Cowden Grayburg Reservoir, West Texas", a paper prepared for presentation at the 1996 SPE Annual Technical Conference and Exhibition, Oct. 1996, pp. 883-893.
Luffel, D. L. et al., "Travis Peak Core Permeability and Porosity Relationships at Reservoir Stress", *SPE Formation Evaluation*, Sep. 1991, pp. 310-318.
Luft, H. B. et al., "Development and Operation of a New Insulated Concentric Coiled Tubing String for Continuous Steam Injection in Heavy Oil Production", Conference Paper published by Society of Petroleum Engineers on the Internet at: (http://www.onepetro.org/mslib/servlet/onepetropreview?id=00030322), on Aug. 8, 2012, 1 page.
Lund, M. et al., "Specific Ion Binding to Macromolecules: Effect of Hydrophobicity and Ion Pairing", *Langmuir*, 2008 vol. 24, 2008, pp. 3387-3391.
Manrique, E. J. et al., "EOR Field Experiences in Carbonate Reservoirs in the United States", *SPE Reservoir Evaluation & Engineering*, Dec. 2007, pp. 667-686.
Maqsood, A. et al., "Thermophysical Properties of Porous Sandstones: Measurement and Comparative Study of Some Representative Thermal Conductivity Models", *International Journal of Thermophysics*, vol. 26, No. 5, Sep. 2005, pp. 1617-1632.

(56) References Cited

OTHER PUBLICATIONS

Marcuse, D., "Curvature Loss Formula for Optical Fibers", *J. Opt. Soc. Am.*, vol. 66, No. 3, 1976, pp. 216-220.

Martin, C. D., "Seventeenth Canadian Geotechnical Colloquium: The Effect of Cohesion Loss and Stress Path on Brittle Rock Strength", *Canadian Geotechnical Journal*, vol. 34, 1997, pp. 698-725.

Martins, A. et al., "Modeling of Bend Losses in Single-Mode Optical Fibers", Institutu de Telecomunicacoes, Portugal, while the date of publication is unknown, it is believed to be prior to Aug. 19, 2009, 3 pages.

Maurer, W. C. et al., "Laboratory Testing of High-Pressure, High-Speed PDC Bits", a paper prepared for presentation at the 61st Annual Technical Conference and Exhibition of the Society of Petroleum Engineers, Oct. 1986, pp. 1-8.

McKenna, T. E. et al., "Thermal Conductivity of Wilcox and Frio Sandstones in South Texas (Gulf of Mexico Basin)", *AAPG Bulletin*, vol. 80, No. 8, Aug. 1996, pp. 1203-1215.

Meister, S. et al., "Glass Fibers for Stimulated Brillouin Scattering and Phase Conjugation", *Laser and Particle Beams*, vol. 25, 2007, pp. 15-21.

Mejia-Rodriguez, G. et al., "Multi-Scale Material Modeling of Fracture and Crack Propagation", Final Project Report in Multi-Scale Methods in Applied Mathematics, while the date of the publication is unknown, it is believed to be prior to Aug. 19, 2009, pp. 1-9.

Mensa-Wilmot, G. et al., "New PDC Bit Technology, Improved Drillability Analysis, and Operational Practices Improve Drilling Performance in Hard and Highly Heterogeneous Applications", a paper prepared for the 2004 SPE (Society of Petroleum Engineers) Eastern Regional Meeting, Sep. 2004, pp. 1-14.

Messica, A. et al., "Theory of Fiber-Optic Evanescent-Wave Spectroscopy and Sensor", *Applied Optics*, vol. 35, No. 13, May 1, 1996, pp. 2274-2284.

Mills, W. R. et al., "Pulsed Neutron Porosity Logging", SPWLA Twenty-Ninth Annual Logging Symposium, Jun. 1988, pp. 1-21.

Mirkovich, V. V., "Experimental Study Relating Thermal Conductivity to Thermal Piercing of Rocks", *Int. J. Rock Mech. Min. Sci.*, vol. 5, 1968, pp. 205-218.

Mittelstaedt, E. et al., "A Noninvasive Method for Measuring the Velocity of Diffuse Hydrothermal Flow by Tracking Moving Refractive Index Anomalies", *Geochemistry Geophysics Geosystems*, vol. 11, No. 10, Oct. 8, 2010, pp. 1-18.

Moavenzadeh, F. et al., "Thin Disk Technique for Analyzing Fock Fractures Induced by Laser Irradiation", a report prepared for the US Department of Transportation under Contract C-85-65, May 1968, 91 pages.

Montross, C. S. et al., "Laser-Induced Shock Wave Generation and Shock Wave Enhancement in Basalt", *International Journal of Rock Mechanics and Mining Sciences*, 1999, pp. 849-855.

Morozumi, Y. et al., "Growth and Structures of Surface Disturbances of a Round Liquid Jet in a Coaxial Airflow", *Fluid Dynamics Research*, vol. 34, 2004, pp. 217-231.

Morse, J. W. et al., "Experimental and Analytic Studies to Model Reaction Kinetics and Mass Transport of Carbon Dioxide Sequestration in Depleted Carbonate Reservoirs", a Final Scientific/Technical Report for DOE, while the date of the publication is unknown, it is believed to be prior to Aug. 19, 2009, 158 pages.

Moshier, S. O., "Microporosity in Micritic Limestones: A Review", *Sedimentary Geology*, vol. 63, 1989, pp. 191-213.

Mostafa, M. S. et al., "Investigation of Thermal Properties of Some Basalt Samples in Egypt", *Journal of Thermal Analysis and Calorimetry*, vol. 75, 2004, pp. 178-188.

Mukhin, I. B. et al., "Experimental Study of Kilowatt-Average-Power Faraday Isolators", OSA/ASSP, 2007, 3 pages.

Multari, R. A. et al., "Effect of Sampling Geometry on Elemental Emissions in Laser-Induced Breakdown Spectroscopy", *Applied Spectroscopy*, vol. 50, No. 12, 1996, pp. 1483-1499.

Munro, R. G., "Effective Medium Theory of the Porosity Dependence of Bulk Moduli", *Communications of American Ceramic Society*, vol. 84, No. 5, 2001, pp. 1190-1192.

Murphy, H. D., "Thermal Stress Cracking and Enhancement of Heat Extraction from Fractured Geothermal Reservoirs", a paper submitted to the Geothermal Resource Council for its 1978 Annual Meeting, Jul. 1978, 7 pages.

Murrell, S. A. F. et al., "The Effect of Temperature on the Strength at High Confining Pressure of Granodiorite Containing Free and Chemically-Bound Water", *Mineralogy and Petrology*, vol. 55, 1976, pp. 317-330.

Myung, I. J., "Tutorial on Maximum Likelihood Estimation", *Journal of Mathematical Psychology*, vol. 47, 2003, pp. 90-100.

Nakano, A. et al., "Visualization for Heat and Mass Transport Phenomena in Supercritical Artificial Air", *Cryogenics*, vol. 45, 2005, pp. 557-565.

Nara, Y. et al., "Study of Subcritical Crack Growth in Andesite Using the Double Torsion Test", *International Journal of Rock Mechanics & Mining Sciences*, vol. 42, 2005, pp. 521-530.

Nicklaus, K. et al., "Optical Isolator for Unpolarized Laser Radiation at Multi-Kilowatt Average Power", *Optical Society of America*, 2005, 3 pages.

Nikles, M. et al., "Brillouin Gain Spectrum Characterization in Single-Mode Optical Fibers", *Journal of Lightwave Technology*, vol. 15, No. 10, Oct. 1997, pp. 1842-1851.

Nilsen, B. et al., "Recent Developments in Site Investigation and Testing for Hard Rock TBM Projects", *1999 RETC Proceedings*, 1999, pp. 715-731.

Nimick, F. B., "Empirical Relationships Between Porosity and the Mechanical Properties of Tuff", *Key Questions in Rock Mechanics*, Cundall et al. (eds), 1988, pp. 741-742.

Nolen-Hoeksema, R., "Fracture Development and Mechnical Stratigraphy of Austin Chalk, Texas: Discussion", a discussion for the American Association of Petroleum Geologists Bulletin, vol. 73, No. 6, Jun. 1989, pp. 792-793.

Oglesby, K. et al., "Advanced Ultra High Speed Motor for Drilling", a project update by Impact Technologies LLC for the US Department of Energy, Sep. 12, 2005, 36 pages.

Olsen, F. O., "Fundamental Mechanisms of Cutting Front Formation in Laser Cutting", *SPIE*, vol. 2207, while publication date is unknown, it is believed to be prior to Jul. 21, 2010, pp. 402-413.

Ouyang, L. B. et al., "General Single Phase Wellbore Flow Model", a report prepared for the US COE/PETC, May 2, 1997, 51 pages.

Palchaev, D. K. et al., "Thermal Expansion of Silicon Carbide Materials", *Journal of Engineering Physics and Thermophysics*, vol. 66, No. 6, 1994, 3 pages.

Parker, R. et al., "Drilling Large Diameter Holes in Rocks Using Multiple Laser Beams (504)", while the date of the publication is unknown, it is believed to be prior to Aug. 19, 2009, 6 pages.

Patricio, M. et al., "Crack Propagation Analysis", while the date of the publication is unknown, it is believed to be prior to Aug. 19, 2009, 24 pages.

Peebler, R. P. et al., "Formation Evaluation with Logs in the Deep Anadarko Basin", *SPE of AIME*, 1972, 15 pages.

Pepper, D. W. et al., "Benchmarking COMSOL Multiphysics 3.5a—CFD Problems", a presentation, Oct. 10, 2009, 54 pages.

Pettitt, R. et al., "Evolution of a Hybrid Roller Cone/PDC Core Bit", a paper prepared for Geothermal Resources Council 1980 Annual Meeting, Sep. 1980, 7 pages.

Phani, K. K. et al., "Porosity Dependence of Ultrasonic Velocity and Elastic Modulus in Sintered Uranium Dioxide—a discussion", *Journal of Materials Science Letters*, vol. 5, 1986, pp. 427-430.

Plinninger, R. J. et al., "Wear Prediction in Hardrock Excavation Using the CERCHAR Abrasiveness Index (CAI)", EUROCK 2004 & 53rd Geomechanics Colloquium, 2004, 6 pages.

Plumb, R. A. et al., "Influence of Composition and Texture on Compressive Strength Variations in the Travis Peak Formation", a paper prepared for presentation at the 67th Annual Technical Conference and Exhibition of the Society of Petroleum Engineers, Oct. 1992, pp. 985-998.

Pooniwala, S. et al., "Lasers: The Next Bit", a paper prepared for the presentation at the 2006 SPE (Society of Petroleum Engineers) Eastern Regional Meeting, Oct. 2006, pp. 1-10.

(56) References Cited

OTHER PUBLICATIONS

Porter, J. A. et al., "Cutting Thin Sheet Metal with a Water Jet Guided Laser Using Various Cutting Distances, Feed Speeds and Angles of Incidence", *Int. J. Adv. Manuf. Technol.*, vol. 33, 2007, pp. 961-967.
Potyondy, D., "Internal Technical Memorandum—Molecular Dynamics with PFC", a Technical Memorandum to PFC Development Files and Itasca Website, *Molecular Dynamics with PFC*, Jan. 6, 2010, 35 pages.
Potyondy, D. O., "Simulating Stress Corrosion with a Bonded-Particle Model for Rock", *International Journal of Rock Mechanics & Mining Sciences*, vol. 44, 2007, pp. 677-691.
Powell, M. et al., "Optimization of UHP Waterjet Cutting Head, The Orifice", Flow International, while the date of the publication is unknown, it is believed to be prior to Aug. 19, 2009, 19 pages.
Price, R. H. et al., "Analysis of the Elastic and Strength Properties of Yuccs Mountain tuff, Nevada", 26th US Symposium on Rock Mechanics, Jun. 1985, pp. 89-96.
Quinn, R. D. et al., "A Method for Calculating Transient Surface Temperatures and Surface Heating Rates for High-Speed Aircraft", NASA, Dec. 2000, 35 pages.
Ramadan, K. et al., "On the Analysis of Short-Pulse Laser Heating of Metals Using the Dual Phase Lag Heat Conduction Model", *Journal of Heat Transfer*, vol. 131, Nov. 2009, pp. 111301-1 to 111301-7.
Rao, M. V. M. S. et al., "A Study of Progressive Failure of Rock Under Cyclic Loading by Ultrasonic and AE Monitoring Techniques", *Rock Mechanics and Rock Engineering*, vol. 25, No. 4, 1992, pp. 237-251.
Rauenzahn, R. M., "Analysis of Rock Mechanics and Gas Dynamics of Flame-Jet Thermal Spallation Drilling", a dissertation for the degree of Doctor of Philosophy at Massachusettes Institute of Technology, Sep. 1986, pp. 1-524.
Rauenzahn, R. M. et al., "Rock Failure Mechanisms of Flame-Jet Thermal Spallation Drilling—Theory and Experimental Testing", *Int. J. Rock Mech. Min. Sci. & Geomech. Abstr.*, vol. 26, No. 5, 1989, pp. 381-399.
Ravishankar, M. K., "Some Results on Search Complexity vs Accuracy", DARPA Spoken Systems Technology Workshop, Feb. 1997, 4 pages.
Ream, S. et al., "Zinc Sulfide Optics for High Power Laser Applications", Paper 1609, while the date of the publication is unknown, it is believed to be prior to Aug. 19, 2009, 7 pages.
Rice, J. R., "On the Stability of Dilatant Hardening for Saturated Rock Masses", *Journal of Geophysical Research*, vol. 80, No. 11, Apr. 10, 1975, pp. 1531-1536.
Richter, D. et al., "Thermal Expansion Behavior of Igneous Rocks", *Int. J. Rock Mech. Min. Sci. & Geomech. Abstr.*, vol. 11, 1974, pp. 403-411.
Rietman, N. D. et al., "Comparative Economics of Deep Drilling in Anadarka Basin", a paper presented at the 1979 Society of Petroleum Engineers of AIME Deep Drilling and Production Symposium, Apr. 1979, 5 pages.
Rijken, P. et al., "Predicting Fracture Attributes in the Travis Peak Formation Using Quantitative Mechanical Modeling and Stractural Diagenesis", Gulf Coast Association of Geological Societies Transactions vol. 52, 2002, pp. 837-847.
Rijken, P. et al., "Role of Shale Thickness on Vertical Connectivity of Fractures: Application of Crack-Bridging Theory to the Austin Chalk, Texas", *Tectonophysics*, vol. 337, 2001, pp. 117-133.
Author unknown, by RIO Technical Services, "Sub-Task 1: Current Capabilities of Hydraulic Motors, Air/Nitrogen Motors, and Electric Downhole Motors", a final report for Department of Energy National Petroleum Technology Office for the Contract Task 03NT30429, Jan. 30, 2004, 26 pages.
Rosler, M., "Generalized Hermite Polynomials and the Heat Equation for Dunkl Operators", a paper, while the date of the publication is unknown, it is believed to be prior to Aug. 19, 2009, pp. 1-24.
Rossmanith, H. P. et al., "Fracture Mechanics Applications to Drilling and Blasting", *Fatigue & Fracture Engineering Materials & Structures*, vol. 20, No. 11, 1997, pp. 1617-1636.
Rubin, A. M. et al., "Dynamic Tensile-Failure-Induced Velocity Deficits in Rock", *Geophysical Research Letters*, vol. 18, No. 2, Feb. 1991, pp. 219-222.
Salehi, I. A. et al., "Laser Drilling—Drilling with the Power Light", a final report a contract with DOE with award No. DE-FC26-00NT40917, May 2007, in parts 1-4 totaling 318 pages.
Sandler, I. S. et al., "An Algorithm and a Modular Subroutine for the Cap Model", *International Journal for Numerical and Analytical Methods in Geomechanics*, vol. 3, 1979, pp. 173-186.
Santarelli, F. J. et al., "Formation Evaluation From Logging on Cuttings", *SPE Reservoir Evaluation & Engineering*, Jun. 1998, pp. 238-244.
Sattler, A. R., "Core Analysis in a Low Permeability Sandstone Reservoir: Results from the Multiwell Experiment", a report by Sandia National Laboratories for the US Department of Energy, Apr. 1989, 69 pages.
Scaggs, M. et al., "Thermal Lensing Compensation Objective for High Power Lasers", published by Haas Lasers Technologies, Inc., while the date of the publication is unknown, it is believed to be prior to Aug. 19, 2009, 7 pages.
Schaff, D. P. et al., "Waveform Cross-Correlation-Based Differential Travel-Time Measurements at the Northern California Seismic Network", *Bulletin of the Seismological Society of America*, vol. 95, No. 6, Dec. 2005, pp. 2446-2461.
Schaffer, C. B. et al., "Dynamics of Femtosecond Laser-Induced Breakdown in Water from Femtoseconds to Microseconds", *Optics Express*, vol. 10, No. 3, Feb. 11, 2002, pp. 196-203.
Scholz, C. H., "Microfracturing of Rock in Compression", a dissertation for the degree of Doctor of Philosophy at Massachusettes Instutute of Trechnology, Sep. 1967, 177 pages.
Schroeder, R. J. et al., "High Pressure and Temperature Sensing for the Oil Industry Using Fiber Bragg Gratings Written onto Side Hole Single Mode Fiber", publisher unknown, while the date of the publication is unknown, it is believed to be prior to Aug. 19, 2009, 4 pages.
Shiraki, K. et al., "SBS Threshold of a Fiber with a Brillouin Frequency Shift Distribution", *Journal of Lightwave Technology*, vol. 14, No. 1, Jan. 1996, pp. 50-57.
Singh, T. N. et al., "Prediction of Thermal Conductivity of Rock Through Physico-Mechanical Properties", *Building and Environment*, vol. 42, 2007, pp. 146-155.
Sinha, D., "Cantilever Drilling—Ushering a New Genre of Drilling", a paper prepared for presentation at the SPE/IADC Middle East Drilling Technology Conference and Exhibition, Oct. 2003, 6 pages.
Sinor, A. et al., "Drag Bit Wear Model", *SPE Drilling Engineering*, Jun. 1989, pp. 128-136.
Smith, D., "Using Coupling Variables to Solve Compressible Flow, Multiphase Flow and Plasma Processing Problems", COMSOL Users Conference 2006, Nov. 1, 2006, 38 pages.
Sneider, RM et al., "Rock Types, Depositional History, and Diangenetic Effects, Ivishak reservoir Prudhoe Bay Field", *SPE Reservoir Engineering*, Feb. 1997, pp. 23-30.
Soeder, D. J. et al., "Pore Geometry in High- and Low-Permeability Sandstones, Travis Peak Formation, East Texas", *SPE Formation Evaluation*, Dec. 1990, pp. 421-430.
Somerton, W. H. et al., "Thermal Expansion of Fluid Saturated Rocks Under Stress", SPWLA Twenty-Second Annual Logging Symposium, Jun. 1981, pp. 1-8.
Sousa, L. M. O. et al., "Influence of Microfractures and Porosity on the Physico-Mechanical Properties and Weathering of Ornamental Granites", *Engineering Geology*, vol. 77, 2005, pp. 153-168.
Stowell, J. F. W., "Characterization of Opening-Mode Fracture Systems in the Austin Chalk", *Gulf Coast Association of Geological Societies Transactions*, vol. L1, 2001, pp. 313-320.
Straka, W. A. et al., "Cavitation Inception in Quiescent and Co-Flow Nozzle Jets", 9th International Conference on Hydrodynamics, Oct. 2010, pp. 813-819.

(56) References Cited

OTHER PUBLICATIONS

Suarez, M. C. et al., "COMSOL in a New Tensorial Formulation of Non-Isothermal Poroelasticity", publisher unknown, while the date of the publication is unknown, it is believed to be prior to Aug. 19, 2009,2 pages.

Summers, D. A., "Water Jet Cutting Related to Jet & Rock Properties", publisher unknown, while the date of the publication is unknown, it is believed to be prior to Aug. 19, 2009, 13 pages.

Suwarno, et al., "Dielectric Properties of Mixtures Between Mineral Oil and Natural Ester from Palm Oil", *WSEAS Transactions on Power Systems*, vol. 3, Issue 2, Feb. 2008, pp. 37-46.

Tang, C. A. et al., "Numerical Studies of the Influence of Microstructure on Rock Failure in Uniaxial Compression—Park I: Effect of Heterogeneity", *International Journal of Rock Mechanics and Mining Sciences*, vol. 37, 2000, pp. 555-569.

Tao, Q. et al., "A Chemo-Poro-Thermoelastic Model for Stress/Pore Pressure Analysis around a Wellbore in Shale", a paper prepared for presentation at the US Symposium on Rock Mechanics (USRMS): *Rock Mechanics for Energy*, Mineral and Infrastracture Development in the Northern Regions, Jun. 2005, 7 pages.

Terra, O. et al., "Brillouin Amplification in Phase Coherent Transfer of Optical Frequencies over 480 km Fiber", publisher unknown, while the date of the publication is unknown, it is believed to be prior to Aug. 19, 2009, 9 pages.

Terzopoulos, D. et al., "Modeling Inelastic Deformation: Viscoelasticity, Plasticity, Fracture", *SIGGRAPH '88*, Aug. 1988, pp. 269-278.

Thomas, R. P., "Heat Flow Mapping at the Geysers Geothermal Field", published by the California Department of Conservation Division of Oil and Gas, 1986, 56 pages.

Thompson, G. D., "Effects of Formation Compressive Strength on Perforator Performance", a paper presented of the Southern District API Division of Production, Mar. 1962, pp. 191-197.

Tovo, R. et al., "Fatigue Damage Evaluation on Mechanical Components Under Multiaxial Loadings", excerpt from the Proceedings of the COMSOL Conference, 2009, 8 pages.

Tuler, F. R. et al., "A Criterion for the Time Dependence of Dynamic Fracture", *The International Journal of Fracture Mechanics*, vol. 4, No. 4, Dec. 1968, pp. 431-437.

Turner, D. et al., "New DC Motor for Downhole Drilling and Pumping Applications", a paper prepared for presentation at the SPE/ICoTA Coiled Tubing Roundtable, Mar. 2001, pp. 1-7.

Turner, D. R. et al., "The All Electric BHA: Recent Developments Toward an Intelligent Coiled-Tubing Drilling System", a paper prepared for presentation at the 1999 SPE/ICoTA Coiled Tubing Roundtable, May 1999, pp. 1-10.

Tutuncu, A. N. et al., "An Experimental Investigation of Factors Influencing Compressional- and Shear-Wave Velocities and Attenuations in Tight Gas Sandstones", *Geophysics*, vol. 59, No. 1, Jan. 1994, pp. 77-86.

Udd, E. et al., "Fiber Optic Distributed Sensing Systems for Harsh Aerospace Environments", publisher unknown, while the date of the publication is unknown, it is believed to be prior to Aug. 19, 2009, 12 pages.

Valsangkar, A. J. et al., "Stress-Strain Relationship for Empirical Equations of Creep in Rocks", *Engineering Geology*, Mar. 29, 1971, 5 pages.

Wagh, A. S. et al., "Dependence of Ceramic Fracture Properties on Porosity", *Journal of Material Sience*, vol. 28, 1993, pages 3589-3593.

Wagner, F. et al., "The Laser Microjet Technology—10 Years of Development (M401)", publisher unknown, while the date of the publication is unknown, it is believed to be prior to Aug. 19, 2009, 9 pages.

Waldron, K. et al., "The Microstructures of Perthitic Alkali Feldspars Revealed by Hydroflouric Acid Etching", *Contributions to Mineralogy and Petrology*, vol. 116, 1994, pp. 360-364.

Walker, B. H. et al., "Roller-Bit Penetration Rate Response as a Function of Rock Properties and Well Depth", a paper prepared for presentation at the 61st Annual Technical Conference and Exhibition of the Society of Petroleum Engineers, Oct. 1986, 12 pages.

Wandera, C. et al., "Characterization of the Melt Removal Rate in Laser Cutting of Thick-Section Stainless Steel", *Journal of Laser Applications*, vol. 22, No. 2, May 2010, pp. 62-70.

Wandera, C. et al., "Inert Gas Cutting of Thick-Section Stainless Steel and Medium Section Aluminun Using a High Power Fiber Laser", *Journal of Chemical Physics*, vol. 116, No. 4, Jan. 22, 2002, pp. 154-161.

Wandera, C. et al., "Laser Power Requirement for Cutting of Thick-Section Steel and Effects of Processing Parameters on Mild Steel Cut Quality", a paper accepted for publication in the Proceedings IMechE Part B, *Journal of Engineering Manufacture*, vol. 225, 2011, 23 pages.

Wandera, C. et al., "Optimization of Parameters for Fiber Laser Cutting of 10mm Stainless Steel Plate", a paper for publication in the Proceeding IMechE Part B, *Journal of Engineering Manufacture*, vol. 225, 2011, 22 pages.

Wandera, C., "Performance of High Power Fibre Laser Cutting of Thick-Section Steel and Medium-Section Aluminium", a thesis for the degree of Doctor of Science (Technology) at , Lappeenranta University of Technology, Oct. 2010, 74 pages.

Wang, C. H., "Introduction to Fractures Mechanics", published by DSTO Aeronautical and Maritime Research Laboratory, Jul. 1996, 82 pages.

Wang, G. et al., "Particle Modeling Simulation of Thermal Effects on Ore Breakage", *Computational Materials Science*, vol. 43, 2008, pp. 892-901.

Waples, D. W. et al., "A Review and Evaluation of Specific Heat Capacities of Rocks, Minerals, and Subsurface Fluids. Part 1: Minerals and Nonporous Rocks", *Natural Resources Research*, vol. 13, No. 2, Jun. 2004, pp. 97-122.

Waples, D. W. et al., "A Review and Evaluation of Specific Heat Capacities of Rocks, Minerals, and Subsurface Fluids. Part 2: Fluids and Porous Rocks", *Natural Resources Research*, vol. 13 No. 2, Jun. 2004, pp. 123-130.

Warren, T. M. et al., "Laboratory Drilling Performance of PDC Bits", *SPE Drilling Engineering*, Jun. 1988, pp. 125-135.

White, E. J. et al., "Reservoir Rock Characteristics of the Madison Limestone in the Williston Basin", *The Log Analyst*, Sep.-Oct. 1970, pp. 17-25.

White, E. J. et al., "Rock Matrix Properties of the Ratcliffe Interval (Madison Limestone) Flat Lake Field, Montana", *SPE of AIME*, Jun. 1968, 16 pages.

Wilkinson, M. A. et al., "Experimental Measurement of Surface Temperatures During Flame-Jet Induced Thermal Spallation", *Rock Mechanics and Rock Engineering*, 1993, pp. 29-62.

Winters, W. J. et al., "Roller Bit Model with Rock Ductility and Cone Offset", a paper prepared for presentation at 62nd Annual Technical Conference and Exhibition of the Society of Petroleum Engineers, Sep. 1987, 12 pages.

Wippich, M. et al., "Tunable Lasers and Fiber-Bragg-Grating Sensors", Obatined from the at: from the Internet website of the Industrial Physicist at: http://www.aip.org/tip/INPHFA/vol-9/iss-3/p24.html, on May 18, 2010, pp. 1-5.

Wu, X. Y. et al., "The Effects of Thermal Softening and Heat Conductin on the Dynamic Growth of Voids", *International Journal of Solids and Structures*, vol. 40, 2003, pp. 4461-4478.

Xiao, J. Q. et al., "Inverted S-Shaped Model for Nonlinear Fatigue Damage of Rock", *International Journal of Rock Mechanics & Mining Sciences*, vol. 46, 2009, pp. 643-648.

Xu, Z. et al., "Application of High Powered Lasers to Perforated Completions", *International Congress on Applications of Laser & Electro-Optics*, Oct. 2003, 6 pages.

Xu, Z. et al., "Laser Rock Drilling by a Super-Pulsed CO2 Laser Beam", a manuscript created for the US Department of Energy, while the date of the publication is unknown, it is believed to be prior to Aug. 19, 2009, 9 pages.

Xu, Z. et al., "Laser Spallation of Rocks for Oil Well Drilling", Proceedings of the 23rd International Congress on Applications of Lasers and Electro-Optics, 2004, pp. 1-6.

Xu, Z. et al., "Modeling of Laser Spallation Drilling of Rocks for Gas-and Oilwell Drilling", a paper prepared for the presentation at

(56) References Cited

OTHER PUBLICATIONS the 2005 SPE (Society of Petroleum Engineers) Annual Technical Conference and Exhibition, Oct. 2005, 6 pages.
Xu, Z. et al., "Rock Perforation by Pulsed Nd: YAG Laser", Proceedings of the 23rd International Congress on Applications of Lasers and Electro-Optics 2004, 2004, 5 pages.
Xu, Z. et al., "Specific Energy for Pulsed Laser Rock Drilling", *Journal of Laser Applications*, vol. 15, No. 1, Feb. 2003, pp. 25-30.
Yabe, T. et al., "The Constrained Interpolation Profile Method for Multiphase Analysis", *Journal of Computational Physics*, vol. 169, 2001, pp. 556-593.
Yamamoto, K. Y. et al., "Detection of Metals in the Environment Using a Portable Laser-Induced Breakdown Spectroscopy Instrument", *Applied Spectroscopy*, vol. 50, No. 2, 1996, pp. 222-233.
Yamashita, Y. et al., "Underwater Laser Welding by 4kW CW YAG Laser", *Journal of Nuclear Science and Technology*, vol. 38, No. 10, Oct. 2001, pp. 891-895.
Yasar, E. et al., "Determination of the Thermal Conductivity from Physico-Mechanical Properties", *Bull Eng. Geol. Environ.*, vol. 67, 2008, pp. 219-225.
York, J. L. et al., "The Influence of Flashing and Cavitation on Spray Formation", a progress report for UMRI Project 2815 with Delavan Manufacturing Company, Oct. 1959, 27 pages.
Zamora, M. et al., "An Empirical Relationship Between Thermal Conductivity and Elastic Wave Velocities in Sandstone", *Geophysical Research Letters*, vol. 20, No. 16, Aug. 20, 1993, pp. 1679-1682.
Zeng, Z. W. et al., "Experimental Determination of Geomechanical and Petrophysical Properties of Jackfork Sandstone—A Tight Gas Formation", a paper prepared for the presentation at the 6th North American Rock Mechanics Symposium (NARMS): *Rock Mechanics Across Borders and Disciplines*, Jun. 2004, 9 pages.
Zehnder, A. T., "Lecture Notes on Fracture Mechanics", 2007, 227 pages.
Zeuch, D. H. et al., "Rock Breakage Mechanisms With a PDC Cutter", a paper prepared for presentation at the 60th Annual Technical Conference and Exhibition of the Society of Petroleum Engineers, Sep. 1985, 12 pages.
Zhang, L. et al., "Energy from Abandoned Oil and Gas Reservoirs", a paper prepared for presentation at the 2008 SPE (Society of Petroleum Engineers) Asia Pacific Oil & Gas Conference and Exhibition, 2008, pp. 1-10.
Zheleznov, D. S. et al., "Faraday Rotators With Short Magneto-Optical Elements for 50-kW Laser Power", *IEEE Journal of Quantum Electronics*, vol. 43, No. 6, Jun. 2007, pp. 451-457.
Zhou, T. et al., "Analysis of Stimulated Brillouin Scattering in Multi-Mode Fiber by Numerical Solution", *Journal of Zhejiang University of Science*, vol. 4 No. 3, May-Jun. 2003, pp. 254-257.
Zhu, X. et al., "High-Power ZBLAN Glass Fiber Lasers: Review and Prospect", *Advances in OptoElectronics*, vol. 2010, pp. 1-23.
Zietz, J. et al., "Determinants of House Prices: A Quantile Regression Approach", *Department of Economics and Finance Working Paper Series*, May 2007, 27 pages.
Zuckerman, N. et al., "Jet Impingement Heat Transfer: Physics, Correlations, and Numerical Modeling", *Advances in Heat Transfer*, vol. 39. 2006, pp. 565-631.
Aptukov, V. N., "Two Stages of Spallation", publisher unknown, while the date of the publication is unknown, it is believed to be prior to Aug. 19, 2009, 6 pages.
Author known, "Heat Capacity Analysis", published by Bechtel SAIC Company LLC, a report prepared for US Department of Energy, Nov. 2004, 100 pages.
Author unknown, "Chapter 7: Energy Conversion Systems—Options and Issues", publisher ubknown, while the date of the publication is unknown, it is believed to be prior to Aug. 19, 2009, pp. 7-1 to 7-32 and table of contents page.
Author unknown , "Chapter I—Laser-Assisted Rock-Cutting Tests", publisher unknown, while the date of the publication is unknown, it is believed to be prior to Aug. 19, 2009, 64 pages.
Author unknown, "Cross Process Innovations", Obtained from the Internat at: http://www.mrl.columbia.edu/ntm/CrossProcess/CrossProcessSect5.htm, on Feb. 2, 2010, 11 pages.
Author unknown, "Fourier Series, Generalized Functions, Laplace Transform", publisher unknown, while the date of the publication is unknown, it is believed to be prior to Aug. 19, 2009, 6 pages.
Author unknown, "Silicone Fluids: Stable, Inert Media", published by Gelest, Inc., while the date of the publication is unknown, it is believed to be prior to Aug. 19, 2009, 27 pages.
Author unknown, "Introduction to Optical Liquids", Cargille-Sacher Laboratories Inc., Obtained from the Internet at: http://www.cargille.com/opticalintro.shtml, on Dec. 23, 2008, 5 pages.
Author unknown, "Laser Drilling", Oil & Natural Gas Projects (Exploration & Production Technologies) Technical Paper, Dept. of Energy, Jul. 2007, 3 pages.
Author unknown, "Leaders in Industry Luncheon", IPAA & TIPRO, Jul. 8, 2009, 19 pages.
Author unknown, "Measurement and Control of Abrasive Water-Jet Velocity", publisher unknown, while the date of the publication is unknown, it is believed to be prior to Aug. 19, 2009, 8 pages.
Author unknown, "Nonhomogeneous PDE—Heat Equation with a Forcing Term", a lecture, 2010, 6 pages.
Author unknown, "Performance Indicators for Geothermal Power Plants", prepared by International Geothermal Association for World Energy Council Working Group on Performance of Renewable Energy Plants, author unknown, Mar. 2011, 7 pages.
Author unknown, "Rock Mechanics and Rock Engineering", publisher unknown, while the date of the publication is unknown, it is believed to be prior to Aug. 19, 2009, 69 pages.
Author unknown, "Shock Tube Solved With Cosmol Multiphysics 3.5a", published by Comsol Multiphysics, 2008, 5 pages.
Author unknown, "Stimulated Brillouin Scattering (SBS) in Optical Fibers", published by Centro de Pesquisa em Optica e Fotonica, Obtained from the Internet at: http://cepof.ifi.unicamp.br/index.php . . . ), on Jun. 25, 2012, 2 pages.
Author unknown, "Underwater Laser Cutting", published by TWI Ltd, May/Jun. 2011, 2 pages.
Related utility application assigned U.S. Appl. No. 13/486,795, filed Jun. 1, 2012, 166 pages.
Related utility application assigned U.S. Appl. No. 13/565,345, filed Aug. 2, 2012, 112 pages.
Grigoryan, V., "Separation of variables: Neumann Condition", a lecture for Math 124A, Dec. 1, 2009, pp. 1-3.
U.S. Appl. No. 12/543,986, filed Aug. 19, 2013, Moxley et al.
U.S. Appl. No. 12/544,094, filed Aug. 19, 2009, Faircloth et al.
U.S. Appl. No. 12/543,968, filed Aug. 19, 2009, Rinzler et al.
U.S. Appl. No. 12/544,136, filed Aug. 19, 2009, Zediker et al.
U.S. Appl. No. 12/544,038, filed Aug. 19, 2009, Zediker et al.
U.S. Appl. No. 12/706,576, filed Feb. 16, 2010, Zediker et al.
U.S. Appl. No. 12/840,978, filed Jul. 21, 2010, Rinzler et al.
U.S. Appl. No. 12/896,021, filed Oct. 1, 2010, Underwood et al.
U.S. Appl. No. 13/034,017, filed Feb. 24, 2011, Zediker et al.
U.S. Appl. No. 13/034,037, filed Feb. 24, 2011, Zediker et al.
U.S. Appl. No. 13/034,175, filed Feb. 24, 2011, Zediker et al.
U.S. Appl. No. 13/034,183, filed Feb. 24, 2011, Zediker et al.
U.S. Appl. No. 13/210,581, filed Aug. 16, 2011, DeWitt et al.
U.S. Appl. No. 13/211,729, filed Aug. 17, 2011, DeWitt et al.
U.S. Appl. No. 13/222,931, filed Aug. 31, 2011, Zediker et al.
U.S. Appl. No. 13/347,445, filed Jan. 10, 2012, Zediker et al.
U.S. Appl. No. 13/403,132, filed Feb. 23, 2012, Zediker et al.
U.S. Appl. No. 13/403,287, filed Feb. 23, 2012, Grubb et al.
U.S. Appl. No. 13/403,615, filed Feb. 23, 2012, Grubb et al.
U.S. Appl. No. 13/403,692, filed Feb. 23, 2012, Zediker et al.
U.S. Appl. No. 13/403,723, filed Feb. 23, 2012, Rinzler et al.
U.S. Appl. No. 13/403,509, filed Feb. 23, 2012, Fraze et al.
U.S. Appl. No. 13/403,741, filed Feb. 23, 2012, Zediker et al.
U.S. Appl. No. 13/486,795, filed Feb. 23, 2012, Rinzler et al.
U.S. Appl. No. 13/565,345, filed Feb. 23, 2012, Zediker et al.
U.S. Appl. No. 13/768,149, filed Feb. 15, 2013, Zediker et al.
International Search Report for PCT Application No. PCT/US2011/050044 dated Feb. 1, 2012, 26 pgs.
International Search Report for PCT Application No. PCT/US2012/049338, dated Jan. 22, 2013, 14 pgs.

(56) References Cited

OTHER PUBLICATIONS

Agrawal Dinesh et al., "Microstructural by TEM of WC/Co composites Prepared by Conventional and Microwave Processes", Materials Research Lab, The Pennsylvania State University, 15$^{th}$ International Plansee Seminar, vol. 2, , 2001, pp. 677-684.

Anand, U. et al., "Prevention of Nozzle Wear in Abrasive Water Suspension Jets (AWSJ) Using PoroLubricated Nozzles", Transactions of the ASME, vol. 125, Jan. 2003, pp. 168-181.

Ashby, M. F. et al., "The Failure of Brittle Solids Containing Small Cracks Under Compressive Stress States", Acta Metall., vol. 34, No. 3, 1986, pp. 497-510.

ASTM International, "Standard Test Method for Thermal Conductivity of Solids by Means of the Guarded-Comparative-Longitudinal Heat Flow Technique", Standard under the fixed Designation E1225-09, 2009, pp. 1-9.

Avar, B. B. et al., "Porosity Dependence of the Elastic Modulof Lithophysae-rich Tuff: Numerical and Experimental Investigations", International Journal of Rock Mechanics & Mining Sciences, vol. 40, 2003, pp. 919-928.

Baird, J. A. et al., "Analyzing the Dynamic Behavior of Downhole Equipment During Drilling", government Sandia Report, SAND-84-0758C, DE84 008840, 7 pages.

Bechtel SAIC Company LLC, "Heat Capacity Analysis", a report prepared for Department of Energy, Nov. 2004, 100 pages.

Benavente, D. et al., "The Combined Influence of Mineralogical, Hygric and Thermal Properties on the Durability of PoroBuilding Stones", Eur. J. Mineral, vol. 20, Aug. 2008, pp. 673-685.

Beste, U. et al., "Micro-scratch evaluation of rock type—a means to comprehend rock drill wear", Tribology International, vol. 37, 2004, pp. 203-210.

Brujan, E. A. et al., "Dynamics of Laser-Induced Cavitation Bubbles Near an Elastic Bounder", J. Fluid Mech., vol. 433, 2001, pp. 251-281.

Chraplyvy, A. R., "Limitations on Lightwave Communications Imposed by Optical-Fiber Nonlinearities". Journal of Lightwave Technology, vol. 8 No. 10, Oct. 1990, pp. 1548-1557.

De Castro Lima, J. J. et al., "Linear Thermal Expansion of Granitic Rocks: Influence of Apparent Porosity, Grain Size and Quartz Content", Bull Eng Geol Env., 2004, vol. 63, pp. 215-220.

Dinçer, Ismail et al., "Correlation between Schmidt hardness, uniaxial compressive strength and Young's modulfor andesites, basalts and tuffs", Bull Eng Geol Env, vol. 63, 2004, pp. 141-148.

Dole, L. et al., "Cost-Effective CementitioMaterial Compatible with Yucca Mountain Repository Geochemistry", a paper prepared by Oak Ridge National Laboratory for the Department of Energy, No. ORNL/TM-2004/296, Dec. 2004, 128 pages.

Dutton, S. P. et al., "Evolution of Porosity and Permeability in the Lower CretaceoTravis Peak Formation, East Texas", The American Association of Petroleum Geologists Bulletin, vol. 76, No. 2, Feb. 1992, pp. 252-269.

Eighmy, T. T. et al., "Microfracture Surface Charaterizations: Implications for in Situ Remedial Methods in Fractured Rock", Bedrock Bioremediation Center, Final Report, National Risk Management Research Laboratory, Office of Research and Development, U.S. Environmental Protection Agency, EPA/600/R-05/121, 2006, pp. 1-99.

Finger, J. T. et al., "PDC Bit Research at Sandia National Laboratories", Sandia Report No. SAND89-0079-UC-253, a report prepared for Department of Energy, Jun. 1989, 88 pages.

Friant, J. E. et al., "Disc Cutter Technology Applied to Drill Bits", a paper prepared by Exacavation Engineering Associates, Inc. for the Department of Energy's Natural Gas Conference, Mar. 1997, pp. 1-16.

Gahan, B. C. et al., "Laser Drilling: Drilling with the Power of Light, Phase 1: Feasibility Study", a Topical Report by the Gas Technology Institute, for the Government under Cooperative Agreement No. DE-FC26-00NT40917, Sep. 30, 2001, 107 pages.

Gale, J. F. W. et al., "Natural Fractures in the Barnett Shale and Their Importance for Hydraulic Fracture Treatments", The American Assoction of Petroleum Geologists, AAPG Bulletin, vol. 91, No. 4, Apr. 2007, pp. 603-622.

Gardner, R. D. et al., "Flourescent Dye Penetrants Applied to Rock Fractures", Int. J. Rock Mech. Min. Sci., vol. 5, 1968, pp. 155-158 with 2 additional pages.

Gonthier, F. "High-power All-Fiber® components: The missing link for high power fiber fasers", source unknown, 11 pages.

Graves, R. M. et al., "Spectral signatures and optic coeffecients of surface and reservoir rocks at COIL, CO2 and Nd:YAG laser wavelenghts", source unknown, 13 pages.

Grigoryan, V., "InhomogeneoBoundary Value Problems", a lecture for Math 1248, Jan. 26, 2010, pp. 1-5.

Hu, H. et al., "SimultaneoVelocity and Concentration Measurements of a Turbulent Jet Mixing Flow", Ann. N.Y. Acad. Sci., vol. 972, 2002, pp. 254-259.

Judzis, A. et al., "Investigation of Smaller Footprint Drilling System; Ultra-High Rotary Speed Diamond Drilling Has Potential for Reduced Energy Requirements", IADC/SPE No. 99020, 33 pages.

Kolle, J. J., "HydroPulse Drilling", a Final Report for Department of Energy under Cooperative Development Agreement No. DE-FC26-FT34367, Apr. 2004, 28 pages.

Leong, K. H., "Modeling Laser Beam-Rock Interaction", a report prepared for Department of Energy (http://www.doe.gov/bridge), 8 pages.

Li, X. B. et al., "Experimental Investigation in the Breakage of Hard Rock by the PDC Cutters with Combined Action Modes", Tunnelling and Underground Space Technology, vol. 16., 2001, pp. 107-114.

Lima, R. S. et al., "Elastic ModulMeasurements via Laser-Ultrasonic and Knoop Indentation Techniques in Thermally Sprayed Coatings", Journal of Thermal Spray Technology, vol. 14(1), 2005, pp. 52-60.

Loland, K. E., "ContinuoDamage Model for Load-Response Estimation of Concrete", Cement and Concrete Research, vol. 10, 1980, pp. 395-402.

Luft, H. B. et al., "Development and Operation of a New Insulated Concentric Coiled Tubing String for ContinuoSteam Injection in Heavy Oil Production", Conference Paper published by Society of Petroleum Engineers on the Internet at: (http://www.onepetro.org/mslib/servlet/onepetropreview?id=00030322), on Aug. 8, 2012, 1 page.

Maqsood, A. et al., "Thermophysical Properties of PoroSandstones: Measurement and Comparative Study of Some Representative Thermal Conductivity Models", International Journal of Thermophysics, vol. 26, No. 5, Sep. 2005, pp. 1617-1632.

Martins, A. et al., "Modeling of Bend Losses in Single-Mode Optical Fibers", Institutu de Telecomunicacoes, Portugal, 3 pages.

Mensa-Wilmot, G. et al., "New PDC Bit Technology, Improved Drillability Analysis, and Operational Practices Improve Drilling Performance in Hard and Highly HeterogeneoApplications", a paper prepared for the 2004 SPE (Society of Petroleum Engineers) Eastern Regional Meeting, Sep. 2004, pp. 1-14.

Moavenzadeh, F. et al., "Thin Disk Technique for Analyzing Fock Fractures Induced by Laser Irradiation", a report prepared for the Department of Transportation under Contract C-85-65, May 1968, 91 pages.

Moradian, Z. A. et al., "Predicting the Uniaxial Compressive Strength and Static Young's Modulof Intact Sedimentary Rocks Using the Ultrasonic Test", International Journal of Geomechanics, vol. 9, No. 1, 2009, pp. 14-19.

Oglesby, K. et al., "Advanced Ultra High Speed Motor for Drilling", a project update by Impact Technologies LLC for the Department of Energy, Sep. 12, 2005, 36 pages.

Olsen, F. O., "Fundamental Mechanisms of Cutting Front Formation in Laser Cutting", SPIE, vol. 2207, pp. 402-413.

Ouyang, L. B. et al., "General Single Phase Wellbore Flow Model", a report prepared for the COE/PETC, May 2, 1997, 51 pages.

Phani, K. K. et al., "Pororsity Dependence of Ultrasonic Velocity and Elastic Modulin Sintered Uranium Dioxide—a discussion", Journal of Materials Science Letters, vol. 5, 1986, pp. 427-430.

(56) References Cited

OTHER PUBLICATIONS

Ping, Cao et al., "Testing study of subcritical crack growth rate and fracture toughness in different rocks", *Transactions of NonferroMetals Society of China*, vol. 16, 2006, pp. 709-714.

Porter, J. A. et al., "Cutting Thin Sheet Metal with a Water Jet Guided Laser Using VarioCutting Distances, Feed Speeds and Angles of Incidence", *Int. J. Adv. Manuf. Technol.*, vol. 33, 2007, pp. 961-967.

Potyondy, D. O., "Simulating Stress Corrosion with a Bonded-Particle Model for Rock", *International Journal of Rock Mechanics& Mining Sciences*, vol. 44, 2007, pp. 677-691.

Price, R. H. et al., "Analysis of the Elastic and Strength Properties of Yuccs Mountain tuff, Nevada", 26th Symposium on Rock Mechanics, Jun. 1985, pp. 89-96.

Qixian, Luo et al., "Using compression wave ultrasonic transducers to measure the velocity of surface waves and hence determine dynamic modulof elasticity for concrete", *Construction and Building Materials*, vol. 10, No. 4, 1996, pp. 237-242.

Richter, D. et al., "Thermal Expansion Behavior of IgneoRocks", *Int. J. Rock Mech. Min. Sci. & Geomech. Abstr.*, vol. 11, 1974, pp. 403-411.

Rijken, P. et al., "Role of Shale Thickness on Vertical Connectivity of Fractures: Application of Crack-Bridging Theory to the Austin Chalk, Texas", *Tectonophysics*, vol. 337 ,2001, pp. 117-133.

Sachpazis, C. I, M. Sc., Ph. D., "Correlating Schmidt Hardness With Compressive Strength and Young's ModulOf Carbonate Rocks", *International Association of Engineering Geology*, Bulletin, No. 42, 1990, pp. 75-83.

Sattler, A. R., "Core Analysis in a Low Permeability Sandstone Reservoir: Results from the Multiwell Experiment", a report by Sandia National Laboratories for the Department of Energy, Apr. 1989, 69 pages.

Smith, D., "Using Coupling Variables to Solve Compressible Flow, Multiphase Flow and Plasma Processing Problems", COMSOL Users Conference 2006, 38 pages.

Tao, Q. et al., "A Chemo-Poro-Thermoelastic Model for Stress/Pore Pressure Analysis around a Wellbore in Shale", a paper prepared for presentation at the Symposium on Rock Mechanics (USRMS): *Rock Mechanics for Energy*, Mineral and Infrastracture Development in the Northern Regions, Jun. 2005, 7 pages.

Tuler, F. R. et al., "A Criterion for the Time Dependence of Dynamic Fracture", *The International Jopurnal of Fracture Mechanics*, vol. 4, No. 4, Dec. 1968, pp. 431-437.

Valsangkar, A. J. et al., Stress-Strain Relationship for Empirical Equations of Creep in Rocks, *Engineering Geology*, Mar. 29, 1971, 5 pages.

Wagh, A. S. et al., "Dependence of Ceramic Fracture Properties on Porosity", *Journal of Material Sience*, vol. 28, 1993, pp. 3589-3593.

Waples, D. W. et al., "A Review and Evaluation of Specific Heat Capacities of Rocks, Minerals, and Subsurface Fluids. Part 1: Minerals and NonporoRocks", *Natural Resources Research*, vol. 13, No. 2, Jun. 2004, pp. 97-122.

Waples, D. W. et al., "A Review and Evaluation of Specific Heat Capacities of Rocks, Minerals, and Subsurface Fluids. Part 2: Fluids and PoroRocks", *Natural Resources Research*, vol. 13 No. 2, Jun. 2004, pp. 123-130.

Williams, R. E. et al., "Experiments in Thermal Spallation of VarioRocks", *Transactions of the ASME*, vol. 118, 1996, pp. 2-8.

Xu, Z. et al., "Laser Rock Drilling by a Super-Pulsed CO2 Laser Beam", a manuscript created for the Department of Energy, while the date of the publication is unknown, it is believed to be prior to Aug. 19, 2009, 9 pages.

Xu, Z. et al., "Specific Energy of Pulsed Laser Rock Drilling", *Journal of Laser Applications*, vol. 15, No. 1, Feb. 2003, pp. 25-30.

Zuckerman, N. et al., "Jet Impingement Heat Transfer: Physics, Correlations, and Numerical Modeling", *Advances in Heat Transfer*, vol. 39, 2006, pp. 565-631.

A Built-for-Purpose Coiled Tubing Rig, by Schulumberger Wells, No. DE-PS26-03NT15474, 2006, 1 pg.

"Chapter I—Laser-Assisted Rock-Cutting Tests", publisher unknown, while the date of the publication is unknown, it is believed to be prior to Aug. 19, 2009, 64 pages.

"Chapter 7: Energy Conversion Systems—Options and Issues", publisher unknown, while the date of the publication is unknown, it is believed to be prior to Aug. 19, 2009, pp. 7-1 to 7-32 and table of contents page.

"Cross Process Innovations", Obtained from the Internet at: http://www.mrl.columbia.edu/ntm/CrossProcess/CrossProcessSect5.htm, on Feb. 2, 2010, 11 pages.

"Fourier Series, Generalized Functions, Laplace Transform", publisher unknown, while the date of the publication is unknown, it is believed to be prior to Aug. 19, 2009, 6 pages.

"Introduction to Optical Liquids", published by Cargille-Sacher Laboratories Inc., Obtained from the Internet at: http://www.cargille.com/opticalintro.shtml, on Dec. 23, 2008, 5 pages.

"Laser Drilling", Oil & Natural Gas Projects (Exploration & Production Technologies) Technical Paper, Dept. of Energy, Jul. 2007, 3 pages.

"Leaders in Industry Luncheon", IPAA & TIPRO, Jul. 8, 2009, 19 pages.

"Measurement and Control of Abrasive Water-Jet Velocity", publisher unknown, while the date of the publication is unknown, it is believed to be prior to Aug. 19, 2009, 8 pages.

"NonhomogeneoPDE—Heat Equation with a Forcing Term", a lecture, 2010, 6 pages.

"Performance Indicators for Geothermal Power Plants", prepared by International Geothermal Association for World Energy Council Working Group on Performance of Renewable Energy Plants, author unknown, Mar. 2011, 7 pages.

"Rock Mechanics and Rock Engineering", publisher unknown, while the date of the publication is unknown, it is believed to be prior to Aug. 19, 2009, 69 pages.

"Shock Tube", Cosmol MultiPhysics 3.5a, 2008, 5 pages.

"Silicone Fluids: Stable, Inert Media", Gelest, Inc., while the date of the publication is unknown, it is believed to be prior to Aug. 19, 2009, 27 pages.

"Stimulated Brillouin Scattering (SBS) in Optical Fibers", Centro de Pesquisa em Optica e Fotonica, Obtained from the Internet at: http://cepof.ifi.unicamp.br/index.php . . . ), on Jun. 25, 2012, 2 pages.

"Underwater Laser Cutting", TWI Ltd, May/Jun. 2011, 2 pages.

\* cited by examiner

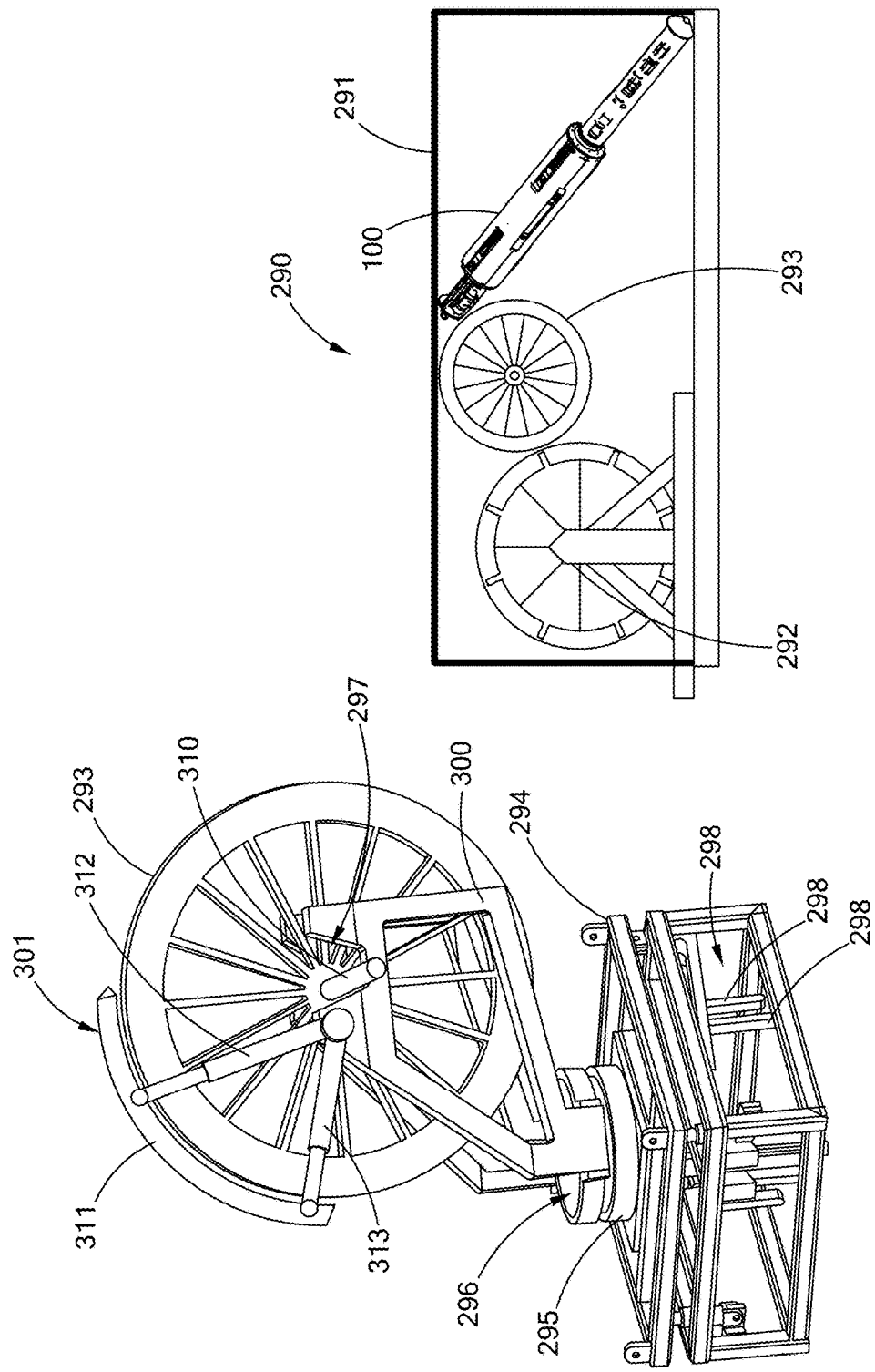

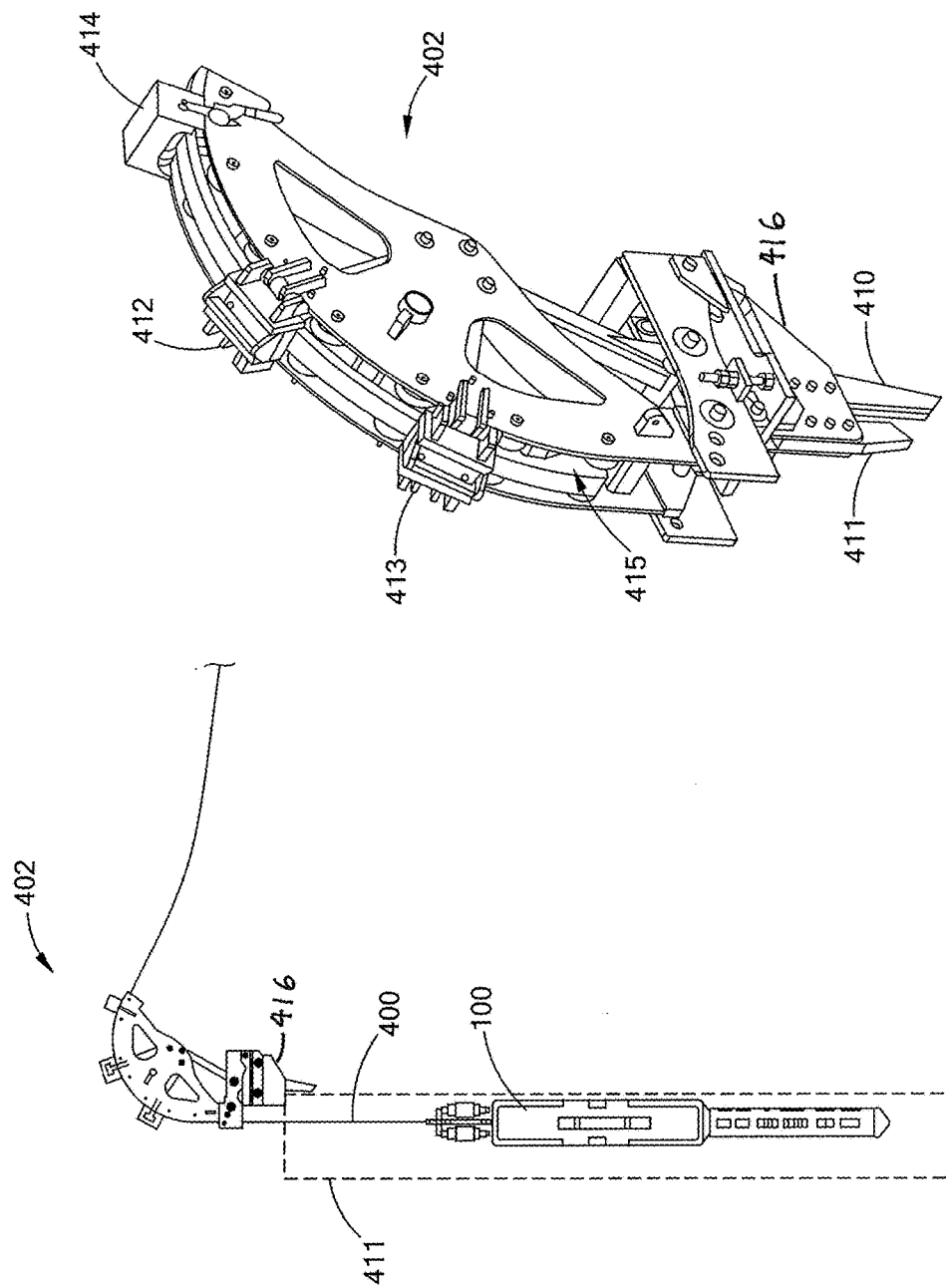

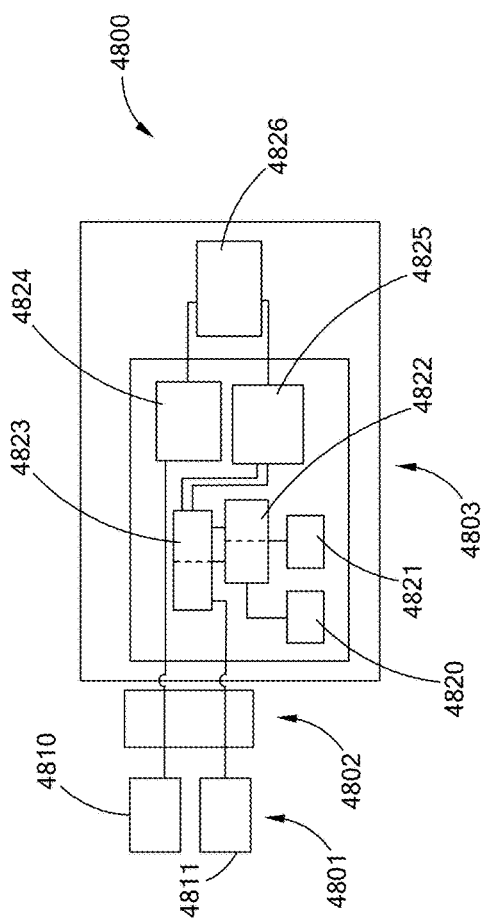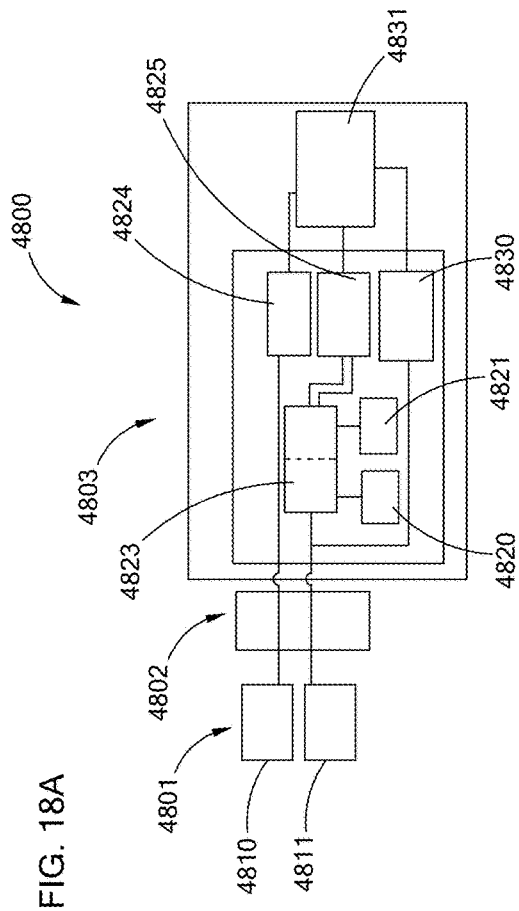
FIG. 18A
FIG. 18B

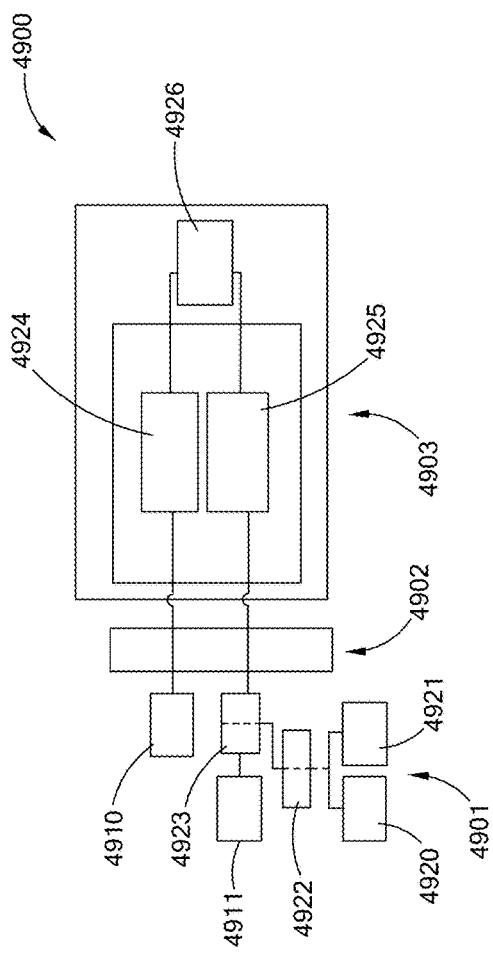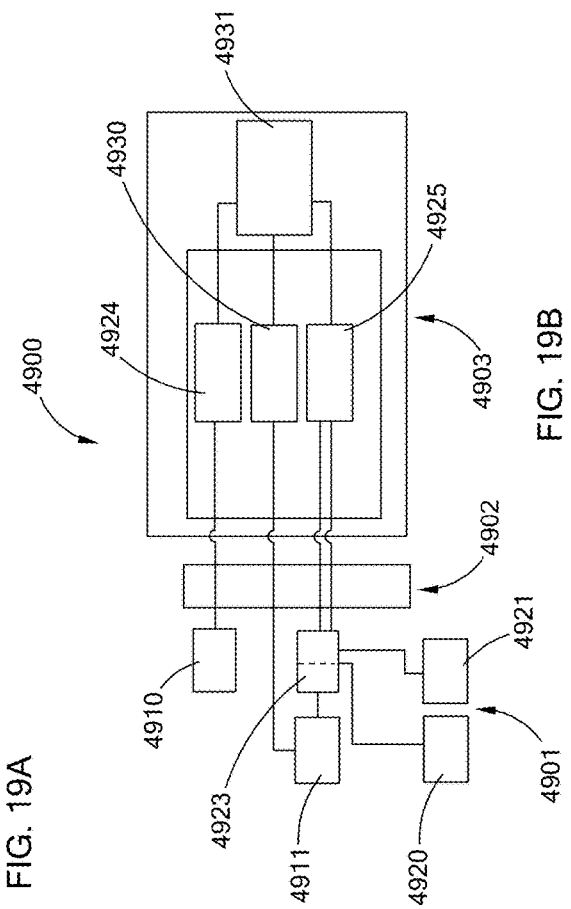

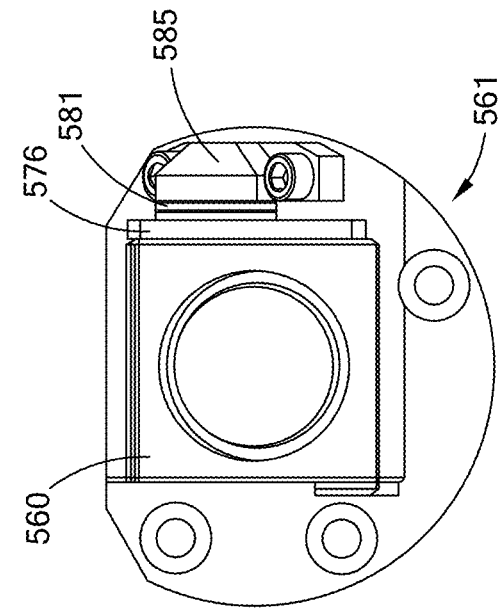
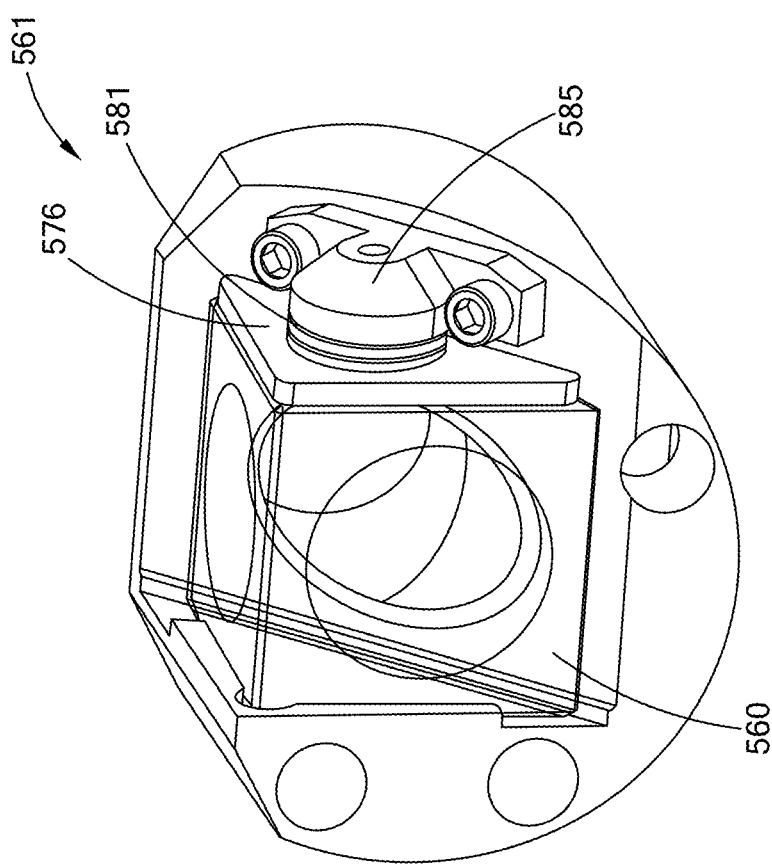
FIG. 33B
FIG. 33A

HIGH POWER LASER OFFSHORE DECOMMISSIONING TOOL, SYSTEM AND METHODS OF USE

This application: (i) is a continuation-in-part of U.S. patent application Ser. No. 13/565,345, filed Aug. 2, 2012, which claims, under 35 U.S.C. §119(e)(1), the benefit of the filing date of Aug. 2, 2011 of provisional application Ser. No. 61/514,391, the benefit of the filing date of Mar. 1, 2012 of provisional application Ser. No. 61/605,422, the benefit of the filing date of Mar. 1, 2012 of provisional application Ser. No. 61/605,429, the benefit of the filing date of Mar. 1, 2012 of provisional application Ser. No. 61/605,434; (ii) is a continuation-in-part of U.S. patent application Ser. No. 13/222,931, filed Aug. 31, 2011, which claims, under 35 U.S.C. §119(e)(1), the benefit of the filing date of Aug. 31, 2010 of provisional application Ser. No. 61/378,910; (iii) is a continuation-in-part of U.S. patent application Ser. No. 13/211,729, filed Aug. 17, 2011, which claims, under 35 U.S.C. §119(e)(1), the benefit of the filing date of Aug. 17, 2010 of provisional application Ser. No. 61/374,594; (iv) is a continuation-in-part of U.S. patent application Ser. No. 13/347,445, filed Jan. 10, 2012, which claims, under 35 U.S.C. §119(e)(1), the benefit of the filing date of Jan. 11, 2011 of provisional application Ser. No. 61/431,827 and the benefit of the filing date of Feb. 7, 2011 of provisional application Ser. No. 61/431,830; (v) is a continuation-in-part of U.S. patent application Ser. No. 13/210,581, filed Aug. 16, 2011; (vi) is a continuation-in-part of U.S. patent application Ser. No. 13/403,741, filed Feb. 23, 2012, which claims, under 35 U.S.C. §119(e)(1), the benefit of the filing date of Feb. 24, 2011 of provisional application Ser. No. 61/446,312; (vii) is a continuation-in-part of U.S. patent application Ser. No. 12/543,986, filed Aug. 19, 2009, which claims, under 35 U.S.C. §119(e)(1), the benefit of the filing date of Aug. 20, 2008 of provisional application Ser. No. 61/090,384, the benefit of the filing date of Oct. 3, 2008 of provisional application Ser. No. 61/102,730, the benefit of the filing date of Oct. 17, 2008 of provisional application Ser. No. 61/106,472 and the benefit of the filing date of Feb. 17, 2009 of provisional application Ser. No. 61/153,271; (viii) is a continuation-in-part of U.S. patent application Ser. No. 12/544,136, filed Aug. 19, 2009, which claims, under 35 U.S.C. §119(e)(1), the benefit of the filing date of Aug. 20, 2008 of provisional application Ser. No. 61/090,384, the benefit of the filing date of Oct. 3, 2008 of provisional application Ser. No. 61/102,730, the benefit of the filing date of Oct. 17, 2008 of provisional application Ser. No. 61/106,472 and the benefit of the filing date of Feb. 17, 2009 of provisional application Ser. No. 61/153,271; (ix) is a continuation-in-part of U.S. patent application Ser. No. 12/840,978, filed Jul. 21, 2010; and (x) is a continuation-in-part of U.S. patent application Ser. No. 12/706,576 filed Feb. 16, 2010 which claims, under 35 U.S.C. §119(e)(1), the benefit of the filing date of Jan. 15, 2010 of provisional application Ser. No. 61/295,562; and, (xi) is a continuation-in-part of U.S. patent application Ser. No. 13/366,882 filed Feb. 6, 2012, which claims, under 35 U.S.C. §119(e)(1), the benefit of the filing date of Feb. 7, 2011 of provisional application Ser. No. 61/439,970, the entire disclosures of each of which are incorporated herein by reference.

BACKGROUND OF THE INVENTION

Field of the Invention

The present inventions relate to high power laser systems, high power laser tools, and methods of using these systems and tools for removing structures objects, and materials, and in particular, structures, objects, and materials in difficult to access locations and environments, such as offshore, underwater, or in hazardous environments, such as pipelines, nuclear and chemical facilities. Thus, the present inventions relate to high power laser systems, high power laser tools, and methods of using these systems and tools for removing structures, objects, and materials located offshore, on an offshore coastal shelf, on a continental shelf, in coastal waters, above the surface of a body of water, below the surface of a body of water, below and above the surface of a body of water, on the bottom of a body of water, e.g., the seafloor, below the bottom of a body of water, e.g., below the seafloor, and combinations and variations of these. In particular, the present inventions relate to the removal of offshore structures, such as: platforms used for the exploration and production of hydrocarbons; oil and gas wells; oil and gas fields; platforms used to support windmills; structures used to support bridges, causeways or piers; pipelines; and power cables.

As used herein, unless specified otherwise "offshore," "offshore activities" and "offshore drilling activities" and similar such terms are used in their broadest sense and would include drilling and other activities on, or in, any body of water, whether fresh or salt water, whether manmade or naturally occurring, such as for example rivers, lakes, canals, inland seas, oceans, seas, bays and gulfs, such as the Gulf of Mexico. As used herein, unless specified otherwise the term "offshore drilling rig" is to be given its broadest possible meaning and would include fixed platforms, tenders, platforms, barges, dynamically positioned multiservice vessels, lift boats, jack-ups, floating platforms, drill ships, dynamically positioned drill ships, semi-submersibles and dynamically positioned semi-submersibles.

As used herein, unless specified otherwise the term "fixed platform," would include any structure that has at least a portion of its weight supported by the seafloor. Fixed platforms would include structures such as: free-standing caissons, monopiles, well-protector jackets, pylons, braced caissons, piled-jackets, skirted piled-jackets, compliant towers, gravity structures, gravity based structures, skirted gravity structures, concrete gravity structures, concrete deep water structures and other combinations and variations of these. Fixed platforms extend from at or below the seafloor to and above the surface of the body of water, e.g., sea level. Deck structures are positioned above the surface of the body of water on top of vertical support members that extend down into the water to the seafloor and into the seabed. Fixed platforms may have a single vertical support, or multiple vertical supports, or vertical diagonal supports, e.g., pylons, legs, braced caissons, etc., such as a three, four, or more support members, which may be made from steel, such as large hollow tubular structures, concrete, such as concrete reinforced with metal such as rebar, and combinations and variations of these. These vertical support members are joined together by horizontal, diagonal and other support members. In a piled-jacket platform the jacket is a derrick like structure having hollow essentially vertical members near its bottom. Piles extend out from these hollow bottom members into the seabed to anchor the platform to the seabed.

The construction and configuration of fixed platforms can vary greatly depending upon several factors, including the intended use for the platform, load and weight requirements, seafloor conditions and geology, location and sea conditions, such as currents, storms, and wave heights. Various types of fixed platforms can be used over a great range of depths from a few feet to several thousands of feet. For example, they may be used in water depths that are very shallow, i.e., less than 50 feet, a few hundred feet, e.g., 100 to 300 feet, and a few thousand feet, e.g., up to about 3,000 feet or even greater depths may be obtained. These structures can be extremely complex and heavy, having a total assembled weight of more than 100,000 tons. They can extend many feet into the seafloor, as deep as 100 feet or more below the seafloor.

Examples of fixed platforms are provided in FIGS. 13 A-C. Where a triangular-pile-jacket, a rectangular-pile-jacket, and a gravity structure are illustrated, respectively. The conductors 2001 are shown within the structure of pile jacket platforms. To the extent utilized in the gravity structure, the conductors would be contained within the vertical support members 2002 of the gravity structure, and thus, are not shown in FIG. 13C. The conductors extend from the deck structures of the platform, 2005,a, b, c above the surface 2006 of the body of water 2007, to and into the seabed 2008. The conductors contain, e.g., hose, tubulars, which are used for among other things recovery of hydrocarbons from the formations below the seafloor. The size, weight, and variability of fixed platforms, associated conductors, and other structures and materials at, on, or within the seabed make their removal difficult.

As used herein, unless specified otherwise the terms "seafloor," "seabed" and similar terms are to be given their broadest possible meaning and would include any surface of the earth, including for example the mud line, that lies under, or is at the bottom of, any body of water, whether fresh or salt water, whether manmade or naturally occurring.

As used herein, unless specified otherwise the terms "well" and "borehole" are to be given their broadest possible meaning and include any hole that is bored or otherwise made into the earth's surface, e.g., the seafloor or seabed, and would further include exploratory, production, abandoned, reentered, reworked, and injection wells.

As used herein, unless specified otherwise the term "drill pipe" is to be given its broadest possible meaning and includes all forms of pipe used for drilling activities; and refers to a single section or piece of pipe. As used herein, unless specified otherwise the terms "stand of drill pipe," "drill pipe stand," "stand of pipe," "stand" and similar type terms are to be given their broadest possible meaning and include two, three or four sections of drill pipe that have been connected, e.g., joined together, typically by joints having threaded connections. As used herein, unless specified otherwise the terms "drill string," "string," "string of drill pipe," string of pipe" and similar type terms are to be given their broadest definition and would include a stand or stands joined together for the purpose of being employed in a borehole. Thus, a drill string could include many stands and many hundreds of sections of drill pipe.

As used herein, unless specified otherwise the term "tubular" is to be given its broadest possible meaning and includes conductor, drill pipe, casing, riser, coiled tube, composite tube, vacuum insulated tube ("VIT"), production tubing, piles, jacket components, offshore platform components, production liners, pipeline, and any similar structures having at least one channel therein that are, or could be used, in the drilling, production, refining, hydrocarbon, hydroelectric, water processing, chemical and related industries. As used herein the term "joint" is to be given its broadest possible meaning and includes all types of devices, systems, methods, structures and components used to connect tubulars together, such as for example, threaded pipe joints and bolted flanges. For drill pipe joints, the joint section typically has a thicker wall than the rest of the drill pipe. As used herein the thickness of the wall of a tubular is the thickness of the material between the internal diameter of the tubular and the external diameter of the tubular.

As used herein, unless specified otherwise the term "pipeline" should be given its broadest possible meaning, and includes any structure that contains a channel having a length that is many orders of magnitude greater than its cross-sectional area and which is for, or capable of, transporting a material along at least a portion of the length of the channel. Pipelines may be many miles long and may be many hundreds of miles long or they may be shorter. Pipelines may be located below the earth, above the earth, under water, within a structure, or combinations of these and other locations. Pipelines may be made from metal, steel, plastics, ceramics, composite materials, or other materials and compositions know to the pipeline arts and may have external and internal coatings, known to the pipeline arts. In general, pipelines may have internal diameters that range from about 2 to about 60 inches although larger and smaller diameters may be utilized. In general natural gas pipelines may have internal diameters ranging from about 2 to 60 inches and oil pipelines have internal diameters ranging from about 4 to 48 inches. Pipelines may be used to transmit numerous types of materials, in the form of a liquid, gas, fluidized solid, slurry or combinations thereof. Thus, for example pipelines may carry hydrocarbons; chemicals; oil; petroleum products; gasoline; ethanol; biofuels; water; drinking water; irrigation water; cooling water; water for hydroelectric power generation; water, or other fluids for geothermal power generation; natural gas; paints; slurries, such as mineral slurries, coal slurries, pulp slurries; and ore slurries; gases, such as nitrogen and hydrogen; cosmetics; pharmaceuticals; and food products, such as beer.

Pipelines may be, in part, characterized as gathering pipelines, transportation pipelines and distribution pipelines, although these characterizations may be blurred and may not cover all potential types of pipelines. Gathering pipelines are a number of smaller interconnected pipelines that form a network of pipelines for bringing together a number of sources, such as for example bringing together hydrocarbons being produced from a number of wells. Transportation pipelines are what can be considered as a traditional pipeline for moving products over longer distances for example between two cities, two countries, and a production location and a shipping, storage or distribution location. The Alaskan oil pipeline is an example of a transportation pipeline. Distribution pipelines can be small pipelines that are made up of several interconnected pipelines and are used for the distribution to, for example, an end user, of the material that is being delivered by the pipeline, such as for example the feeder lines used to provide natural gas to individual homes. Pipelines would also include, for example, j-tubes that interconnect subsea pipelines with producing structures, pipeline end manifolds (PLEM), and similar sub-sea structures; and would also include flowlines connecting to, for example, wellheads. As used herein, the term pipeline includes all of these and other characterizations of pipelines that are known to or used in the pipeline arts.

As used herein, unless specified otherwise "high power laser energy" means a laser beam having at least about 1 kW (kilowatt) of power. As used herein, unless specified otherwise "great distances" means at least about 500 m (meter). As used herein the term "substantial loss of power," "substantial power loss" and similar such phrases, mean a loss of power of more than about 3.0 dB/km (decibel/kilometer) for a selected wavelength. As used herein the term "substantial power transmission" means at least about 50% transmittance.

Discussion of Related Arts

Sub-Sea Drilling

Typically, and by way of general illustration, in drilling a subsea well an initial borehole is made into the seabed and then subsequent and smaller diameter boreholes are drilled to extend the overall depth of the borehole. Thus, as the overall borehole gets deeper its diameter becomes smaller; resulting in what can be envisioned as a telescoping assembly of holes with the largest diameter hole being at the top of the borehole closest to the surface of the earth. As the borehole is being extended, in this telescoping fashion, casing may be inserted into the borehole, and also may be cemented in place. Smaller and smaller diameter casing will be used as the depth of the borehole increases.

Thus, by way of example, the starting phases of a subsea drill process may be explained in general as follows. In the case of a floating rig, once the drilling rig is positioned on the surface of the water over the area where drilling is to take place, an initial borehole is made by drilling a 36" hole in the earth to a depth of about 200-300 ft. below the seafloor. A 30" casing is inserted into this initial borehole. This 30" casing may also be called a conductor. The 30" conductor may or may not be cemented into place. During this drilling operation a riser is generally not used and the cuttings from the borehole, e.g., the earth and other material removed from the borehole by the drilling activity are returned to the seafloor. Next, a 26" diameter borehole is drilled within the 30" casing, extending the depth of the borehole to about 1,000-1,500 ft. This drilling operation may also be conducted without using a riser. A 20" casing is then inserted into the 30" conductor and 26" borehole. This 20" casing is cemented into place. The 20" casing has a wellhead, or casing head, secured to it. (In other operations an additional smaller diameter borehole may be drilled, and a smaller diameter casing inserted into that borehole with the wellhead being secured to that smaller diameter casing.) The wellhead, or casing head, would be located at the seafloor. A blowout preventer ("BOP") is then secured to a riser and lowered by the riser to the sea floor; where the BOP is secured to the wellhead, or casing head. From this point forward, in general, all drilling activity in the borehole takes place through the riser and the BOP.

In the case of a fixed platform rig, once the drilling rig is positioned on the seafloor over the area where drilling is to take place, an initial borehole is made by drilling a 36" hole in the earth to a depth of about 200-300 ft. below the seafloor. A 30" casing is inserted into this initial borehole. This 30" casing may also be called a conductor. The 30" conductor may or may not be cemented into place. During this drilling operation a riser is generally not used and the cuttings from the borehole, e.g., the earth and other material removed from the borehole by the drilling activity, are returned to the seafloor. In the case of a fixed platform, the conductor extends from below the seafloor to above the surface of the water, and generally to the platform decking. Next, a 26" diameter borehole is drilled within the 30" casing, extending the depth of the borehole to about 1,000-1,500 ft. This drilling operation is conducted within the conductor. A 20" casing is then inserted into the 30" conductor and 26" borehole. This 20" casing is cemented into place and extends from below the seafloor to the above the surface of the sea. The 20" casing has a wellhead, or casing head, secured to it. (In other operations, an additional smaller diameter borehole may be drilled, and a smaller diameter casing inserted into that borehole with the wellhead being secured to that smaller diameter casing.) With a fixed platform, the wellhead or casing head, is located above the surface of the body of water and generally in the decking area of the platform. A BOP is then secured to the wellhead or casing head. From this point forward, in general, all drilling activity in the borehole takes place through the BOP.

During completion of the well a production liner and within the production liner a production pipe are inserted into the borehole. These tubulars extend from deep within the borehole to a structure referred to as a Christmas tree, which is secured to the wellhead or casing head. (Other structures, in addition to, including, or encompassed by a Christmas tree, such as a tree, production tree, manifold and similar types of devices may be secured to or associated with the wellhead, casing head or conductor.) In sub-sea completions, the Christmas tree is located on the sea floor. In completions using a fixed platform, the Christmas tree is located above the surface of the body of water, in the platforms deck, atop the conductor. During production, hydrocarbons flow into and up the production pipe to the Christmas tree and from the Christmas tree flow to collection points where they are stored, processed, transferred and combinations of these. Depending upon the particular well, a conductor may have many concentric tubulars within it and may have multiple production pipes. These concentric tubulars may or may not be on the same axis. Further, these concentric tubulars may have the annulus between them filled with cement. A single platform may have many conductors and for example may have as many as 60 or more, which extend from the deck to and into the seafloor.

The forgoing illustrative examples have been greatly simplified. Many additional steps, procedures, tubulars and equipment (including additional equipment, power lines and pipelines on or below the seafloor) maybe utilized to proceed from the initial exploratory drilling of a well to the actual production of hydrocarbons from a field. At some point in time, a well or a collection of wells, will no longer be economically producing hydrocarbons. At which point in time the decision may be made to plug and abandon the well, several wells, and to additionally decommission the structures associated with such wells. As with the steps to drill for and produce hydrocarbons, the steps for plugging, abandoning and decommissioning are complex and varied.

Prior Methodologies to Remove Subsea Structures

There are generally several methodologies that have been used to remove structures from the seafloor. These methodologies may general be categorized as: complex saws, such as diamond saws: large mechanical cutters or shears; oxygen-arc or torch cutters; abrasive water jets; and explosives. Additionally, there may be other methodologies, including the use of divers and ROVs to physically scrap, chip, cut or otherwise remove material. All of these methodologies have health, safety, environmental, and reliability drawbacks.

A key and critical factor for any methodology that is used for the removal of subsea structures is that when subsea structures are cut-up for lifting out of the sea, these cuts must be complete. Thus, A. Culwell, Removal and Disposal of Deck and Jacket Structures, p. 52 (contained in "The Process of Decommissioning and Removing Offshore and Associated Onshore Oil and Gas Facilities", 1997)("A. Culwell"), notes that: "[i]t is crucial to the safety of the heavy lifts that these cuts be complete and reliable because they could not be examined for verification." Culwell, at page 52, further notes that "abrasive water jet methodology . . . does not have guaranteed success and many cuts were repeated or completed with divers working inside the caisson legs after [abrasive water jet] cuts proved to be incomplete."

Diamond saws and mechanical cutters have similar reliability failings. Diamond saws, as well as, abrasive water jets, are also slow in making their cuts, and thus, can be time consuming, which along with other factors, greatly adds to the overall removal costs. Oxygen-arc or torch cutters are similarly slow, may require divers, and thus, subject the divers to hazardous conditions, such as being inside of a caisson. Additionally, these cutters will not cut all types of material, for example concrete, which may require for example a diver to chip the concrete away.

Explosives, although reliable are dangerous to both humans and marine life, and in particular, to marine mammals. The use of explosives above the sea floor is being greatly restricted, and to protect marine life, these restrictions may extend to activities just below the sea floor, e.g., about 15 feet down or less. The abrasives used in abrasive water jets also have environmental concerns, although the study of this has only recently been started. The abrasive material used may prove dangerous to marine life and harmful to the environment.

High Power Laser Transmission

Prior to the recent breakthroughs of Foro Energy co-inventors it was believed that the transmission of high power laser energy over great distances without substantial loss of power was unobtainable. Their breakthroughs in the transmission of high power laser energy, in particular power levels greater than 5 kW, are set forth, in part, in the novel and innovative teachings contained in the following US Patent Application Publications Publication No. 2010/0044106; Publication No. 2010/0044104; Publication No. 2010/0044103; Publication No. 2010/0215326; and, Publication No. 2012/0020631, the entire disclosures of each of which is incorporated herein by reference.

SUMMARY

In the removal, repair, cleaning and decommissioning of structures located in difficult to access, harsh or hazardous environments, such as offshore structures and nuclear facilities, it has long been desirable to have the ability to reliably and safely cut or section these structures for removal and to do so in a controlled and predetermined manner. The present inventions, among other things, solves these needs by providing the articles of manufacture, devices and processes taught herein.

Thus, there is provided a high power laser decommissioning tool, the tool having: body, having a first section and a second section, wherein the first section is rotationally associated with the second section; the first section having: an anchor assembly having: a locking device for fixing the body in a location within a tubular; an engagement surface for engaging against an inner surface of the tubular; and a device for extending the engagement surface into engagement against the inner surface of the tubular; a first motor, operationally connected to the second section, whereby the first motor rotates the second section; a high power laser fiber; and, a connector assembly for attaching a proximal end of the first section to an umbilical; the second section having: a second motor; a laser pad; a distal end of the high power laser fiber; the distal end of the high power laser fiber in mechanical and optical association with the laser pad; and, the second motor operationally associated with the laser pad, whereby the second motor causes an axial movement of the pad.

There is further provided decommissioning tools and systems having configurations having one or more configurations or components as follows: wherein the high power laser fiber is in a wrapped configuration, whereby as the second second section is rotated in a first direction the fiber will unwind, and when the second section is rotated in a second direction the fiber will wind; wherein the high power laser fiber is in a helical configuration, whereby as the second second section is rotated in a first direction the fiber will unwind, and when the second section is rotated in a second direction the fiber will wind; wherein the high power laser fiber is in a helical configuration, whereby as the second second section is rotated in a direction the fiber will unwind; wherein the high power laser fiber is in a wrapped configuration, whereby as the second second section is rotated in a first direction the fiber will unwind, and when the second section is rotated in a second direction the fiber will wind; and the pad has optics defining a laser beam path having a bend from about 85 degrees to about 95 degrees; wherein the high power laser fiber is in a helical configuration, whereby as the second second section is rotated in a direction the fiber will unwind; and the pad has optics defining a laser beam path having a bend from about 85 degrees to about 95 degrees; wherein the anchor assembly has a plurality of hydraulic cylinders, operably associated with legs, whereby the hydraulic cylinders extend and retract the legs into engagement with the tubular; the first motor is proximal to the second motor; wherein the second motor is operably associated with the laser pad, through a ball screw nut assembly; wherein the second motor is operably associated with the laser pad, through a ball screw nut assembly operably associated with a four bar linkage; having a plurality of high power optical fibers; wherein the high power laser fiber is in a helical configuration, whereby as the second second section is rotated in a direction the fiber will unwind; and the pad has optics defining a laser beam path having a bend from about 85 degrees to about 95 degrees; wherein the anchor assembly has a plurality of hydraulic cylinders, operably associated with legs, whereby the hydraulic cylinders extend and retract the legs into engagement with the tubular; and the first motor is proximal to the second motor; and, wherein the high power laser fiber is in a helical configuration, whereby as the second second section is rotated in a direction the fiber will unwind; and wherein the laser pad has a heat sink.

Additionally there is provided a decommissioning tool high power laser pad, the pad having; a sealed optics package, having a connector having a distal end and a proximal end, the connector proximal end in optical association with a high power laser fiber; a reflector; and a window, whereby the connector distal end, the reflector and the window define an optical path; a fluid flow passage having a proximal end and a distal end and defining a fluid flow path; the fluid flow passage distal end in fluid communication with a laser nozzle; and, wherein the fluid flow path and the optical path do not coincide within the sealed optics.

There is further provided decommissioning tools, pads and systems having configurations having one or more configurations or components as follows: having a focusing optics; wherein the reflector is a focusing optic; having: optics defining a laser beam path having a bend from about 85 degrees to about 95 degrees; having a temperature sensor; having a heat sink; having a heat sink, the heat sink defining a cavity open to the outside environment and thermally associated with a component in the sealed optics package, whereby as deployed the ambient environment cools the component; and having a heat sink, the heat sink defining a cavity open to the outside environment and thermally associated with the reflector, whereby as deployed the ambient environment cools the reflector.

Still further there is provided a high power laser decommissioning tool, the tool having: a body, having a first body section and a second body section, wherein the first body section is rotationally associated with the second body section; the first body section having a first housing having an outer surface and an inner surface; the second body section having a second housing having an outer surface; a first portion of the second housing outer surface extending into the first housing, whereby the first housing inner surface overlaps the first portion; a rotary seal located between the second housing outer surface and the first housing inner surface; a third housing having an inner surface and an outer surface; the third housing extending at least partially over the first body section and the second body section; an annular passage defined by the inner surface of the third housing and at least a portion of the outer surfaces of the first and second housings; and, a high power laser fiber contained in the annular passage.

Yet still further there is provided decommissioning tools, pads and systems having configurations having one or more configurations or components as follows: a connector assembly for attaching a proximal end of the first section to an umbilical; having an anchor assembly; wherein the anchor assembly has a plurality of hydraulic cylinders, operably associated with legs, whereby the hydraulic cylinders extend and retract the legs into engagement with the tubular; having a motor operably associated with the laser pad, through a ball screw nut assembly; wherein the motor is operably associated with the laser pad, through a ball screw nut assembly operably associated with a four bar linkage.

Further there is provided a high power laser decommissioning tool, the tool having: a body, having a first section and a second section, wherein the first section is rotationally associated with the second section; the first section having: an anchor assembly; a first motor, operationally connected to the second section, whereby the first motor operates to rotate the second section; and a high power laser fiber; the second section having: a laser pad; the high power laser fiber, having a distal end; the distal end of the high power laser fiber in mechanical and optical association with the laser pad; and, the laser pad having: a sealed optics package, defining a laser beam path within the package; a fluid flow passage defining a fluid flow path; wherein the fluid flow path and the laser beam path do not coincide within the sealed optics package.

Additionally there is provided a high power laser decommissioning tool, the tool having: a first section having: a means for anchoring the tool in a location within a tubular; a means for rotating the second section; and, a means for transmitting a high power laser; and, a second section having: a laser pad; a means for extending the laser pad; the high power laser fiber; and, a distal end of the high power laser fiber in mechanical and optical association with the laser pad; wherein the first section is rotationally associated with the second section; and, the laser pad has: a sealed optics package, having a connector having a distal end and a proximal end, the connector proximal end in optical association with a high power laser fiber; a focusing optic; a reflector; and a window, whereby the distal end of the connector, the focusing optic, the reflector and the window define in part a laser beam path; a fluid flow passage defining in part a fluid flow path; the fluid flow passage having a proximal end and a distal end, the distal end in fluid communication with a laser nozzle; wherein the fluid flow path and the laser beam path do not coincide within the sealed optics, and wherein the fluid flow path and the laser beam path coincide in the nozzle.

Furthermore there is provided a high power laser decommissioning tool, the tool having: a first section having; the first section having a means for anchoring the tool in a location within a tubular; a means for rotating the second section; and, a means for transmitting a high power laser; and, a second section having: a laser pad; a means for extending the laser pad; the high power laser fiber; and, the distal end of the high power laser fiber in mechanical and optical association with the laser pad; wherein the first section is rotationally associated with the second section; and, the laser pad having a means for providing a sealed laser beam path; a fluid flow passage defining a fluid flow path; and the fluid flow passage having a proximal end and a distal end, the distal end in fluid communication with a laser nozzle.

Still further there is provided a high power laser decommissioning system, the system having: a high power laser decommission tool having a high power laser fiber, focusing optics defining a laser beam path, and a flow passage defining a fluid flow path; a frame having support members defining an area within the frame; a spool having a high power laser umbilical position in the area; a transfer and placement means associated with the umbilical and releasable position in the area.

Moreover and further there is provided a method of decommission a structure having a tubular, the method having: providing a laser decommissioning system in operable proximity to a tubular to be removed, the decommissioning system having a laser having a power of at least about 10 kW, a spool, an umbilical, and a laser decommissioning tool, wherein the laser, the umbilical and the tool are in optical association and thereby define a laser beam path upon with the laser beam travels; positioning a mounting assembly on the tubular; lowering the laser decommissioning tool into the tubular; locking the decommissioning tool at a predetermined location within the decommissioning tool; fixing the umbilical with respect to the mounting assembly; propagating a laser beam having at least about 10 kW along the laser beam path and toward a surface of the tubular; and, the laser beam cutting the tubular.

Further there is provided a method of decommission a structure having a tubular, the method having: providing a laser decommissioning system in operable proximity to a tubular to be removed, the decommissioning system having a laser having a power of at least about 10 kW, a spool, an umbilical, and a laser decommissioning tool, wherein the laser, the umbilical and the tool are in optical association and thereby define a laser beam path upon with the laser beam travels; positioning a mounting assembly on the tubular; lowering the laser decommissioning tool into the tubular; locking the decommissioning tool at a predetermined location within the decommissioning tool; fixing the umbilical with respect to the mounting assembly; propagating a laser beam having at least about 10 kW along the laser beam path and toward a surface of the tubular; and, the laser beam cutting the tubular; wherein the tool is locked first in the tubular and then the umbilical is fixed with respect to the mounting assembly.

Moreover there is provided a method of decommission a structure having a tubular, the method having: providing a laser decommissioning system in operable proximity to a tubular to be removed, the decommissioning system having a laser having a power of at least about 10 kW, a spool, an umbilical, and a laser decommissioning tool, wherein the laser, the umbilical and the tool are in optical association and thereby define a laser beam path upon with the laser beam travels; positioning a mounting assembly on the tubular; lowering the laser decommissioning tool into the tubular; locking the decommissioning tool at a predetermined location within the decommissioning tool; fixing the umbilical with respect to the mounting assembly; propagating a laser beam having at least about 10 kW along the laser beam path and toward a surface of the tubular; and, the laser beam cutting the tubular; wherein the tubular is completely severed in one pass of the laser beam.

BRIEF DESCRIPTION OF THE DRAWINGS

FIG. 11 is a perspective view of an embodiment of a mounting assembly in accordance with the present invention.

FIG. 12 is a schematic cross sectional view of an embodiment of a laser decommissioning system in accordance with the present invention.

FIG. 14 is a cross sectional view of an embodiment of a laser tool deployed in a tubular to be cut in accordance with the present invention.

FIG. 14A is a perspective view of an embodiment of a laser decommissioning deployment assembly in accordance with the present invention.

FIG. 18A is a schematic of an embodiment of a laser cutting tool in accordance with the present invention.

FIG. 18B is a schematic of an embodiment of a laser cutting tool in accordance with the present invention.

FIG. 19A is a schematic of an embodiment of a laser cutting tool in accordance with the present invention.

FIG. 19B is a schematic of an embodiment of a laser cutting tool in accordance with the present invention.

FIG. 33A is a perspective view of an embodiment of a prism and prism holding assembly in accordance with the present invention.

FIG. 33B is a plan view of the embodiment of FIG. 33A.

DESCRIPTION OF THE PREFERRED EMBODIMENTS

Figure 1:
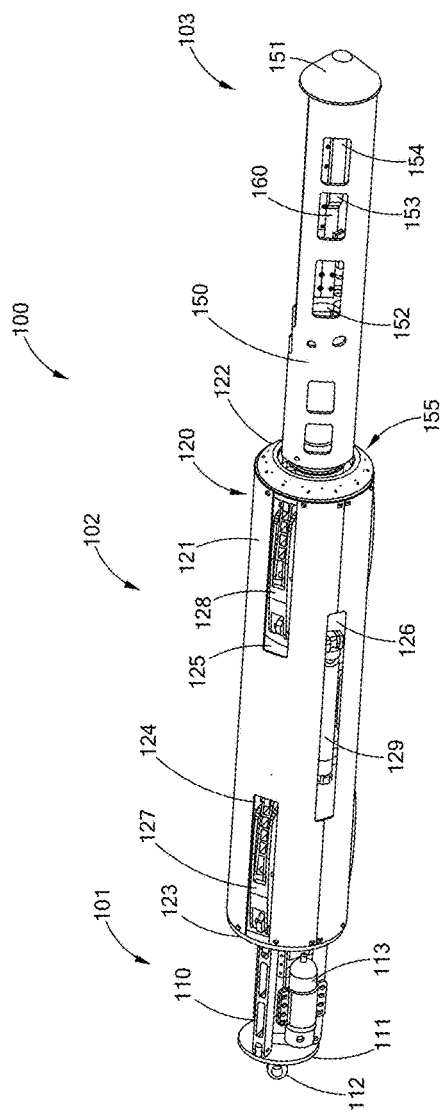
FIG. 1 is a perspective view of an embodiment of a laser decommissioning tool in accordance with the present invention.

In general, the present inventions relate to the removal of objects, structures, and materials in difficult to access, hazardous or harsh environments using high power laser energy to cut or section items into sizes that are removable, more easily removed. The ability to quickly and reliably cut such items into predetermined sizes and to cut or open predetermined channels, provides many advantages, including environmental and safety, as well as, potentially providing cost benefits. Although not limited to the plugging, abandonment and decommissioning of offshore oil wells and platforms, the present inventions provide particular advantages, and solve long-standing needs, in such applications.

In about 1946 the first exploratory oil well was drilled in the Gulf of Mexico. From that point forward, through the present time, there has been considerable activity to explore, develop and produce hydrocarbons from offshore fields in the Gulf of Mexico and in other offshore areas of the world. These efforts have resulted in many thousands of fixed platforms being constructed over the last fifty years. A large number of these platforms have reached and are reaching the end of their useful lives, and more will be doing so in the future. Although some of these platforms are left to form reefs, in general they are required to be removed, for various environmental, navigation, and aesthetic reasons, among others. Thus, the present inventions find significant use and provide significant benefits to the plugging, abandonment and decommissioning of offshore hydrocarbon producing platforms, facilities and associated structures.

Once it has been determined that a well is not going to be used, the well will be plugged, and if there is no intention to return to the well, abandoned. By way of example, a laser plugging and abandonment procedure may generally involve some or all, of the following activities and equipment, as well as other and additional activities and equipment. Further laser plugging and abandonment procedures and activities would include, by way of example, the use of high power laser tools, systems, cutters and cleaners to perform any and all of the type of activities that are set forth in BOEMRE 30 CFR 250, subpart Q, and including by way of example, activities such as permanent abandonment, temporary abandonment, plug back to sidetrack, bypass, site clearance and combinations and variations of these. Such activities would further include, without limitation the cutting, removal and/or modification of any structures (below or above the surface of the earth and/or the sea floor) for the purpose of temporarily or permanently ceasing and/or idling activities. Examples of high power lasers, laser tools, systems, cutters and cleaners that may be utilized for, or in, laser plugging and abandonment procedures and activities for example are disclosed and taught in the following US Patent Applications and US Patent Application Publications: Ser. No. 13/565,345; Ser. No. 13/403,741; Ser. No. 13/403,723; Ser. No. 13/403,692; Ser. No. 13/347,445; Ser. No. 13/210,581; Ser. No. 13/366,882; Ser. No. 61/734,809; Ser. No. 61/786,763; Publication No. 2012/0020631; Publication No. US 2010/0215326; Publication No. US 2010/0044106; Publication No. US 2012/0266803; Publication No. US 2012/0248078; Publication No. US 2012/0255933; Publication No. US 2012/0068086; Publication No. US 2012/027326; Publication No. US 2012/0067643; and, Publication No. US 2010/0044103, the entire disclosures of each of which are incorporated herein by reference. Laser plugging and abandonment activities would also include: new activities that were unable to be performed prior to the development of high power laser systems, equipment and procedures; existing procedures that prior to the development of the high power laser systems, equipment and procedures would have been unable to be performed in an economically, safely and/or environmentally viable manner; and combinations and variations of these, among other things.

After the valves on the wellhead and tree have been checked to ensure proper operability, an inspection unit, such as a wireline unit, slick line/electric line unit, slick line unit, or similar type of unit, may be used to check, inspect and measure, the borehole depth, gauge the internal diameter of the tubulars in the borehole and determine other needed information about the borehole. To the extent that there are any tools, valves, or other downhole equipment, that are required or desirable to be removed, but which are stuck downhole, the unit may be used to lower a laser cutting tool and laser tool umbilical (or the umbilical may be used without the need for a separate or additional line, e.g., a wireline, depending upon the umbilical and laser module), to the location of the stuck downhole equipment. For example, the laser tool can deliver a high power laser beam to the stuck downhole equipment, cutting the equipment to sufficiently free it for recovery, by the laser tool or the line; completely melting or vaporizing the stuck equipment, and thus, eliminating it as an obstruction; or combinations and variations of these. The well is then pressure tested and any fluid communication between tubular annular spaces is evaluated.

The laser module and laser cutting tool, or tools, may then be used in conjunction with the platforms existing hoisting equipment, e.g., the derrick, and cementing, circulating and pumping equipment, to plug and abandon the well. If such equipment is not present on the platform, or for some other reason, other hoisting, circulating or pumping equipment may be used, as needed, in conjunction with, for example, a coil tubing rig having a laser unit (e.g., the laser coil tubing systems described in US Patent Application Publication No. 2012/0273470), or a laser work over and completion unit (e.g., the mobile laser unit described in US Patent Application Publication No. 2012/0273470) may be used. Additionally, a rig-less abandonment and decommissioning system may have a laser removal system of the present invention integrated into, or located on it. The laser removal system may be configured to have a very small foot print, and thus, take up only a small amount of deck space. The laser removal system may substantially enhance, or expand, the capabilities of the rig-less abandonment and decommissioning system by enabling it to perform decommissioning projects that it otherwise could not without the laser system's ability to cut and section materials.

In general, and by way of example, plugging and abandonment activities may involve the following activities, among others. A cement plug is placed at the deepest perforation zone and extends above that zone a predetermined distance, for example about 100 feet. After the plug has been placed and tested, the laser tool is lowered into the well and the production tubing and liner, if present, are cut above the plug and pulled. If there are other production zones, whether perforated or not, cement plugs may also be installed at those locations.

As the production tubing is pulled, it may be cut into segments by a laser cutting device, or it may have been removed before the decommissioning project began, and if jointed, its segments may be unscrewed by pipe handling equipment and laid down. The laser cutting device may be positioned on the rig floor, in which instance the pipe handling equipment associated with the rig floor can be used to raise and hold the tubing, while the laser cutting device cuts it, remove the upper section of the cut tubing, hold the lower section from falling, and then pull the lower section of tubing into position for the next laser cut. In general, for this type of pulling and cutting operation the laser cutting tool may be located above a clamping device to hold the pipe and below a hoisting device, such as a crane, top drive and drawworks, to lift the pipe. The laser cutting device may be movably positioned on the rig floor, for example in the manner in which an iron rough neck is positioned.

A second, or intermediate, cement plug is installed a location above the first plug and in the general area of a shoe of an intermediate and surface casing. Additional intermediate plugs may also be installed. During the installation of these cement plugs, or other cement plugs or activities, to the extent that circulation is needed to be established, or the annulus between tubulars is required to be filled with cement, the laser tool may be used to cut windows or perforations, at predetermined intervals and to predetermined radial depths to establish circulation or provide the ability to selectively fill an annulus with cement. It being understood that these various steps and procedures generally will be based at least in part on the well casing program.

Thus, for example, the laser tool may cut an opening through an 11¾ inch casing, at a depth of 10,000 feet, and expose the annulus between the 11¾ inch casing and a 13⅝ inch casing. The laser tool may then cut a second opening at a depth of 10,300 feet exposing the same annulus. This ability to selectively open tubulars and expose various annular spaces in a predetermined and controlled manner may find application in various cleaning, circulating, plugging and other activities required to safely and properly plug and abandoned a well. This ability may also provide benefits to meet future cleaning and plugging regulations or safety requirements. For example, the ability to selectively expose annular space, using the laser tool, and then fill it with cement provides the ability to insure that no open annular space that extends to the sea floor is left open to the borehole. The ability to selectively expose annular space additionally provides the ability to open or cut windows and perforations in a single piece of casing or multiple pieces of casing at precise sizes, shapes and locations.

In general, any remaining uncemented casing strings, that are located above the top most intermediate plug, may be cut by the laser tool (using internal, external and combinations of both, cuts) and then pulled from the well. (These strings may be segmented by a laser cutting device, at the rig floor as they are being pulled). A top cement plug starting at a fixed depth below the sea floor (e.g., 50 to 100 feet) and extending down into the borehole (e.g., an additional 200-300 feet) is then placed in the well. It being recognized that the cement plug may be added (filled) by flowing from the lower position up, or the upper end position down.

The conductor, and any casings or tubulars, or other materials, that may be remaining in the borehole, are cut at a predetermined depth below the seafloor (e.g., from 5 to 20 feet, and preferably 15 feet) by the laser cutting tool. Once cut, the conductor, and any internal tubulars, are pulled from the seafloor and hoisted out of the body of water, where they may be cut into smaller segments by a laser cutting device at the rig floor, vessel deck, work platform, or an off-shore laser processing facility. Additionally, biological material, or other surface contamination or debris that may reduce the value of any scrap, or be undesirable for other reasons, may be removed by the laser system before cutting and removal, after cutting and removal or during those steps at the various locations that are provided in this specification for performing laser operations. Holes may be cut in the conductor (and its internal cemented tubulars) by a laser tool, large pins may then be inserted into these holes and the pins used as a lifting and attachment assembly for attachment to a hoist for pulling the conductor from the seafloor and out of the body of water. As the conductor is segmented on the surface additional hole and pin arrangements may be needed.

It is contemplated that internal, external and combinations of both types of cuts be made on multi-tubular configurations, e.g., one tubular located within the other. The tubulars in these multi-tubular configurations may be concentric, eccentric, concentrically touching, eccentrically touching at an area, have grout or cement partially or completely between them, have mud, water, or other materials partially or completely between them, and combinations and variations of these.

Additionally, the laser systems provide an advantage in crowded and tightly spaced conductor configurations, in that the precision and control of the laser cutting process permits the removal, or repair, of a single conductor, without damaging or effecting the adjacent conductors.

The forgoing discussions of high power laser plugging and abandonment activities is meant for illustration purposes only and is not limiting, as to either the sequence or general types of activities. Those of skill in the decommissioning, plugging and abandonment arts, may recognize that there are many more and varied steps that may occur and which may occur in different sequences during a decommissioning, plugging and abandonment process. For example, the borehole between cement plugs may be filled with appropriately weighted fluids or drilling muds. Many of these other activities, as well as, the foregoing cutting, segmenting, and plugging activities, are dictated, in whole or in part, by the particular and unique casing and cement profile of each well, seafloor conditions, regulations, and how the various tubulars have aged, degraded, or changed over the life of the well, which could be 10, 20, or more years old.

The high power laser systems, methods, down hole tools and cutting devices, provide improved abilities to quickly, safely and cost effectively address such varied and changing cutting, cleaning, and plugging requirements that may arise during the plugging and abandonment of a well. These high power laser systems, methods, down hole tools and cutting devices, provide improved reliability, safety and flexibility over existing methodologies such as explosives, abrasive water jets, milling techniques or diamond band saws, in the laser's systems ability to meet and address the various cutting conditions and requirements that may arise during a plugging and abandonment project. In particular, and by way of example, unlike these existing methodologies, high power laser systems of certain wavelengths and processes, will not be harmful to marine life, and they may ensure a complete and rapid cut through all types of material. Unlike an explosive charge, which sound and shock waves, may travel many miles, the laser beam for specific wavelengths, even a very high power beam of 20 kW or more, has a very short distance, e.g., only a few feet, through which it can travel unaided through open water. Unlike abrasive water jets, which need abrasives that may be left on the sea floor, or dispersed in the water, the laser beam, even a very high power beam of 20 kW or more, is still only light; and uses no abrasives and needs no particles to cut with or that may be left on the sea floor or dispersed in the water.

The laser cuts to the vertical members of the jacket, or other members to be cut, may be made from the inside of the members to the outside, or from the outside of the member to the inside. In the inside-to-outside cut, the laser beam follows a laser beam path starting from inside the member, to the member's inner surface, through the member, and toward the body of water or seabed. For the outside-to-inside cut, the laser beam follows a laser beam path starting from the outside of the member, i.e., in the laser tool, going toward the outer surface of the member, through the member, and into its interior. For the inside-to-outside cut the laser cutting tool will be positioned inside of the member, below the seafloor, in the water column, above the body of water and combinations and variations of these. For the outside to inside cut, the laser cutting tool will be positioned adjacent to the outer surface of the member. In creating a section for removal from the body of water, only inside-out cuts, only outside-in cuts, and combinations of these cuts may be used. Thus, for example, because of wave action in the area of the intended cuts all cuts may be performed using the inside-outside beam path. Multiple laser cutting tools may be used, laser cutting tools having multiple laser cutting heads may be used, laser cutting tools or heads having multiple laser beam delivery paths may be used, and combinations of these. The sequence of the laser cuts to the members preferably should be predetermined. They may be done consecutively, simultaneously, and in combinations and various of these timing sequences, e.g., three members may be cut at the same time, follow by the cutting of a fourth, fifth and sixth member cut one after the other.

While it is preferable to have the cuts of the members be clean and complete, and be made with just one pass of the laser, the precision and control of the laser, laser cutting tools, and laser delivery heads, provides the ability to obtain many types of predetermined cuts. These complete laser cuts provide the ability to assure and to precisely determine and know the lifting requirements for, and the structural properties of the section being removed, as well as any remaining portions of the structure. Such predetermined cuts may have benefits for particular lifting and removal scenarios, and may create the opportunity for such scenarios that were desirable or cost effective, but which could not be obtained with existing removal methodologies. For example, the member may be cut in a manner that leaves predetermined "land" section remaining. This could be envisioned as a perforation with cuts (removed) areas and lands (areas with material remaining). There may be a single cut and a single land area, multiple cuts and lands and the land areas may make collectively or individually, at least about 5%, at least about 10%, at least about 20%, at least about 50% of the circumference or exterior area of the vertical member. The land areas could provide added safety and stability as the vertical members are being cut. The size and locations of the lands would be known and predetermined, thus their load bearing capabilities and strength would be determinable. Thus, for example, once all the perforation cuts have been made, the heavy lifting crane may be attached to the jacket section to be removed, a predetermined lifting force applied by the crane to the section, and the lands cut freeing the section for removal. The lands may also be configured to be a predetermined size and strength that the crane is used to mechanically break them as the section is lifted away from the remaining portion of the jacket. This ability to provide predetermined cutting patterns or cuts, provides many new and beneficial opportunities for the use of the laser cutting system in the removal of offshore structures and other structures.

The lands of a laser perforation cut, are distinguishable and quite different from the missed cuts that occur with abrasive water jet cutters. The location, size, consistency, and frequency of the abrasive water jet cutter's missed cuts are not known, planned or predetermined. As such, the abrasive water jet's missed cuts are a significant problem, detriment and safety concern. On the other hand, the laser perforated cuts, or other predetermined custom laser cutting profiles, that may be obtained by the laser removal system of the present inventions, are precise and predetermined. In this manner the laser perforation, or other predetermined, cuts may enhance safety and provide the ability to precisely know where the cuts and lands are located, to know and predetermine the structural properties and dynamics of the member that is being cut, and thus, to generally know and predetermine the overall structural properties and dynamics of the offshore structure being removed.

In FIGS. 1 to 10A there are shown various views of an embodiment of a laser decommissioning tool. Like numbers throughout these figures refer to the same structure, part, component or assembly. Further, while a structure, part, component or assembly may be discussed with respect to a particular figure, it should be recognized that it may also be viewed in the other figures, and understood by reference to the other figures in the group of FIGS. 1 to 10A.

Figure 3:
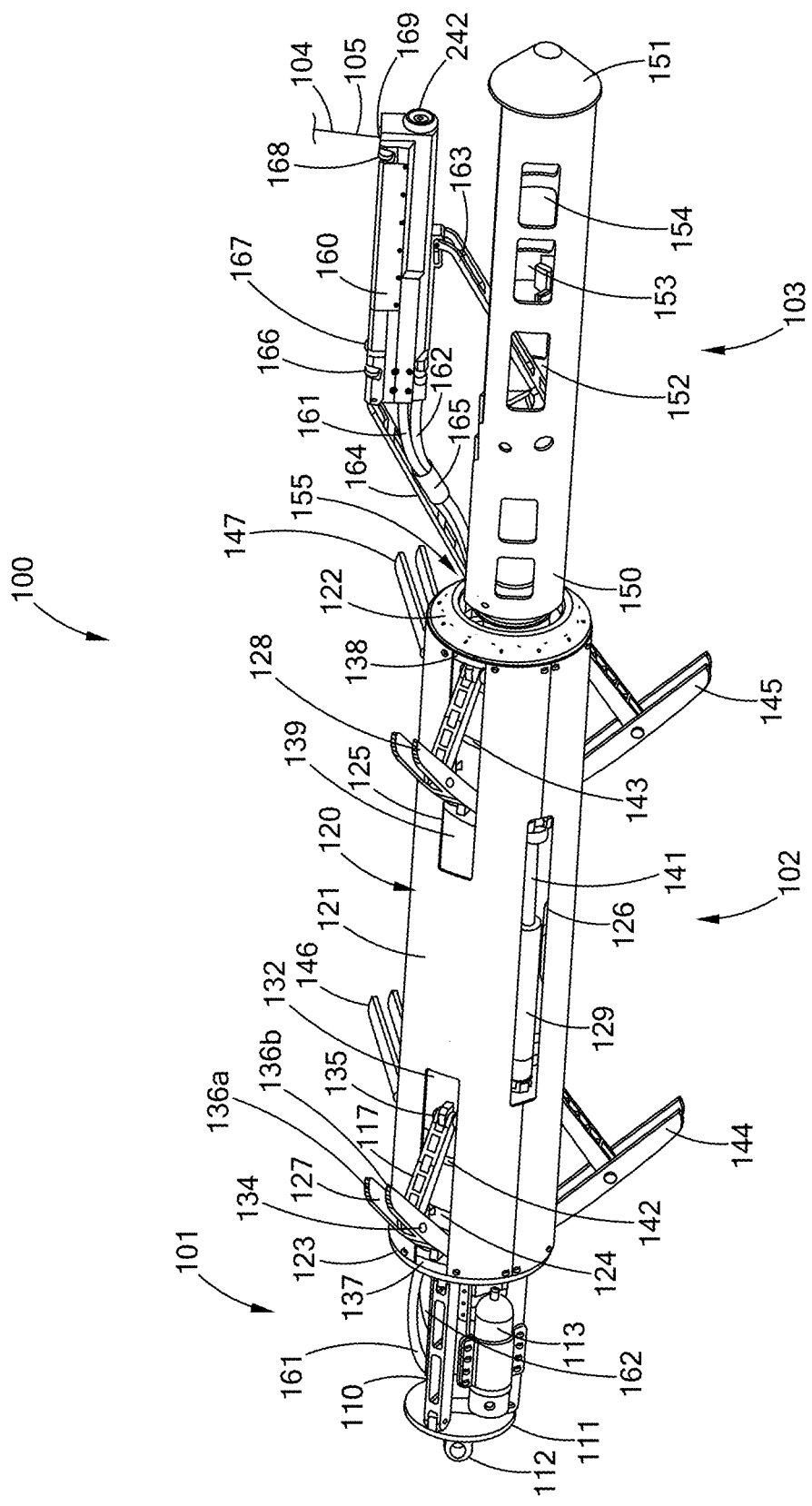
FIG. 3 is a perspective view of the embodiment of FIG. 1 in a deployed configuration.

In FIG. 1, a perspective view of the laser decommissioning tool 100 is shown in a retracted configuration, e.g., the configuration that it would have when it was being lowered into a conductor or other tubular to be cut. In FIG. 3, a perspective view of the laser tool 100 is shown in a deployed configuration, e.g., the anchors and laser cutter pad are extend and positioned in a manner that would be seen inside of the conductor or other tubular when a laser cut is being performed.

Turning primarily to FIG. 1 the high power laser decommissioning tool 100 has three sections: an upper section 101, a middle section 102, and a lower section 103. Generally, and unless specified otherwise, the upper section will also be the distal end, which is closes to and may connect to the laser beam source, and the lower section is the proximal end and will be the end from which the laser beam is delivered to an intended target area or surface to be cut. Thus, in the case of a vertical tubular to be cut with an inside-out cut, when the laser tool 100 is positioned in the tubular to perform the laser cut, the lower section 103 would be oriented further in, lower, or down, the tubular, than the middle section 102 and the upper section 103.

In this embodiment of a laser decommissioning tool, these sections 101, 102, 103, are discrete and joined together by various mechanical attachment means, such as flanges, screws, bolts, threated connection members, rotary seals, and the like. Further in this embodiment the lower section 103 rotates with respect to the middle 102 and upper sections 101, which are preferably fixed, or remain relatively stationary, with respect to the tubular to be cut during the laser cutting operation. Other embodiments having different fixed and rotating sections may be utilized, as well as, more or less sections; and having one or more, or all, sections being integral with each other. Further, the laser beam, or multiple laser beams, may be delivered from more than one section, from the middle section, from the upper section, from an additional section, from multiple and different sections, and combinations and variations of these.

Figure 4:
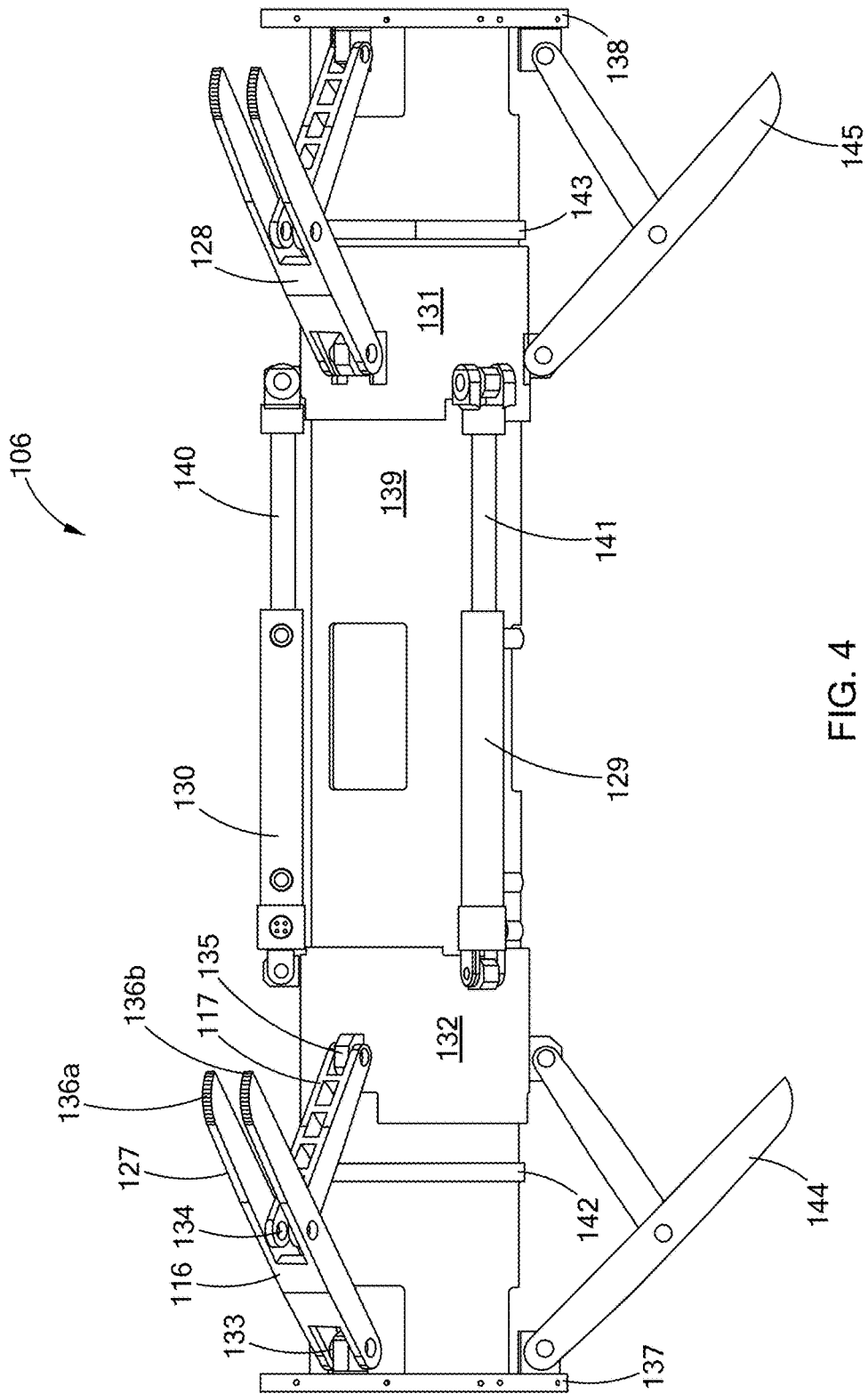
FIG. 4 is a perspective view of the anchoring assembly of the embodiment of FIG. 1, in a deployed configuration.
Figure 5:
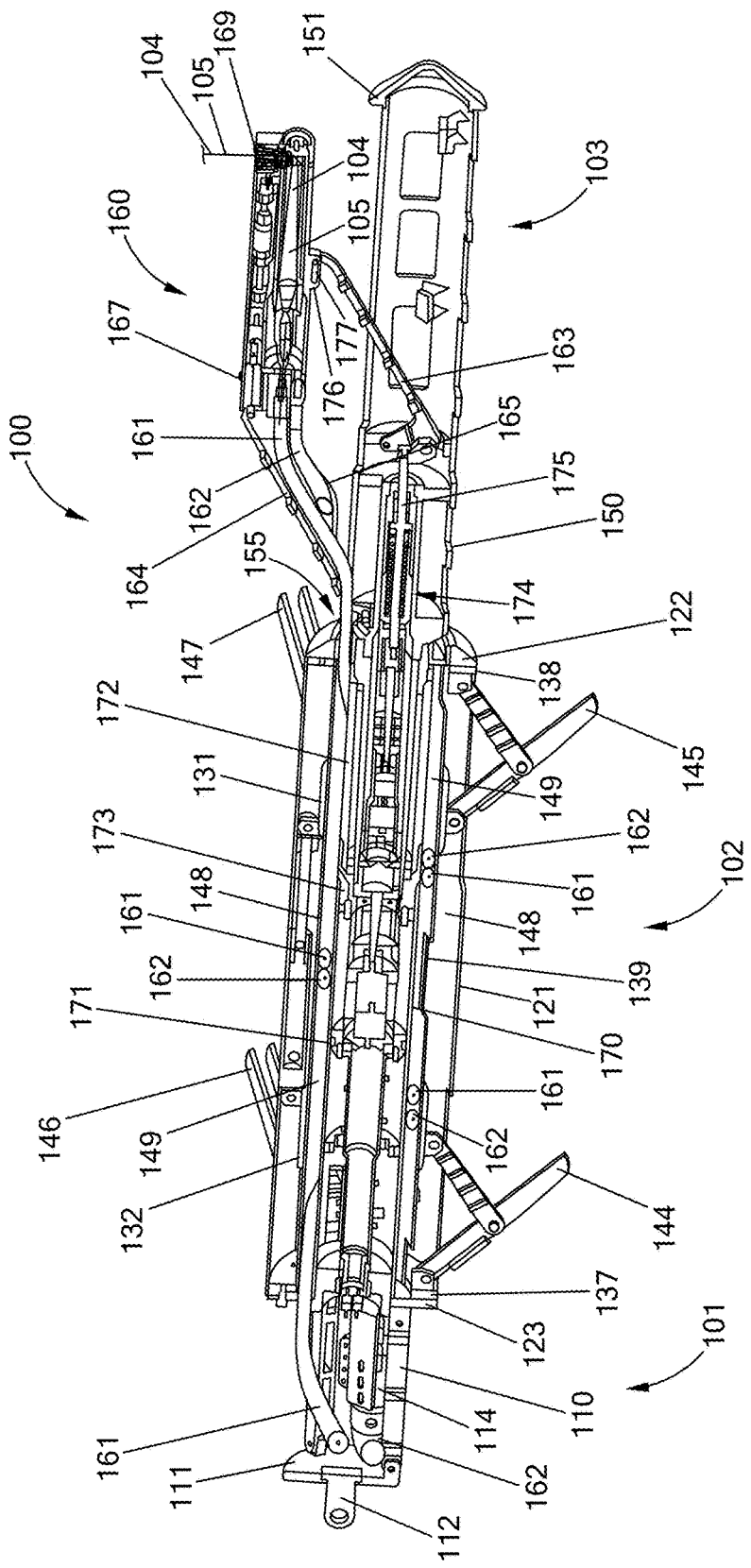
FIG. 5 is a cross sectional view of the embodiment of FIG. 1.

Turning primarily to FIG. 1 the upper section 101 has a frame 110, a cap 111, an attachment member, e.g., an eye hole, 112, a gas filter 113, a second gas filter 114 (not seen in the view of FIG. 1, but seen in for example the view of FIG. 5). The gas can be air, nitrogen, an inert gas, oxygen, or other gasses that are, or may be, used in the laser cutting processes. In this embodiment the gas is preferably nitrogen or air. The middle section 102 has a body 120. The middle section 102 body 120 has a middle section cover or housing 121, which is associated with a lower end cap 122 and an upper end cap 123. The housing 121 has several openings, e.g., 124, 125, which permit the anchoring legs, e.g., 127, 128, which may be actuated, e.g., hydraulically, electronically or both, to extend out from the body 120 and anchor the tool against a tubular. The housing 121 also has several openings 126, which accommodate, e.g., provide space for, the pistons, e.g., 129, which are used to extend the anchoring legs and engage the inside surface of a tubular. The anchoring legs and pistons with their cylinders are a part of an anchoring assembly 106, which is shown and discussed in further detail with respect to FIGS. 2 and 4.

Staying with FIG. 1, the lower section 103 has a housing 150 that rotates with respect to the middle section body 120. The lower section housing 150 has openings, e.g., 152, 153, 154, and an end cone 151. The laser cutter pad 160, when in the retracted configuration or position, is contained within the housing 150. Port 155 provides a pathway for the high power laser fiber, gas line, and other cables, e.g., data and information wires, to extend into the middle section 120 from the laser cutter pad 160. (In FIG. 1, the high power laser cable, gas line, conduit or hose, and any information and data lines are not shown.) As will be further described, port 155 allows these lines and cables to pass into the middle section 102, where the housing 121 protects them from the exterior conditions and provides for the rotation of the lower section to perform a laser cut of a tubular.

Figure 2:
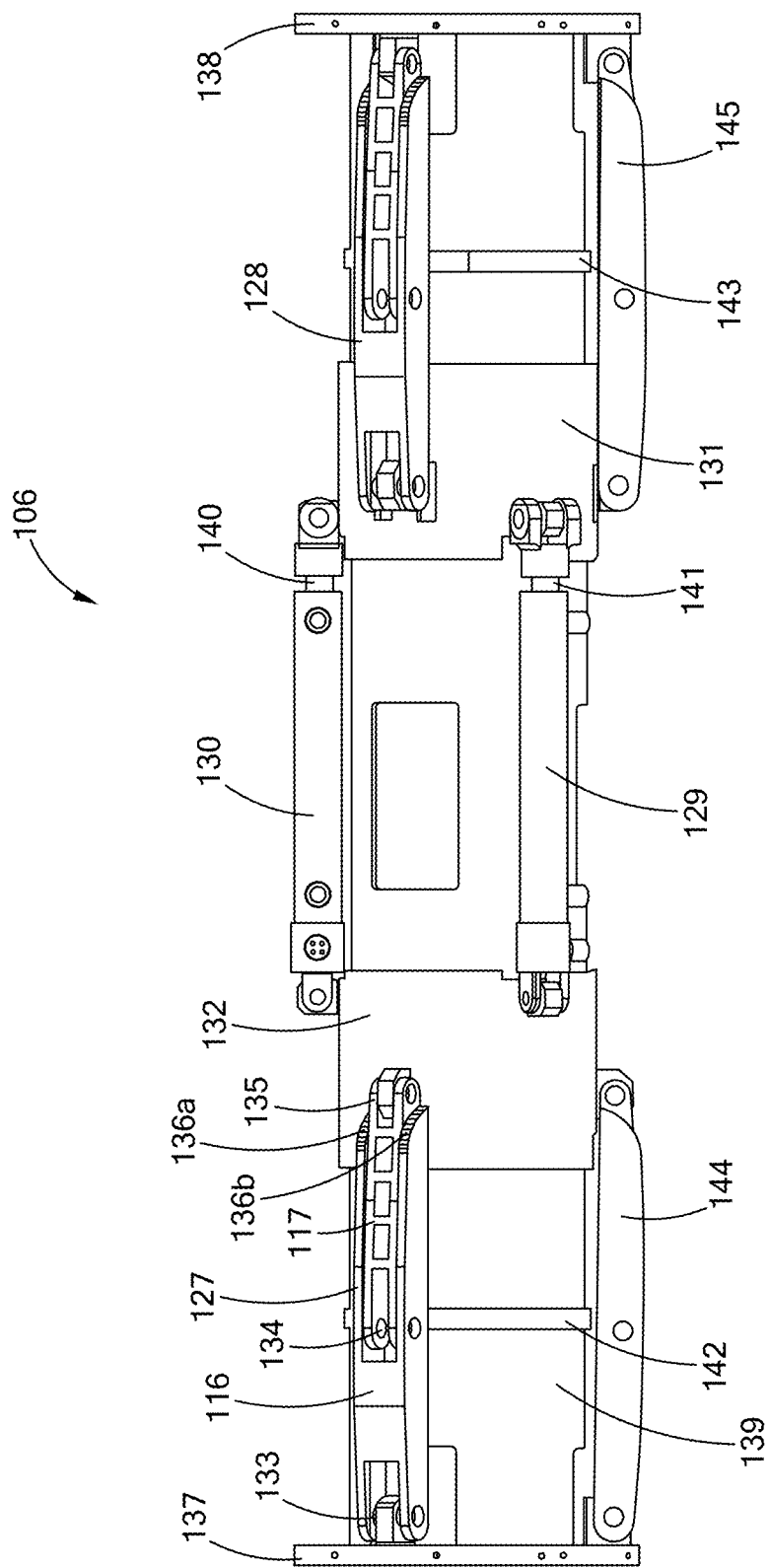
FIG. 2 is a perspective view of the anchoring assembly of the embodiment of FIG. 1.

Turning primarily to FIGS. 2 and 4 there is shown a perspective view of the anchoring assembly 106, (which is covered by the housing 120 when the tool 100 is fully assembled). In these figures the anchoring assembly 106 is seen in isolation, e.g., removed from the rest of the tool 100. In the view of FIG. 2 the anchoring assembly 106 is shown in the retracted configuration and in the view of FIG. 4, the anchoring assembly is shown in the deployed configuration, e.g., the anchor legs are extended. The anchoring assembly 106 has three pistons, e.g., 129, 130 (the third piston is not seen the figures). The pistons, e.g., 129, 130 are connected to sliding rings 131,132, which slide along the anchoring assembly, or more specifically along the inner, body 139, as the piston arms, e.g., 140, 141, are extended out by the cylinders, e.g. 129, 130. Both rings 131 and 132 slide along inner body 139, until the anchoring legs, e.g. 127, 128, 144, 145, 146, 147, are fully extended, e.g., until they hit the side of a tubular or other structure, and/or until the rings 131, 132 come in contact with retaining flanges, or stops 142, 143. The upper end of inner body 139 has a flange 137 and the lower end of inner body 139 has a flange 138. The sides of the anchor legs not associated with the sliding rings 132, 131 are pivotally mounted or other wise attached to the flanges 137, 138.

Using anchoring leg 127 for illustrative purposes, recognizing that in this embodiment the other anchoring legs are similar (although in other embodiments they may not all be the same or similar), the anchoring legs have a pivot assembly 133 providing a pivot point at the end of a ridged member 116. The ridged member 116 has a second pivot assembly 134, which provides a second pivot point about a little less than midway along the length of the member 116. The ridged member 116 extends beyond pivot assembly 134 to an end section that has two engagement feet 136a, 136b, which feet engage, or abut against the inner wall of a tubular, or other structure in the tubular. A second ridged member 117 extends between, and mechanically connects, pivot assembly 134 to pivot assembly 135. Pivot assembly 135 is associated with sliding ring 132 and pivot assembly 133 is associated with flange 137. In this manner as the sliding ring 132 is moved toward stop 142 by piston and piston arm 130-140 the ridge members 116, 117 will move in a somewhat scissor like manner extending feet 136a, 136b outward and away from inner body 139.

Turning primarily to FIG. 3 there is shown a prospective view of the tool 100 with the anchoring legs 127, 144, 145, 146, 147 extended and with the laser cutter pad 160 extended, e.g., as configured or positioned to perform a cutting operation in a tubular. In the view of this figure the gas lines 162 and the high power optical fiber and cable 161 are seen. (The monitoring and sensor wires are not shown for clarity purposes.)

The laser cutter pad 160 is extended by pad arm 163 and pad arm 164 from the lower section 103 housing 150. This assembly forms a modified four bar linkage that provides for the lower, or proximal end of the pad, to be at an equal or smaller distance to the inner surface of tubular, than any other portion of the pad. In this way as the pad is extended and the lower section 103 is rotated for a cutting operation the stand off distance, e.g., the distance that the laser beam 104 has to travel along its laser beam path 105 after leaving the pad 160 until it strikes the target surface, is maintained relatively constant, and preferably kept constant as the pad is rotated around the inner surface of the tubular. The pad 160 has four rollers 166, 167, 168, 169 that are for engagement with, and rolling along, the inner surface of the tubular as the pad is rotated within a tubular. The high power optical fiber cable 161, having the high power optical fiber, and the gas line 161 (as well as any data, information, sensors or other conductors) extend from the upper end (the distal end) of the pad 160, and are partially retained by bracket 165 against arm 164 and run into the middle section 102. The optical cable 161 and the gas line 162 travel into the middle section 102 through port 155. Inside of the middle section 102 they are wrapped about inner components of that section, so that during rotation of the lower section they may be unwrapped and wrapped again, permitting the lower assembly to rotate first in one direction and then back in the other direction, without the need for an optical slip ring. In FIG. 3 these cables and lines can be partially seen exiting the middle section 102 and traveling through the upper section 101.

Turning primarily to FIG. 5 there is shown a cross sectional view of tool 100 in an extended configuration. The laser fiber cable 161 and the gas line 162 exit the laser cutter pad 160 and travel along pad arm 164 until the enter middle section 102 via port 155. Once inside of the middle section 102, the laser fiber cable 161 and the gas line 162 are positioned in annuls 149. Annulus 149 is formed between inner body 139 and motor section assembly 170. In a preferred embodiment annulus 149 is subject to the environmental conditions of the tool, e.g., it is open to the outside or ambient environment of the tool, which would include the environment within the tubular to be cut. The laser fiber cable 161 and gas line 162 are wrapped around motor section assembly 170, preferably in a helix. In this manner, the lower section 103 can be rotated in one direction unwinding the helix and then rotated back in the other direction winding the helix. In this manner multiple laser cutting passes can be made around the interior of a tubular. Preferably, it will only take a single cut to completely sever the tubular, and the laser will not have to be fired during the return or rewinding rotation, or can be fired to assure that the cut is complete.

Figure 6:
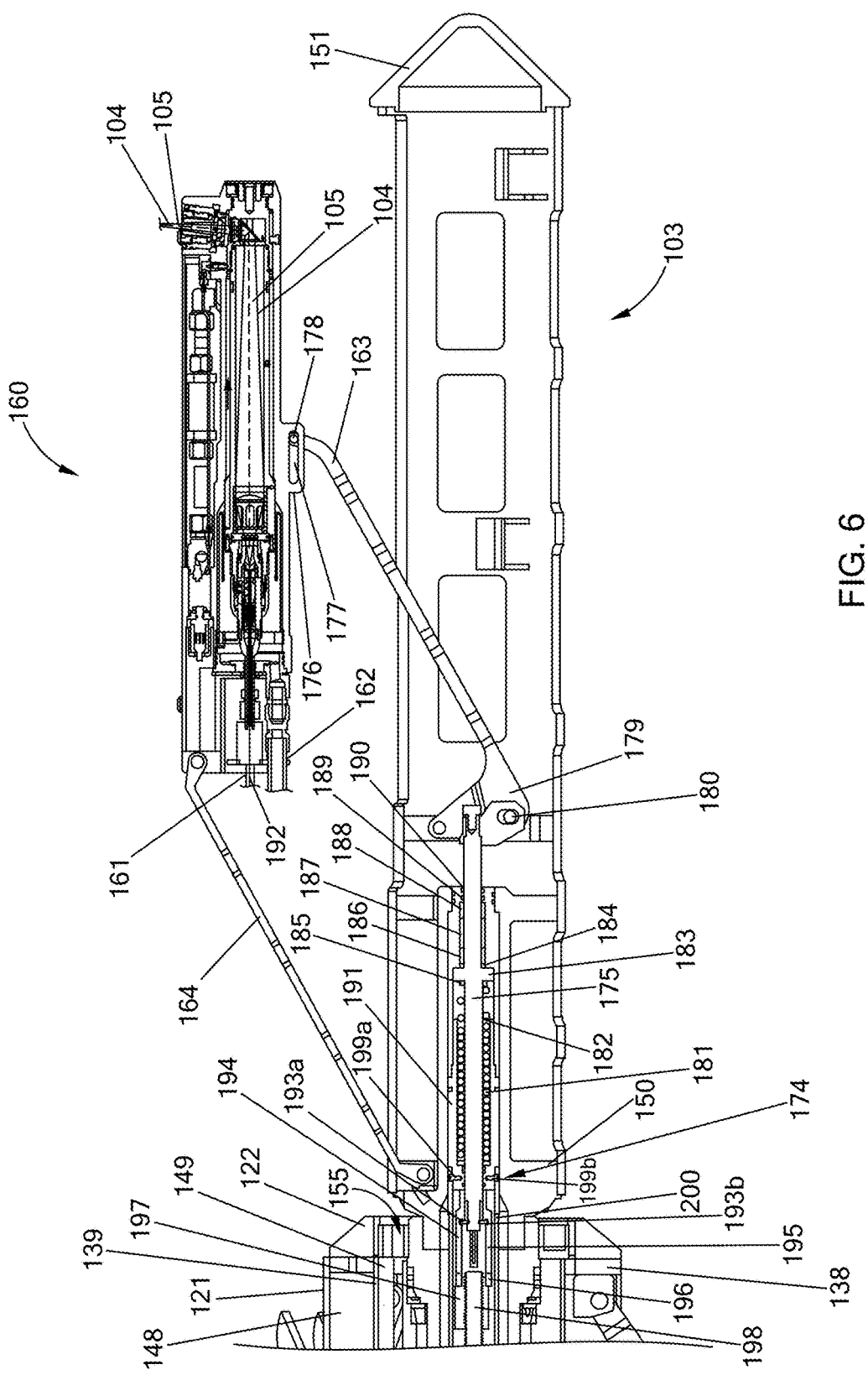
FIG. 6 is a cross sectional view of the lower section of the embodiment of FIG. 1.

Turning now primarily toward FIG. 6, as well as FIG. 5, there is shown a detailed cross sectional view of the lower section 103 and extend laser cutter pad 160 firing laser beam 104. (For clarity of the underlying tool components the laser fiber cable 161, containing the optical fiber 192, and the gas line 162 are cropped off as they exit the laser pad 160 and not shown within the rest of the tool in FIGS. 6, 7, 8 and 9). The laser beam 104 travels along the laser beam path 105 within the laser cutter pad 160 and then exits the laser cutter pad 160. The laser cutter pad 160 is pivotally attached to the lower section 103 housing 150 by a modified four bar linkage, which includes pad arms 163, 164. Pad arm 163 attaches to laser cutter pad 160 by a pin 178 that is positioned in slot 177 of pad arm mounting bracket 176.

Figure 7:
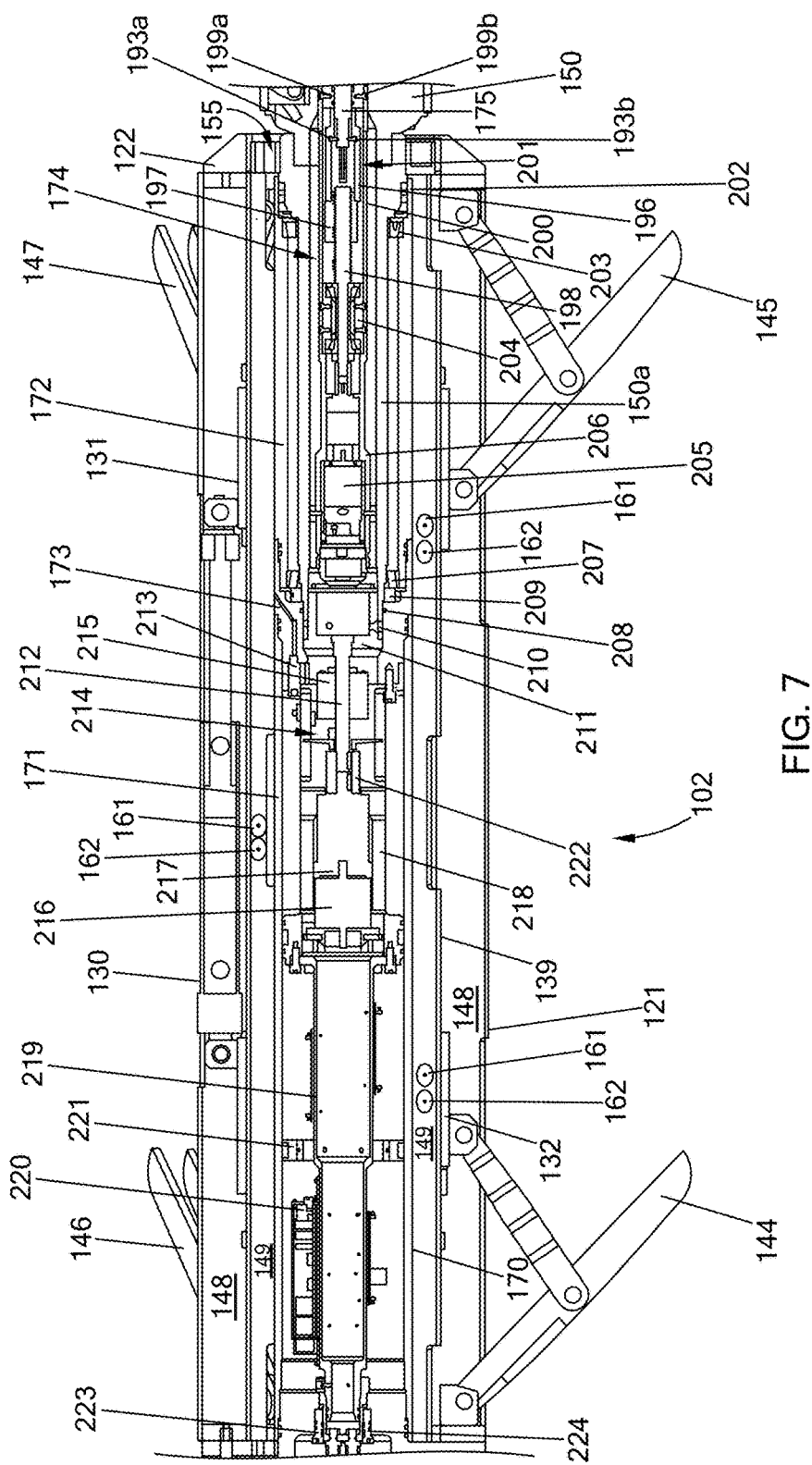
FIG. 7 is a cross sectional view of the middle section of the embodiment of FIG. 1.

Turning primarily to FIG. 5, FIG. 6 and FIG. 7, which detailed cross sectional views of the middle section 102, the connection of the lower section 103 with the middle section 102, and the pad arm extension mechanism 174. Lower section 103 housing 150 extends into middle section 102, and more specifically inner part 150a of housing 150 is positioned within lower part 172 of motor section assembly 170. Inner part 150a is mounted within lower part 172 so that inner part 150a is rotatable. Inner part 150a is fixed with housing 150 and thus the two rotate together. The distal or upper end of inner part 150a is attached to chuck 211 by way of pin 210. Chuck 211 has an axil 212 that is connected by coupler 222 to the gear box 217 of motor 216. Thus, the motor 216 and gear box 217 can rotate housing 150 and laser cutter pad 160, through a full 360° of rotation (or more provided that there are sufficient loops in the helix). Seal 208, collar 209, and bearing 207 provide for the rotational engagement of the distal end of inner part 150a with the motor section assembly 170 and in particular with motor section lower part 172 and connection member 173 (which connects motor section lower part 172 to motor section upper part 171). Bearing 203 and seal collar assembly 202 provide for a second point of rotational engagement between the motor section assembly 170 (in particular, lower part 172 of that assembly) and part 150a.

The pad extension mechanism 174 is contained within housing 150 and part 150a. It rotates with housing 150 and part 150a. The pad extension mechanism 174 has a motor 205, which has a motor housing 206. The motor housing 206 is connected by connector 204 to the ball screw housing 200; and the ball screw housing 200 is fixed to the rod housing 191 by pins 199a, 199b. Motor housing 206, connector 204, ball screw housing 200 and rod housing 191 form the outer housing or body of the pad extension mechanism 174. This body is held in place, e.g., fixed to the lower section 103 housing 150 and part 150a. Motor 205 by way of various parts turns ball screw 198, which is associated, e.g., in threated engagement, with ball nut 197. When ball screw 198 is rotated by motor 205, ball nut 197 moves forward (proximally) or backwards (distally). Ball nut 197 is attached to ball nut sleeve 196, which has slots 194, 195. Ball nut sleeve 196 advances and retracts with the ball nut 197. Pins 193a, 193b are slideably contained or held within slots 194, 195 of ball nut sleeve 196. Pins 193a, 193b connect rod 175 to ball nut sleeve 196, so that rod 175 can slide or move forward (proximally) and backward (distally) with respect to, and to a limited extent independently of the ball nut sleeve 196. Spring 181 is located around rod 175 and inside of rod housing 191. Spring 181 extends to and engages, exerting a force against, pad 185, which abuts against, or is on, stop member 183. When the laser cutter pad 160 is fully extended stop member 183 engages ledge 184 of rod housing 191. When the laser cutter pad 160 is fully retracted pad 185 engages washer 182. Rod 175 extends through bearing 186, spacer 187, bearing 188 and seals 189, 190 to connect to a cam member 179. Cam member 179 is part of pad arm 163 and is connected to rod 175 by pin 180.

In operation motor 208 turns ball screw 198 causing ball nut sleeve 196 to move forward. As ball nut sleeve 196 moves forward this permits spring 181 to move rod 175 forward, which rotates cam member 179 causing pad arm 163 to raise and extend the laser cutter pad 160 from the housing 150. Once extended, the laser cutter pad 160 has the ability to move, e.g., raise and lower, or extend and retract, to follow the inner surface of the tubular being cut as the lower section 103 of the tool 100 is rotated. In this way, provided the inner radius of the tubular is smaller than the maximum extend radius of the laser cutter pad 160, the pad 160 preferably should always be forced into engagement with the inner surface of the tubular and rollers 166, 167, 168, 169 should preferably contact and roll along this inner surface as the laser cut is being made. The spring 181 forces the laser cutter pad to its maximum radius of extension, while the slots 194, 195 and pins 193a, 193b permit the pad to move, e.g., retract, as it is pushed in by the inner surface of the tubular as it is rotated around that surface. To retract the laser cutter pad 160, the motor 205 is rotated in the opposition direction causing ball nut sleeve 196 to move backwards, and thus, pull pins 193a, 193b and rod 175 backwards, retracting the pad 160 into housing 150. In this manner, and in this embodiment, the motor does not force, or apply any force to extend the pad, or cause the pad to be in engagement with the inner surface of the tubular. The motor's sole function is to retract and hold the pad in the retracted configuration.

Turning primarily toward FIG. 7, the middle section 102 has an annulus 148 that is formed between middle section body housing 121 and inner body 139. Internal, i.e., moving closer to the center axis of the tool, to annulus 148, a second annulus 149 is formed between inner body 139 and motor section assembly 170. In this embodiment, motor section assembly 170 and pad extension mechanism 174 are sealed from environmental conditions, and thus are constructed to withstand the temperature, pressure, fluids, and other environmental conditions that may be present in the environment of intended use for the tool, e.g., the inside of a conductor or pile that is to be cut off during decommissioning. Further, in this embodiment annulus 148 and annulus 149 are exposed to, open to, the environmental conditions of use.

It is noted that other numbers of, and configurations of, annular spaces, motor sections, extension mechanisms, as well as, whether and the extent to which, these components or section are isolated from environmental conditions may be used without departing from the spirit of the inventions.

Motor 216 and gear box 217 are contained within housing 218. Housing 218 is connected to tube 219 and to connection member 173. Tube 219 is held in place by support ring 221. Tube 219 contains wires that provide electrical power, control information, and receive data from the motors, pistons, sensors or other components in, or on, the tool. These wires enter through adapters 223, 224, which seal the cavity of tube 219 from environmental conditions. Control and data circuit boards 220 and related software and hardware are located inside the motor section assembly.

A pressure sensor and port 213 provides information about the pressure in annulus 149, which in turn should be the environmental pressure that the tool is under. This in turn can be used to provide an approximate depth, or location of the tool 100. An optical position determination assembly 214 determines the rotational position and the amount of rotation, e.g., degrees rotation, of the lower section.

An optical position determination assembly 214 is located in the upper portion 171 of the motor assembly 172 and fixed to axil 212. In this manner as the axil is rotated, and thus the lower section 103 and laser cutter pad 160 are rotated, their rotational orientation can be determined, known and monitored.

An electrical slip ring 215 transmits power, data and control information back and forth across the rotating juncture between the upper portion 170 and lower portion 172 of the motor assembly 170.

Figure 8:
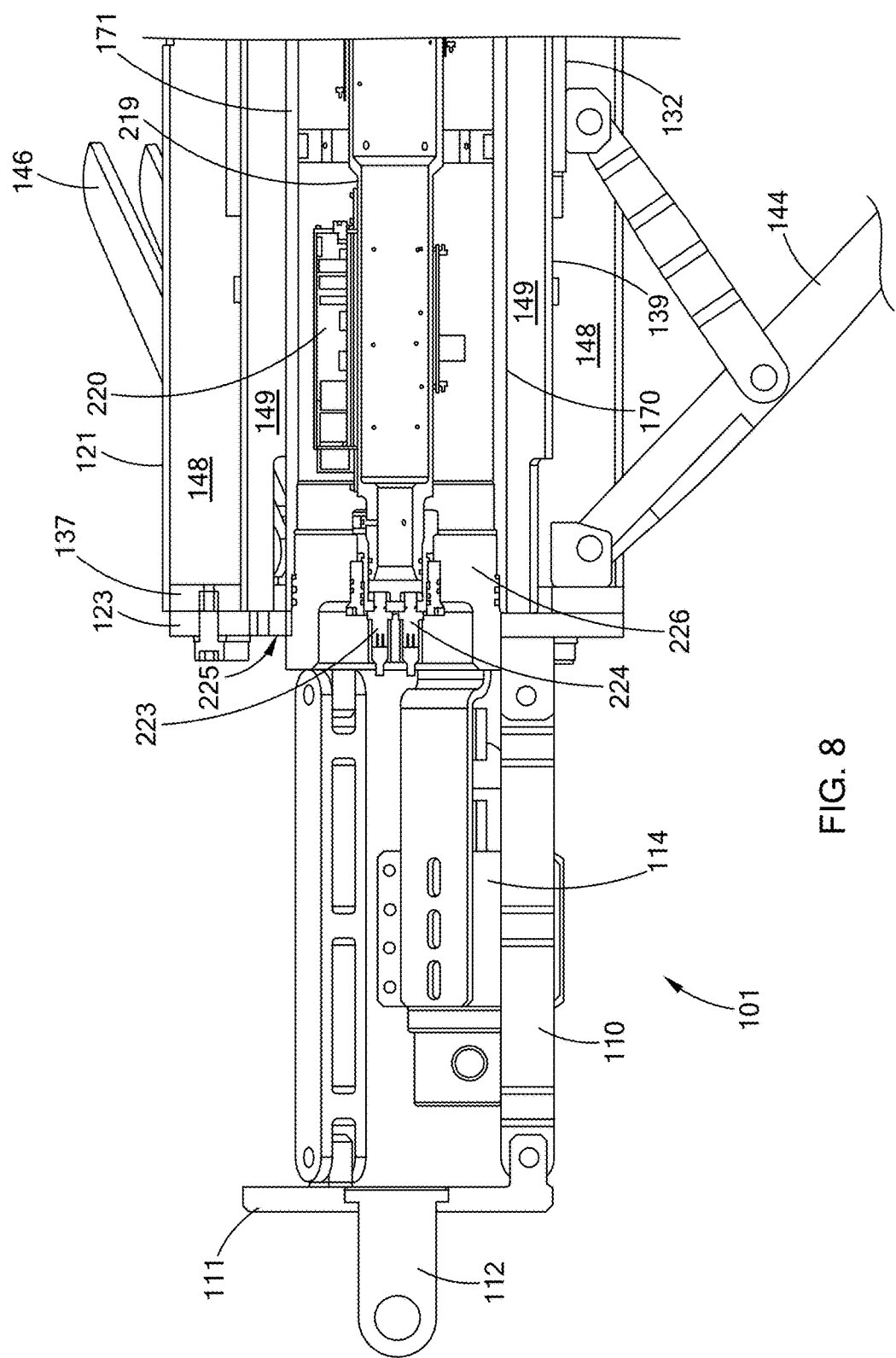
FIG. 8 is a cross sectional view of the upper section of the embodiment of FIG. 1.

Turning primarily to FIG. 8 there is shown a detailed cross sectional view of upper section 101 of laser cutting tool 100. The upper section 101 has a cap 111 that has an attachment member 112 having an eyehole. There is an upper section frame 110 that is attached to the cap 111 and by way of the cap 111 the attachment member 112. Air filter 114 is positioned adjacent the frame 110. (Air filter 113 is similarly positioned by not seen in FIG. 8.) Tube 219 is associated with adapters 223 and 224 to receive and carry control, electrical, data or other lines to the motors and sensors. Passage 225 is located in end piece 226 and provides an opening for the optical fiber cable 161 and the gas line 162 (not shown in FIG. 8) to pass out of annulus 149 and connect to an umbilical (not shown in FIG. 8) or otherwise extent to the surface support assembly and the source of the high power laser beam. Upper end cap 123 is associated and connected with flange 137, which in turn is associated with and caps annulus 148 and is associated and connected with housing 121. A control and data board, which may be a circuit board, microcomputer, controller, or other more or less complicated electronics, 220 is positioned motor assembly 170. This hardware and its associated software can be located in other portions of the tool or system, for example in other section of the tool, other location in the tool, the umbilical, the deployment stand, the laser cabin, or on the surface.

Figure 9:
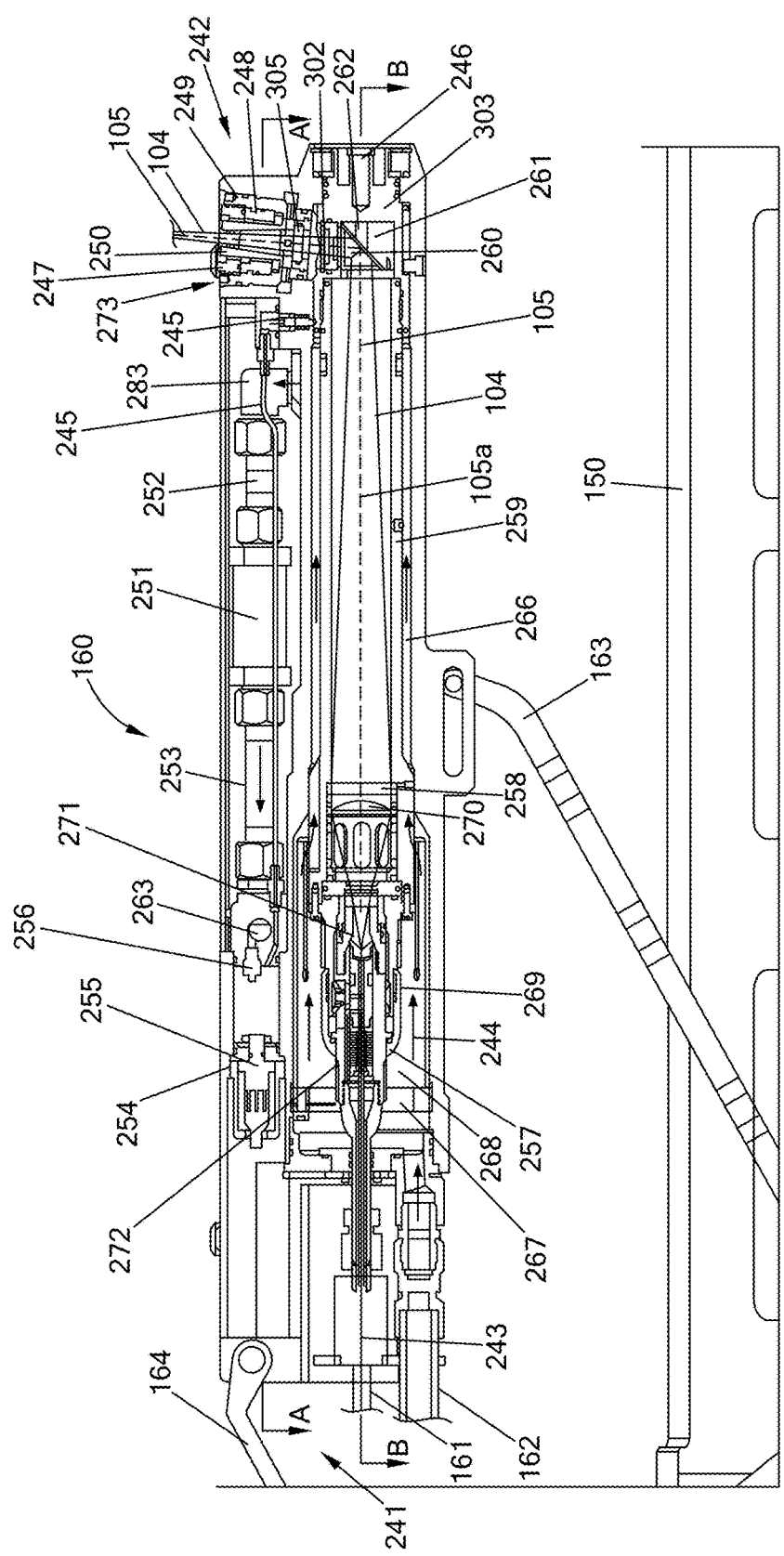
FIG. 9 is a cross sectional view of an embodiment of a laser cutter pad of the embodiment of FIG. 1 in accordance with the present invention.
Figure 9A:
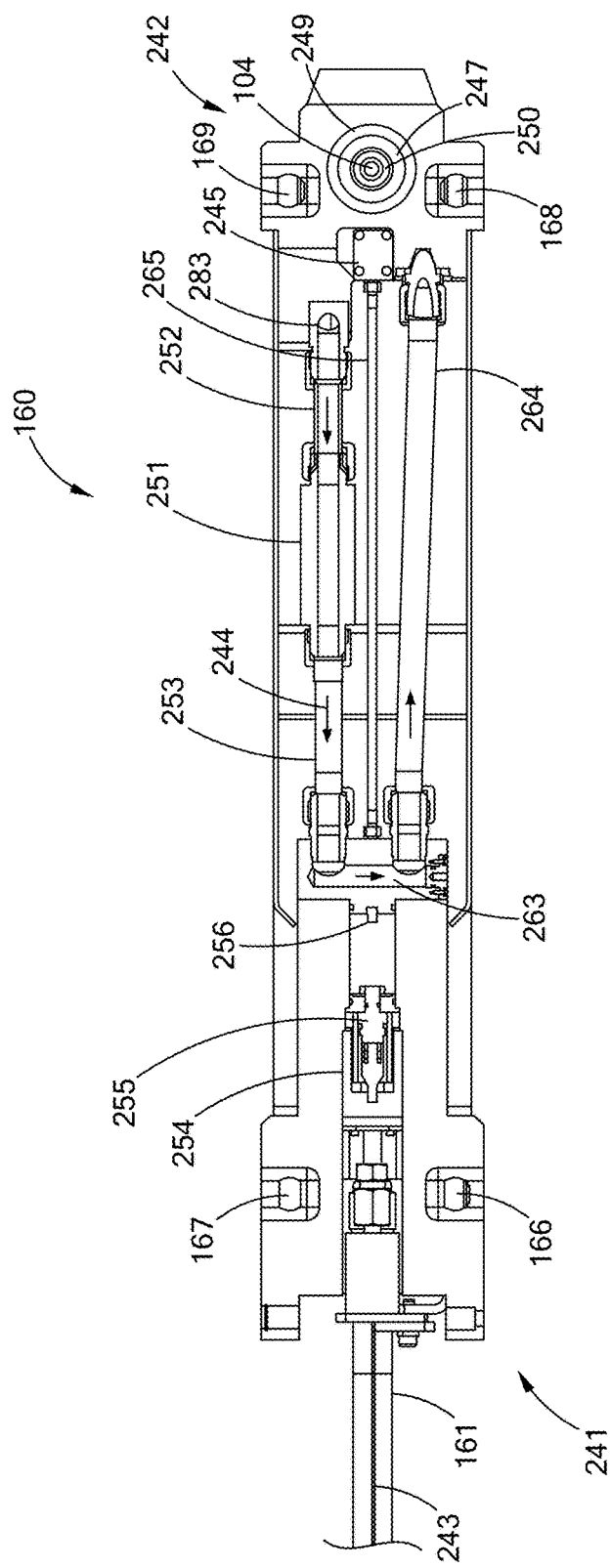
FIG. 9A is a cross sectional view of the laser cutter pad of FIG. 9 taken along line A-A of FIG. 9.
Figure 9B:
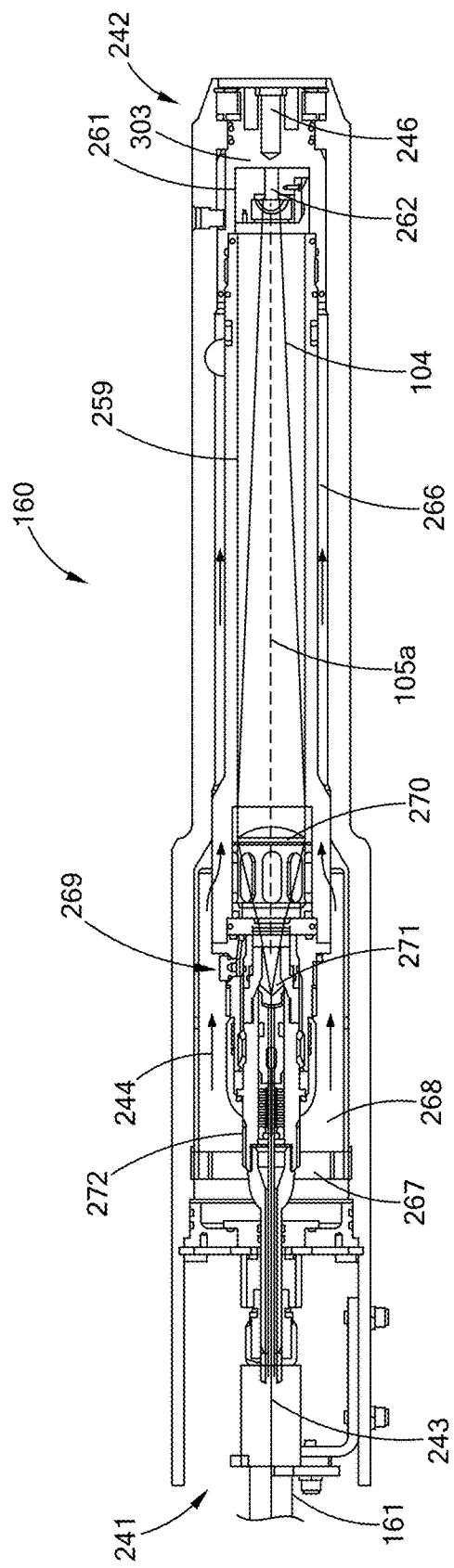
FIG. 9B is a cross sectional view of the laser cutter pad of FIG. 9 taken along line B-B of FIG. 9.
Figure 9D:
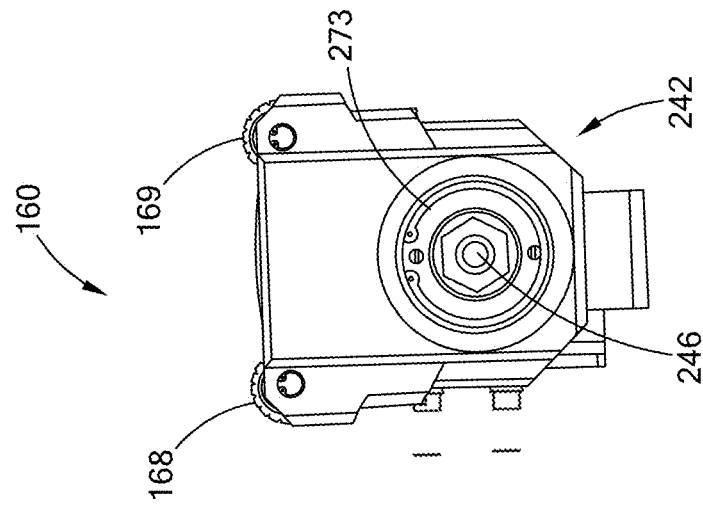
FIG. 9D is a plan view of the lower end of the laser cutter pad of FIG. 9.
Figure 9C:
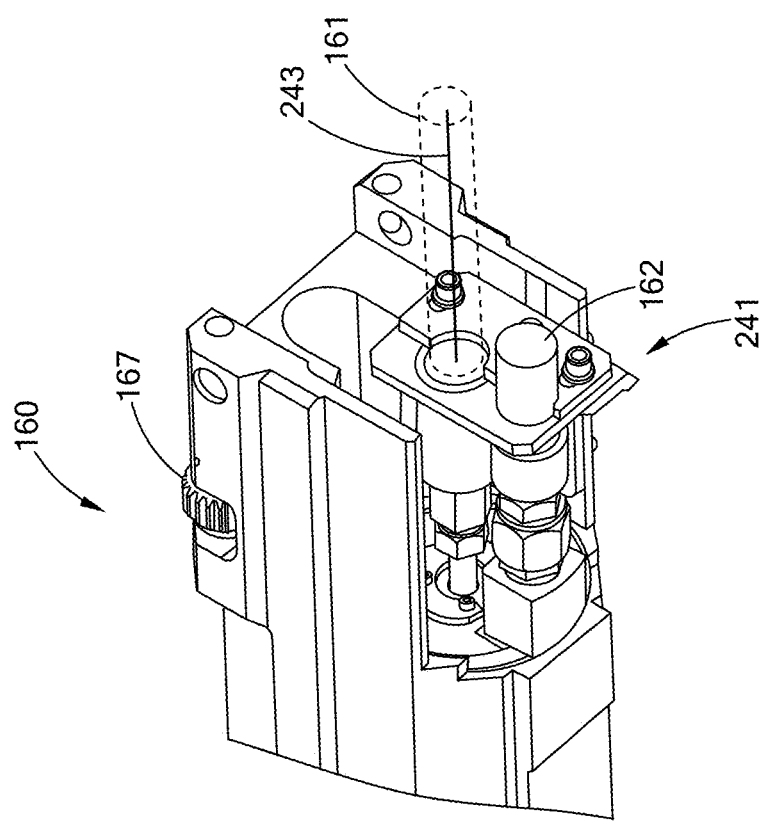
FIG. 9C is a perspective view of the upper end of the laser cutter pad of FIG. 9.

Turning now principally to FIGS. 9 and 9A to 9D there are provided various detailed views of the laser cutter pad 160. FIG. 9 is a cross sectional view of laser cutter pad 160. FIG. 9A is a cross sectional view of laser cutter pad 160 taken along line A-A (of FIG. 9) and FIG. 9B is a cross sectional view of laser cutter pad 160 taken along line B-B (of FIG. 9). FIG. 9C is a perspective view of the upper end 241 of the laser cutter pad 160. FIG. 9D is a plan view of the lower end 242 of the laser cutter pad 160.

The laser cutter pad 160 has an upper or proximal end 241 and a lower or distal end 242. The laser fiber cable 161 and the gas line 162 are attached to and enter into the laser cutter pad 160 through the proximal end 241. The laser fiber cable 161 has a high power optical fiber 243. The optical fiber cable 161 may be, for example, one of the types of cables and fibers disclosed and taught in Patent Application Publication No. 2010/0215326, 2012/0020631, and 2012/0068086 the entire disclosures of each of which is incorporated herein by reference. The optical fiber cable 161 may have one, two, three or more high power optical fibers, it may also have gas lines, electronic data, communication and control lines, and optical data, communication and control lines. The gas line 162 and the optical fiber cable 161 may be separate as in the embodiment of FIG. 9, or they may be joined, integral, or combined in whole or in part into a cable or umbilical, and may be so combined or separate at different points within the system, as may be advantageous for a particular configuration of a system or for a particular application and use.

The optical fiber 243 is optically and mechanically joined with the optics package 269. The optics package 269 has laser beam focusing and shaping optics 270 that provided for predetermined laser beam properties, such as beam shape, power per unit area, and energy distribution profile. The optics package has a connector 272 that has a quartz block 271. The quartz block 271 is optically and mechanically connected to, or associated with, the optical fiber 243. The optics package 269 may include or be, for example, one of the types of optics packages, optics assemblies, connectors, or laser beam shaping and determining assemblies of the type disclosed and taught in Patent Application Publication Nos. 2013/0011102, 2012/0275159, 2012/0267168 and 2012/0074110, the entire disclosures of each of which are incorporated herein by reference. The laser beam 104 exits the optics package 269 through window 258 and travels along laser beam path 105a in beam path tube 259 until it reaches the total internal reflection (TIR) prism 260 in prism assembly 261. Examples of TIR prisms and TIR prism laser assemblies are disclosed and taught in Patent Application Ser. Nos. 61/605,434, 61/755,745 and Ser. No. 13/768,149, the entire disclosures of each of which are incorporated herein by reference.

The laser beam passes through the first face, entering into the TIR prism 260 and is reflected off of the inner surface of the longest face, e.g., the hypotenuse, and directed toward the nozzle 250. The laser beam 104 is combined with a gas jet and exits the laser cutter pad 160 traveling along beam path 105 toward the target, e.g., interior of pipe to be cut.

The gas flow enters the laser cutting pad 160 at the upper end 241 from gas line 162. The flow of the gas, along the gas flow path, through the laser cutting pad 160 is shown by the arrows, e.g., 244. The gas, among other things, may be used to cool the optics package, other components within the laser cutting pad 160, and serve as the fluid source for the laser jet, that exits the nozzle 250. The gas leaves the gas line 162 and flows through a distribution flow assembly, chamber or manifold. This assembly 267 serves to distribute the flow of the gas substantially uniformly, and preferably uniformly, in the annular cavity 268 that is located around the optics package 269. Flow restrictors, diverters or inserts may be used, or the outer cavity walls may be narrowed to force or cause high gas flows closer to the outer surface of the optics package 269, and thereby enhance the heat removal, or cooling effect of the gas flow. This may also prevent the occurrence of stagnant or dead spots in the gas path through the pad 160, which preferably should be minimized if possible. The annular optics package cavity 268 is connected to annulus 266, which surrounds the laser beam path tube 259. The gas flow through annulus 266 and into right turn fitting 283. From fitting 283 the gas flows through flow conduit 252 into check valve 251, and then to flow conduit 253.

It should be noted that in this embodiment of a laser pad the gas does not directly flow over, or around, the prism. Thus, the prism is cooled by way of port 262 in the prism assembly 261. This port is located close to, and in good thermal conductivity, with the inner end of inlet 246, which serves as a heat sink. In let 246 is located in prism housing 303. In this manner the water from the environment, e.g., from within the pile, can be used to cool the prism 260. Also, in this embodiment of the pad 160 the gas flow is separate and isolated from the laser beam path, i.e., the laser beam path 105a and the laser beam 104 are not in the gas flow path (until they are combined at the nozzle 250 to form the laser jet). Thus, the optics package and laser beam path to, and into the prism, are sealed and not exposed to gas flow or ambient conditions. In this manner, the pad 160 can preferably be assembled in a clean room environment so as to minimize, reduce or eliminate, any contamination along the laser beam path 105a, as the laser beam 104 leaves the window 258 and travels to the prism 260 through the beam path tube 259. Thus, the pad 160 has a sealed and isolated laser beam path 105a. It being understood that other configurations, variations and arrangements of these components, beam paths and gas flow paths are contemplated.

The gas flow from flow conduit 253 into crossing flow conduit 263. A monitoring housing 254 has a temperature sensor connector 255 (e.g., an electrical connector for wires coming from line 256, to temperature sensor 245) and a pressure transducer 256. A temperature sensor 245 is located toward the lower end 242 of the pad 160. A communication line 265 connects (e.g. houses wires) a port near the lower end 242 to the monitoring housing 254. The gas flows from conduit 263 into flow conduit 264 and then to the nozzle 250 where the gas is combined with the laser beam 104 to form a laser fluid jet.

The check valve 251 prevents ambient water, contamination, mud or debris from entering the gas path should the gas flow stop, or be reduce to an extent that external fluids or material could flow back into the nozzle 250.

The nozzle 250 has an adjusting locking assembly 273 that eliminates the need for setscrews or more cumbersome aligning and locking mechanisms (although less preferable such mechanism may be used). The locking adjusting locking assembly 273 has a first (outer) ring 247, a second (inner) ring 248, that are both located around the nozzle 250. There is a sleeve 249 that is located around both the first and second rings 247, 249. The inner ring 248 is tightened against the nozzle 250 after the nozzle is adjusted and aligned with an alignment laser beam that is coaxial with the laser beam path, shape and pattern of the high power laser beam. This provides the ability to partially tighten, move and position the nozzle to align it. Once aligned the inner ring 248 is tighten, locking the nozzle in place. The outer ring 247 is then tightened against the inner ring 248 locking the inner ring 247 and nozzle 250 in position. The nozzle 250 has a nozzle window 305. In this manner the nozzle 250 can be aligned with the laser beam path 105 and the laser beam 104 to prevent the laser beam from cutting or damaging the nozzle, during operations.

Figure 9E:
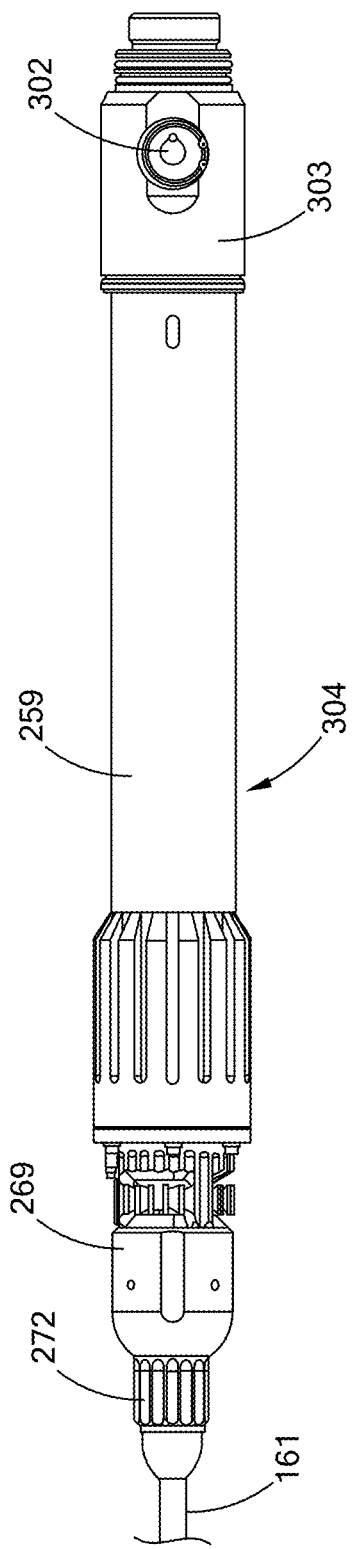
FIG. 9E is a perspective view of an embodiment of a sealed optical cartridge in accordance with the present invention.
Figure 10A:
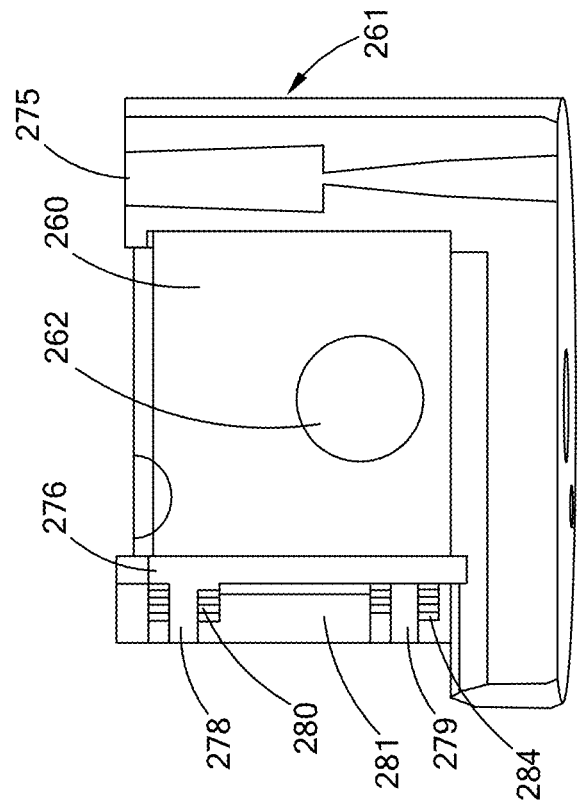
FIG. 10A is a cross sectional view of the embodiment of FIG. 10 taken along line A-A of FIG. 10.
Figure 10:
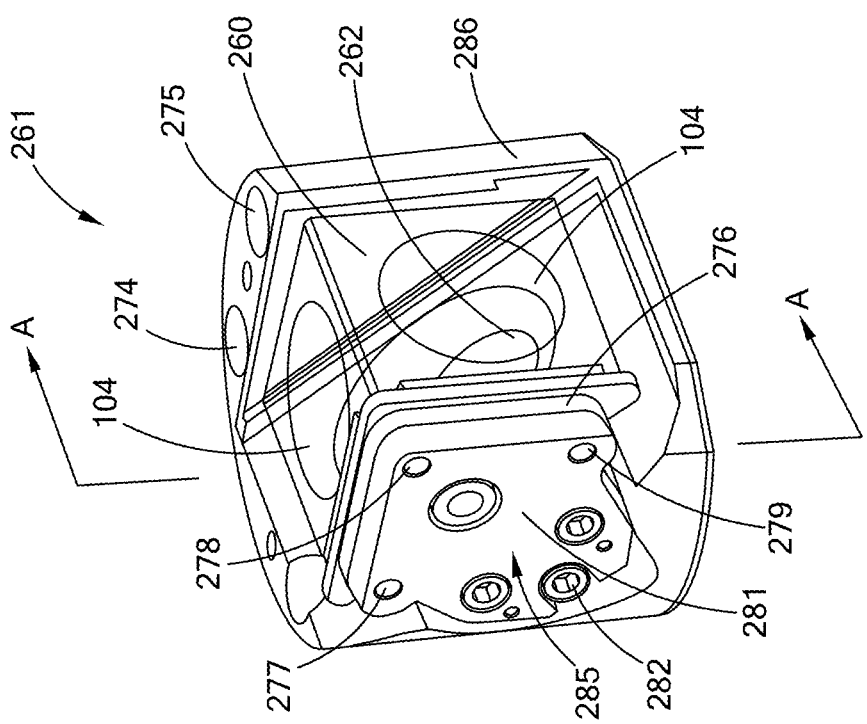
FIG. 10 is a perspective view of a prism and prism holding assembly in accordance with the present invention.
Figure 13A:
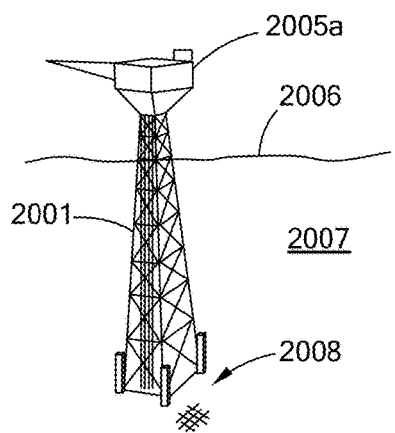
FIGS. 13A to 13C are illustrations of embodiments of offshore structures.
Figure 13B:
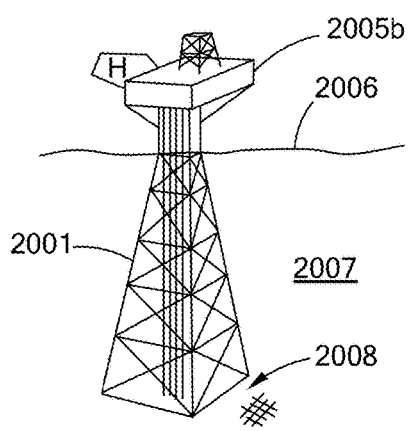
Figure 13C:
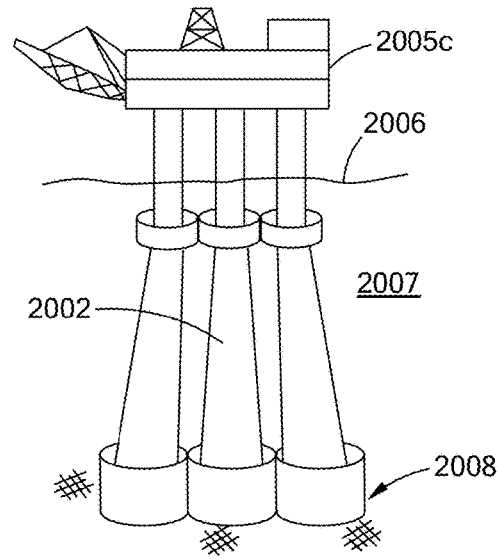

Turning to FIGS. 10 and 10A there is provided a perspective view of the prism assembly used in the embodiment of FIGS. 1 to 9E, this prism assembly 261 and a cross sectional view taken along line A-A, respectively. The TIR prism 260 is held in place in the prism assembly 261 having a retaining assembly 285 that has an inner plate 276 and an outer plate 281. Pins 277, 278, and 279 extend from the inner plate 276 through openings in the outer plate 281. Set screws, e.g., 282 are positioned in the outer plate. Springs, e.g., 280, 284 are located between the inner 276 and outer 281 plates; and positioned around the pins, e.g., 278, 279. Cooling channels 274, 275 are located in the body 286 of the prism assembly 261.

Turning to FIGS. 33A and 33B there is provided a perspective view of an embodiment of a prism assembly 561 and a plan view of that assembly, respectively. The TIR prism 560 is held in place in the prism assembly 561 having a retaining assembly 585 that has an inner plate 576 and a spring assembly 581. The spring assembly 581 provides for good mechanical and thermal conduct, and provides for the prism to be held in position by the preload of the spring.

Turning primarily to FIG. 9E, the optical path components, e.g., the optical components that the laser beam passes through within the tool, are contained in a sealed optical cartridge 304. The sealed optical cartridge 304, in this embodiment, is made up of the optical fiber cable 161, the connector 272, the optics package 269, the beam path tube 259, the prism housing 303 and the prism housing window 302. In this manner, and preferably, the sealed optical cartridge can be assembled in a clean and controlled environment, e.g., a clean room, to minimize the risk of contamination in or along the optical path components and the laser beam path. The sealed optical cartridge can then be incorporated into the laser decommissioning tool in a standard factory setting, yard, or at a decommissioning site. Further, spare or extra sealed optics cartridges can be stored at a job site, or decommissioning operation location to quickly change out these cartridges if one should be come damaged or inoperable. It should further be understood that in this embodiment of the laser tool two windows are utilized: the window 302 on the sealed optical cartridge 304 and the window 305 associated with the nozzle assembly. This dual window configuration is preferred as it adds greater flexibility and reliability for use, repair, and service of the unit in the field.

Turning to FIG. 12 there is provided a schematic view of an embodiment of a laser decommissioning system 290 using a laser tool 100 of the type shown in the embodiment of FIGS. 1 to 10A. The system 290 has a frame 291, which protects the components and allows them to be readily lifted, moved or transported. They system 290 has an umbilical (not shown) that is on a spool 292 (the spool may have a level wind, drive motors, controllers, fittings, monitoring equipment and other apparatus associated with it, which are not shown in the figures) and a guide wheel 293. Preferably, the umbilical is connected to the laser tool 100, passes over the guide wheel 293 and is wrapped around spool 292 when the system 290 leaves the yard (e.g. storage facility) for transport to a decommissioning location. In this manner minimal assembly or fiber splicing is required. The source of the laser beam, and the source for fluids, e.g., hydraulics, gas for the jet, and control and monitoring data and information, can be plugged into the spool at the job site.

Turning to FIG. 11 there is provided a perspective view of a mounting assembly 294. The mounting assembly 294 is attached to the top of a pile or tubular to be cut. The mounting assembly 294 has a frame 300, having mounting slots 297 for receiving the wheel 293. (Preferably, mounting slots 297 are fitted with cradle assemblies for receiving and locking the wheel 293 in place by for example receiving and holding the wheel's axil 310). The frame 300 is mounted on a swivel 295, that has an opening 296 for extending the tool 100 and the umbilical (not shown in the figure) into the pile, member or tubular to be cut. The mounting assembly 294 has several (preferably more than one, and at least three or four) clamp assemblies, which are set by mechanical assist (for example, hydraulic, electrical, spring assist, gravity assist and combinations and variations of these), e.g., 298, having an inner claiming finger 298a and an outer clamping finger 298b.

The wheel 293 has a breaking assembly 301, having a breaking member 311 to contact the umbilical, the wheel frame or both, and apparatus to draw the breaking member into engagement, such as hydraulic cylinders 312, 313 (note that although not shown, preferably the other side of the wheel has similar hydraulic cylinders.) The breaking assembly 301 can be activated to hold, or lock, the umbilical and wheel in a fixed position with respect to the wheel 293 and the member to be cut, e.g., the pile.

By way of example, a laser decommission transport frame and system can be fitted with a spool and an umbilical. The umbilical has conduits and lines for providing electrical power, sending and receiving data and control information, hydraulics, and a gas supply line. The umbilical has a high power laser fiber having, for example, a core having a diameter of from about 200 µm to about 1,000 µm, about 500 µm and about 600 µm. Preferably the sealed optical cartridge is connected to both the tool and the umbilical before the frame and system are delivered to the decommissioning site. At the decommissioning site a mounting assembly, e.g., 294 is positioned with a crane over the member, e.g., pile, to be cut, decommissioned, or removed. The mounting assembly is locked onto the pile. Once locked on to the pile, the mounting assembly is positioned and ready to receive the laser tool. Thus, using the crane, and preferably rigging to a deployment assembly, e.g., guide wheel 293, and with the wheel break set, the wheel, and thus the umbilical and the tool are positioned over the frame. As this wheel is being moved from the deck of the decommissioning vessel to the pile, by the crane, the spool unwinds the umbilical according to provide sufficient length to reach the pile. The tool is then lowered into the pile as the wheel is set in the mounting slots, e.g., 297. At this point, the break can be released and the tool lowered to the appropriate depth, by unwinding the umbilical from the spool. Once lowered to the appropriate depth the wheel break is set, preventing the umbilical from raising or lowering within the pile. The centralizers on the laser decommissioning tool are then extended, centering and fixing the tool in position. If the spool is located on a floating platform heave compensation, if needed, may be accomplished: by using the fish belly, e.g., dip or slack, in the umbilical between the spool and frame to take up the movement; by setting the tension on the spool so that the fish belly of the umbilical between the pile and the frame is taken up or let out according to compensate for the heave of the vessel; by other heave compensation devices known to the offshore drilling arts; and combinations and variation of these. The laser cut of the pile can then be made. It being understood that other sequences of activities, e.g., placing, locking, cutting, may be used, desirable or preferred depending upon the particular decommissioning activity and conditions.

Turning to FIG. 14 there is provided a schematic cross sectional view of a laser tool 100 deployed into a tubular 401, e.g., a pile, which is to be cut. In the embodiment of this system the deployment assembly is a guide-arc 402. The laser tool 100 is shown as being lowered into the tubular 401, and has not yet been anchored or centralized. The umbilical 400 is extending over the guide-arc 402 and into the tubular 401 and back toward the spool and support vessel (not shown in this figure). Turning to FIG. 14A there is provided a detailed perspective view of the guide-arc 402, without the umbilical being present. The guide-arch 402 has an inlet guide device 414, which allows the umbilical to lay within arcuate channel 415. The arcuate channel 415 has rollers, or other friction reducing devices, to permit the umbilical to move over, or in, the guide-arch channel 415. Breaks, or clamps, 412, 413 are located above the channel 415, and over the umbilical (when present). Breaks 412, 413 clamp down on the umbilical fixing it with respect to the guide-arch 402. The guide-arch 402 has clamping fingers 411, 410 for engaging the inner and outer surfaces of the tubular 401 respectively. The clamping fingers 411, 410 and the guide-arch 402 are mounted on frame 420. There is a load cell (not shown in FIG. 14) between the guide arc and the lower mounting bracket 416 that allows for umbilical pull weight to be recorded and sent via data cable back to the main tool monitoring/control and reel control station. This is used to ensure a maximum pull is not exerted onto the tool in case the tool becomes lodged downhole.

Figure 34:
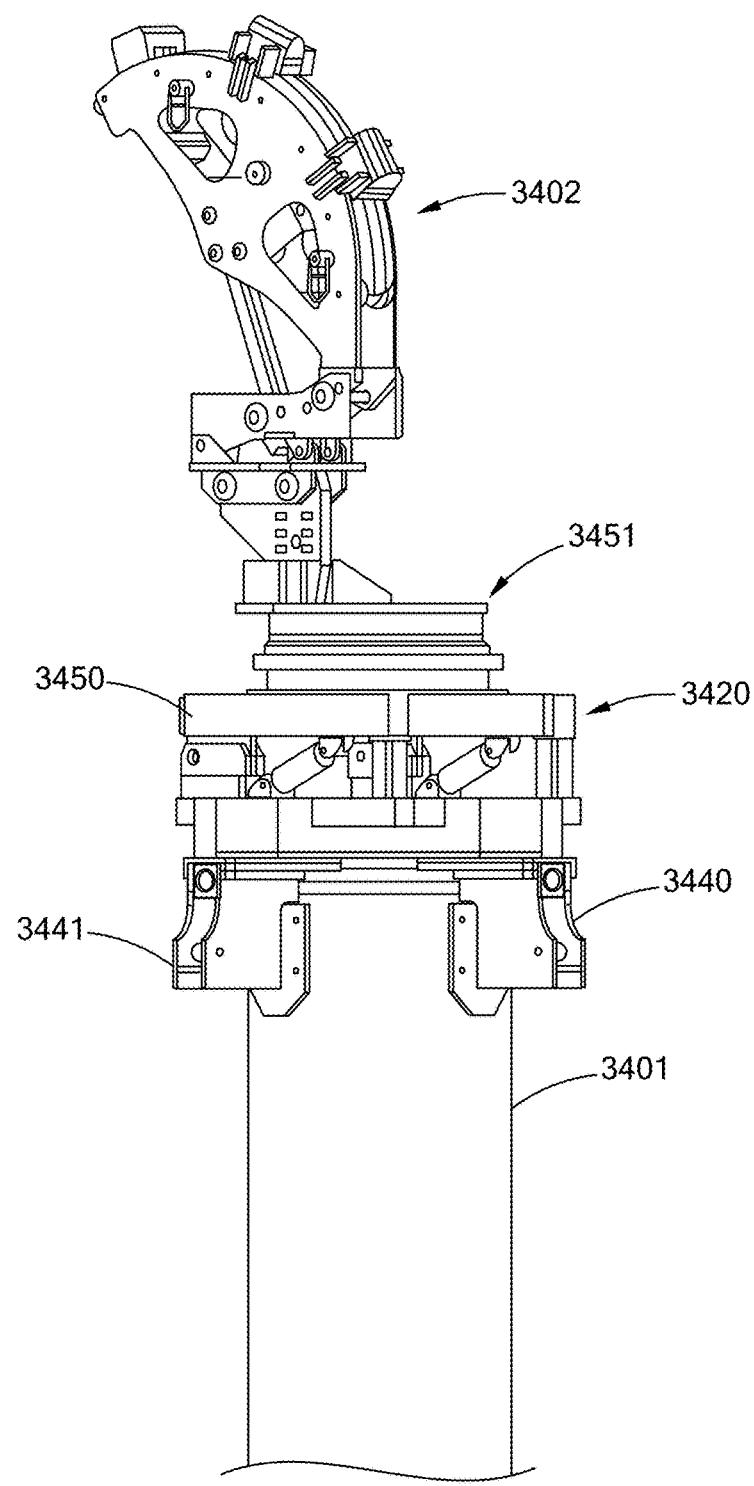
FIG. 34 is a perspective view of an embodiment of a mounting assembly in accordance with the present invention.

Turning to FIG. 34 there is provided a perspective view of an embodiment of a mounting frame 3420 attached to a tubular 3401 to be cut. The mounting frame 3420 has three attachment members 3440, 3441 (the third member is not shown in the drawing) attached to a ridged base frame 3450. The ridged base 3450 has a swivel or rotation assembly 3451 that permits the guide-arch 3402 to move radially so that it can more easily be aligned with the vessel having the laser and spool.

The laser module may be a mobile laser unit or system or a laser work over and completion unit or system, for example, of the types taught and disclosed the following US patent application Ser. No. 13/565,345; Ser. No. 13/782,942; Ser. No. 13/403,741; Ser. No. 13/403,723; Ser. No. 13/403,692; Ser. No. 13/347,445; Ser. No. 13/210,581, Ser. No. 61/734,809; and Ser. No. 61/786,763, the entire disclosures of each of which are incorporated herein by reference, and variations and combinations of those lasers, units and systems.

The ability to make precise and predetermined cuts that structurally weaken support members, the platform, the jacket, or an offshore structure, in a predetermined manner, provide the ability for new and innovative ways to rig, handle and remove offshore structures. For example, the structure may be cut in a predetermined manner that enables it to be toppled and pulled using a winching and flotation mechanism, and thus in essence be cut, tipped and drag onto a vessel for further cutting and sectioning. Persons of skill in the offshore platform and decommissioning arts, upon reviewing the teachings of this specification, may develop many new and innovative techniques for rigging, handling and removing structures based upon the capabilities of the present laser cutting tools, devices, systems and methods, which techniques will fall within the scope of protection for the present inventions.

It is noted that the laser removal system, methods, tools and devices of the present inventions may be used in whole, or in part, in conjunction with, in addition to, or as an alternative, in whole, or in part, to existing methodologies for the removal of offshore structures without departing from the spirit and scope of the present inventions. Further, it is noted that the laser removal system, methods, tools and devices of the present inventions may be used in whole, or in part, in conjunction with, in addition to, or as an alternative, in whole or in part, to existing methodologies to remove or repair only a portion of an offshore structure without departing from the spirit and scope of the present inventions. Additionally, it is noted that the sequence or time of the various steps, activities and methods or removal (whether solely based on the laser removal system, methods, tools and devices or in conjunction with existing methodologies) may be varied, repeated, sequential, consecutive and combinations and variations of these, without departing from the spirit and scope of the present inventions.

It is preferable that the assemblies, conduits, support cables, laser cutters and other subsea components associated with the operation of the laser cutters, should be constructed to meet the pressure and environmental requirements for the intended use. The laser cutter head and optical related components, if they do not meet the pressure requirements for a particular use, or if redundant protection is desired, may be contained in or enclosed by a structure that does meet these requirements. For deep and ultra-deep water uses, the laser cutter and optics related components should preferably be capable of operating under pressures of 1,000 psi, 2,000 psi, 4,500 psi, 5,000 psi or greater. The materials, fittings, assemblies, useful to meet these pressure requirements are known to those of ordinary skill in the offshore drilling arts, related sub-sea Remote Operated Vehicle ("ROV") arts, and in the high power laser art.

For plugged, damaged, collapsed and partially collapsed tubulars, as well as, for other solid, or occluded, structures that need to be removed from above the seafloor, below the seafloor, or both, a boring, radially cutting and, sectioning method may be employed. In this method the laser beam path is first directed along the length, and preferably along the axis, of the structure to be removed, e.g., the laser beam would be directed downwardly at the center of a vertical member. The laser would bore a hole, preferably along the axis of the structure, and the laser cutting tool would move into and down this axial hole. At a point where the axial hole was of sufficient depth the tool would perform a radial cut of the structure, i.e., an inside-to-outside cut with the laser beam path traveling from inside the axial hole, to the interior surface of the axial hole, through the structure, and through the outer surface of the structure. This radial cut would sever (or partially sever in a predetermined manner as discussed above) the structure. The laser tool would be removed to a safe position and the severed section of the structure removed. The depth of the axial hole may be used to determine the size of the severed section that will be removed. Thus, in general longer axial holes will give rise to larger and heavier severed sections. Preferably, the radial cut does not occur at precisely the bottom of the axial hole. Instead, if the radial cut is performed slightly above, or above, the bottom of the axial hole, the remaining portion of the hole, after the severed section is removed, may be used as a pilot hole to continue the axial hole for the removal at the next section of the structure.

The laser cutting tools may also have monitoring and sensing equipment and apparatus associated with them. Such monitoring and sensing equipment and apparatus may be a component of the tool, a section of the tool, integral with the tool, or a separate component from the tool but which still may be operationally associated with the tool, and combinations and variations of these. Such monitoring and sensing equipment and apparatus may be used to monitor and detect, the conditions and operating parameters of the tool, the high power laser fiber, the optics, any fluid conveyance systems, the laser cutting head, the cut, and combinations of these and other parameters and conditions. Such monitoring and sensing equipment and apparatus may also be integrated into or associated with a control system or control loop to provide real time control of the operation of the tool. Such monitoring and sensing equipment may include by way of example: the use of an optical pulse, train of pulses, or continuous signal, that are continuously monitored that reflect from the distal end of the fiber and are used to determine the continuity of the fiber; the use of the fluorescence and black body radiation from the illuminated surface as a means to determine the continuity of the optical fiber; monitoring the emitted light as a means to determine the characteristics, e.g., completeness, of a cut; the use of ultrasound to determine the characteristics, e.g., completeness, of the cut; the use of a separate fiber to send a probe signal for the analysis of the characteristics, e.g., of the cut; and a small fiber optic video camera may be used to monitor, determine and confirm that a cut is complete. These monitoring signals may transmit at wavelengths substantially different from the high power signal such that a wavelength selective filter may be placed in the beam path uphole or downhole to direct the monitoring signals into equipment for analysis. The monitoring system may also utilize laser radar systems as for example describe in this specification.

To facilitate some of these monitoring activities an Optical Spectrum Analyzer or Optical Time Domain Reflectometer or combinations thereof may be used. For example, an AnaritsuMS9710C Optical Spectrum Analyzer having: a wavelength range of 600 nm-1.7 microns; a noise floor of 90 dBm @ 10 Hz, −40 dBm @ 1 MHz; a 70 dB dynamic range at 1 nm resolution; and a maximum sweep width: 1200 nm and an Anaritsu CMA 4500 OTDR may be used.

The efficiency of the laser's cutting action, as well as the completion of the cut, can also be determined by monitoring the ratio of emitted light to the reflected light. Materials undergoing melting, spallation, thermal dissociation, or vaporization will reflect and absorb different ratios of light. The ratio of emitted to reflected light may vary by material further allowing analysis of material type by this method. Thus, by monitoring the ratio of emitted to reflected light material type, cutting efficiency, completeness of cut, and combinations and variation of these may be determined. This monitoring may be performed uphole, downhole, or a combination thereof. Further, a system monitoring the reflected light, the emitted light and combinations thereof may be used to determine the completeness of the laser cut. These, and the other monitoring systems, may be utilized real-time as the cut is being made, or may be utilized shortly after the cut has been made, for example during a return, or second rotation of the laser tool, or may be utilized later in time, such as for example with a separate tool.

An embodiment of a system for monitoring and confirming that the laser cut is complete and, thus, that the laser beam has severed the member, is a system that utilizes the color of the light returned from the cut can be monitored using a collinear camera system or fiber collection system to determine what material is being cut. In the offshore environment it is likely that this may not be a clean signal. Thus, and preferably, a set of filters or a spectrometer may be used to separate out the spectrum collected by the downhole sensor. This spectra can be used to determine in real-time, if the laser is cutting metal, concrete or rock; and thus provide information that the laser beam has penetrated the member, that the cut is in progress, that the cut is complete and thus that the member has been severed.

The conveyance structure may be: a single high power optical fiber; it may be a single high power optical fiber that has shielding; it may be a single high power optical fiber that has multiple layers of shielding; it may have two, three or more high power optical fibers that are surrounded by a single protective layer, and each fiber may additionally have its own protective layer; it may contain or have associated with the fiber a support structure which may be integral with or releasable or fixedly attached to optical fiber (e.g., a shielded optical fiber is clipped to the exterior of a metal cable and lowered by the cable into a borehole); it may contain other conduits such as a conduit to carry materials to assist a laser cutter, for example gas, air, nitrogen, oxygen, inert gases; it may have other optical or metal fiber for the transmission of data and control information and signals; it may be any of the combinations and variations thereof.

The conveyance structure transmits high power laser energy from the laser to a location where high power laser energy is to be utilized or a high power laser activity is to be performed by, for example, a high power laser tool. The conveyance structure may, and preferably in some applications does, also serve as a conveyance device for the high power laser tool. The conveyance structure's design or configuration may range from a single optical fiber, to a simple to complex arrangement of fibers, support cables, shielding on other structures, depending upon such factors as the environmental conditions of use, performance requirements for the laser process, safety requirements, tool requirements both laser and non-laser support materials, tool function(s), power requirements, information and data gathering and transmitting requirements, control requirements, and combinations and variations of these.

The conveyance structure may be, for example, coiled tubing, a tube within the coiled tubing, wire in a pipe, fiber in a metal tube, jointed drill pipe, jointed drill pipe having a pipe within a pipe, or may be any other type of line structure, that has a high power optical fiber associated with it. As used herein the term "line structure" should be given its broadest meaning, unless specifically stated otherwise, and would include without limitation: wireline; coiled tubing; slick line; logging cable; cable structures used for completion, workover, drilling, seismic, sensing, and logging; cable structures used for subsea completion and other subsea activities; umbilicals; cables structures used for scale removal, wax removal, pipe cleaning, casing cleaning, cleaning of other tubulars; cables used for ROV control power and data transmission; lines structures made from steel, wire and composite materials, such as carbon fiber, wire and mesh; line structures used for monitoring and evaluating pipeline and boreholes; and would include without limitation such structures as Power & Data Composite Coiled Tubing (PDT-COIL) and structures such as those sold under the trademarks Smart Pipe® and FLATpak®.

High power long distance laser fibers and laser systems, which are disclosed in detail in US Patent Application Publications 2010/0044106, 2010/0044103, 2010/0044105 and 2010/0215326, and 2012/0020631, the entire disclosures of each of which are incorporated herein by reference, break the length-power-paradigm, and advance the art of high power laser delivery beyond this paradigm, by providing optical fibers and optical fiber cables (which terms are used interchangeably herein and should be given their broadest possible meanings, unless specified otherwise), which may be used as, in association with, or as a part of conveyance structures, that overcome these and other losses, brought about by nonlinear effects, macro-bending losses, micro-bending losses, stress, strain, and environmental factors and provides for the transmission of high power laser energy over great distances without substantial power loss.

Embodiments and teachings regarding high power optical fiber cable, fibers and the systems and components for delivering high power laser energy, separately or in conjunction with other materials, e.g., fluids, data or control information, over great distances from the laser to a remote location for use by a tool, including high powered laser umbilicals, high power laser conveyance structures, high power laser handling apparatus and high power laser deployment systems, are disclosed and taught in US Patent Application Publications No. 2012/0068086, 2010/0044106, 2010/0044103, 2010/0044105, 2010/0215326, 2012/0020631, 2013/0011102, 2012/0248078, 2012/0273269, 2012/0273470, and 2012/0266803 and in U.S. patent application Ser. Nos. 13/782,942 and 13/565,345 the entire disclosures of each of which are incorporated herein by reference. Embodiments of high power laser connectors and couplers are disclosed and taught in US Patent Application Publication No. 2013/0011102, the entire disclosure of which is incorporated herein by reference. These and other embodiments may be used as umbilicals, tethers, conveyance devices, deployment and retrieval devices, devices to transmit work fluids and returns of waste materials, devices to transmit the high power laser beam, devices to send and receive data and information including control information, and combinations and variations of these in relation to or conjunction with the laser tool.

The laser cutting tools and devices that may be utilized for the present removal methods and with, or as a part of, the present removal systems, in general, may have a section for receiving the high power laser energy, such as for example, from a high power connector on a high power fiber, or from an umbilical having a fluid path and a high power fiber. Although single fiber tools and devices are described herein, it should be understood that a cutting tool or device may receive high power laser energy from multiple fibers. In general, the laser cutting tools and devices may have one, or more, optics package or optics assemblies, which shape, focus, direct, re-direct and provide for other properties of the laser beam, which are desirable or intended for a cutting process. Embodiments of high power laser optics, optics assemblies, and optics packages are disclosed and taught in US Patent Application Publication Nos. 2010/0044105, 2012/0275159, 2012/0267168, 2012/0074110, and U.S. Patent Application Ser. Nos. 61/786,687, and Ser. No. 13/768,149, the entire disclosures of each of which is incorporated herein by reference. In general, the laser cutting tools and devices may also have one or more laser cutting heads, having for example a fluid jet, or jets, associated with the laser beam path that laser beam takes upon leaving the tool and traveling toward the material to be cut, e.g., the inside of a conductor. Embodiments of high power laser cutting tools, devices and cutting heads are disclosed and taught in the following US Patent Applications Publication Nos. 2012/0074110 and 2012/0067643; and in U.S. Patent Application Ser. Nos. 61/605,429, 61/605,434, 61/786,687, 61/786,687, 61/798,597, 13/768,149, and Ser. No. 13/565,434, the entire disclosures of each of which are incorporated herein by reference, as well as in, US Patent Applications Publication No. 2010/0044104; and U.S. patent application Ser. No. 13/403,509; 13/366,882; Ser. No. 61/378,910; Ser. No. 61/374,594; and Ser. No. 13/347,445, the entire disclosures of each of which is incorporated herein by reference.

In general, these associated fluid jets in the laser cutting heads find greater applicability and benefit in cutting applications that are being conducted in, or through, a liquid or debris filled environment, such as e.g., an outside-to-inside cut where sea water is present, or an inside-to-outside cut where drilling mud is present. The fluid jets may be a liquid, a gas, a combination of annular jets, where the inner annular jet is a gas and the outer is a fluid, where the inner annular jet and outer annular jets are liquids having predetermined and preferably different indices of refraction. The fluid jets may be a series of discrete jets that are substantially parallel, or converging fluid jets and combinations and variations of these.

Thus, for example an annular gas jet, using air, oxygen, nitrogen or another cutting gas, may have a high power laser beam path within the jet. As this jet is used to perform a linear cut or kerf, a second jet, which trails just behind the gas jet having the laser beam, is used. The paths of these jets may be essentially parallel, or they may slightly converge or diverge depending upon their pressures, laser power, the nature of the material to be cut, the stand off distance for the cut, and other factors.

Additionally, it may be desirable for the laser cutting tools, and especially subsea tools, and preferably in particular tools that may be used in the interior of a jacket member, inside of tubulars, or inside of a conductor, or in other similarly confined and difficult to observe spaces, to have other mechanical, measuring and monitoring components, such as a centralizer, packers, valves for directing cement, valves for pressure testing, a locking device, and sensing devices to determined for example, the conditions of a cut or position of the tool.

Figure 15:
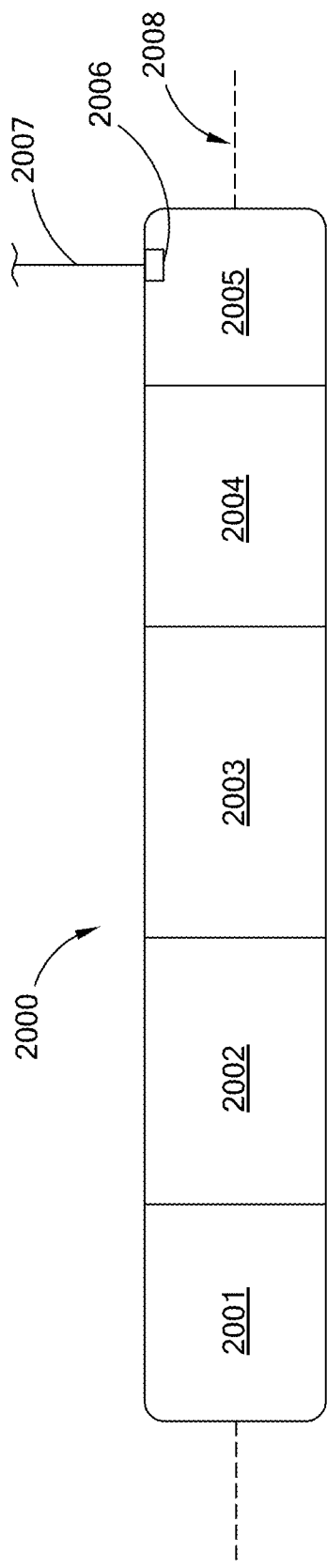
FIG. 15 is a schematic of an embodiment of a laser cutting tool in accordance with the present invention.

Turning to FIG. 15 there is provided a schematic of an embodiment of a laser cutting tool 2000 having a longitudinal axis shown by dashed line 2008. The laser cutting tool 2000 has a conveyance termination section 2001. The conveyance termination section 2000 would receive and hold, for example, a composite high power laser umbilical, a coil tube having for example a high power laser fiber and a channel for transmitting a fluid for the laser cutting head, a wireline having a high power fiber, or a slick line and high power fiber. The laser tool 2000 has an anchor and positioning section 2002. The anchor and positioning section may have a centralizer, a packer, or shoe and piston or other mechanical, electrical, magnetic or hydraulic device that can hold the tool in a fixed and predetermined position longitudinally, axially or both. The section may also be used to adjust and set the stand off distance that the laser head is from the surface to be cut. The laser tool 2000 has a motor section, which may be an electric motor, a step motor, a motor driven by a fluid, or other device to rotate the laser cutter head, or cause the laser beam path to rotate. In this configuration the laser fiber, and fluid path, if a fluid is used in the laser head, must pass by or through the motor section 2003. Motor, optic assemblies, and beam and fluid paths of the types for example that are disclosed and taught in the following US patent application Ser. No. 13/403,509; Ser. No. 13/403,287; Publication No. 2012/0074110; Ser. No. 61/605,434; Ser. No. 13/782,869; and Ser. No. 61/786,687, may be utilized, the entire disclosures of each of which are incorporated herein by reference. There is provided an optics section 2004, which for example, may shape and direct the beam and have optical components such as a collimating element or lens and a focusing element or lens. Optics assemblies, packages and optical elements of the type that are for example disclosed and taught in the following US patent application Ser. No. 13/403,509; Ser. No. 13/782,869; Ser. No. 61/786,687; 61/727,096 and, Ser. No. 13/403,287, may be utilized, the entire disclosure of each of which is incorporated herein by reference. There is provided a laser cutting head section 2005, which directs and moves the laser beam along a laser beam path 2007. In this embodiment the laser cutting head 2005 has a laser beam exit 2006. In operation the laser beam path may be rotated through 360 degrees to perform a complete circumferential cut of a tubular. (It is noted that the laser beam path may be, for example: rotated a single revolution in one direction, e.g., clockwise; rotated in a reciprocal manner, e.g., clockwise for a number of degrees and then counter clockwise for the same, greater or lessor degrees; rotated in multiple revolutions, e.g., 1½ revolutions, 2 revolutions, 3.75 revolutions, 4 revolutions, or more; and combinations and variations of these.) The laser beam path may also be moved along the axis of the tool. The laser beam path also may be scanned or otherwise moved in a pattern during propagation or delivery of the laser beam. In this manner, circular cuts, windows and perforations may be made to a tubular, support member, or for example a conductor. In the embodiment of FIG. 15, as well as other embodiments, the laser beam path 2007 forms a 90 degree angle with the axis of the tool 2008. This angle could be greater than 90 degrees or less then 90 degrees.

Figure 16:
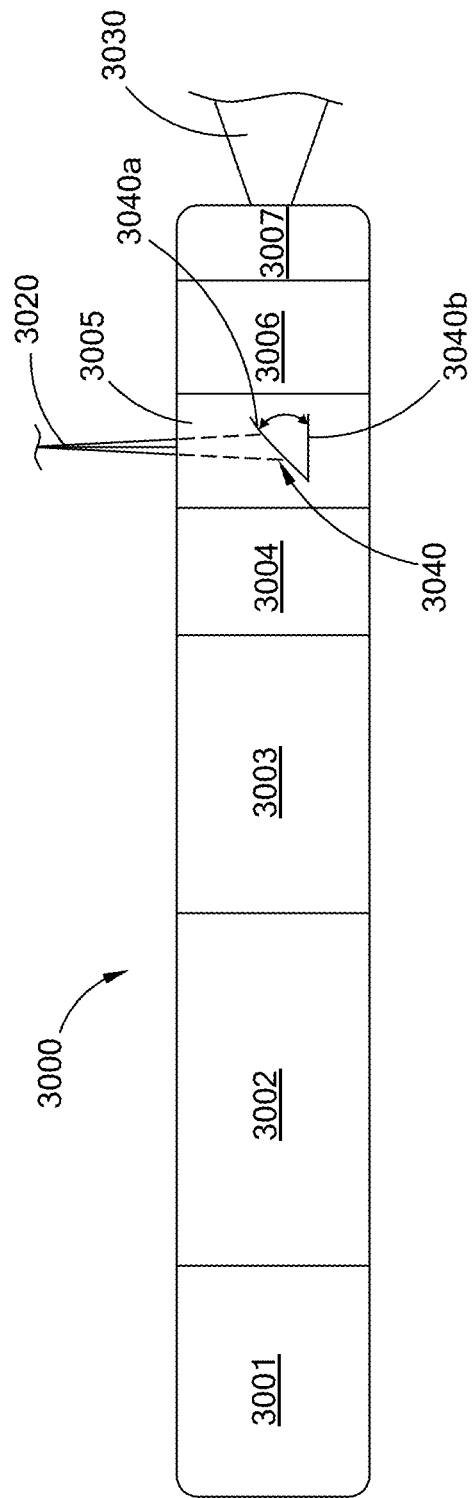
FIG. 16 is a schematic of an embodiment of a laser cutting tool in accordance with the present invention.

Turning to FIG. 16, there is shown an embodiment of a laser cutting tool 3000. The laser cutting tool 3000 has a conveyance termination section 3001, an anchoring and positioning section 3002, a motor section 3003, an optics package 3004, an optics and laser cutting head section 3005, a second optics package 3006, and a second laser cutting head section 3007. The conveyance termination section would receive and hold, for example, a composite high power laser umbilical, a coil tube having for example a high power laser fiber and a channel for transmitting a fluid for the laser cutting head, a wireline having a high power fiber, or a slick line and high power fiber. The anchor and positioning section may have a centralizer, a packer, or shoe and piston or other mechanical, electrical, magnetic or hydraulic device that can hold the tool in a fixed and predetermined position both longitudinally and axially. The section may also be used to adjust and set the stand off distance that the laser head is from the surface to be cut. The motor section may be an electric motor, a step motor, a motor driven by a fluid or other device to rotate one or both of the laser cutting heads or cause one or both of the laser beam paths to rotate. Motor, optic assemblies, and beam and fluid paths of the types for example that are disclosed and taught in the following US patent application Ser. No. 13/403,509; Ser. No. 13/403,287; Publication No. 2012/0074110; Ser. No. 61/605,434; Ser. No. 13/782,869; and Ser. No. 61/786,687, may be utilized, the entire disclosures of each of which are incorporated herein by reference. There is provided an optics section 2004, which for example, may shape and direct the beam and have optical components such as a collimating element or lens and a focusing element or lens. Optics assemblies, packages and optical elements of the type that are for example disclosed and taught in the following U.S. patent application Ser. No. 13/403,509; Ser. No. 13/782,869; Ser. No. 61/786,687; 61/727,096 and, Ser. No. 13/408,287, may be utilized, the entire disclosure of each of which is incorporated herein by reference. The optics and laser cutting head section 3005 has a mirror 3040. The mirror 3040 is movable between a first position 3040*a*, in the laser beam path, and a second position 3040*b*, outside of the laser beam path. The mirror 3040 may be a focusing element. Thus, when the mirror is in the first position 3040*a*, it directs and focuses the laser beam along beam path 3020. When the mirror is in the second position 3040*b*, the laser beam passes by the mirror and enters into the second optics section 3006, where it may be shaped into a larger circular spot (having a diameter greater than the tools diameter), a substantially linear spot, or an elongated epical pattern, as well as other spot or pattern shapes and configurations, for delivery along beam path 3030. The tool of the FIG. 16 embodiment may be used, for example, in the boring, radially cutting and, sectioning method discussed herein, wherein beam path 3030 would be used for axial boring of a structure and beam path 3020 would be used for the axial cutting and segmenting of the structure. Like the embodiment of FIG. 15, the laser beam path 3020 may be rotated and moved axially. The laser beam path 3030 may also be rotated and preferably should be rotated if the beam pattern is other than circular and the tool is being used for boring. The embodiment of FIG. 16 may also be used to clear, pierce, cut, or remove junk or other obstructions from the bore hole to, for example, facilitate the pumping and placement of cement plugs during the plugging of a bore hole.

Figure 17:
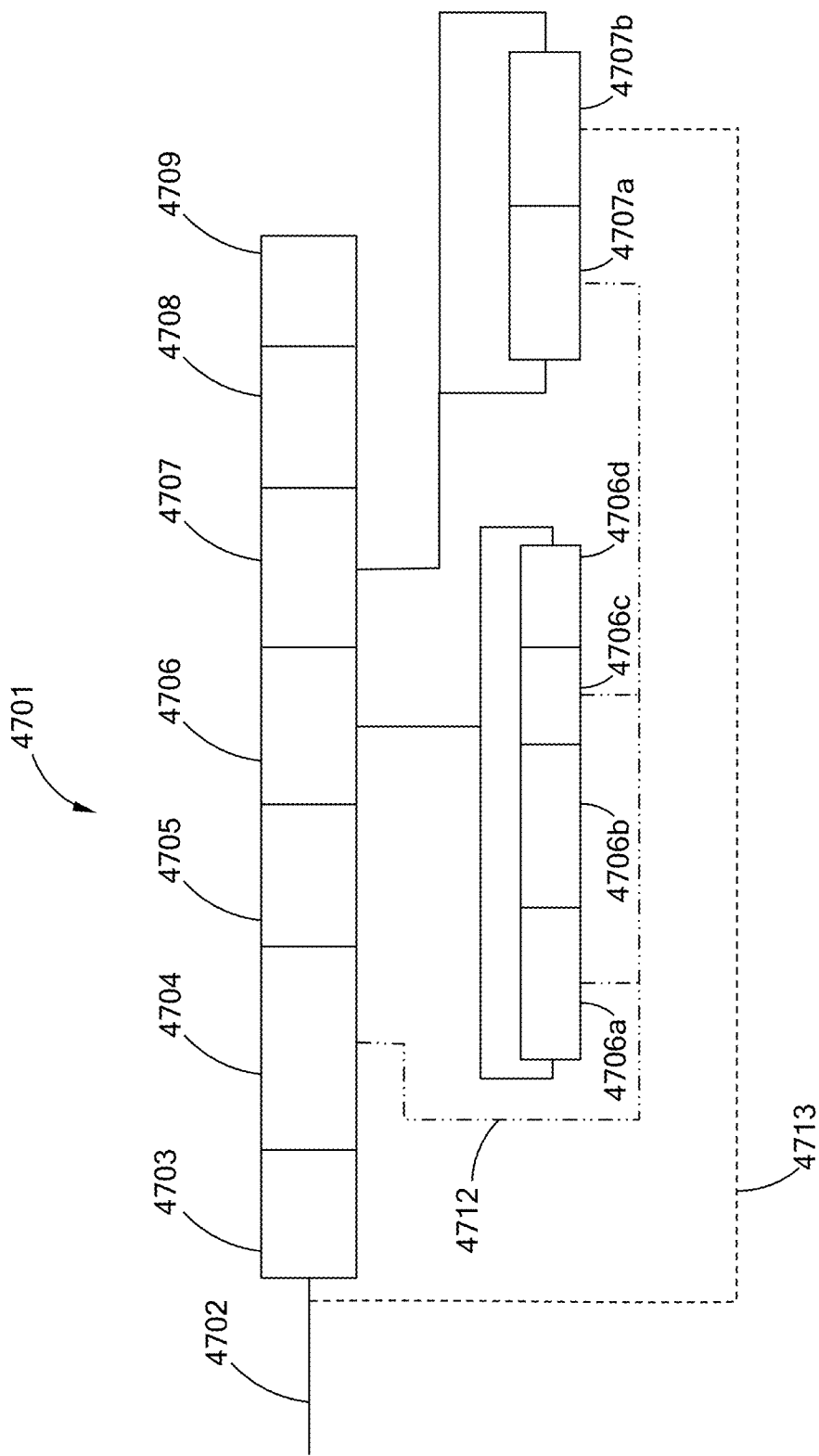
FIG. 17 is a schematic of an embodiment of a laser cutting tool in accordance with the present invention.

Turning to FIG. 17 there is provided a schematic of an embodiment of a laser cutting tool. The laser tool 4701 has a conveyance structure 4702, which may have an E-line, a high power laser fiber, and an air pathway. The conveyance structure 4702 connects to the cable/tube termination section 4703. The tool 4701 also has an electronics cartridge 4704, an anchor section 4705, an hydraulic section 4706, an optics/cutting section (e.g., optics and laser head) 4707, a second or lower anchor section 4708, and a lower head 4709. The electronics cartridge 4704 may have a communications point with the tool for providing data transmission from sensors in the tool to the surface, for data processing from sensors, from control signals or both, and for receiving control signals or control information from the surface for operating the tool or the tools components. The anchor sections 4705, 4708 may be, for example, a hydraulically activated mechanism that contacts and applies force to the borehole. The lower head section 4709 may include a junk collection device, or a sensor package or other down hole equipment. The hydraulic section 4706 has an electric motor 4706*a*, a hydraulic pump 4606*b*, a hydraulic block 4706*c*, and an anchoring reservoir 4706*d*. The optics/cutting section 4707 has a swivel motor 4707*a* and a laser head section

4707*b*. Further, the motors 4704*a* and 4706*a* may be a single motor that has power transmitted to each section by shafts, which are controlled by a switch or clutch mechanism. The flow path for the gas to form the fluid jet is schematically shown by line 4713. The path for electrical power is schematically shown by line 4712. The laser head section 4707*b* preferably may have any of the laser fluid jet heads provided in this specification, it may have a laser beam delivery head that does not use a fluid jet, and it may have combinations of these and other laser delivery heads that are known to the art.

FIGS. 18A and 18B show schematic layouts for cutting systems using a two fluid dual annular laser jet. Thus, there is an uphole section 4801 of the system 4800 that is located above the surface of the earth, or outside of the borehole. There is a conveyance section 4802, which operably associates the uphole section 4801 with the downhole section 4803. The uphole section has a high power laser unit 4810 and a power supply 4811. In this embodiment the conveyance section 4802 is a tube, a bunched cable, or umbilical having two fluid lines and a high power optical fiber. In the embodiment of FIG. 18A the downhole section has a first fluid source 4820, e.g., water or a mixture of oils having a predetermined index of refraction, and a second fluid source 4821, e.g., an oil having a predetermined and different index of refraction from the first fluid. The fluids are fed into a dual reservoir 4822 (the fluids are not mixed and are kept separate as indicated by the dashed line), which may be pressurized and which feeds dual pumps 4823 (the fluids are not mixed and are kept separate as indicated by the dashed line). In operation the two fluids 4820, 4821 are pumped to the dual fluid jet nozzle 4826. The high power laser beam, along a beam path enters the optics 4824, is shaped to a predetermined profile, and delivered into the nozzle 4826. In the embodiment of FIG. 18B a control head motor 4830 has been added and controlled motion laser jet 4831 has been employed in place of the laser jet 4826. Additionally, the reservoir 4822 may not be used, as shown in the embodiment of FIG. 18B.

Turning to FIGS. 19A and 19B there is shown schematic layouts for cutting systems using a two fluid dual annular laser jet. Thus, there is an uphole section 4901 of the system 4900 that is located above the surface of the earth, or outside of the borehole. There is a conveyance section 4902, which operably associates the uphole section 4901 with the downhole section 4903. The uphole section has a high power laser unit 4910 and a power supply 4911 and has a first fluid source 4920, e.g., a gas or liquid, and a second fluid source 4921, e.g., a liquid having a predetermined index of refraction. The fluids are fed into a dual reservoir 4922 (the fluids are not mixed and are kept separate as indicated by the dashed line), which may be pressurized and which feeds dual pumps 4923 (the fluids are not mixed and are kept separate as indicated by the dashed line). In operation the two fluids 4920, 4921 are pumped through the conveyance section 4902 to the downhole section 4903 and into the dual fluid jet nozzle 4926. In this embodiment the conveyance section 4902 is a tube, a bunched cable, or umbilical. For FIG. 19A the conveyance section 4902 would have two fluid lines and a high power optical fiber. In the embodiment of FIG. 19B the conveyance section 4902 would have two fluid lines, an electric line and a high power optical fiber. In the embodiment of FIG. 19A the downhole section has an optics assembly 4924 and a nozzle 4925. The high power laser beam, along a beam path enters the optics 4924, where it may be shaped to a predetermined profile, and delivered into the nozzle 4926. In the embodiment of FIG. 19B a control head motor 4930 has been added and controlled motion laser jet 4931 has been employed in place of the laser jet 4926. Additionally, the reservoir 4922 may not used as shown in the embodiment of FIG. 19B.

Downhole tractors and other types of driving or motive devices may be used with the laser tools to both advance or push the laser down into or along a member to be cut, or to pull the laser tool from the member. Thus, for example a coil tubing injector, an injector assembly having a goose neck and/or straightener, a rotating advancement and retraction device, a dog and piston type advancement and retraction device, or other means to push or pull a coil tubing, a tubular, a drill pipe, integrated umbilical or a composite tubing, which is affixed to the laser tool, may be utilized. In this manner the tool may be precisely positioned for laser cutting. Further, when performing an inside-to-outside cut, if the pile, or other structure is filled with mud, or other semi-solid material, the laser tool may be forced through, e.g., snubbed, the mud to the location where the laser cut is to be performed. For an outside-to-inside cut, this type of forcing may also be utilized when there is mud, debris or similar semi-solid materials present around the outside of the cut that the tool may be pushed through. In this manner the laser cut could be performed without having to go through the added expense and time of removing the mud to expose the cut area. It is noted that a winch, gravity and other means of lowering or advancing the laser tool to the desired position may be employed. These devices can be used to advance the laser tool to a specific location where a laser process, e.g., a laser cut is needed, or they can be used to move the tool, and thus the laser head and beam path to deliver a particular pattern to make a particular cut. Further, these devices may be incorporated into, or otherwise associated with, platforms or structures that are attached to, either permanently or releasably to the top of the pile, well or other structure that is to be cut.

The arrangement and relative positions of sections and components of the laser tools, devices and configurations of the embodiments herein may be varied, intermixed, and additional sections or components may be used and employed without departing from the scope and spirit of the inventions.

Configurations of optical elements for collimating and focusing the laser beam can be employed with laser cutting heads to provide the desired beam properties for a particular application or tool configuration. A further consideration, however, is the management of the optical affects of fluids or debris that may be located within the beam path between laser tool and the work surface, e.g., the surface of the material to be cut.

Thus, it is advantageous to minimize the detrimental effects of such fluids and materials and to substantially ensure, or ensure, that such fluids do not interfere with the transmission of the laser beam, or that sufficient laser power is used to overcome any losses that may occur from transmitting the laser beam through such fluids. To this end, mechanical, pressure and jet type systems may be utilized to reduce, minimize or substantially eliminate the effect of these fluids on the laser beam.

For example, mechanical devices may be used to isolate the area where the laser operation is to be performed and the fluid removed from this area of isolation, by way of example, through the insertion of an inert gas, or an optically transmissive fluid, such as a water, brine, or water solutions. The use of a fluid in this configuration has the added advantage that it is essentially incompressible.

Preferably, if an optically transmissive fluid is employed the fluid will be flowing. In this manner, the overheating of the fluid, from the laser energy passing through it, or from it residing at the cut site, may be avoided or lessened; because the fluid is flowing and not dwelling or residing for extended times in the laser beam or at the cut site, where heating from laser and the laser cut material may occur.

The mitigation and management of back reflections when propagating a laser fluid jet through a fluid, from a cutting head of a laser tool to a work surface, may be accomplished by several methodologies, which are set forth in various embodiments herein. The methodologies to address back reflections and mitigate potential damage from them would include the use of an optical isolator, which could be placed in either collimated space or at other points along the beam path after it is launched from a fiber or connector. The focal point may be positioned such that it is a substantial distance from the laser tool; e.g., greater than 4 inches, greater than 6 inches and greater than 8 inches. Preferably, the focus point may be beyond the fluid jet coherence distance, thus, greatly reducing the likelihood that a focused beam would strike a reflective surface formed between the end of the fluid jet and the medium in which it was being propagated, e.g., a gas jet in water. The laser beam may be configured such that it has a very large depth of focus in the area where the work surface is intended to be, which depth of focus may extend into and preferably beyond the cutting tool. Additionally, the use of an active optical element (e.g., a Faraday isolator) may be employed. Methods, configurations and devices for the management and mitigation of back reflections are taught and disclosed in US Patent Applications Publication No. 2012/0074110 and Ser. No. 61/605,434, the entire disclosures of each of which is incorporated herein by reference.

Moreover, a mechanical snorkel like device, or tube, which is filled with an optically transmissive fluid (gas or liquid) may be extended between or otherwise placed in the area between the laser tool and the work surface or area. Similarly mechanical devices such as an extendable pivot arm may be used to shorten the laser beam path keeping the beam closer to the cutting surface as the cut is advanced or deepened.

A jet of high-pressure gas may be used with the laser beam. The high-pressure gas jet may be used to clear a path, or partial path for the laser beam. The gas may be inert, it may be air, nitrogen, oxygen, or other type of gas that accelerates, enhances, or controls the laser cutting processes.

The use of oxygen, air, or the use of very high power laser beams, e.g., greater than about 1 kW, greater than about 10 kW, and greater than about 20 kW, could create and maintain a plasma bubble, a vapor bubble, or a gas bubble in the laser illumination area, which could partially or completely displace the fluid in the path of the laser beam. If such a bubble is utilized, preferably the size of the bubble should be maintained as small as possible, which will avoid, or minimize the loss of power density.

A high-pressure laser liquid jet, having a single liquid stream, may be used with the laser beam. The liquid used for the jet should be transmissive, or at least substantially transmissive, to the laser beam. In this type of jet laser beam combination the laser beam may be coaxial with the jet. This configuration, however, has the disadvantage and problem that the fluid jet may not act as a wave-guide. A further disadvantage and problem with this single jet configuration is that the jet must provide both the force to keep the drilling fluid away from the laser beam and be the medium for transmitting the beam.

A compound fluid jet may be used in a laser cutting tool. The compound fluid jet has an inner core jet that is surrounded by annular outer jets. The laser beam is directed by optics into the core jet and transmitted by the core jet, which functions as a waveguide. A single annular jet can surround the core, or a plurality of nested annular jets can be employed. As such, the compound fluid jet has a core jet. This core jet is surrounded by a first annular jet. This first annular jet can also be surrounded by a second annular jet; and the second annular jet can be surrounded by a third annular jet, which can be surrounded by additional annular jets. The outer annular jets function to protect the inner core jet from the drill fluid present between the laser cutter and the structure to be cut. The core jet and the first annular jet should be made from fluids that have different indices of refraction.

The angle at which the laser beam contacts a surface of a work piece may be determined by the optics within the laser tool or it may be determined the positioning of the laser cutter or tool, and combinations and variations of these. The laser tools have a discharge end from which the laser beam is propagated. The laser tools also have a beam path. The beam path is defined by the path that the laser beam is intended to take, and can extend from the laser source through a fiber, optics and to the work surface, and would include as the laser path that portion that extends from the discharge end of the laser tool to the material or area to be illuminated by the laser.

In the situation where multiple annular jets are employed, the criticality of the difference in indices of refraction between the core jet and the first (inner most, i.e., closes to the core jet) annular jet is reduced, as this difference can be obtained between the annular jets themselves. However, in the multi-annular ring compound jet configuration the indices of refraction should nevertheless be selected to prevent the laser beam from entering, or otherwise being transmitted by the outermost (furthest from the core jet and adjacent the work environment medium) annular ring. Thus, for example, in a compound jet, having an inner jet with an index of refraction of $n_1$, a first annular jet adjacent the inner jet, the first annular jet having an index of refraction of $n_2$, a second annular jet adjacent to the first annular jet and forming the outer most jet of the composite jet, the second annular jet having an index of refraction of $n_3$. A waveguide is obtained when for example: (i) $n_1 > n_2$; (ii) $n_1 > n_3$; (iii) $n_1 < n_2$ and $n_2 > n_3$; and, (iv) $n_1 < n_2$ and $n_1 > n_3$ and $n_2 > n_3$.

The pressure and the speed of the various jets that make up the compound fluid jet can vary depending upon the applications and use environment. Thus, by way of example the pressure can range from about 100 psi, to about 4000 psi, to about 30,000 psi, to preferably about 70,000 psi, to greater pressures. However, lower pressures may also be used. The core jet and the annular jet(s) may be the same pressure, or different pressures, the core jet may be higher pressure or the annular jets may be higher pressure. Preferably, the core jet is at a higher pressure than the annular jet. By way of example, in a multi-jet configuration the core jet could be 70,000 psi, the second annular jet (which is positioned adjacent the core and the third annular jet) could be 60,000 psi and the third (outer, which is positioned adjacent the second annular jet and is in contact with the work environment medium) annular jet could be 50,000 psi. The speed of the jets can be the same or different. Thus, the speed of the core can be greater than the speed of the annular jet, the speed of the annular jet can be greater than the speed of the core jet and the speeds of multiple annular jets can be different or the same. The speeds of the core jet and the annular jet can be selected, such that the core jet does contact the drilling fluid, or such contact is minimized. The speeds of the jet can range from relatively slow to very fast and preferably range from about 1 m/s (meters/second) to about 50 m/s, to about 200 m/s, to about 300 m/s and greater. The order in which the jets are first formed can be the core jet first, followed by the annular rings, the annular ring jet first followed by the core, or the core jet and the annular ring being formed simultaneously. To minimize, or eliminate, the interaction of the core with the drilling fluid, the annular jet is created first followed by the core jet.

In selecting the fluids for forming the jets and in determining the amount of the difference in the indices of refraction for the fluids, the wavelength of the laser beam and the power of the laser beam are factors that should be considered. Thus, for example, for a high power laser beam having a wavelength in the 1070 nm (nanometer) range the core jet can be made from an oil having an index of refraction of about 1.53 and the annular jet can be made from water having an index of refraction from about 1.33 or another fluid having an index less than 1.53. Thus, the core jet for this configuration would have an NA (numerical aperture) from about 0.12 to about 0.95, respectively.

The number of laser cutters utilized in a configuration of the present inventions can be a single cutter, two cutters, three cutters, and up to and including 12 or more cutters. As discussed above, the number of cutters depends upon several factors and the optimal number of cutters for any particular configuration and end use may be determined based upon the end use requirements and the disclosures and teachings provided in this specification. The cutters may further be positioned such that their respective laser beam paths are parallel, or at least non-intersecting within the center axis of the member to be cut.

Focal lengths may vary for example from about 40 mm (millimeters) to about 2,000 mm, and more preferably from about 150 mm to about 1,500 mm, depending upon the application, material type, material thickness, and other conditions that are present during the cutting. The jet velocity may be about 100 to The mirror may be any high power laser optic that is highly reflective of the laser beam wavelength, can withstand the operational pressures, and can withstand the power densities that it will be subjected to during operation. For example, the mirror may be made from various materials. For example, metal mirrors are commonly made of copper, rhodium, polished and coated with polished gold, nickel, aluminum, or silver and sometime may have dielectric enhancement. Mirrors with glass substrates may often be made with fused silica because of its very low thermal expansion. The glass in such mirrors may be coated with a dielectric HR (highly reflective) coating. The HR stack as it is known, includes of layers of high/low index layers made of $SiO_2$, $Ta_2O_5$, $ZrO_2$, MgF, $Al_2O_3$, $HfO_2$, $Nb_2O_5$, $TiO_2$, $Ti_2O_3$, $WO_3$, SiON, $Si_3N_4$, Si, or $Y_2O_3$ (All these materials would work for may wave lengths, including 1064 nm to 1550 nm). For higher powers, such as 50 kW actively cooled copper mirrors with gold enhancements may be used. It further may be water cooled, or cooled by the flow of the gas. Preferably, the mirror may also be transmissive to wavelengths other than the laser beam wavelength. In this manner an optical observation device, e.g., a photo diode, a camera, or other optical monitoring and detection device, may be placed behind it.

During operations, and in particular when the laser tool is being operated in a fluid filled or dirty environment, the air flow should be maintained into the laser head and out the nozzle with sufficient pressure and flow rate to prevent environmental contaminants or fluid from entering into the nozzle, or contaminating the mirror or optics. A shutter, or door that may be opened and closed may also be used to protect or seal the nozzle opening, for example, during tripping into and out of a borehole. A disposable cover may also be placed over the nozzle opening, which is readily destroyed either by the force of the gas jet, the laser beam or both. In this manner, the nozzle, mirror and optics can be protecting during for example a long tripping in to a borehole, but readily removed upon the commencement of downhole laser cutting operations, without the need of mechanical opening devices to remove the cover.

The reflective member in embodiments of laser tools and laser cutting heading heads may be a prism, and preferably a prism that utilizes total internal reflection (TIR). Thus, and in general, the prism is configured within the tool such that a high power laser beam is directed toward a first face or surface of the prism. The prism may be made of fused silica, sapphire, diamond, calcium chloride, or other such materials capable of handling high power laser beams and transmitting them with little, low or essentially no absorbance of the laser beam. The plane of first face is essentially normal to the laser beam and has an antireflective (AR) coating. This angle may vary from 90 degrees, by preferably no more than 5 degrees. Large angles of variation are contemplated, but less preferred, because specific AR coatings and other means to address reflection, refraction will need to be utilized. A key advantage in this embodiment is that the AR coatings have a much lower absorption than an (highly reflective) HR coating as a consequence there is substantially less heating in the substrate when using and AR coating. The entrance and exit of the prism should have AR coating matched to the medium of transmission and the angle of incidence of the laser beam should satisfies the TIR condition to cause the beam to be deflected in a different direction. Multiple TIR reflections can be used to make the total desired angle with virtually no loss, and essentially no loss, in power at each interface.

Upon entering the prism, the laser beam travels through the prism material and strikes a second surface or face, e.g., the hypotenuse, of the prism. The material on the outside this second face has an index of refraction, which in view of the angle at which the laser beam is striking the second face, result in total internal reflection (TIR) of the laser beam within the prism. Thus, the laser beam travels from the second face to the third face of the prism and leaves the prism at an angle that is about 90 degrees to the path of the laser beam entering the prism. In this manner, the prism utilizes TIR to change the direction of the laser beam within the tool. Depending upon the position of the prism relative to the incoming laser beam and other factors, the angle of the exiting laser beam from the prism relative to the incoming laser beam into the prism may be greater than or less than 90 degrees, e.g., 89 degrees, 91 degrees, 92 degrees, and 88 degrees, with the minimum angle being dependent on the refractive index of the material and the TIR condition, etc. Further embodiments of TIR prisms in laser tools are taught and disclosed in U.S. patent application Ser. No. 13/768,149 and Ser. No. 61/605,434, the entire disclosures of which are incorporated herein by reference.

By way of example, the types of laser beams and sources for providing a high power laser beam may, by way of example, be the devices, systems, and beam shaping and delivery optics that are disclosed and taught in the following US Patent Applications and US Patent Application Publications: Publication No. 2010/0044106; Publication No. 2010/

0044105; Publication No. 2010/0044103; Publication No. 2010/0044102; Publication No. 2010/0215326; Publication No. 2012/0020631; Publication No. 2012/0068086; Publication No. 2012/0261188; Publication No. 2012/0275159; Publication No. 2013/0011102; Ser. No. 13/210,581; Ser. No. 13/403,132; Ser. No. 13/403,509; Ser. No. 13/486,795; Ser. No. 61/734,809; and Ser. No. 61/786,763, the entire disclosures of each of which are incorporated herein by reference. The source for providing rotational movement, for example may be a string of drill pipe rotated by a top drive or rotary table, a down hole mud motor, a down hole turbine, a down hole electric motor, and, in particular, may be the systems and devices disclosed in the following US Patent Applications and US Patent Application Publications: Publication No. 2010/0044106, Publication No. 2010/0044104; Publication No. 2010/0044103; Ser. No. 12/896,021; Publication No. 2012/0267168; Ser. No. 13/403,509; 13/403,287; Ser. No. 61/798,597; and Ser. No. 13/211,729, the entire disclosures of each of which are incorporated herein by reference.

By way of example, umbilicals, high powered optical cables, and deployment and retrieval systems for umbilical and cables, such as spools, optical slip rings, creels, and reels, as well as, related systems for deployment, use and retrieval, are disclosed and taught in the following US Patent Applications and Patent Application Publications: Publication No. 2010/0044104; Publication No. 2010/0044106; Publication No. 2010/0044103; Publication No. 2012/0068086; Publication No. 2012/0273470; Publication No. 2010/0215326; Publication No. 2012/0020631; Publication No. 2012/0074110; Ser. No. 13/782,942; Ser. No. 13/403,692; and, Ser. No. 13/403,723, the entire disclosures of each of which is incorporated herein by reference, and which may preferably be used as in conjunction with, or as a part of, the present tools, devices, systems and methods and for laser removal of an offshore or other structure. Thus, the laser cable may be: a single high power optical fiber; it may be a single high power optical fiber that has shielding; it may be a single high power optical fiber that has multiple layers of shielding; it may have two, three or more high power optical fibers that are surrounded by a single protective layer, and each fiber may additionally have its own protective layer; it may contain other conduits such as a conduit to carry materials to assist a laser cutter, for example oxygen; it may have conduits for the return of cut or waste materials; it may have other optical or metal fiber for the transmission of data and control information and signals; it may be any of the combinations set forth in the forgoing patents and combinations thereof.

In general, the optical cable, e.g., structure for transmitting high power laser energy from the system to a location where high power laser activity is to be performed by a high power laser tool, may, and preferably in some applications does, also serve as a conveyance device for the high power laser tool. The optical cable, e.g., conveyance device can range from a single optical fiber to a complex arrangement of fibers, support cables, armoring, shielding on other structures, depending upon such factors as the environmental conditions of use, tool requirements, tool function(s), power requirements, information and data gathering and transmitting requirements, etc.

Generally, the optical cable may be any type of line structure that has a high power optical fiber associated with it. As used herein the term line structure should be given its broadest construction, unless specifically stated otherwise, and would include without limitation, wireline, coiled tubing, logging cable, umbilical, cable structures used for completion, workover, drilling, seismic, sensing logging and subsea completion and other subsea activities, scale removal, wax removal, pipe cleaning, casing cleaning, cleaning of other tubulars, cables used for ROV control power and data transmission, lines structures made from steel, wire and composite materials such as carbon fiber, wire and mesh, line structures used for monitoring and evaluating pipeline and boreholes, and would include without limitation such structures as Power & Data Composite Coiled Tubing (PDT-COIL) and structures such as Smart Pipe®. The optical fiber configurations can be used in conjunction with, in association with, or as part of a line structure.

Generally, these optical cables may be very light. For example an optical fiber with a Teflon shield may weigh about ⅔ lb per 1000 ft, an optical fiber in a metal tube may weight about 2 lbs per 1000 ft, and other similar, yet more robust configurations may way as little as about 5 lbs or less, about 10 lbs or less, and about 100 lbs or less per 1,000 ft. Should weight not be a factor, and for very harsh, demanding and difficult uses or applications, the optical cables could weight substantially more.

By way of example, the conveyance device or umbilical for the laser tools transmits or conveys the laser energy and other materials that are needed to perform the operations. It may also be used to handle any waste or returns, by for example having a passage, conduit, or tube incorporated therein or associated therewith, for carrying or transporting the waste or returns to a predetermined location, such as for example to the surface, to a location within the structure, tubular or borehole, to a holding tank on the surface, to a system for further processing, and combinations and variations of these. Although shown as a single cable multiple cables could be used. Thus, for example, in the case of a laser tool employing a compound fluid laser jet the conveyance device could include a high power optical fiber, a first line for the core jet fluid and a second line for the annular jet fluid. These lines could be combined into a single cable or they may be kept separate. Additionally, for example, if a laser cutter employing an oxygen jet is utilized, the cutter would need a high power optical fiber and an oxygen, air or nitrogen line. These lines could be combined into a single tether or they may be kept separate as multiple tethers. The lines and optical fibers should be covered in flexible protective coverings or outer sheaths to protect them from fluids, the work environment, and the movement of the laser tool to a specific work location, for example through a pipeline or down an oil, gas or geothermal well, while at the same time remaining flexible enough to accommodate turns, bends, or other structures and configurations that may be encountered during such travel.

By way of example, one or more high power optical fibers, as well as, lower power optical fibers may be used or contained in a single cable that connects the tool to the laser system, this connecting cable could also be referred to herein as a tether, an umbilical, wire line, or a line structure. The optical fibers may be very thin on the order of hundreds e.g., about greater than 100, of μm (microns). These high power optical fibers have the capability to transmit high power laser energy having many kW of power (e.g., 5 kW, 10 kW, 20 kW, 50 kW or more) over many thousands of feet. The high power optical fiber further provides the ability, in a single fiber, although multiple fibers may also be employed, to convey high power laser energy to the tool, convey control signals to the tool, and convey back from the tool control information and data (including video data) and cut verification, e.g., that the cut is complete. In this manner the high power optical fiber has the ability to perform, in a single very thin, less than for example 1000 µm diameter fiber, the functions of transmitting high power laser energy for activities to the tool, transmitting and receiving control information with the tool and transmitting from the tool data and other information (data could also be transmitted down the optical cable to the tool). As used herein the term "control information" is to be given its broadest meaning possible and would include all types of communication to and from the laser tool, system or equipment.

Generally, it is preferred that when cutting and removing large structures, such as, e.g., multi-string caissons, jackets, piles, and multi-string conductors, requires that after the cut is performed, that the completeness of cut be verified before a heavy lift ship is positioned and attached for the lift, e.g., hooked up, to remove the sectioned portion. If the cut is not complete, and thus, the sectioned portion is still attached to the rest of the structure, the lift ship will not be able to lift and remove the sectioned portion from the structure. Heavy lifting vessels, e.g., heavy lift ships, can have day rates of hundreds-of-thousands of dollars. Thus, if a cut is not complete, the heavy lift ship will have to be unhooked and kept on station while the cutting tool is repositioned to complete the cut and then the heavy lift ship is moved back in and re-hooked up to remove the sectioned portion. During the addition time period for unhooking, completing the cut and re-hooking, the high day rate is being incurred. Additionally, there are safety issues that may arise if a lift cannot be made because of an incomplete cut. Therefore, with a laser cut, as well as with conventional cutting technology it is important to verify the completeness of the cut. Preferably, this verification can be done passively, e.g., not requiring a mechanical probing, or a test lift. More preferably the passive verification is done in real-time, as the cut is being made.

In the laser cutting process, a high power laser beam is directed at and through the material to be cut with a high pressure fluid, e.g., gas, jet for, among other things, clearing debris from the laser beam path. The laser beam may generally be propagated by a long focal length optical system, with the focus either midway through the material or structure to be cut, or at the exit of the outer surface of that material or structure. When the focus is located midway through the material or structure, there is a waist in the hole that the laser forms in that material or structure, which replicates the focal point of the laser. This waist may make it difficult to observe the cut beyond this point because the waist can be quite small. The waist may also be located in addition to midway through, at other positions or points along the cut line, or cut through the material.

A laser radar system using a near diffraction limited diode laser source or q-switched laser can be aligned to be co-linear with the high energy laser beam and it can be used to probe the cut zone and provide passive, real-time monitoring and cut verification. A near-diffraction limited sourced for the laser radar system is preferred, but not essential, because it can create a laser beam that is significantly smaller in diameter than the high power laser beam and as a consequence can probe the entire length of the cut without interference. Although the laser radar laser beam is preferably coaxial with the cutting laser beam, it may also be scanned or delivered on a separate beam path. The laser radar laser beam may also be bigger in diameter than the high energy laser beam to, for example, image the entire cut. The signal that is reflected from the cut zone is analyzed with a multi-channel analyzer, which tracks how many hits are obtained at a specific range and velocity. Any signal returns that indicate a near zero velocity, or a velocity consistent with the penetration rate of the high power laser, will be either the grout or steel surface to be cut. High velocity returns will correspond to the debris being stirred up by the high pressure jet and negative velocities will be the inflow of fluid from the penetration zone.

The laser radar will have a laser source, a very narrow-band filter, a high speed pulse power supply, a high speed detector, a timer, a counter and a multi-channel analyzer system. A multi-channel analyzer system is not essential, but is preferred and provides a convenient means to sort the data into useful information. The laser radar can be a laser source that is a significantly different wavelength than the high power laser ranging from the visible to the infrared wavelengths. As long as the radar laser wavelength is sufficiently outside of the high power laser spectrum band, then the laser radar signal can be isolated with a high quality narrow band-pass filter of 1 nm in width or less. If a laser diode is used as the source, the laser diode will be stabilized in wavelength by an external grating, etalon or dispersive element in the cavity. Bragg Gratings have shown that ability to stabilize a laser diode to 1 pico-meter, significantly more stable than needed for this application.

The laser radar can operate in, for example, two modes: 1) time of flight and 2) phase delay in a pseudo-random continuous modulation format. The laser radar can determine the velocity of the return using, for example, one of two methods: 1) the difference between two consecutive distance measurements divided by the time delay between the two measurements, or 2) a Doppler frequency shift caused by the particle moving either away or toward the observer. The post processing of the raw data can be used to determine if the laser radar is measuring the advancement of the laser cutting zone, the inflow of external mud or the outflow of debris and gas.

The laser radar could also be employed in a liquid jet based design. However, the time of flight is now a strong function of the refractive index of the fluid, which changes with pressure and temperature. Therefore, these characteristics of the liquid media being used during the cutting process should be understood and addressed in the design of the laser radar system for a liquid laser jet cut.

It may also be possible to use cameras and spectrometers to image the exit of the cut once the laser has penetrated the outer casing. Similarly, X-ray Fluorescence, eddy current detectors, Optical Coherence Tomography, and ultra sound as potential solutions, may also be used for real-time and real-time passive cut verification, however, for these approaches the solid angle represents a more significant issue than for the laser radar system, making that system preferable. Further, these systems are, or may be, more complex than the laser radar system, which may make them more difficult to integrate and harden for down-hole deployment and use.

Although not specifically shown in the embodiment of the figures and examples, break detection and back reflection monitory devices and systems may be utilized with, or integrated into the present tools, umbilicals, optical cables, deployment and retrieval systems and combinations and variation so these. Examples of such break detection and monitoring devices, systems and methods are taught and disclosed in the following US Patent Application: Ser. No. 13/486,795, Publication No. 2012/00074110 and Ser. No. 13/403,723, and US Patent Application Publication No. 2010/0044106, the entire disclosures of each of which are incorporated herein by reference.

By way of example, the laser systems of the present invention may utilize a single high power laser, or they may have two or three high power lasers, or more. The lasers may be continuous or pulsed (including, e.g., when the lasing occurs in short pulses, and a laser capable of continuous lasing fired in short pulses). High power solid-state lasers, specifically semiconductor lasers and fiber lasers are preferred, because of their short start up time and essentially instant-on capabilities. The high power lasers for example may be fiber lasers or semiconductor lasers having 5 kW, 10 kW, 20 kW, 50 kW or more power and, which emit laser beams with wavelengths in the range from about 455 nm (nanometers) to about 2100 nm, preferably in the range about 800 nm to about 1600 nm, about 1060 nm to 1080 nm, 1530 nm to 1600 nm, 1800 nm to 2100 nm, and more preferably about 1064 nm, about 1070-1083 nm, about 1360 nm, about 1455 nm, 1490 nm, or about 1550 nm, or about 1900 nm (wavelengths in the range of 1900 nm may be provided by Thulium lasers). Thus, by way of example, the present tools, systems and procedures may be utilized in a system that is contemplated to use four, five, or six, 20 kW lasers to provide a laser beam in a laser tool assembly having a power greater than about 60 kW, greater than about 70 kW, greater than about 80 kW, greater than about 90 kW and greater than about 100 kW. One laser may also be envisioned to provide these higher laser powers. Examples of preferred lasers, and in particular solid-state lasers, such as fibers lasers, are disclosed and taught in the following US Patent Applications and US Patent Application Publications Publication No. 2010/0044106, Publication No. 2010/0044105, Publication No. 2010/0044103, Publication No. 2013/0011102, Publication No. 2010/0044102, Publication No. 2010/0215326, Publication No. 2012/0020631, 2012/0068006, Ser. No. 13/210,581, Ser. No. 61/734,809, and Ser. No. 61/786,763, the entire disclosures of each of which are incorporated herein by reference. Additionally, a self-contained battery operated laser system may be used. This system may further have its own compressed gas tanks, and be submergible, and may also be a part of, associated with, or incorporation with, an ROV, or other sub-sea tethered or free operating device.

EXAMPLES

The following examples are provide to illustrate various devices, tools, configurations and activities that may be performed using the high power laser tools, devices and system of the present inventions. These example are for illustrative purposes, and should not be view as, and do not otherwise limit the scope of the present inventions.

Example 1

Figure 20:
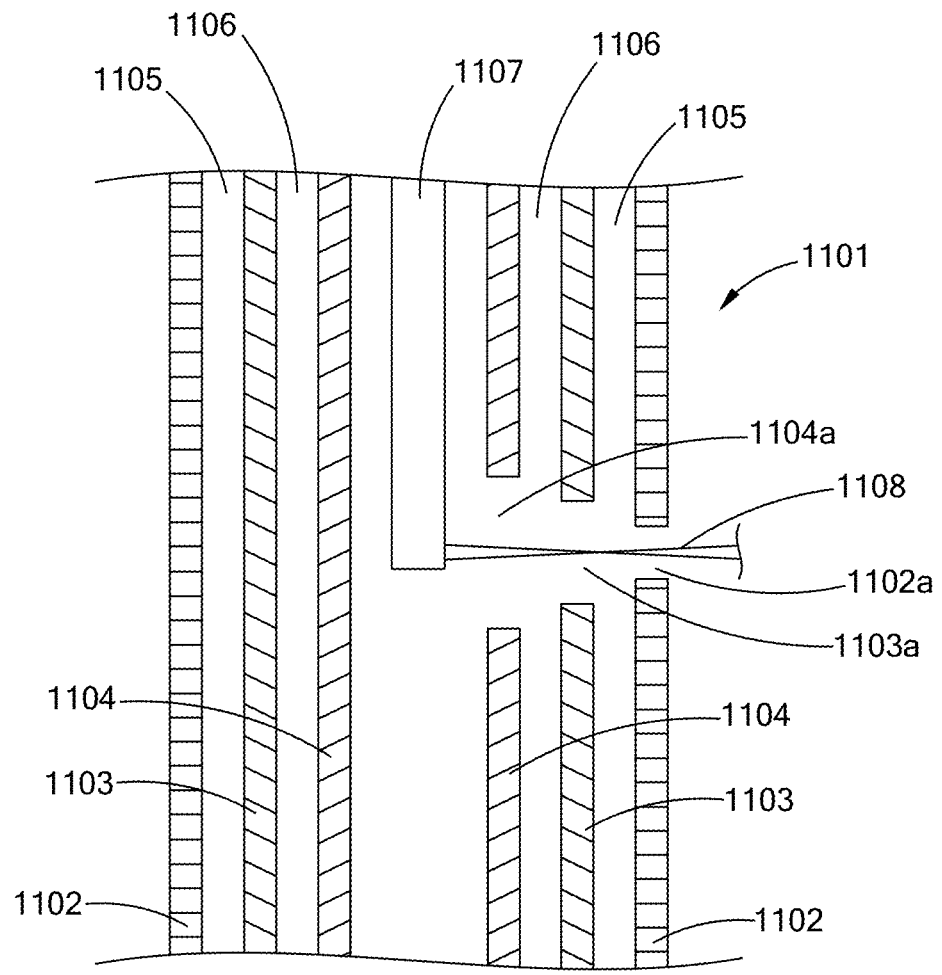
FIG. 20 is a cross sectional view of an embodiment of a laser cutting tool and an embodiment of a process in accordance with the present invention.

In this example, there is provided a method of cutting through a conductor having multiple tubulars and annular areas. Thus, turning to FIG. 20 there is shown a configuration of tubulars 1101, having a conductor 1102, a first annulus 1105, an inner casing 1103, a second annulus 1106 and an internal casing 1104. The annuli 1105, 1106 may be open space, contain cement, a drilling fluid, or combinations and variations of these. The laser cutting tool 1107, has a gas jet laser cutting head, which directs a laser beam and gas jet along path 1108. The internal casing 1104 is cut using two, three, four or more passes of the laser to create an area of removed material 1104*a*. (Only the beginning of the cuts are shown in FIG. 20, it being understood that each of these cuts would preferably extend around the circumference of the casing and thus the removed material would be a ring) The inner casing 1103 is cut using fewer passes of the laser to create a smaller area of removal 1103*a*. The conductor is then cut using fewer passes, or preferably a single pass, to create a smaller area of removal 1102*a*. In this manner, the surface effects, which may be detrimental to the integrity of the jet, that are caused by the edges of the tubular boarding an area of removal will be avoided, because each successive tubular has a narrow cut. This stepped method of cutting may preferably be utilized for a gas jet when the annular areas are open space, and may also be utilized when the annular areas are filled, e.g., contain other materials, such as cement.

Example 2

In this example a laser removal system may be used to assist in the plugging abandonment and decommission of a subsea field. The field is associated with a floating spar platform. Two mobile containers are transported to the spar platform, containing a laser module, and a work container have laser cutting tools, devices, umbilicals and other support materials. The laser module obtains its power from the spar platform's power generators or supplied power generation. The laser cutting tools are lowered by the spars hoisting equipment, to the seafloor, where they are lowered into a first well that has been plugged, the laser tool directs a high power laser beam, having about 15 kW of power, in a nitrogen jet, around the interior of the well. The laser beam and jet in a single pass severs all of the tubulars in the well at about 15 feet below the mud line. This process is repeated for the remaining wells in the field that are to be abandoned.

Example 3

A laser removal system may be used to recover 15,000 feet of 3½" and 4½" tubing from a total of six weds. The laser removal system is used in conjunction with and interfaces with the existing platform and hoisting equipment. As the tubing is pulled it is quickly cut in to lengths of 30 to 35 feet, by a laser cutting device on the platform's floor. This avoids the use and associated cost of a separate rig and could allow for the reuse of tubulars in future projects.

Example 4

A laser decommissioning vessel may be used to remove a subsea 30" multi-string casing stub that is covered with debris (sand bags) and is wedged and bent against an operating pipeline and is located at a depth of 350 feet. The inner casing string, 13¾", in the multi-string stub is jammed with an unknown material starting at about 1 foot below the sea floor that could not be removed by jetting. All strings of casing in the multi-string stub are fully cemented. A laser removal system and tool is used to remove this stub without the need for dredging. A laser tool having two beam paths, a boring beam path and a severing beam path, is used to first bore through the jammed material in the inner casing string. This provides access for the tool down to 18 feet below the sea floor. The tool then severs the multi-string stub in 3-foot sections, until the stub is removed to 15 feet below the sea floor. The smaller, 3 foot sections are used to accommodate the use of a smaller and less expensive hoisting equipment. Additionally, because the structural integrity of the stub is unknown multiple smaller sections are lifted instead of a single 15-foot section.

Example 5

A heavy lifting vessel having for example a crane with a lifting capacity in excess of 500 tons is stationed by a fixed platform in 1,000 feet of water. The heavy lifting vessel is used to remove the deck and top structures of the platform. Upon removal of these structures the heavy lifting vessel is no longer needed and leaves the site. As the heavy lifting vessel leaves the site, a smaller laser cutting system is stationed at the site. The laser cutting system provides the ability to make safe, easy, predetermined cuts, and thus to cut the jacket into small, manageable pieces, which can be removed without the need for the heavy lifting vessel. In this manner the laser removal system and method allows for systematic removal of the jacket in smaller, easily handled pieced, starting from the top, and moving down.

Example 6

Figure 21:
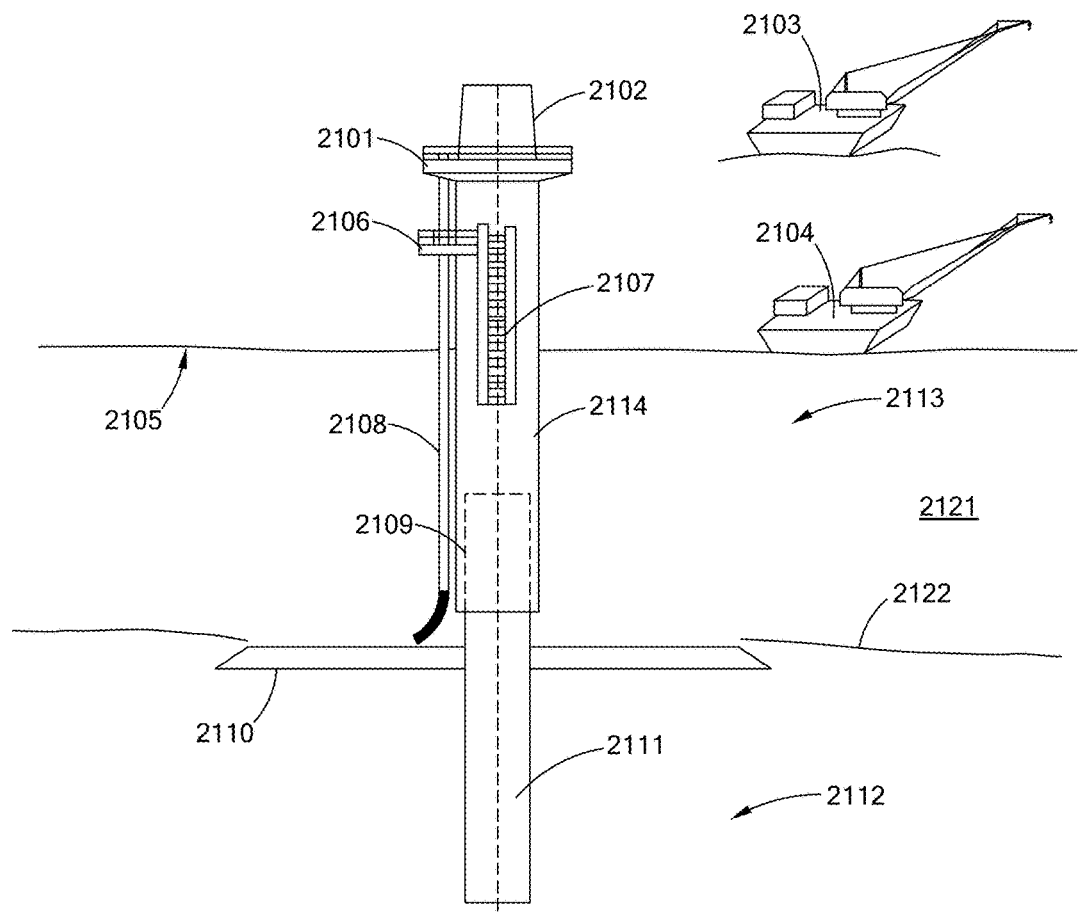
FIG. 21 is a schematic of an embodiment of a monopile structure and associated laser decommissioning system in accordance with the present invention.

Turning to FIG. 21, there is shown a schematic of an example of a monopile structure and associated foundation with a laser decommissioning vessel and a support vessel on station. Thus, the monopole has a tower 2102, having a work platform 2101, an intermediate platform 2106 and a boat landing 2107 are above the surface 2105 of a body of water 2121. The tower 2102 extends over a monopile 2111, which extends through a scour protection member 2110, into and below the seabed 2112. Thus, the tower 2102 extends from within the body of water 2121 to above the surface 2105 of the body of water 2121. The structure may be viewed as having several sections or areas: a substructure area shown by arrow 2113, a foundation area shown by arrow 2112, and a transition area 2114. There is also a grout area 2109 where the tower 2102 is grouted to the monopile 2111. The structure also has an external J tube 2108. Although one support vessel 2103 and one laser decommission vessel 2104 are shown, it should be understood that they may be a single vessel or other vessels or types of vessels, in addition to the two that are shown in the figure. The wells are first plugged as required by regulations for the particular area. The conductors, production pipe and other tubulars within the monopile 2111 and tower 2102 are cut with a laser tool. For example the laser tool of the embodiment of FIG. 34 would cut the conductors internal to external at 15 feet below the mudline. Following the removal of the all internal and external components of the monopile, the topside of the work platform 2101, and the tower 2102, down to below the subsea transition 2114 would be removed via a laser. The upper section now being removed allows for clear diver access to remove the subsea internal centralizer (not shown) as well as clear access to have the mud plug jetted from the pile down to 15 to 20 feet below the seafloor. Upon clear access down to 15 feet below the seafloor a laser tool would cut the monopile internal to external. Outside in laser cutting may also be performed, for example if obstructions prevented a tool from accessing the monopile internally and it was determined for some reason that this obstruction would not be removed with a differently configured laser tool, for example having a forward propagating beam path as shown in the embodiment of FIG. 16. For the internal cut a fluid, and preferable one that is transmissive to, or substantially transmissive to the laser, such as water, salt water, mineral oil, or diesel, may be jetted and pumped from the inside of the monopile to a sufficient amount, level to provide access to the intended laser cut area. For the external cut the material around the monopile may be dredge out to provide access for the laser cutting tool, or a tool that is capable of being forced through the mud may be used. The transition section may also be cut with the laser tool and removed in one or more sections, or if the transition piece is grouted or otherwise affixed to the monopile the assembly may be removed with one lift. One of the advantages of the laser plugging and abandonment procedure is the ability to have predetermined and precise and efficient sectioning of large sections of these structures to smaller more easily, and cost effectively, handled sections.

Example 7

The laser cutting systems and tools are used to remove a subsea system, including subsea pipeline end manifolds (PLEMs) and subsea pipeline end terminals (PLETs), and/or subsea production equipment, e.g., controls, templates, skids, separators and other such types of equipment that may be located on the sea floor. Laser PIGs, of the type disclosed in U.S. patent application Ser. No. 13/366,882 may also be used in this process.

Example 8

The laser cutting systems and tools are used to cut and section portions of a platform deck that are located above the surface of a body of water. The laser cutters may split the deck in half, or in smaller sections, to provide for lighter sections to be lifted. These cuts may be either inside, outside in, or combinations of these depending upon the type of structures, e.g., I-beams, tubular members, deck legs to pile tops, etc., that the deck and above water line structure is made up of.

Example 9

Figure 22:
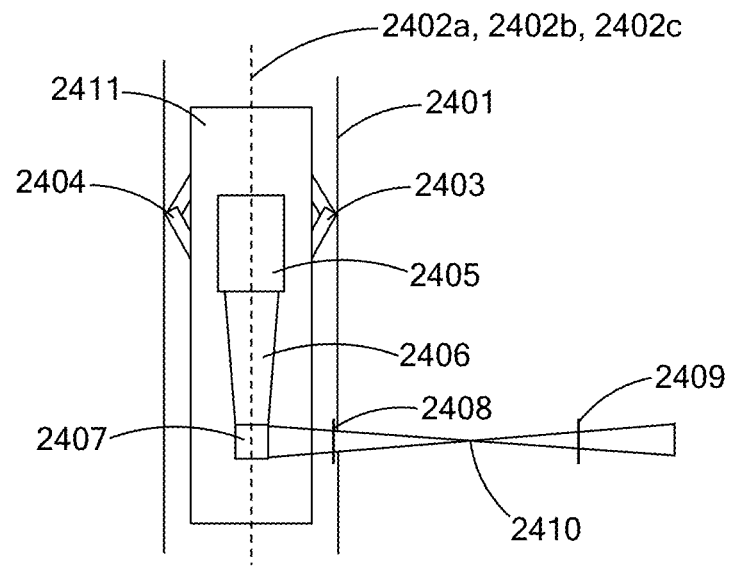
FIG. 22 is a schematic of an embodiment of a laser tool in accordance with the present invention.

Turning to FIG. 22 there is provided an embodiment of a laser cutting tool that may be used to perform laser removal operations, such as cutting for plugging, removal, abandonment, decommissioning, repair and refurbishment operations. Thus, there is provided a laser tool having a body 2411, which is positioned inside of an inner surface 2401 of a tubular, e.g., a pile, a pile and conductor, a multi-string conductor, and combinations and variations of these, to be cut. The laser tool body 2411 has an optic package 2405, that focuses and directs the laser beam along beam path 2406 to a reflective device, 2407, for example a TIR reflective prism. The laser beam traveling along the beam path leaves the reflective device 2407 and travels toward the target, e.g., the intended area of laser illumination.

To obtain deep cuts, the beam has a long depth of field, and thus has a first spot size at 2408, which is in the area of the inner surface of the tubular 2401, a focus point 2410 which is removed from the inner surface of tubular 2401 and a second spot size 2409, which is removed from the focal point 2410. In this manner the tool, thus configured, would have an effective cut distance between spots 2408 and 2409, for a predetermined laser fluence, which is established to meet the material and cutting speed requirements for the operation.

Figure 24:
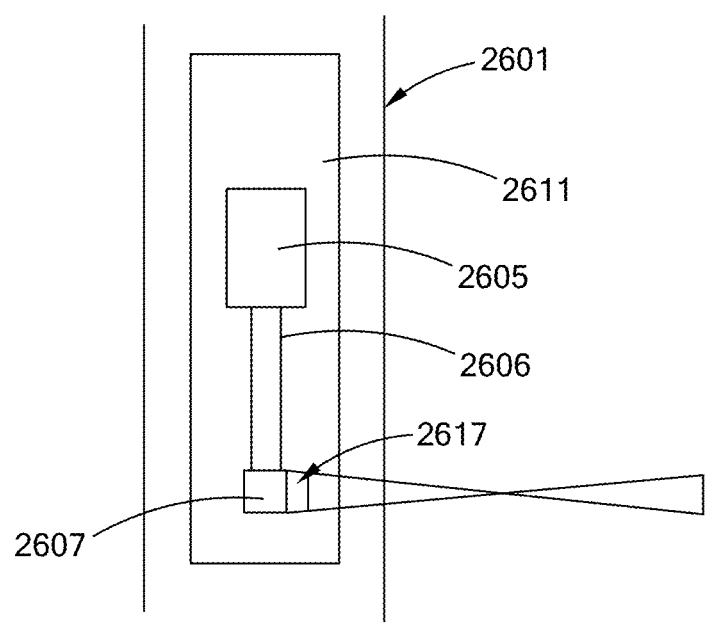
FIG. 24 is a schematic of an embodiment of a laser tool in accordance with the present invention.

The embodiment of this example would be a completely on-axis embodiment, i.e., three axis are aligned. Thus, there is an axis for the tubular to be cut 2402c, an axis for the tool body 2402b, and an axis for the optics package (including the beam path exiting the optics package) 2402a. In this embodiment, the axes are substantially co-axial, and preferable co-axial, i.e., on a same axis as shown in FIG. 24.

The tool has fixation devices 2404, 2403, which may serve to anchor, centralize, fix the tool at a predetermined stand-off distance, and which may also serve as a packer. Any fixation device known to the art may be used. Preferably, the fixation device will have the ability to be used across a wide range of tubular inner diameters.

Example 10

Figure 23:
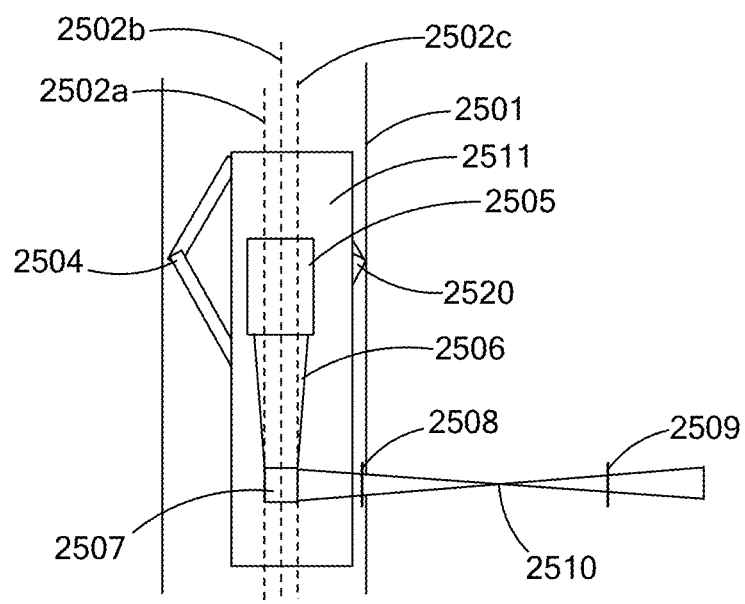
FIG. 23 is a schematic of an embodiment of a laser tool in accordance with the present invention.

In FIG. 23, there is provided an embodiment of a laser cutting tool that may be used to perform laser removal operations, such as cutting for plugging, removal, abandonment, decommission, repair and refurbishment operations. Thus, there is provided a laser tool having a body 2511, which is positioned inside of an inner surface 2501 of a tubular, e.g., a pile, a pile and conductor, a multi-string conductor, and combinations and variations of these, to be cut. The laser tool body 2511 has an optic package 2505, that focuses and directs the laser beam along beam path 2506 to a reflective device 2507, for example a TIR reflective prism. The laser beam traveling along the beam path leaves the reflective device 2507 and travels toward the target, e.g., the intended area of laser illumination.

To obtain deep cuts, the beam has a long depth of field, and thus, has a first spot size at 2508, which is in the area of the inner surface of the tubular 2501, a focus point 2510 which is removed from the inner surface of tubular 2501 and a second spot size 2509, which is removed from the focal point 2510. In this manner the tool, thus configured, would have an effective cut distance between spots 2508 and 2509, for a predetermined laser fluence, which is established to meet the material and cutting speed requirements for the operation.

The embodiment of this example would be a three off-axis embodiment, i.e., three axis are not aligned. Thus, there is an axis for the tubular to be cut 2502*c*, an axis for the tool body 2502*b*, and an axis for the optics package (including the beam path exiting the optics package) 2502*a*. In this embodiments these three axis are not co-axial, with each axis, as shown in the Figure, having a separate position.

The tool has fixation devices 2504, which may serve to anchor, and fix the tool at a predetermined stand-off distance, and which may also serve as a packer. There is also provided a roller, bumper, or stand-off device 2520, which engages the inner surface 2520. Any fixation device and stand-off device known to the art may be used. Preferably, the fixation device will have the ability to be used across a wide range of tubular inner diameters.

Example 11

In FIG. 24 there is provided an embodiment of a cutting tool 2611 positioned in a tubular structure 2601. The tool 2611 has an optics package 2605, which provides a collimated laser beam along beam path 2606 to a reflective device 2607, which may be a TIR prism. The collimated laser beam then leaves traveling along the beam path to focusing optic 2617 which focuses the laser beam. This embodiment may be an on-axis or off-axis configuration.

Example 12

Figure 25:
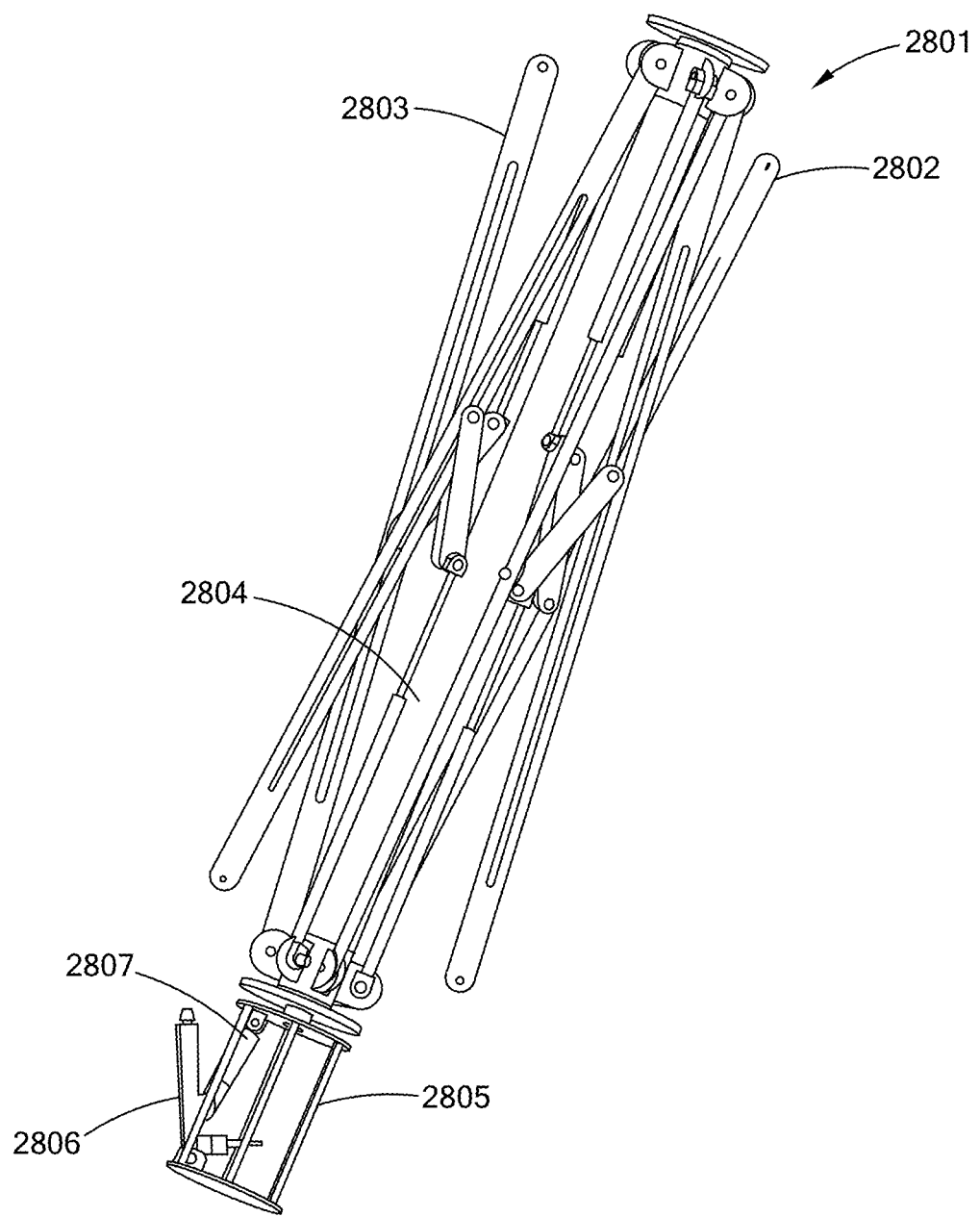
FIG. 25 is a perspective view of an embodiment of a laser cutting tool in accordance with the present invention.

In FIG. 25 there is provided an embodiment of a laser-decommissioning tool, which may be used for example to perform an inside-to-outside cut on a pile. Thus, there is provided a tool 2801 having a first section 2804 that has associated therewith anchoring devices 2802, 2803 and a third anchoring device (not shown). The first section 2804 is hollow and contains the high power laser fiber, control cables or wires, and passages for transmitting the laser cutting fluid. The first section is rotationally coupled to a second section 2805 that contains an extension mechanism 2807 such as a piston, or mechanical jack, that moves the laser head arm 2806 into a cutting position. The laser head arm contains an optics package for focusing and direction the laser beam and also a nozzle package for forming the laser-fluid jet. Although one laser head arm is shown in this embodiment, two, three or more may be used. Thus, in use the laser head arm is in a retracted position, within the outer cage 2812, as the tool is lowered into position within the pile. The outer cage 2812 protects the laser head. Thus, time and equipment costs may be saved, by avoiding the step of removing, e.g., dredging out the mud that may otherwise typically be located within the pile at and above the area to be cut. In this manner the tool may be pushed through the mud, for example by using coiled tubing and an injector system, to the position of the cut, e.g., 15 feet below the sea bed. The laser head arms may then be opened, by forcing them through the mud with the pistons. The lower section may then be rotated (by internal motor section not shown) to perform the cut, by moving the laser head arms through the mud. The shape of the laser head arms may be such as to more easily move through the mud, such as a partial or complete diamond shape, e.g., a knife-edge on the leading face for outward movement, and a knife-edge on the leading face for rotational movement. It being noted that this tool may also be advanced to the cut location after any mud or debris has been removed from the pile or tubular to be severed.

Example 13

Figure 26:
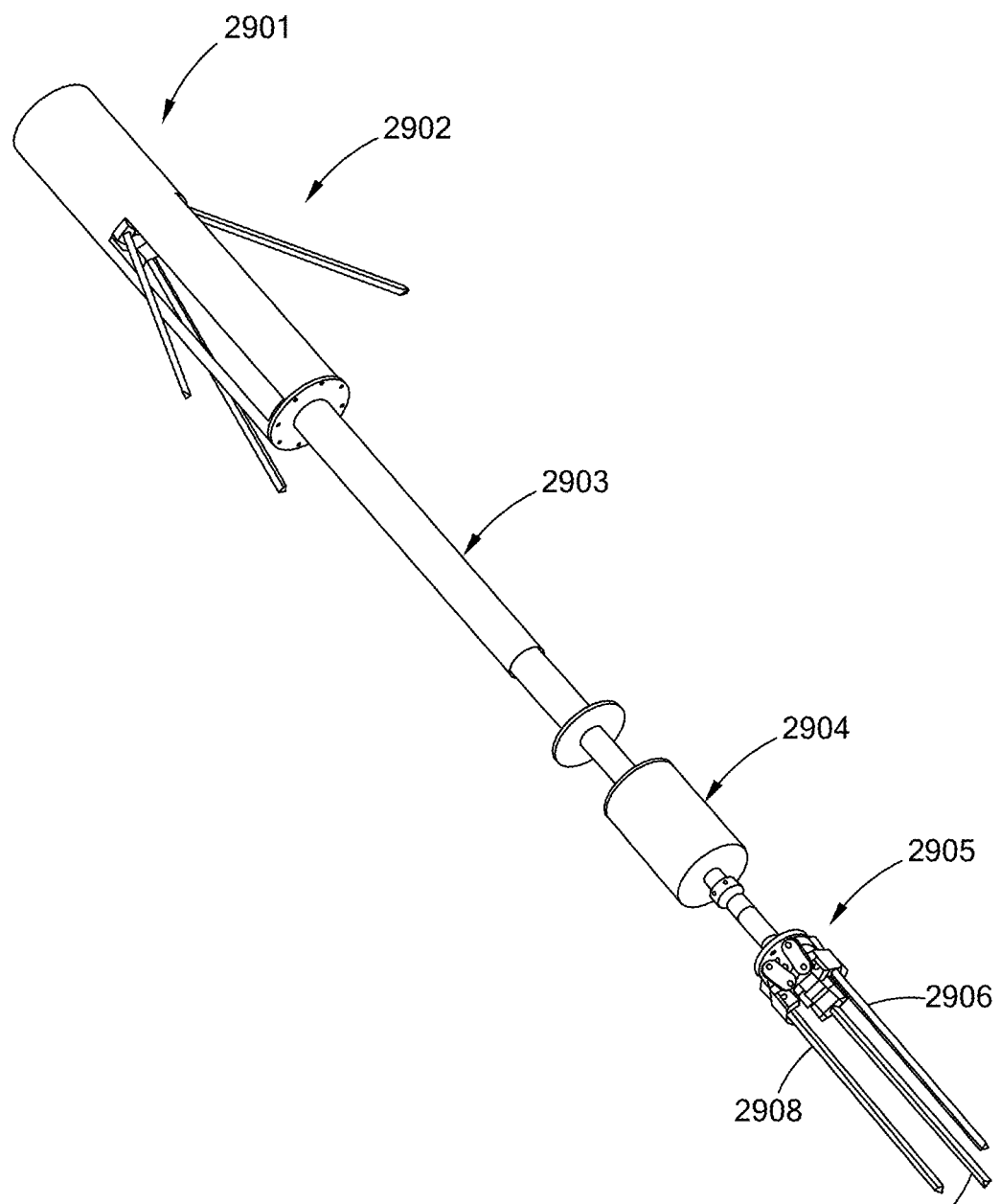
FIG. 26 is a perspective view of an embodiment of a laser cutting tool in accordance with the present invention.

Turning to FIG. 26, there is provided an embodiment of a laser tool that eliminates the need for dredging the work site before performing a laser cut. Thus, there is provided a laser tool 2901 having an anchoring section 2902, a pushing or extension section 2903, a motor section 2904 and a lower rotation section 2905 that in this embodiment has three laser head arms 2906, 2907, 2908. The arms are shown in their retracted positions in the figure. The anchoring section 2902, the pushing section 2903, and the motor section 2904 may have passages for the laser fiber, data and control lines and for conveying any fluids used for the fluid laser jet. (It should be understood that the optical fibers, data and control lines, and passages for fluids, e.g., conduit forming the passage(s) may be located outside of the tool and attached to or otherwise associated with the laser arm heads 2906, 2907, 2908. In operation the tool is lowered into the tubular to be cut, unit sufficient resistant is encounter that it can no longer be advance, by gravity or by force from for example an injector. At this point the anchors are set, fixing the tool in position. The pushing section is the activated and elongates, pushing the motor section 2904 and the rotating section 2905 down into the mud to the location where the cut is to be performed. Extending device then move the laser head arms 2906, 2907, 2908 out to engage, or be adjacent to, near to, or within reach of the laser jet under the particular mud conditions and environment, the inner surface of the tubular. The laser head arms 2906, 2907, 2908 each contain an optics package for focusing and direction the laser beam and also a nozzle assembly for forming the laser-fluid jet. Thus, time and equipment costs may be saved, by avoiding the step of removing, e.g., dredging out the mud that may otherwise typically be located within the tubular at and above the area to be cut. In this manner the tool may be pushed through the mud to the position of the cut, e.g., 15-20 feet below the sea bed. The laser head arms may then be opened, by forcing them through the mud with the pistons. The lower section 2905 may then be rotated by motor section 2904 to perform the cut, by moving the laser head arms through the mud. The shape of the laser head arms may be such as to more easily move through the mud, such as a partial or complete diamond shape, e.g., a knife-edge on the leading face for outward movement, and a knife-edge on the leading face for rotational movement. It being noted that this tool may also be advanced to the cut location after any mud or debris has been removed from the tubular to be severed.

Example 14

Figure 27:
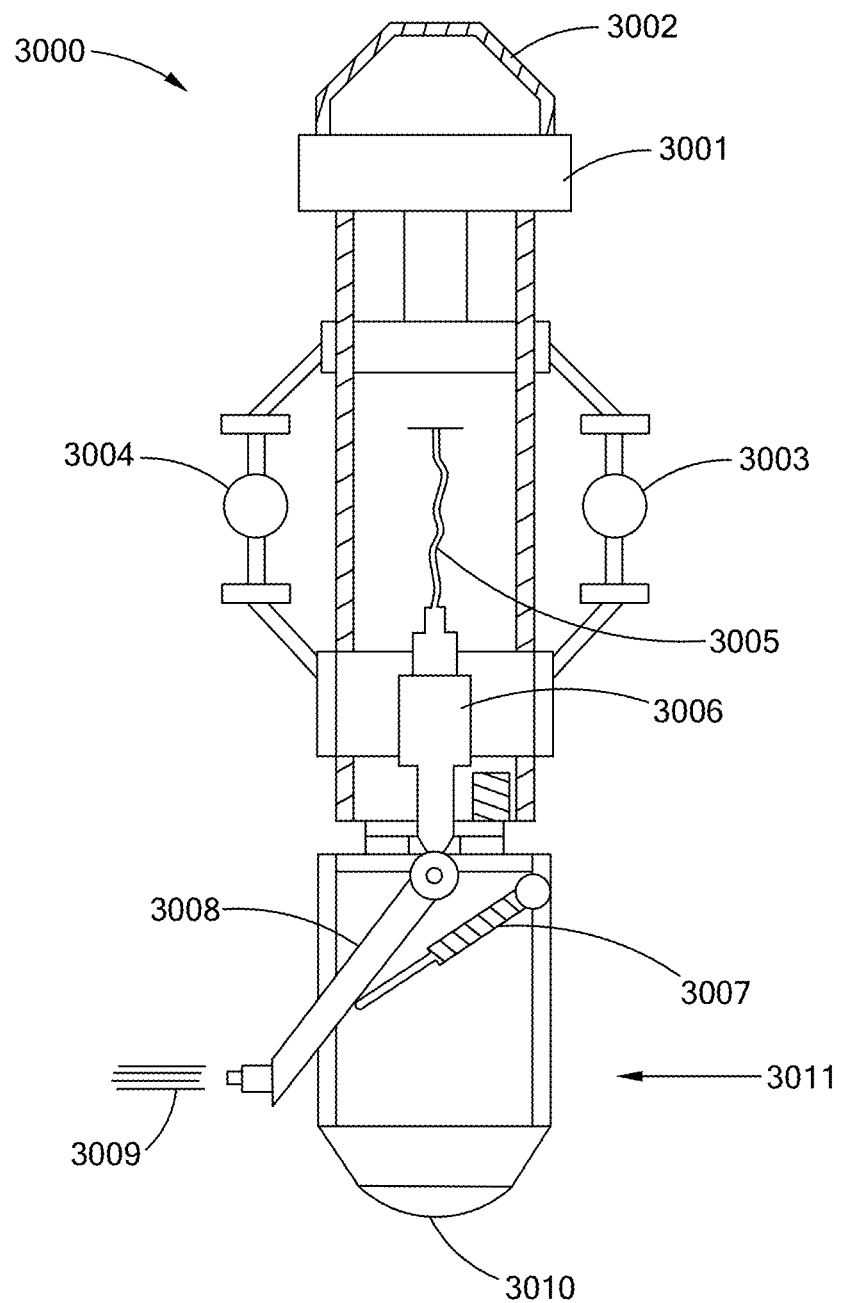
FIG. 27 is a cross sectional view of an embodiment of a laser cutting tool in accordance with the present invention.

Turning to FIG. 27 there is provided a laser tool 3000 having an upper attachment section 3002 for attachment to a line structure (not shown). Below attachment section 3002 is a first section 3001 having a first motor, e.g., and electric motor. The motor section 3001 is used to rotate the tool to extend and retract fixation devices 3004 and 3003 so that they engage the inner surface of the tubular to be cut. The optical fiber 3005 is located within the tool and is in optical communication with an optics package 3006 that directs the laser beam (and may also shape and focus the beam). The laser beam path then leaves the optics package and is directed, by beam directing devices, into arm 3008, where it exist the arm as laser-jet 3009. There an arm opening device 3007, that moves the arm outwardly from a retracted position to an operating position. There is provided a second motor 3020 that rotates the lower section and thus rotates the arm 3008. There is also provided a protective housing or noise cone 3010. The second motor 3020 can, preferably rotate the arm in both directions, e.g., clock-wise and counter-clock wise. Although not shown, the tool may have passages and conduits for conveying data lines, and fluids for forming the laser-fluid jet. Further, the tool may have cut verification devices, which enable the completeness of the cut made by the laser to be verified, either real-time during the cut, or on a separate rotation after the cut. The tool may have an effective cutting range of from about 24 inches to about 96 inches.

Example 15

Figure 28:
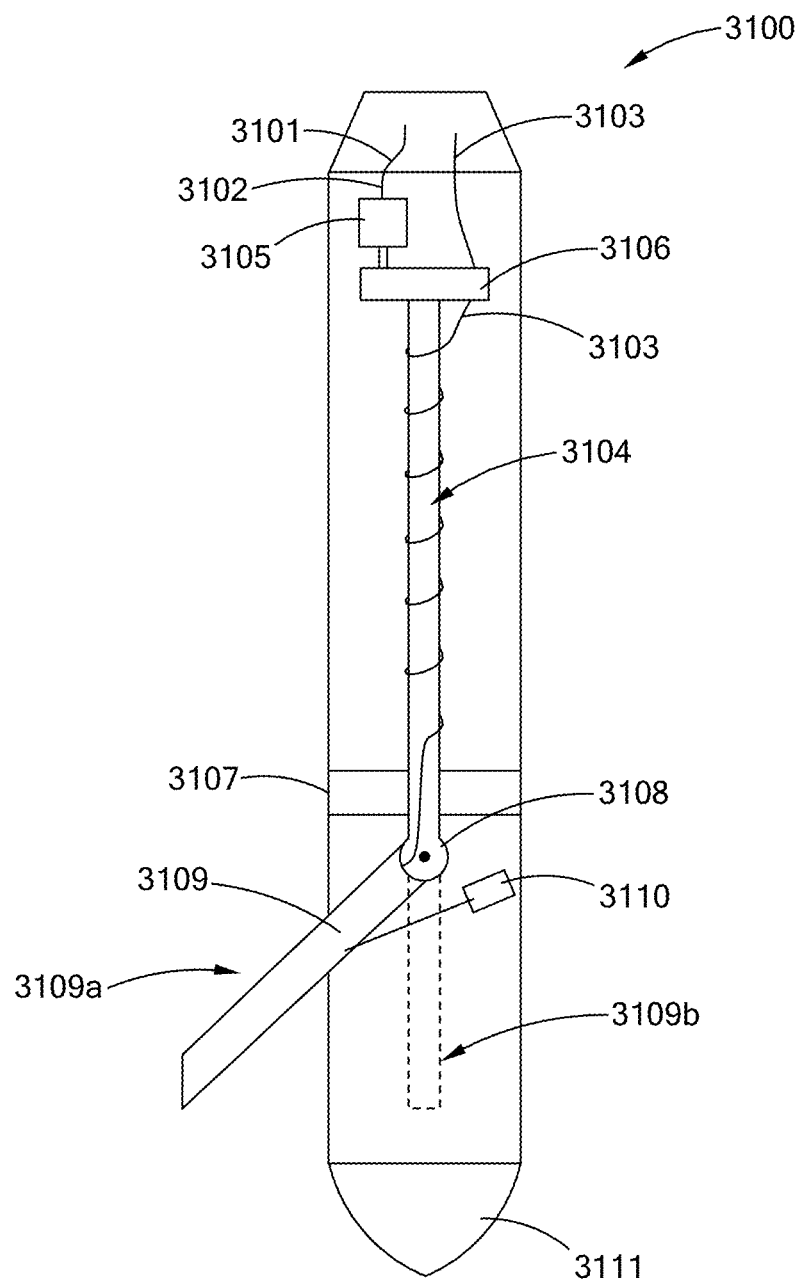
FIG. 28 is a schematic view of an embodiment of a laser cutting tool in accordance with the present invention.

Turning to FIG. 28, there is provided a laser tool 3100. The tool has a top attachment section 3101 for attaching to a line structure (not shown). There is provided an electric power line 3012 that is associated with an electric motor 3105 that is associated with a gear box 3106 for rotating a shaft 3104. There is further provided an optical fiber cable 3103 that is wrapped around the shaft 3104, e.g., spiral wrapped around the shaft 3104. There is a bearing and rotational sealing section 3107 that the shaft and fiber pass through to a rotating section 3130, that has a laser arm 3109, and protective noise piece 3111. There is a device 3110 to push the laser arm 3109 from a retracted position 3109*b* to and extended position 3109*a*. In this embodiment, the fiber is wrapped such that as the lower section is rotated to perform the cut, the fiber is unwound. In this manner, in this embodiment there is no beam path that travels in free space across a rotating mechanical juncture, e.g., a junction where one section is rotating and the other is not, or where the sections are rotating in different directions or at different rates.

Example 16

Figure 29:
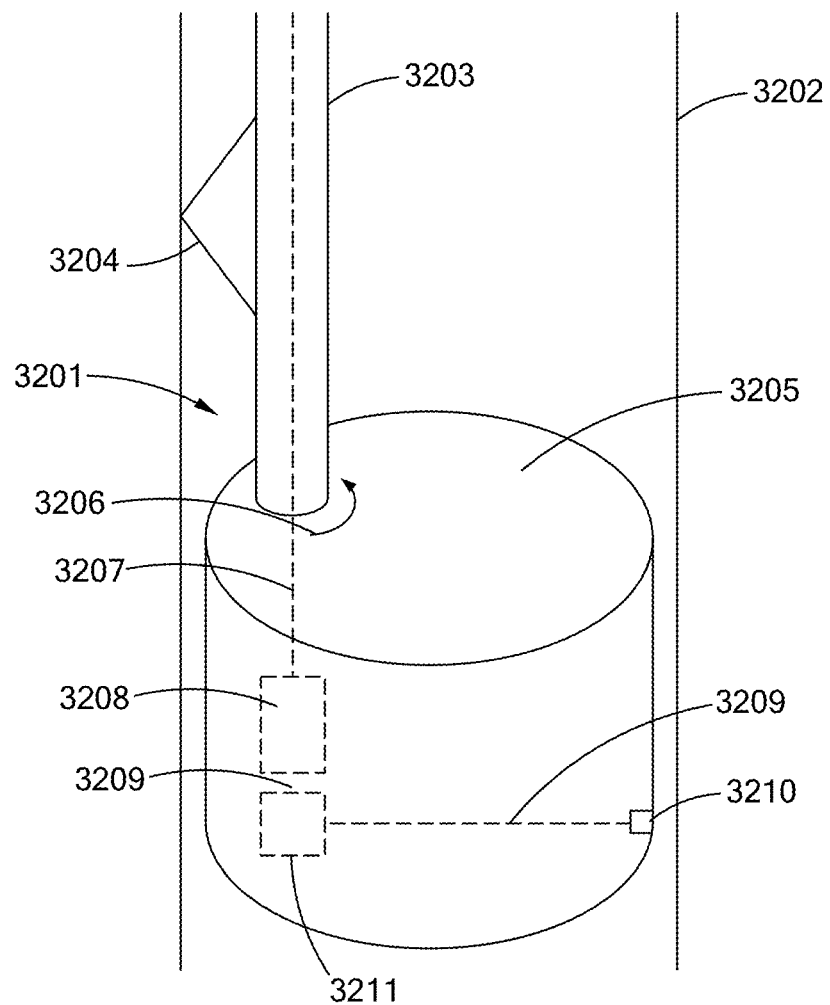
FIG. 29 is a perspective view of an embodiment of a laser cutting tool in accordance with the present invention.

Turning to FIG. 29, there is provided an embodiment of a laser tool assembly 3201 located within a tubular 3202. The laser tool assembly 3201 has a shaft section 3203 that has an anchoring device 3204, which is expandable, e.g., a spring loaded, to provide a force to push the shoe against the tubular. The shaft section is connected to a shoe section 3205. There is provided a motor section that rotates the shoe section 3205 in the direction of arrow 3206, relative to the tubular and the shaft section 3203 which do not rotate. The optical fiber 3207 extends through the shaft 3203 into the shoe and is optically associated with an optics package 3208, the laser beam leaves the optics package 3208 and travels along beam path 3209 to a reflective member 3211, where it leaves the reflective member 3211 and travels along beam path 3209, to exit the shoe at nozzle 3210, striking the tubular 3202. In this manner, a constant distance between the beam exit and the inner surface of the tubular and be maintained essentially constant, even when irregularities, or eccentricities are present in the tubular.

Example 17

Figure 30:
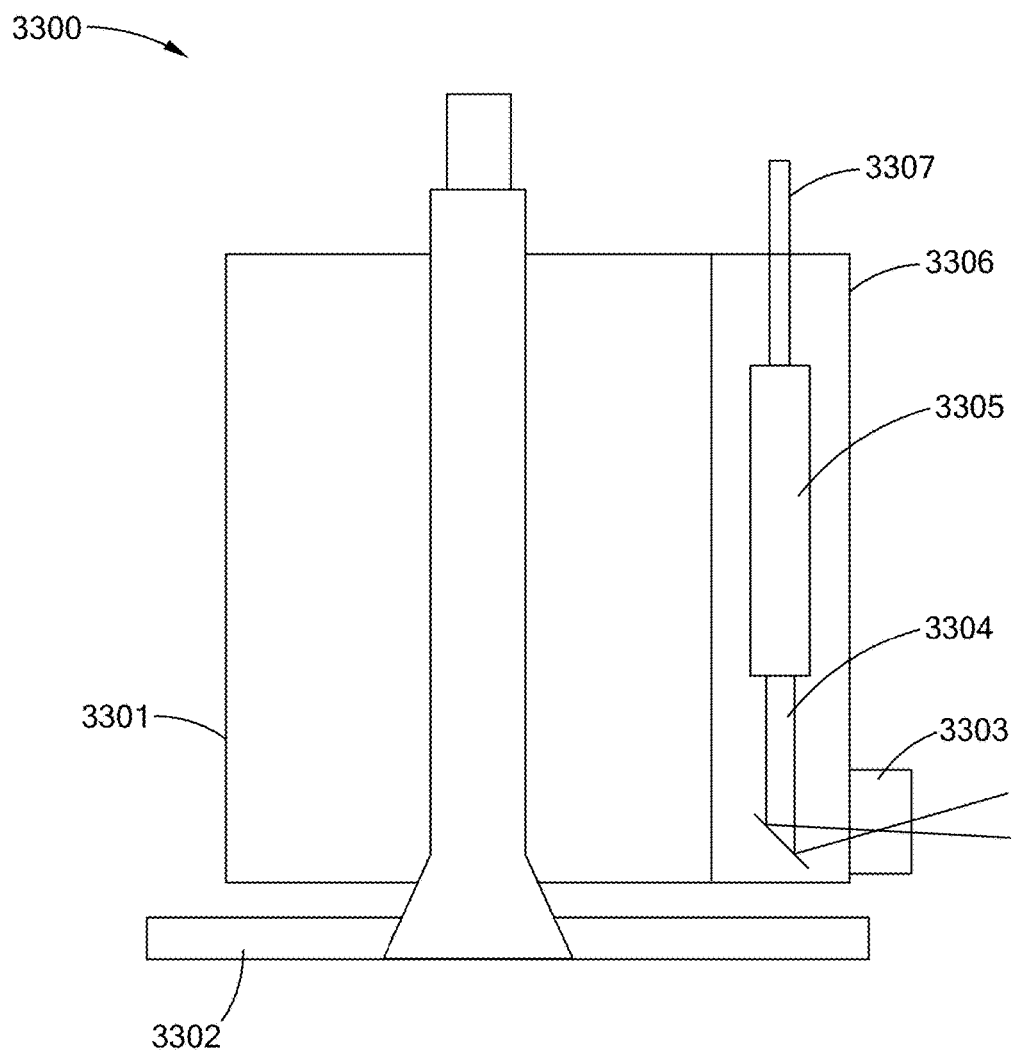
FIG. 30 is a schematic view of an embodiment of a laser cutting tool in accordance with the present invention.

Turning to FIG. 30 there is provided a laser cutting tool assembly having a removable external laser component. Thus, the laser cutting tool assembly 3300 has a drum 3301 having a side section for receiving the external laser component 3306. The external laser component 3306 has a high power laser umbilical 3307, an optics package 3305, a laser beam on a laser beam path 3304 and a nozzle 3303 for forming a fluid laser jet. There is provided a locking member 3302 that can be rotatably expanded to engage the inner walls of a tubular to be cut. In this manner a motor (not shown) rotates the drum, which rotates the external laser component 3306. External laser components may be specified or configured for specific diameter tubulars. Thus, the embodiment of FIG. 33 provides the ability to quickly and easily change the tool for different size, e.g., diameter tubulars.

Example 18

Multistring laser cutting operational procedure.

| Step | Operation |
|---|---|
| 1. | All wells must be clean of debris in order for internal laser cutting tools to function properly. Contractor is to use API sized drifts and properly drift the innerstring of the multistring well prior to the arrival of the laser cutting system. |
| 2. | Lift equipment from the support vessel onboard the work vessel and sea fasten. Equipment will be rigged up according to deck spot plan and procedure for rigging. All lifting operations require a good communication between crew, deck foreman and crane operator to avoid any hazardous situation (hanging load, correct rigging, etc.) Sea fastening and verification of the sea fastening (NDT) will be provided by the client. |

| Step | Operation |
|---|---|
| 3. | Hook-up of umbilical's and hoses.<br>Hook-up of equipment shall commence as soon as the placement and sea fastening of the equipment is confirmed and approved by the client.<br>Escape routes shall be identified and marked.<br>Hook up fiber optics, hydraulics, water and air hoses. Focus on routing of hoses to minimize trip hazards. Route fiber optic lines in a manner that minimizes exposure to personnel. Focus on isolation of equipment to prevent release of stored energy. |
| 4. | Client has filled out and reported the correct cutting depth from top of the multistring to 15' BML<br>NOTE: Depth is to include an additional distance from mean sea level to well work deck. |
| 5. | Before running the Internal Laser Cutting Tool down hole, as shown in FIG. 34, follow deployment checklist and operation procedures for pre-deployment |
| 6. | Clear as much deck space as possible. Place and secure tool umbilical winch (deployment winch) in-line with the platform multistring/well to be cut. |
| 7. | Check that the laser internal multistring cutting surface system is ready for operation |
| 8. | Connect laser cutting tool to the laser cutting umbilical (includes fiber optic line, hydraulic lines, pneumatic hoses, and electrical cables). Once connected perform full laser tool function test. |
| 9. | Connect the Foro gooseneck and injector assembly above and in-line with the well. Assembly may connect to a operator supplied I-beam or casing jack platform.<br>Utilizing the vessel crane, hoist the laser tool and umbilical over to the gooseneck and injector assembly. Slower lowering the tool down into the top of the well innerstring.<br>Clamp the injector head assembly to the umbilical for deployment of the tool to the cut depth. |
| 10. | Once the top of the tool is safely below the top of the multistring and umbilical secured, proceed to operate the injector head to slowly lower the umbilical and laser multistring cutting tool down to 15 feet below mudline. |
| 11. | At cut depth, actuate the tools anchors to the firmly secure the tool to the interior of the multistring. |
| 12. | Initiate gas flow thru the umbilical from the laser surface spread compressor, this will allow for gas to open the cutting nozzle orifice and flow evenly over the optic components as well as provide a proper laser waveguide for efficient internal to external multistring cutting.<br>NOTE: Do not allow for the gas to shutdown on the surface at anytime as this will cause debris and sediment to enter into the optic assembly of the tool and cause failure. |
| 13. | Check surface gas manifold to ensure the umbilical return is open, once open actuate the cutting tool packers. The gas pressure pumped down the gas feed line of the umbilical and thru the nozzle beneath the packers will create a downhole environment conducive to laser cutting. This will also allow for the innerstring return to be taken back up thru the umbilical and up the surface for monitoring cement, mud, seawater and gas returns. |
| 14. | Start the laser from the laser control container located on the vessel deck, monitor the returns as penetration occurs to check for liquid mud and/or liquid cement annuli. If voided annulus or fully grouted annulus are monitored move to step 14 once penetration to seabed occurs<br>If any of the heavy solids are taken thru the returns, shutdown the laser but keep air flowing to take the heavy solid return up to surface and voided annulus occur.<br>Start the laser again and continue with penetration thru seabed. |
| 15. | Confirm laser penetration thru the wall of the multistring into the seafloor by means of optic verification |
| 16. | Start laser cutting tool head rotation at pre-specified speed (based on shorebase engineer supplied cutting times versus multistring outer diameter, number of strings and wall thickness) |
| 17. | Shut the topside valve that controls the return line in the umbilical |
| 18. | Open the secondary air line on the surface manifold to allow gas flow down thru the return line. This will allow for additional gas to flow out and thru the cut zone, keeping a proper cutting atmosphere. |
| 19. | Complete 360 degree rotation and confirm the cut by means of optic verification thru a counter-clockwise rotation across the previously cut zone. IF not fully severed continue cutting with laser power at full levels until full severance occurs.<br>Once multistring has been verified fully severed, stop the rotation of the tool and release the tools anchor and packer. |
| 20. | Utilizing the injector head slowly retrieve the laser cutting tool until it reaches the top of the multistring. Gas flow should still be flowing out of the cutting head nozzle orifice in order to ensure proper optic cleanliness.<br>Connect the vessel crane to the tool and umbilical.<br>Securely hoist back to the vessel or platform working area for maintenance and down-rigging or if additional wells move the gooseneck and injector assembly to the next location and repeat Steps 4-19 |

Example 19

Single pile cutting operational procedure.

| Step | Operation |
|------|-----------|
| 1. | All piles must be clean of debris in order for internal laser cutting tools to function properly. Contractor is to properly jet or dredge pile internally before arrival of the laser cutting tools and systems and remove any internal centralizers. |
| 2. | Lift equipment onboard and sea fasten. Equipment will be rigged up according to deck spot plan and procedure for rigging. All lifting operations require a good communication between crew, Deck Forman and Crane Operator to avoid any hazardous situation (hanging load, correct rigging, etc.) Sea fastening and verification of the sea fastening (NDT) will be provided by the client. |
| 3. | Hook-up of umbilical's and hoses. Hook-up of equipment shall commence as soon as the placement and sea fastening of the equipment is confirmed and approved by the client. Escape routes shall be identified and marked. Hook up fiber optics, hydraulics, water and air hoses. Focus on routing of hoses to minimize trip hazards. Route fiber optic lines in a manner that minimizes exposure to personnel. Focus on isolation of equipment to prevent release of stored energy. |
| 4. | Client has filled out and reported the correct cutting depth from top of the pile to 15' BML NOTE: Depth is to include an additional distance due to pile batter angle. |
| 5. | Before running the Internal Laser Cutting Tool down hole, follow deployment checklist and operation procedures for pre-deployment |
| 6. | Clear as much deck space as possible. Place and secure tool umbilical winch (deployment winch) in front of vessel railing, closest to the structure and in-line with the platform piles |
| 7. | Check that the laser internal pile cutting surface system is ready for operation |
| 8. | Connect laser cutting tool to the laser cutting umbilical (includes fiber optic line, hydraulic lines, pneumatic hoses, and electrical cables). Once connected perform full laser tool function test. |
| 9. | Utilizing the vessel crane, hoist the laser tool to the pile top deployment frame and secure to the umbilical to the gooseneck and injector assembly before hoisting the entire pile top assembly over to the pile. Once the tool and umbilical are secure, hoist the deployment frame over to the platform and slowly lower the tool into the top of the pile. Actuate the deployment frame clamps to secure the frame to pile top. |
| 10. | Once the top of the tool is safely below the top of the pile proceed to operate the injector head to slowly lower the umbilical and laser pile cutting tool down to 15 feet below mudline. |
| 11. | At cut depth, actuate the tools stabilizers and/or anchors to the firmly secure the tool to the interior of the pile. |
| 12. | Initiate gas flow thru the umbilical from the laser surface spread compressor, this will allow for gas to open the cutting nozzle orifice and flow evenly over the optic components as well as provide a proper laser waveguide for efficient internal to external pile cutting. NOTE: Do not allow for the gas to shutdown on the surface at anytime as this will cause debris and sediment to enter into the optic assembly of the tool and cause failure. |
| 13. | Start the laser from the laser control container located on the vessel deck |
| 14. | Confirm laser penetration thru the wall of the pile into the seafloor by means of optic verification |
| 15. | Start laser cutting tool head rotation at pre-specified speed (based on shorebase engineer supplied cutting times versus pile outer diameter and wall thickness) |
| 16. | Complete 360 degree rotation and confirm the cut by means of optic verification thru a counter-clockwise or clockwise rotation across the previously cut zone. Once pile has been verified fully severed, stop the rotation of the tool and release the tools stabilizers and anchors. |
| 17. | Utilizing the deployment frame injector head slowly retrieve the laser cutting tool until it reaches the top of the pile. Gas flow should still be flowing out of the cutting head nozzle orifice in order to ensure proper optic cleanliness. Connect the vessel crane to the deployment frame and securely hoist back to the vessel working area for maintenance and down-rigging. |

Example 20

Figure 31:
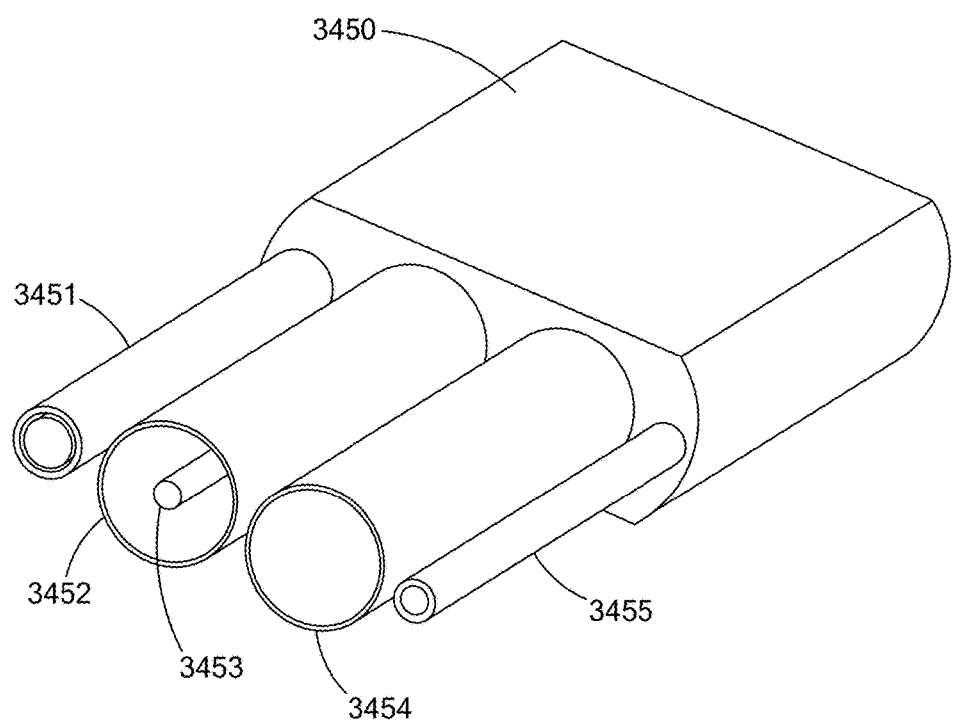
FIG. 31 is a perspective schematic view of an embodiment of an integrated umbilical for use with an embodiment of a laser tool in accordance with the present invention.
Figure 32A:
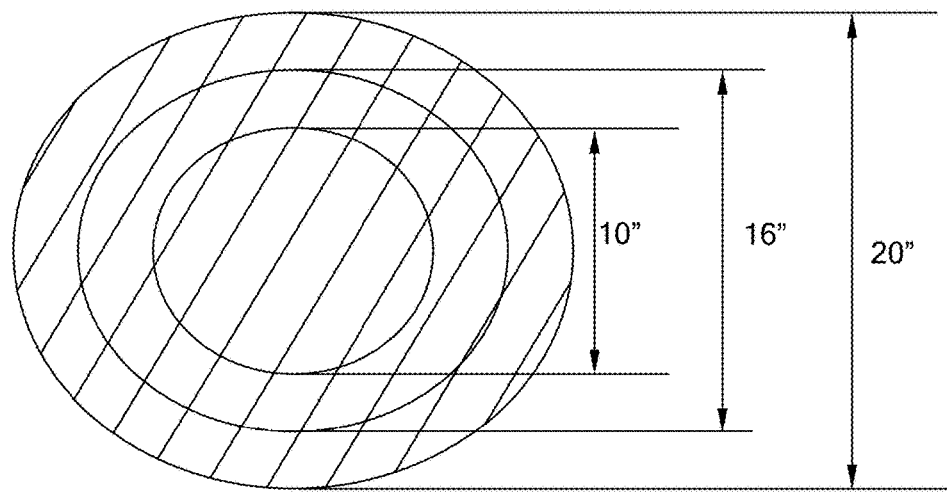
FIGS. 32A to 32M are cross sectional schematic views of material configurations cut in the embodiments of Example 21 in accordance with the present invention.
Figure 32B:
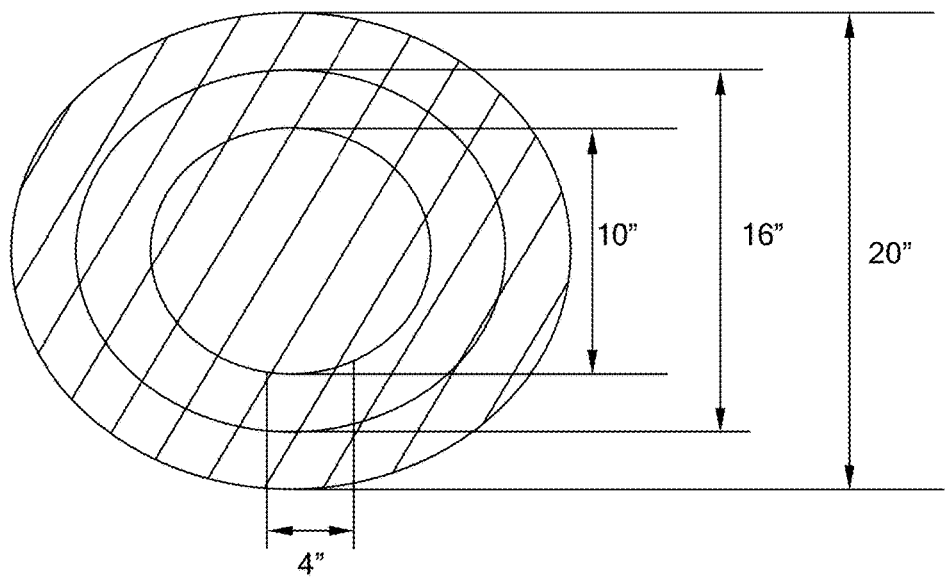
Figure 32C:
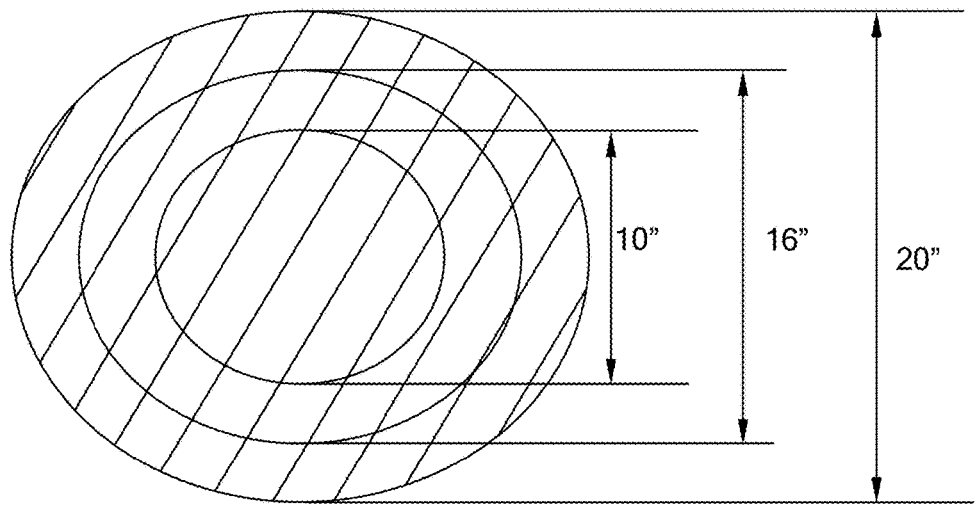
Figure 32D:
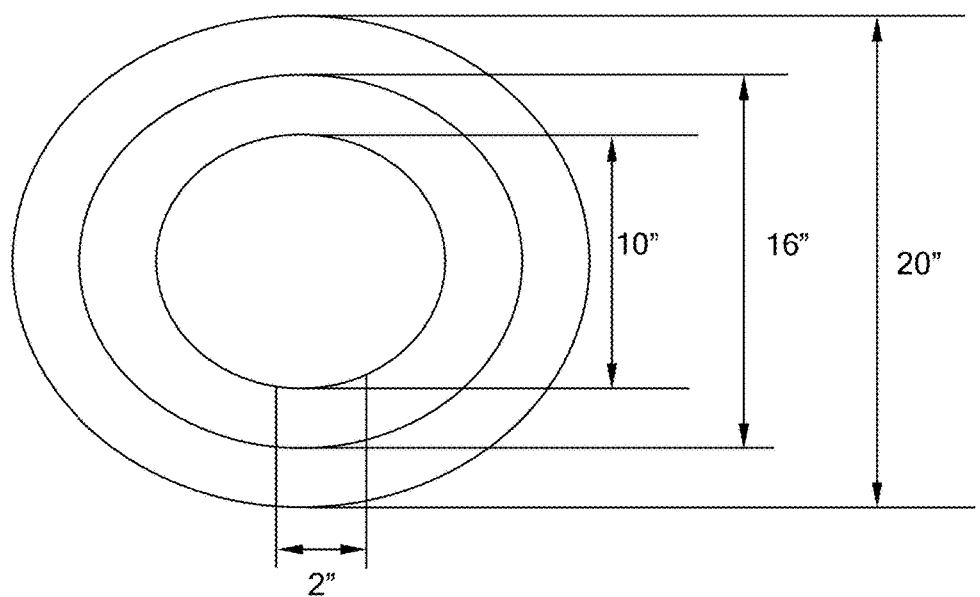
Figure 32E:
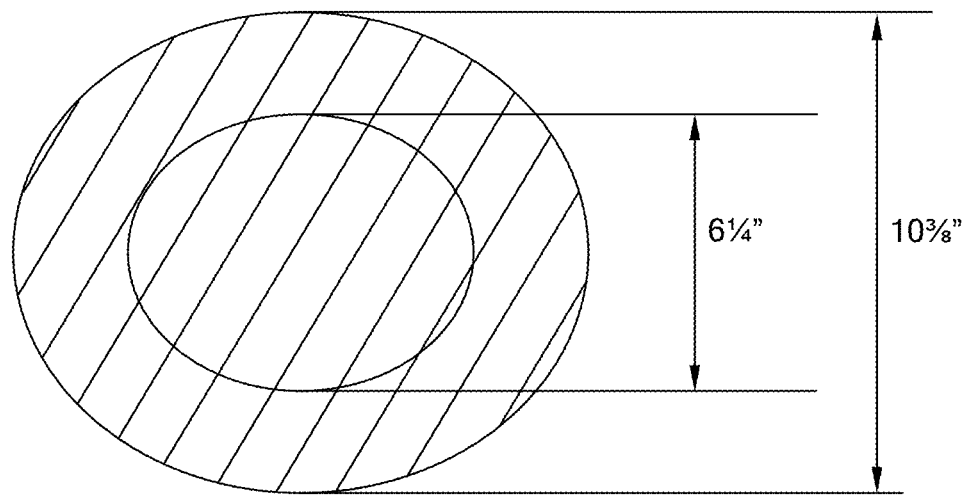
Figure 32F:
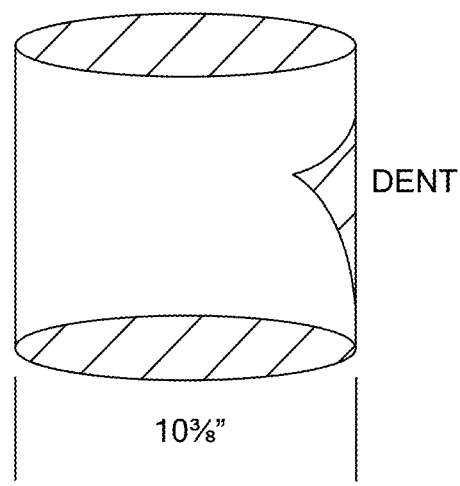
Figure 32G:
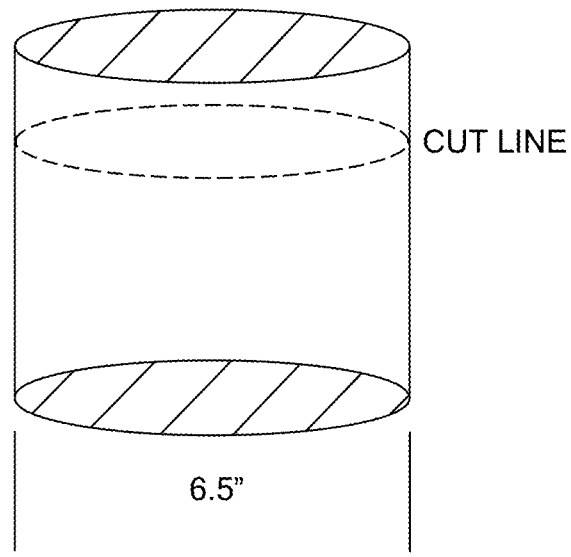
Figure 32H:
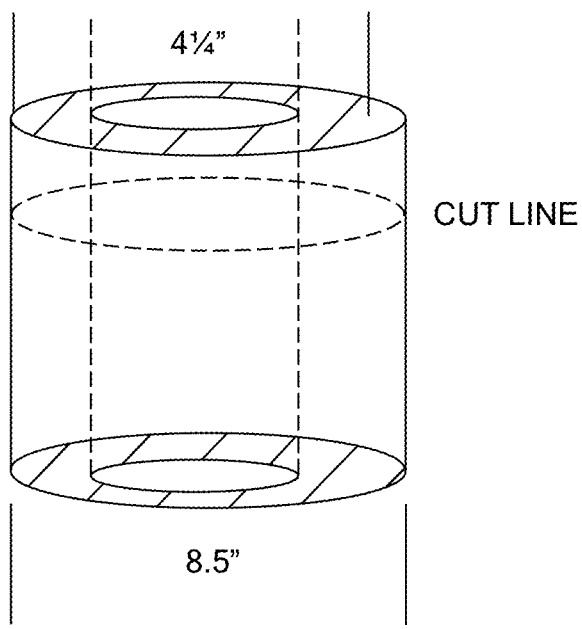
Figure 32I:
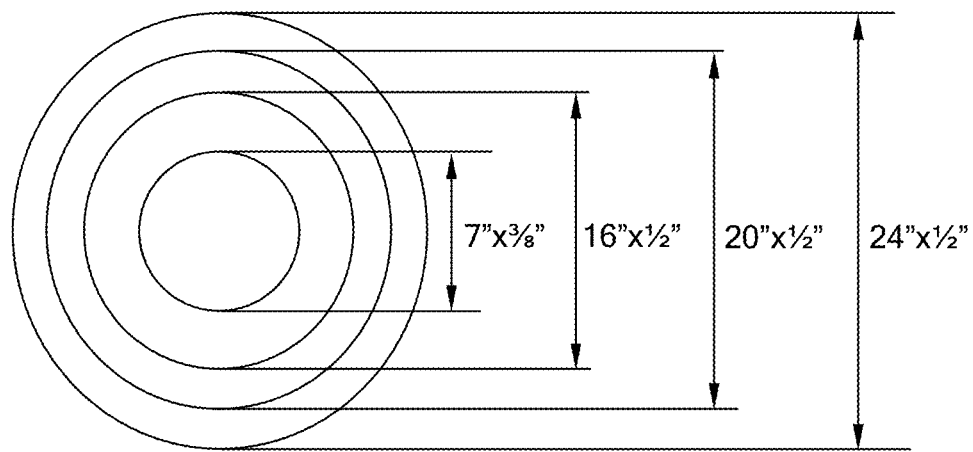
Figure 32J:
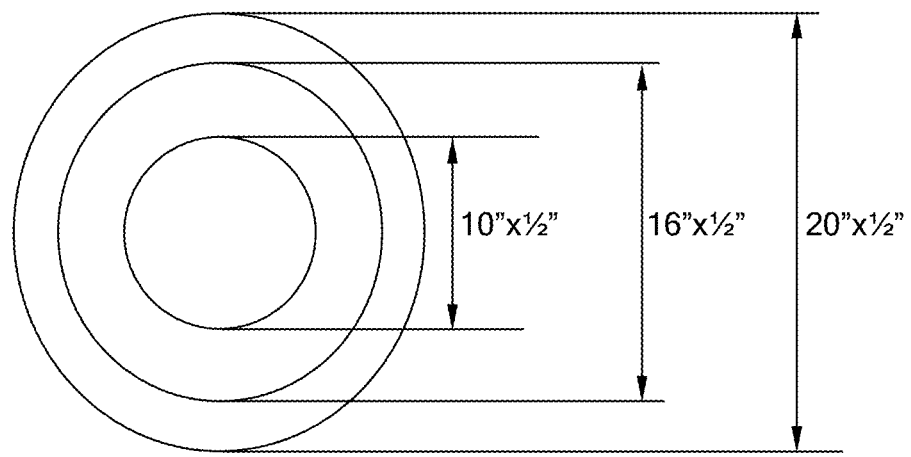
Figure 32K:
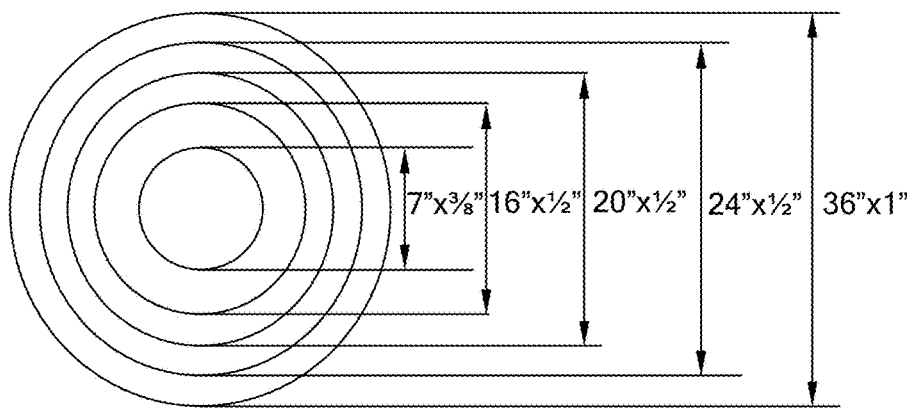
Figure 32L:
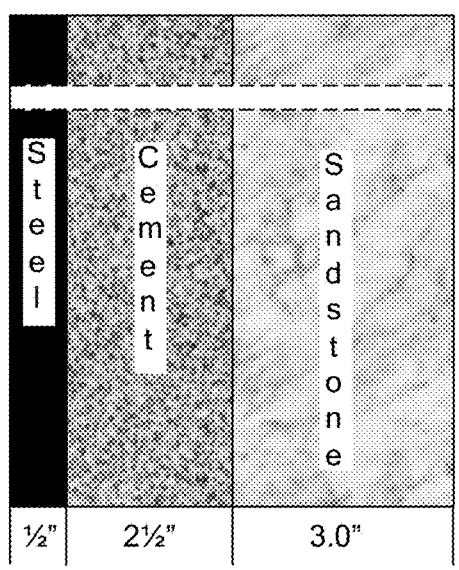
Figure 32M:
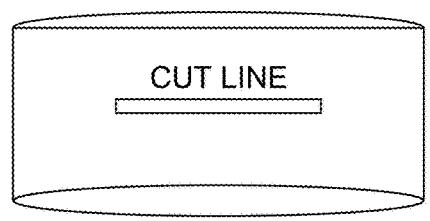

Thus, turning to FIG. 31 there is provided a schematic view of an embodiment of an integrated umbilical, having an outer member 3450, incorporating a hydraulics line 3451, a line 3452 for conveying the fluid for the fluid laser jet as well as acting as a possible strength member, the line 3452 containing a high power optical fiber in a metal tube 3453, a line 3454 for bringing returns (e.g., waste, cut material) away from the cut area, e.g., to the surface, and a line 3455 for providing electric power.

Example 21

Using a laser head in a laboratory testing apparatus, the following laser complete cuts were made on and in combinations and configurations of tubulars and materials as illustrated in FIG. 32A to 32M, and set forth in Table III.

TABLE III

| Material | FIG. illustrating configuration of material cut | Configuration | Process | Stand Off | Nozzle Diameter | Focal Length | Process Power | CFM | PSI | Speed IPM |
|---|---|---|---|---|---|---|---|---|---|---|
| Steel and Cement | 35A | 10" × 3/8" 20" × 3/8" 16" × 3/4" Fully Grouted | Cut Off Complete from ID in Air | 1/2" | .425" | 1000 mm | 15.8 KW | 280 | 125 | 5 |
| Steel and Cement | 35B | 10" × 3/8" 20" × 3/8" 16" × 3/4" Fully Grouted | Cut 4" Diameter Hole Through Fully Grouted in Air | 3/4" | 0.325 | 500 mm | 15.1 KW | 165 | 125 | 1 |
| Steel and Cement | 35C | 10" × 3/8" 20" × 3/8" 16" × 34" Fully Grouted | Cut Off Complete from ID in Water | 1/2" | .425" | 1000 mm | 15.8 KW | 280 | 125 | 5 |
| Steel and Cement | 35D | 10" × 3/8" 20" × 3/8" 16" × 34" No Grout | Cut 2" Diameter Hole in water ungrouted | 3/4" | .425" | 1000 mm | 15.8 KW | 280 | 125 | 3 |
| Steel and Cement | 35E | 6¼" × 3/8" 10" × 3/8" Grouted | Cut off complete from ID in Water | 1"" | .270" | 1000 mm | 16.2 KW | 185 | 125 | 6 |
| Steel | 35F | 10" × 3/8" Diameter Tube with Dent | Cut out Dent From ID in 3 Sections | up to 2" | .270" | 1000 mm | 16.2 KW | 185 | 125 | 10 |
| Steel | 35G | 6.5" Diameter by 3/8" Thick Tube | Cut from OD around part | .100" | .060" | 250 mm | 17.3 KW | 14 | 125 | 170 |
| Steel | 35H | 8.5" OD × 4.25 ID Tool Joint | Cut from OD around part | .100" | .225" | 500 mm | 17.3 KW | 120 | 125 | 10.5 |
| Steel and Cement | 35I | 24" × 1/2"-20" × 1/2"-16" × 1/2"-7" × 3/8" Cemented Between 16" and 20" | Cut from ID Under Water with Sealed Center | .500" | .300" | 1000 mm | 18.0 KW | 195 | 125 | 43 Minutes to Cut |
| Steel | 35J | 10½" × 3/8"-16" × 1/2"-20" × 1/2" Ungrouted | Cut from ID Under Water with Sealed Center | .500" | .300" | 1000 mm | 18.0 KW | 175 | 125 | 43 Minutes to Cut |
| Steel | 35K | 7" × 3/8"-16" × 1/2"-20" × 1/2"-36" × 1" Ungrouted | Cut from ID Under Water with Sealed Center | .500" | .300" | 1000 mm | 18.0 KW | 175 | 125 | Only 59 seconds |
| Steel, Cement and Sandstone | 35L | 1/2" Steel-2 1/2" Cement and 3" Sandstone | Perforation 2" Diameter Through Hole in Air | .500" | .300" | 500 mm | 16.5 KW | 200 | 125 | 5 |
| Steel | 35M | 1" Casing Steel | Optimizes Cutting Speed for 1/2" Diameter Beam | .500" | .750" | 1000 mm | 18.5 KW | 295 | 125 | 10 to 12 |

In addition to these, examples, the high power laser removal systems, tools, devices and methods of the present inventions may find other uses and applications in activities such as subsea beveling; decommissioning other types of offshore installations and structures; emergency pipeline repairs; cutting and removal of structures in refineries; civil engineering projects and construction and demolitions; removal of piles and jetties; removal of moorings and dolphins; concrete repair and removal; cutting of effluent and discharge pipes; maintenance, cleaning and repair of intake pipes; making small diameter bores; cutting below the mud line; precise, in-place milling and machining; heat treating; cutting elliptical man ways; and cutting deck plate cutting.

The various embodiments of systems, tools, laser heads, cutting heads, nozzles, fluid jets and devices set forth in this specification may be used with various high power laser systems and conveyance structures, in addition to those embodiments of the Figures in this specification. The various embodiments of systems, tools, laser heads, cutting heads, nozzles, fluid jets and devices set forth in this specification may be used with other high power laser systems that may be developed in the future, or with existing non-high power laser systems, which may be modified, in-part, based on the teachings of this specification, to create a laser system. Further the various embodiments of systems, tools, laser heads, cutting heads, nozzles, fluid jets and devices set forth in the present specification may be used with each other in different and various combinations. Thus, for example, the laser heads, nozzles and tool configurations provided in the various embodiments of this specification may be used with each other; and the scope of protection afforded the present inventions should not be limited to a particular embodiment, configuration or arrangement that is set forth in a particular embodiment, or in an embodiment in a particular Figure.

The various embodiments of tools, systems and methods may be used with various high power laser systems, tools, devices, and conveyance structures and systems. For example, embodiments of the present systems, tools and methods may use, or be used in, or with, the systems, lasers, tools and methods disclosed and taught in the following US patent applications and patent application publications: Publication No. 2010/0044106; Publication No. 2010/0215326; Publication No. 2012/0275159; Publication No. 2010/0044103; Publication No. 2012/0267168; Publication No. 2012/0020631; Publication No. 2013/0011102; Publication No. 2012/0217018; Publication No. 2012/0217015; Publication No. 2012/0255933; Publication No. 2012/0074110; Publication No. 2012/0068086; Publication No. 2012/0273470; Publication No. 2012/0067643; Publication No. 2012/0266803; Publication No. 2012/0217019; Publication No. 2012/0217017; Publication No. 2012/0217018; Ser. No. 13/868,149; Ser. No. 13/782,869; Ser. No. 13/222,931; Ser. No. 61/745,661; and Ser. No. 61/727,096, the entire disclosures of each of which are incorporated herein by reference.

It is also noted that the laser systems, methods, tools and devices of the present inventions may be used in whole or in part in conjunction with, in whole or in part in addition to, or in whole or in part as an alternative to existing methodologies for, e.g., monitoring, welding, cladding, annealing, heating, cleaning, drilling, advancing boreholes, controlling, assembling, assuring flow, drilling, machining, powering equipment, and cutting without departing from the spirit and scope of the present inventions. Additionally, it is noted that the sequence or timing of the various laser steps, laser activities and laser methods (whether solely based on the laser system, methods, tools and devices or in conjunction with existing methodologies) may be varied, repeated, sequential, consecutive and combinations and variations of these, without departing from the spirit and scope of the present inventions.

The invention may be embodied in other forms than those specifically disclosed herein without departing from its spirit or essential characteristics. The described embodiments are to be considered in all respects only as illustrative and not restrictive.

What is claimed:

1. A high power laser decommissioning tool, the tool comprising:
   a. a body, comprising a first section and a second section, wherein the first section is rotationally associated with the second section;
   b. the first section comprising:
      i. an anchor assembly comprising: a locking device for fixing the body in a location within a tubular; an engagement surface for engaging against an inner surface of the tubular; and a device for extending the engagement surface into engagement against the inner surface of the tubular;
      ii. a first motor, operationally connected to the second section, whereby the first motor rotates the second section;
      iii. a high power laser fiber; and,
      iv. a connector assembly for attaching a proximal end of the first section to an umbilical;
   c. the second section comprising:
      i. a second motor;
      ii. a laser pad;
      iii. a distal end of the high power laser fiber;
      iv. the distal end of the high power laser fiber in mechanical and optical association with the laser pad; and,
      v. the second motor operationally associated with the laser pad, whereby the second motor causes an axial movement of the pad.

2. The decommissioning tool of claim 1, wherein the high power laser fiber is in a wrapped configuration, whereby as the second section is rotated in a first direction the fiber will unwind, and when the second section is rotated in a second direction the fiber will wind.

3. The decommissioning tool of claim 1, wherein the high power laser fiber is in a helical configuration, whereby as the second section is rotated in a first direction the fiber will unwind, and when the second section is rotated in a second direction the fiber will wind.

4. The decommissioning tool of claim 1, wherein the high power laser fiber is in a helical configuration, whereby as the second section is rotated in a direction the fiber will unwind.

5. The decommissioning tool of claim 1, wherein the high power laser fiber is in a wrapped configuration, whereby as the second section is rotated in a first direction the fiber will unwind, and when the second section is rotated in a second direction the fiber will wind; and the pad comprises optics defining a laser beam path having a bend from about 85 degrees to about 95 degrees.

6. The decommissioning tool of claim 1, wherein the high power laser fiber is in a helical configuration, whereby as the second section is rotated in a direction the fiber will unwind; and the pad comprises optics defining a laser beam path having a bend from about 85 degrees to about 95 degrees.

7. The decommissioning tool of claim 1, wherein the anchor assembly comprises a plurality of hydraulic cylinders, operably associated with legs, whereby the hydraulic cylinders extend and retract the legs into engagement with the tubular.

8. The decommissioning tool of claim 1, the first motor is proximal to the second motor.

9. The decommissioning tool of claim 1, wherein the second motor is operably associated with the laser pad, through a ball screw nut assembly.

10. The decommissioning tool of claim 1, wherein the second motor is operably associated with the laser pad, through a ball screw nut assembly operably associated with a four bar linkage.

11. The decommissioning tool of claim 1, comprising a plurality of high power optical fibers.

12. The decommissioning tool of claim 1, wherein the high power laser fiber is in a helical configuration, whereby as the second section is rotated in a direction the fiber will unwind; and the pad comprises optics defining a laser beam path having a bend from about 85 degrees to about 95 degrees; wherein the anchor assembly comprises a plurality of hydraulic cylinders, operably associated with legs, whereby the hydraulic cylinders extend and retract the legs into engagement with the tubular; and the first motor is proximal to the second motor.

13. The decommissioning tool of claim 1, wherein the high power laser fiber is in a helical configuration, whereby as the second section is rotated in a direction the fiber will unwind; and wherein the laser pad comprises a heat sink.

14. A high power laser decommissioning tool, the tool comprising:
   a. a body, comprising a first body section and a second body section, wherein the first body section is rotationally associated with the second body section;
   b. the first body section comprising a first housing having an outer surface and an inner surface;
   c. the second body section comprising a second housing having an outer surface; a first portion of the second housing outer surface extending into the first housing, whereby the first housing inner surface overlaps the first portion; a rotary seal located between the second housing outer surface and the first housing inner surface;
   d. a third housing having an inner surface and an outer surface;
   e. the third housing extending at least partially over the first body section and the second body section; an annular passage defined by the inner surface of the third housing and at least a portion of the outer surfaces of the first and second housings; and,
   f. a high power laser fiber contained in the annular passage.

15. The high power laser decommission tool of claim 14, comprising a connector assembly for attaching a proximal end of the first section to an umbilical.

16. The high power laser decommission tool of claim 14, comprising a connector assembly for attaching a proximal end of the first section to an umbilical, wherein the assembly comprises an eye hole.

17. The decommissioning tool of claim 14, wherein the high power laser fiber is in a wrapped configuration, whereby as the second section is rotated in a first direction the fiber will unwind, and when the second section is rotated in a second direction the fiber will wind.

18. The decommissioning tool of claim 14, wherein the high power laser fiber is in a helical configuration, whereby as the second section is rotated in a first direction the fiber will unwind, and when the second section is rotated in a second direction the fiber will wind.

19. The decommissioning tool of claim 14, wherein the high power laser fiber is in a helical configuration, whereby as the second section is rotated in a direction the fiber will unwind.

20. The decommissioning tool of claim 14, wherein the high power laser fiber is in a wrapped configuration, whereby as the second section is rotated in a first direction the fiber will unwind, and when the second section is rotated in a second direction the fiber will wind; wherein the second section comprises a laser pad comprises optics defining a laser beam path having a bend from about 85 degrees to about 95 degrees.

21. The decommissioning tool of claim 20, comprising a motor operably associated with the laser pad, through a ball screw nut assembly.

22. The decommissioning tool of claim 21, wherein the motor is operably associated with the laser pad, through a ball screw nut assembly operably associated with a four bar linkage.

23. The decommissioning tool of claim 14, wherein the high power laser fiber is in a helical configuration, whereby as the second section is rotated in a direction the fiber will unwind; and the wherein the second section comprises a laser pad comprises optics defining a laser beam path having a bend from about 85 degrees to about 95 degrees.

24. The decommissioning tool of claim 14, comprising an anchor assembly.

25. The decommissioning of claim 24, wherein the anchor assembly comprises a plurality of hydraulic cylinders, operably associated with legs, whereby the hydraulic cylinders extend and retract the legs into engagement with the tubular.

* * * * *